United States Patent
Numauchi

(10) Patent No.: US 7,514,895 B2
(45) Date of Patent: Apr. 7, 2009

(54) METHOD AND DEVICE FOR SYNCHRONOUSLY CONTROLLING MULTIPLE PRINTING PRESSES OR MULTIPLE UNITS IN PRINTING PRESS

(75) Inventor: Hiromitsu Numauchi, Noda (JP)

(73) Assignee: Komori Corporation, Tokyo (JP)

( * ) Notice: Subject to any disclaimer, the term of this patent is extended or adjusted under 35 U.S.C. 154(b) by 738 days.

(21) Appl. No.: 11/099,672

(22) Filed: Apr. 6, 2005

(65) Prior Publication Data

US 2005/0231149 A1    Oct. 20, 2005

(30) Foreign Application Priority Data

Apr. 7, 2004    (JP)    ............... 2004-112655

(51) Int. Cl.
G05B 11/32    (2006.01)

(52) U.S. Cl. ............... 318/625; 318/41; 318/49

(58) Field of Classification Search ............... 318/41, 318/49, 59, 63, 66, 68, 77, 85, 625
See application file for complete search history.

(56) References Cited

U.S. PATENT DOCUMENTS 5,757,147 A * 5/1998 Blumor et al. ............ 318/41
6,109,176 A * 8/2000 Fujio et al. ............ 101/216
6,417,643 B1  7/2002 Shiba et al.
6,684,788 B2 * 2/2004 Ohno et al. ............ 101/484
2002/0189480 A1 * 12/2002 Ohno et al. ............ 101/484

FOREIGN PATENT DOCUMENTS

| CN | 2122720 U | 11/1992 |
|---|---|---|
| JP | 2001-309681 A | 11/2001 |

* cited by examiner

*Primary Examiner*—Rina I Duda
(74) *Attorney, Agent, or Firm*—Birch, Stewart, Kolasch & Birch, LLP

(57) ABSTRACT

A method and a device for synchronously controlling multiple printing presses or multiple units in a printing press can reduce power consumption and improve durability of motors and motor bearings. A synchronous control device for multiple printing presses includes machine shafts of a main printing press and a sub printing press respectively provided with drive motors and is configured to synchronously control rotation of the sub printing press with respect to rotation of the main printing press. Here, drive motor brakes are attached to the respective drive motors, and drive control devices respectively configured to release synchronous control of the drive motor of the sub printing press by a stop instruction and to start the drive motor brakes of both of the printing presses are provided.

18 Claims, 124 Drawing Sheets

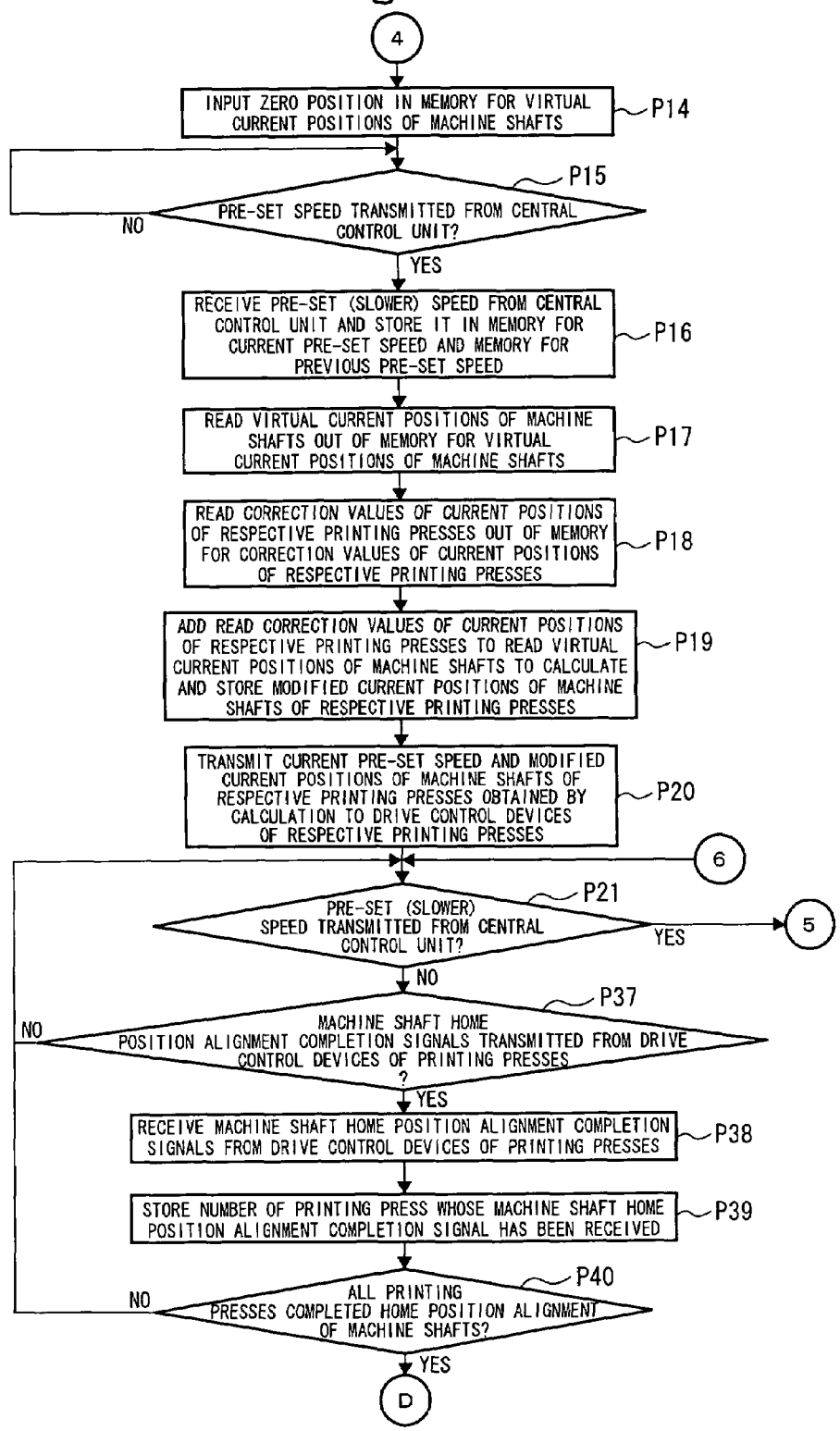

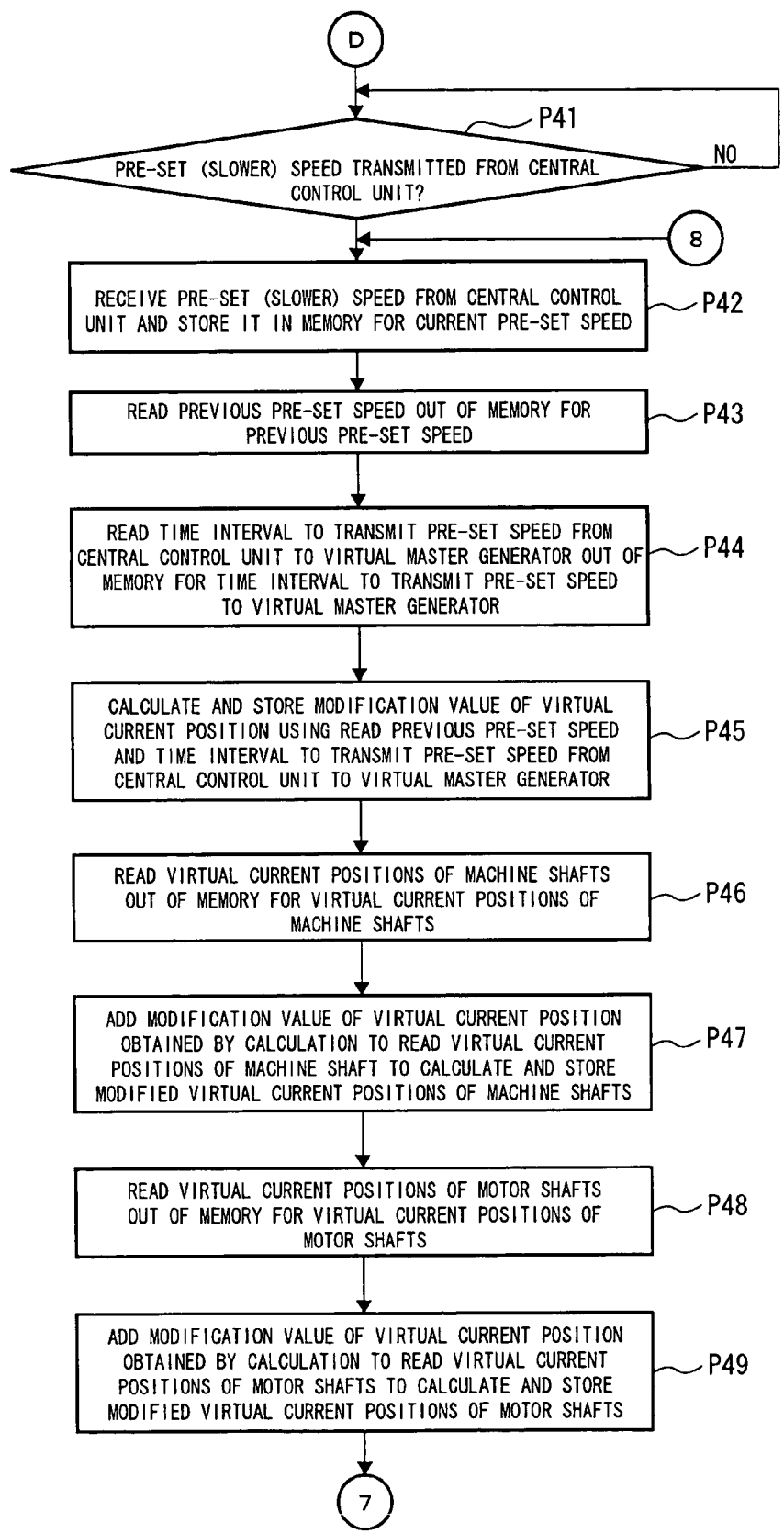

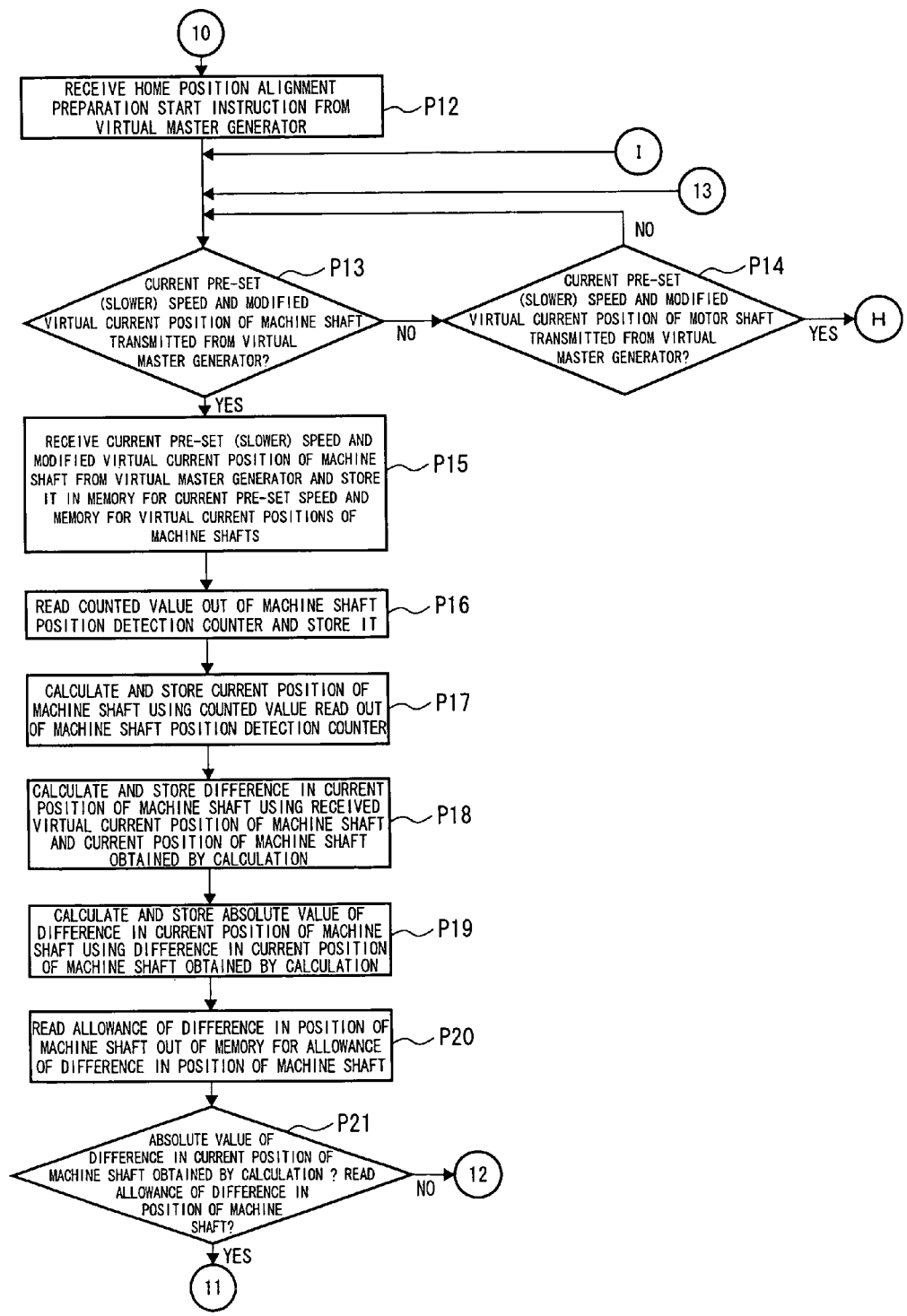

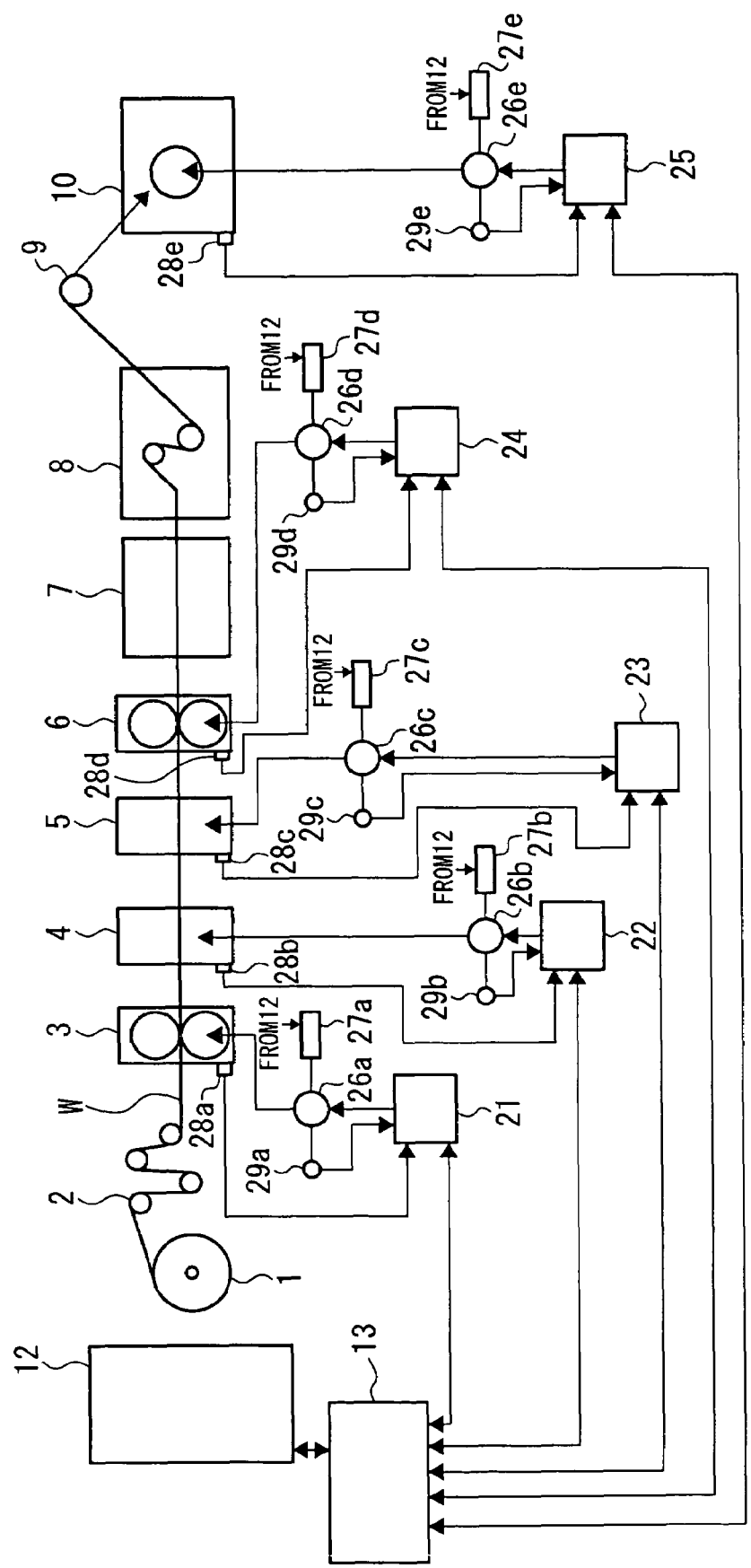

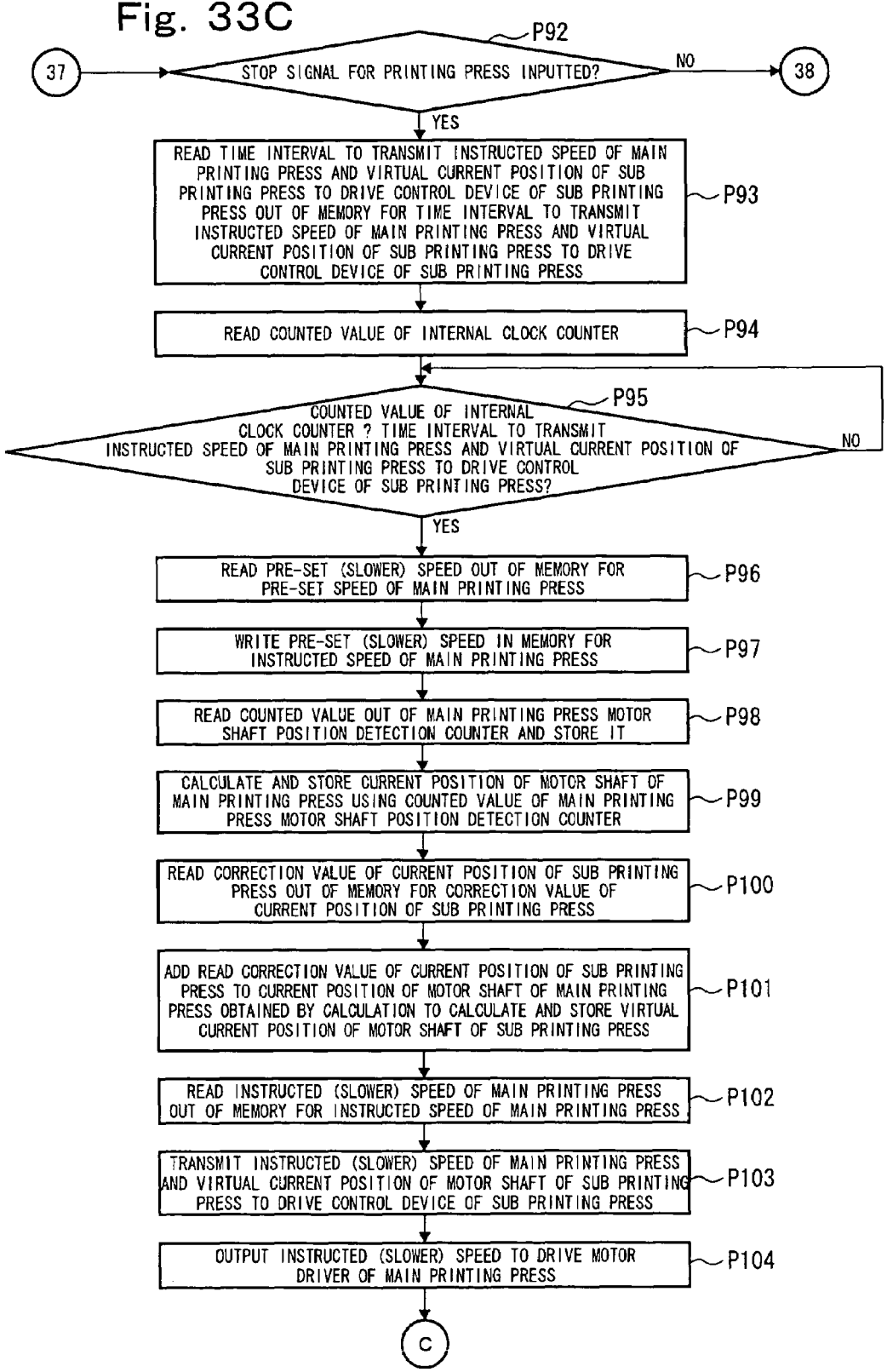

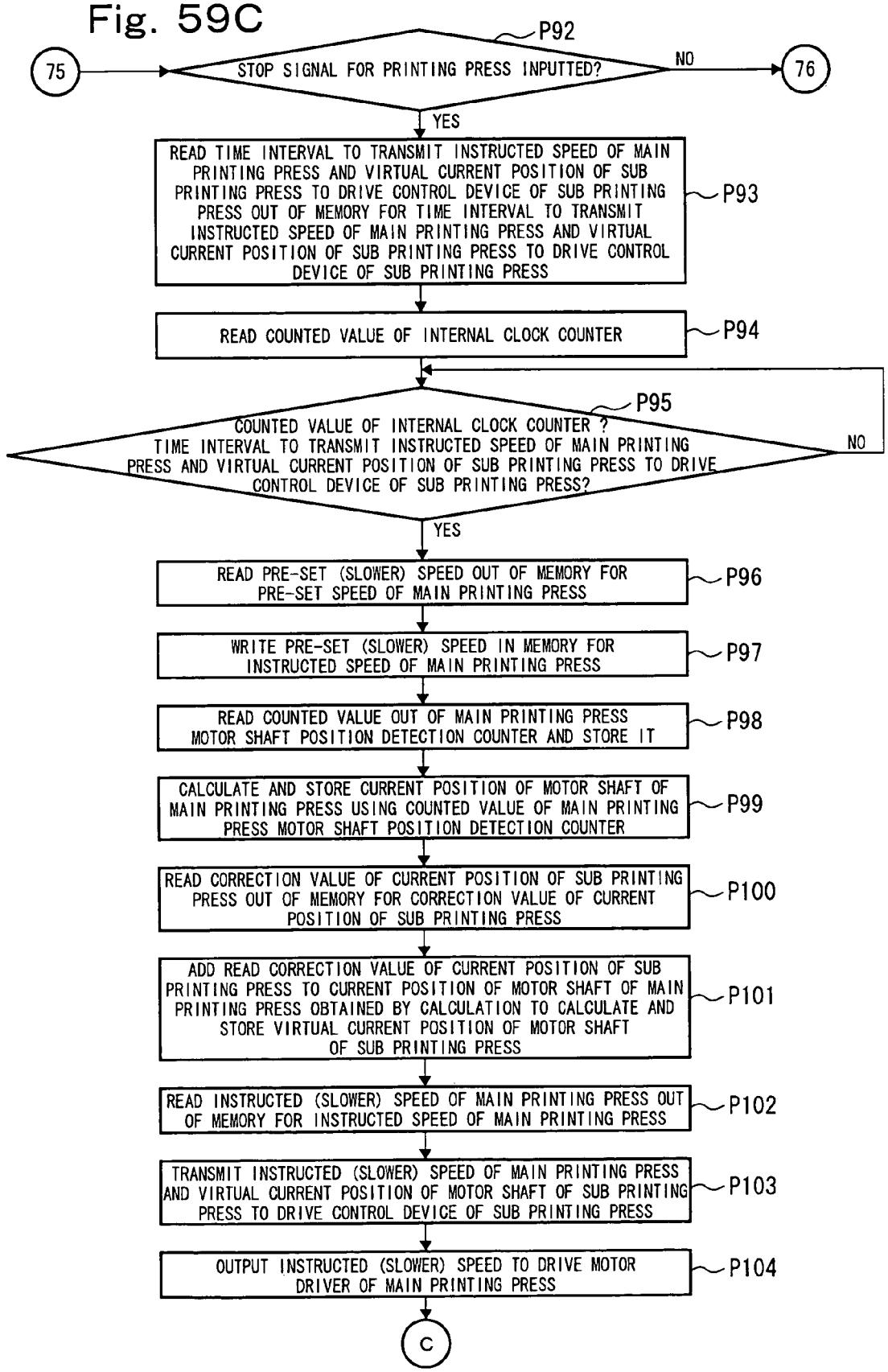

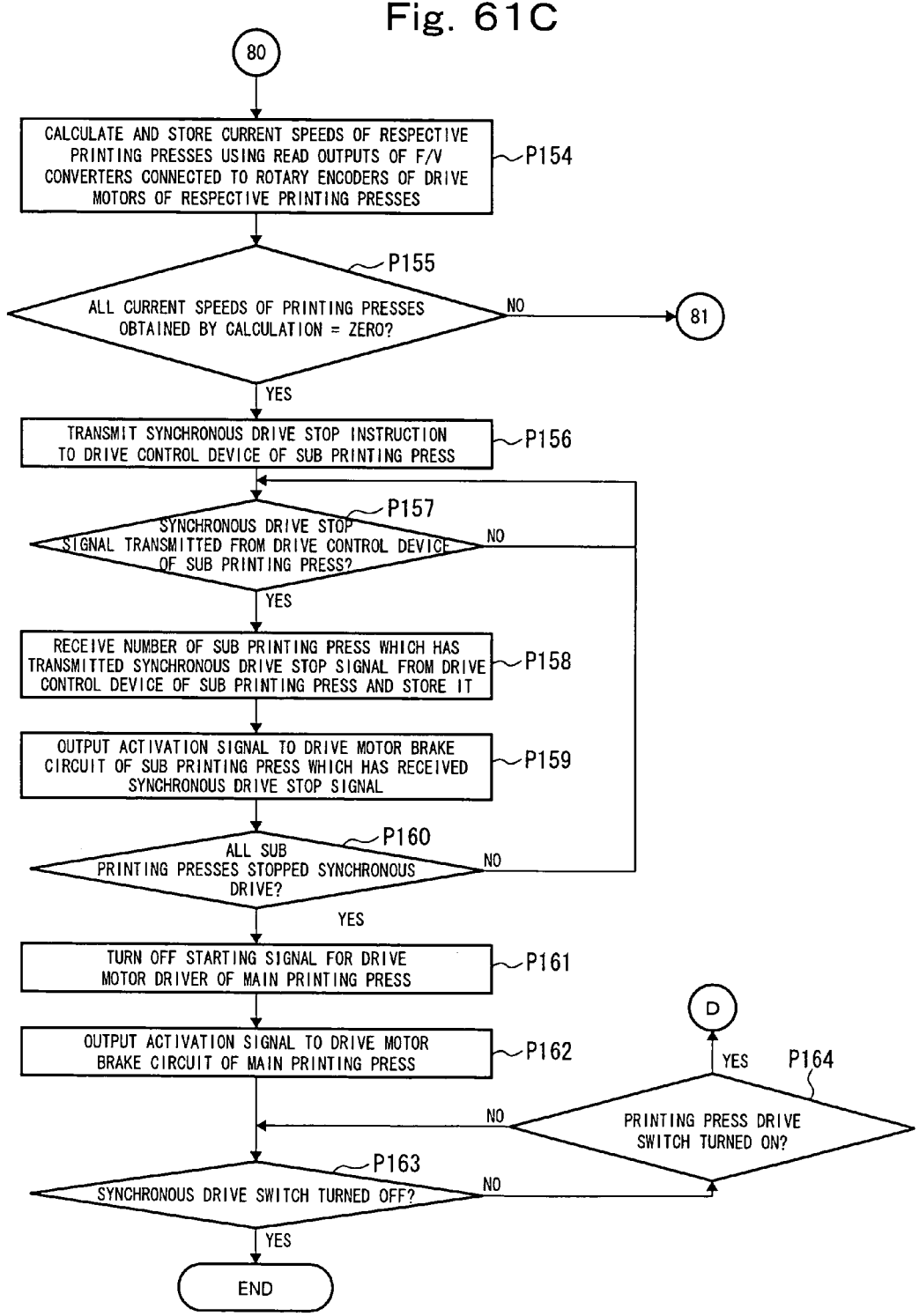

METHOD AND DEVICE FOR SYNCHRONOUSLY CONTROLLING MULTIPLE PRINTING PRESSES OR MULTIPLE UNITS IN PRINTING PRESS

BACKGROUND OF THE INVENTION

1. Field of the Invention

The present invention relates to a method and a device for synchronously controlling multiple printing presses or multiple units in a printing press suitable for application to web-fed rotary printing presses.

2. Description of the Related Art

Conventionally, a synchronous drive control device for synchronously driving multiple printing presses or multiple units (such as printing units or folding machines) in a printing press has been configured to perform synchronous control even when the printing press or the printing presses are in shutdown as shown in Japanese Unexamined Patent Publication No. 2001-309681 (hereinafter, referred to as Patent Document 1), for example.

That is to say, Patent Document 1 relates to a synchronous control device applicable to web-fed rotary printing presses and the like, and more specifically, discloses an invention concerning a synchronous control device including a home position aligning function configured to accurately achieve synchronous drives of rotation phases and rotation speeds in terms of either electric motors including a main motor and a plurality of sub motors or respective machine shafts to be driven by the electric motors. Upon the synchronous control, firstly, phases of an electric motor shaft and the machine shaft of the main motor are constantly detected with a phase detector by use of an output from a rotary encoder of the main motor and an output from a main motor machine shaft home position detector. Meanwhile, phases of electric motor shafts and the machine shafts of the sub motors are constantly detected with phase detectors by use of outputs from rotary encoders of the sub motors and outputs from sub motor machine shaft home position detectors. Then, phase differences between the machine shaft of the main motor and the machine shafts of the sub motors are obtained by use of a machine shaft phase difference detector, and phase differences between the electric motor shaft of the main motor and the electric motor shafts of the sub motors are obtained by use of an electric motor shaft phase difference detector. Based on these outputs, home positions of the machine shafts of the main motors and the sub motors are aligned and then home positions of the electric motor shafts of the main motor and sub motors are aligned to perform synchronous control of the main motor and the sub motors.

However, the invention according to Patent Document 1 is configured to perform the synchronous control (position control and "0" speed control of the electric motors) even when the web-fed rotary printing press are in shutdown. Accordingly, currents will flow on the electric motors and electric motor drive circuits even when the printing presses are in shutdown. For this reason, this invention has problems of an increase in power consumption, and of deterioration in durability of the electric motors and bearings of the electric motors which are attributable to deterioration of greases of the electric motors of the bearings of the electric motors caused by heat generation.

SUMMARY OF THE INVENTION

In consideration of the foregoing problems, it is an object of the present invention to provide a method and a device for synchronously controlling multiple printing presses or multiple units in a printing press, which are capable of reducing power consumption and improving durability of motors and motor bearings.

To attain the object, a method of synchronously controlling multiple printing presses or multiple units in a printing press according to the present invention is a method of synchronously controlling any of multiple printing presses or any of multiple units in a printing press, in which any of the multiple printing presses or the multiple units in the printing press are respectively provided with drive motors and rotation of at least one drive motor among the plurality of drive motors is synchronously controlled, the method characterized in that braking means for braking the rotation of at least one of the drive motors among the plurality of drive motors is provided, and the method including the step of: releasing synchronous control of the drive motor provided with the braking means by a stop instruction and starting the braking means.

In an aspect of the present invention, the method is characterized in that the synchronous control of the drive motor is released by cutting off a starting signal for a motor driver of the drive motor.

In an aspect of the present invention, the method is characterized in that speed detecting means for detecting a rotation speed of the drive motor provided with the braking means is provided, and the method further including the steps of: starting deceleration of drive speeds of the plurality of drive motors by the stop instruction; and releasing the synchronous control of the drive motor provided with the braking means and starting the braking means when the rotation speed detected by the speed detecting means becomes equal to or slower than a predetermined rotation speed.

In an aspect of the present invention, the method is characterized in that the predetermined rotation speed is equal to zero.

In an aspect of the present invention, the method is characterized in that a virtual master generator for generating a synchronization reference signal based on an inputted rotation speed instruction is provided, the synchronization reference signal includes a speed instruction and a phase instruction, and the plurality of drive motors are controlled to be synchronized with the synchronization reference signal from the virtual master generator.

In an aspect of the present invention, the method is characterized in that the synchronous control of the drive motors is released by cutting off a starting signal for motor drivers of the drive motors.

In an aspect of the present invention, the method is characterized in that speed detecting means for detecting a rotation speed of the drive motor provided with the braking means is provided, and the method further including the steps of: starting deceleration of drive speeds of the plurality of drive motors by the stop instruction; and releasing the synchronous control of the drive motor provided with the braking means and starting the braking means when the rotation speed detected by the speed detecting means becomes equal to or slower than a predetermined rotation speed.

In an aspect of the present invention, the method is characterized in that the predetermined rotation speed is equal to zero.

In an aspect of the present invention, the method is characterized in that a first drive motor and a second drive motor is provided, braking means for braking rotation of the second drive motor is provided, and speed detecting means for detecting rotation speed of the first drive motor or the second drive motor is provided, and the method further including the steps of: starting deceleration of drive speeds of the first drive motor and the second drive motor by the stop instruction; and releasing the synchronous control of the second drive motor and starting the braking means when the rotation speed detected by the speed detecting means becomes equal to or slower than a predetermined rotation speed.

In an aspect of the present invention, the method is characterized in that the predetermined rotation speed is equal to zero.

In an aspect of the present invention, the method is characterized in that the synchronous control of the drive motor is released by cutting off a starting signal for a motor driver of the drive motor.

To attain the object, a device for synchronously controlling multiple printing presses or multiple units in a printing press according to the present invention is a device for synchronously controlling any of multiple printing presses or any of multiple units in a printing press, in which any of the multiple printing presses or the multiple units in the printing press are respectively provided with drive motors and rotation of at least one of the drive motors among the plurality of drive motors is synchronously controlled, the device including: braking means for braking the rotation of at least one of the drive motors among the plurality of drive motors; and controlling means for releasing synchronous control of the drive motor provided with the braking means by a stop instruction and starting the braking means.

In an aspect of the present invention, the device is characterized in that the synchronous control of the drive motor is released by cutting off a starting signal for a motor driver of the drive motor.

In an aspect of the present invention, the device is characterized in that the device further includes speed detecting means for detecting a rotation speed of the drive motor provided with the braking means, wherein the controlling means starts deceleration of drive speeds of the plurality of drive motors by the stop instruction, and when the rotation speed detected by the speed detecting means becomes equal to or slower than a predetermined rotation speed, the controlling means releases the synchronous control of the drive motor provided with the braking means, and starts the braking means.

In an aspect of the present invention, the device is characterized in that the predetermined rotation speed is equal to zero.

In an aspect of the present invention, the device is characterized in that the device further includes a virtual master generator for generating a synchronization reference signal based on an inputted rotation speed instruction, wherein the synchronization reference signal includes a speed instruction and a phase instruction, and the controlling means controls the plurality of drive motors in a way that the plurality of drive motors are synchronized with the synchronization reference signal from the virtual master generator.

In an aspect of the present invention, the device is characterized in that the synchronous control of the drive motors is released by cutting off a starting signal for motor drivers of the drive motors.

In an aspect of the present invention, the device is characterized in that the device further includes speed detecting means for detecting a rotation speed of the drive motor provided with the braking means, wherein the controlling means starts deceleration of drive speeds of the plurality of drive motors by the stop instruction, and when the rotation speed detected by the speed detecting means becomes equal to or slower than a predetermined rotation speed, the controlling means releases the synchronous control of the drive motor provided with the braking means, and starts the braking means.

In an aspect of the present invention, the device is characterized in that the predetermined rotation speed is equal to zero.

In an aspect of the present invention, the device is characterized in that the device further includes: a first drive motor and a second drive motor; braking means for braking rotation of the second drive motor; and speed detecting means for detecting rotation speed of the first drive motor or the second drive motor, wherein the controlling means starts deceleration of drive speeds of the first drive motor and the second drive motor by the stop instruction, and when the rotation speed detected by the speed detecting means becomes equal to or slower than a predetermined rotation speed, the controlling means releases the synchronous control of the second drive motor, and starts the braking means.

In an aspect of the present invention, the device is characterized in that the predetermined rotation speed is equal to zero.

In an aspect of the present invention, the device is characterized in that the synchronous control of the drive motor is released by cutting off a starting signal for a motor driver of the drive motor.

According to the present invention configured as described above, when the printing press or the printing presses are in shutdown, synchronous conditions of the multiple printing presses or the multiple units in the printing press are retained by stopping the synchronous control of the drive motor and starting the braking means attached to the drive motor. In this way, it is not necessary to supply currents to the motors and the motor drivers when the printing press or the printing presses are in shutdown, and it is thereby possible to reduce power consumption and to improve durability of motors and motor bearings.

BRIEF DESCRIPTION OF THE DRAWINGS

FIG. 8B is another operational flowchart of the virtual master generator.

FIG. 9A is another operational flowchart of the virtual master generator.

FIG. 12B is another operational flowchart of the drive control device of each of the printing presses.

FIG. 15 is a schematic configuration diagram of a device for synchronously controlling multiple units in a printing press, showing a second embodiment of the present invention.

FIG. 33C is another operational flowchart of the drive control device for the main printing press.

FIG. 59C is another operational flowchart of the drive control device for the main printing press.

FIG. 61C is another operational flowchart of the drive control device for the main printing press.

FIG. 65A is another operational flowchart of the drive control device for the main unit.

FIG. 65B is another operational flowchart of the drive control device for the main unit.

FIG. 66A is another operational flowchart of the drive control device for the main unit.

FIG. 66B is another operational flowchart of the drive control device for the main unit.

FIG. 66C is another operational flowchart of the drive control device for the main unit.

DETAILED DESCRIPTION OF THE PREFERRED EMBODIMENTS

Now, preferred embodiments of a method and a device for synchronously controlling multiple printing presses or multiple units in a printing press according to the present invention will be described in detail with reference to the accompanying drawings.

First Embodiment

Figure 1:
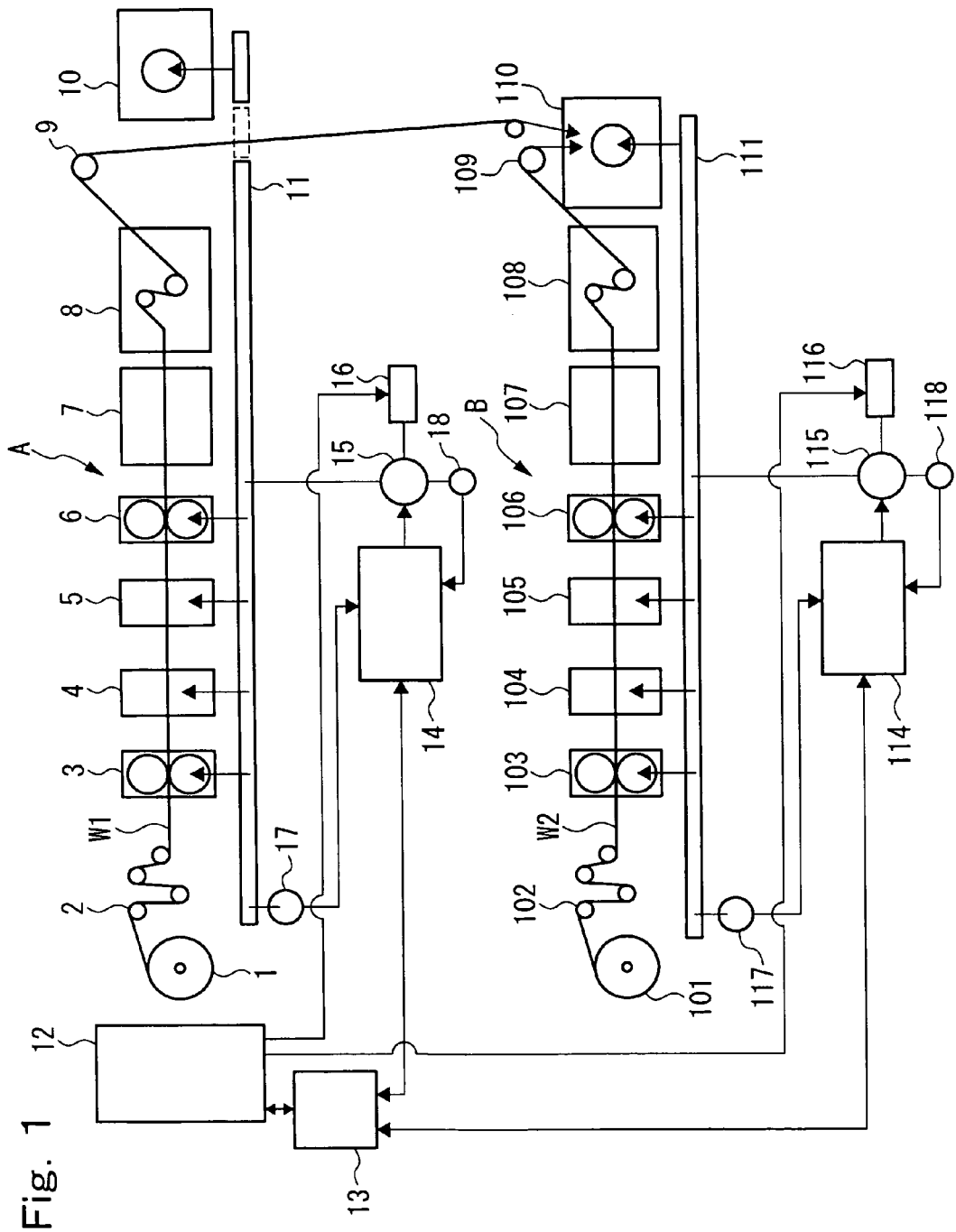
FIG. 1 is a schematic configuration diagram of a device for synchronously controlling multiple printing presses, showing a first embodiment of the present invention.
Figure 2:
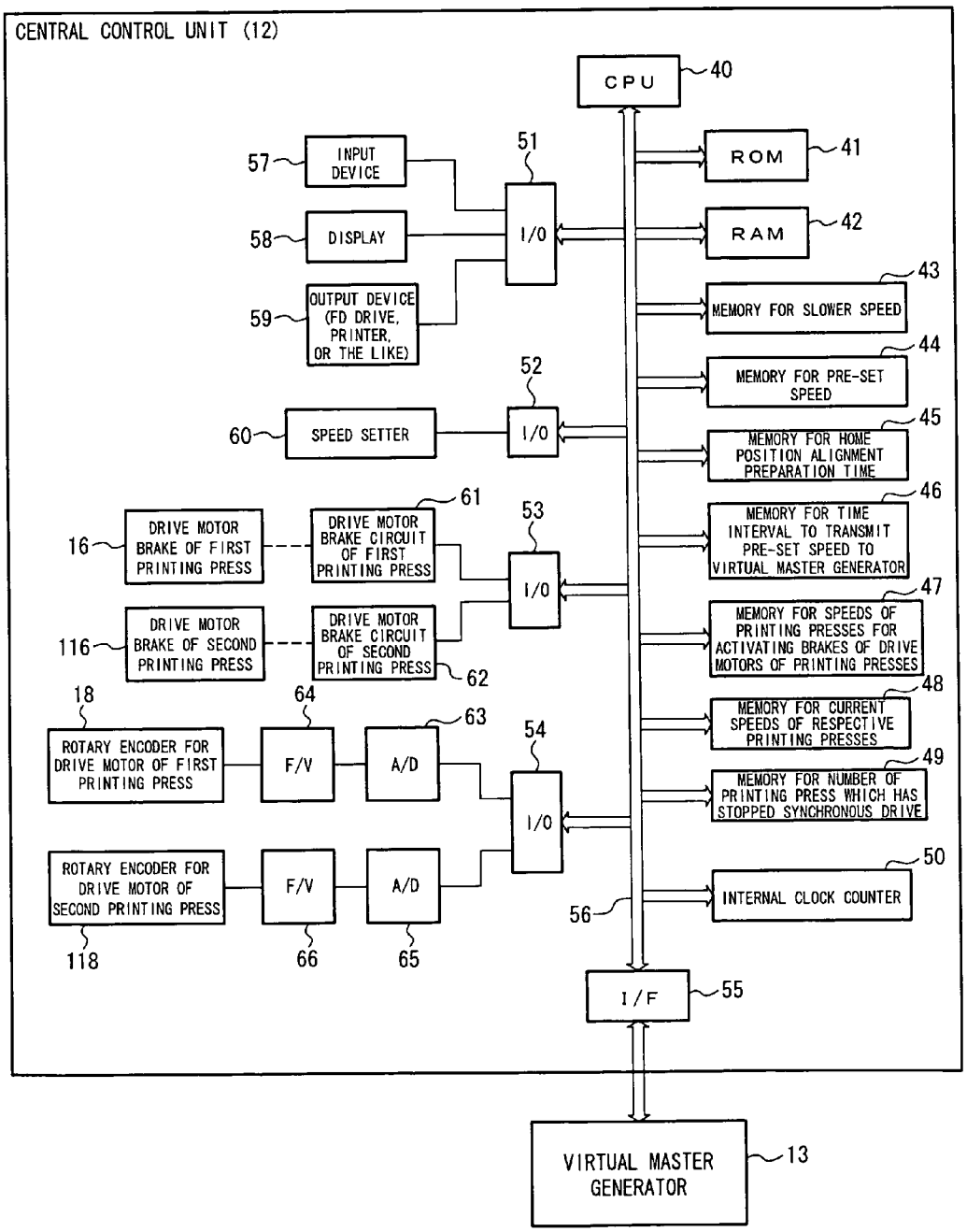
FIG. 2 is a block diagram of a central control unit.
Figure 3:
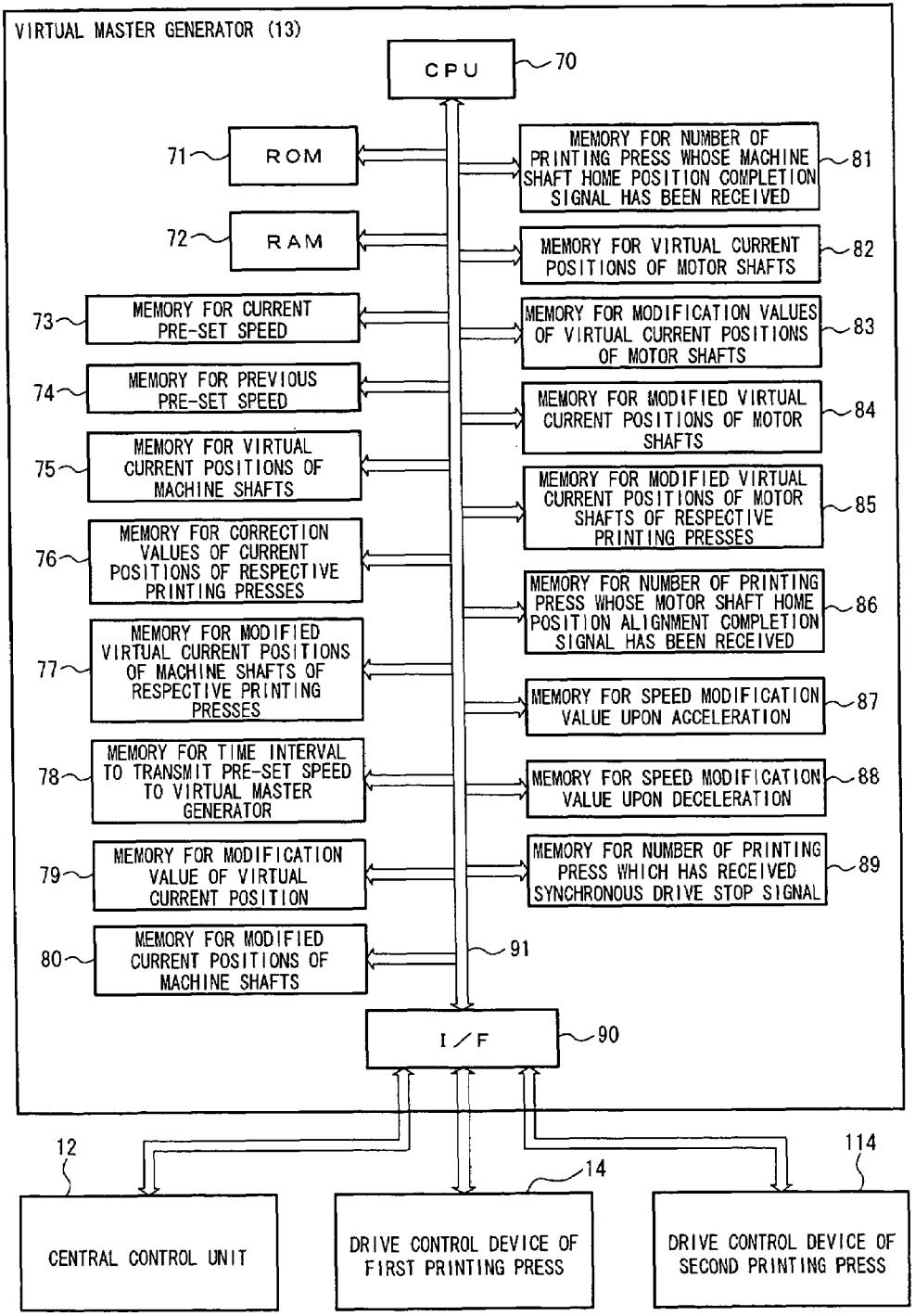
FIG. 3 is a block diagram of a virtual master generator.
Figure 4:
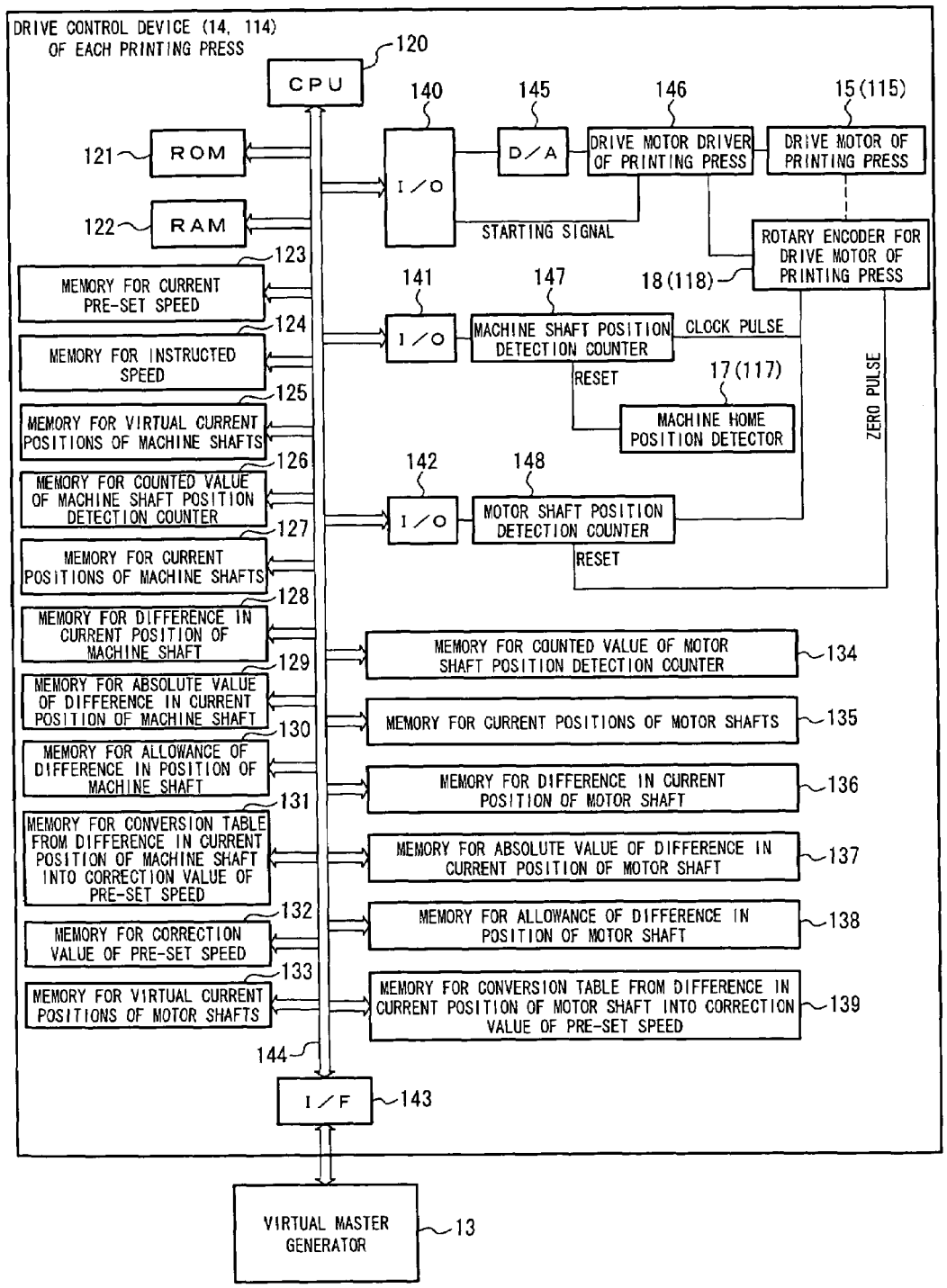
FIG. 4 is a block diagram of a drive control device of each of the printing presses.
Figure 5A:
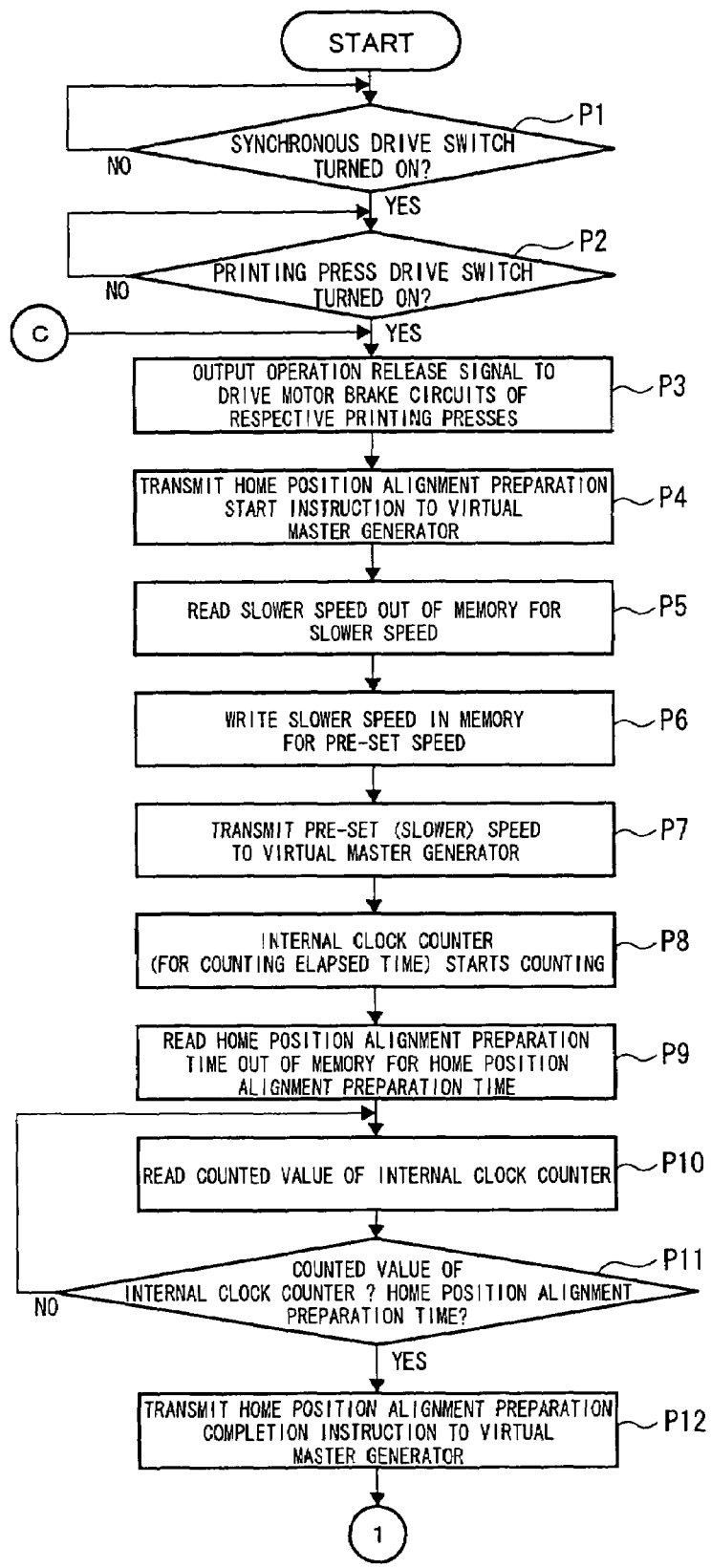
FIG. 5A is an operational flowchart of the central control unit.
Figure 5B:
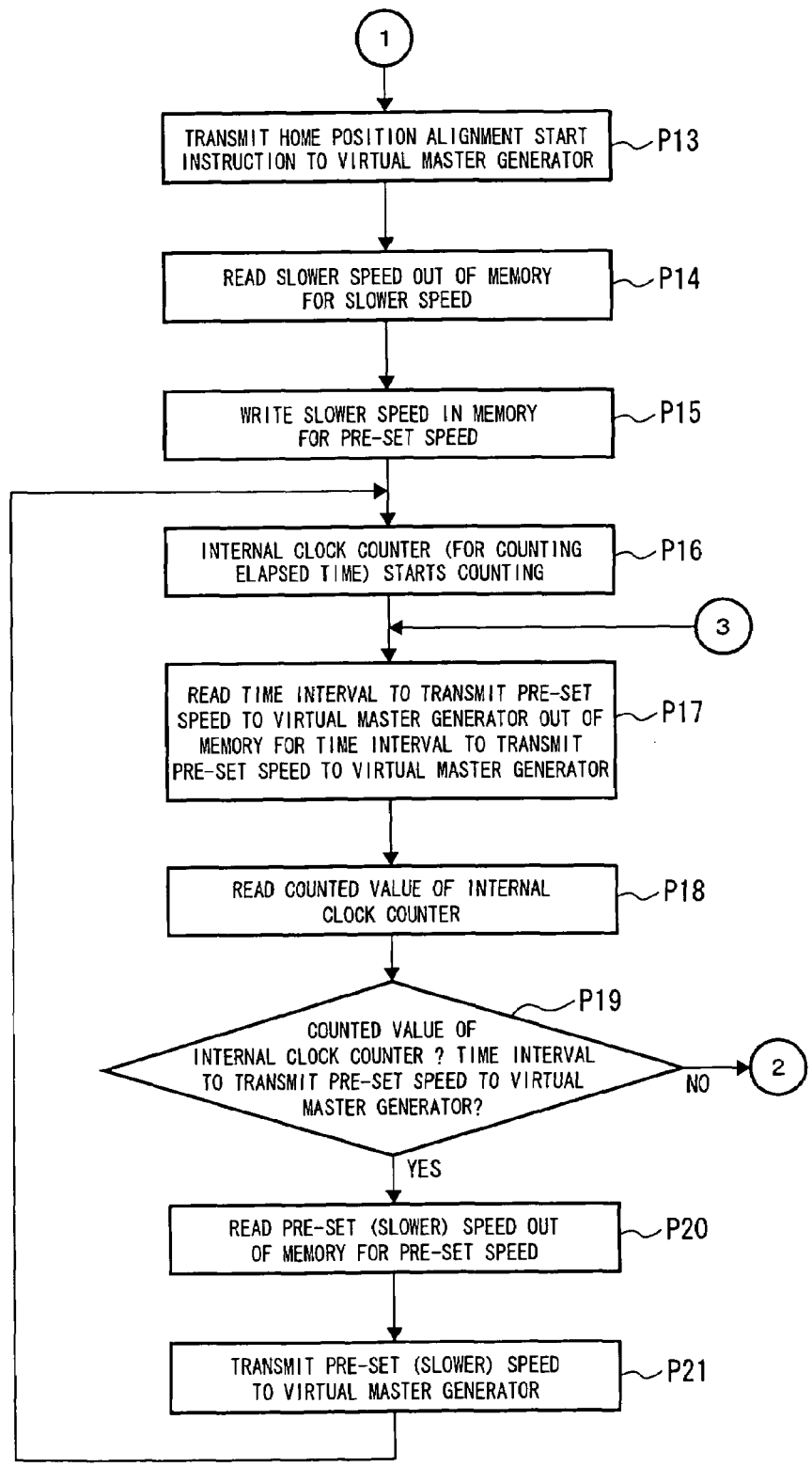
FIG. 5B is another operational flowchart of the central control unit.
Figure 5C:
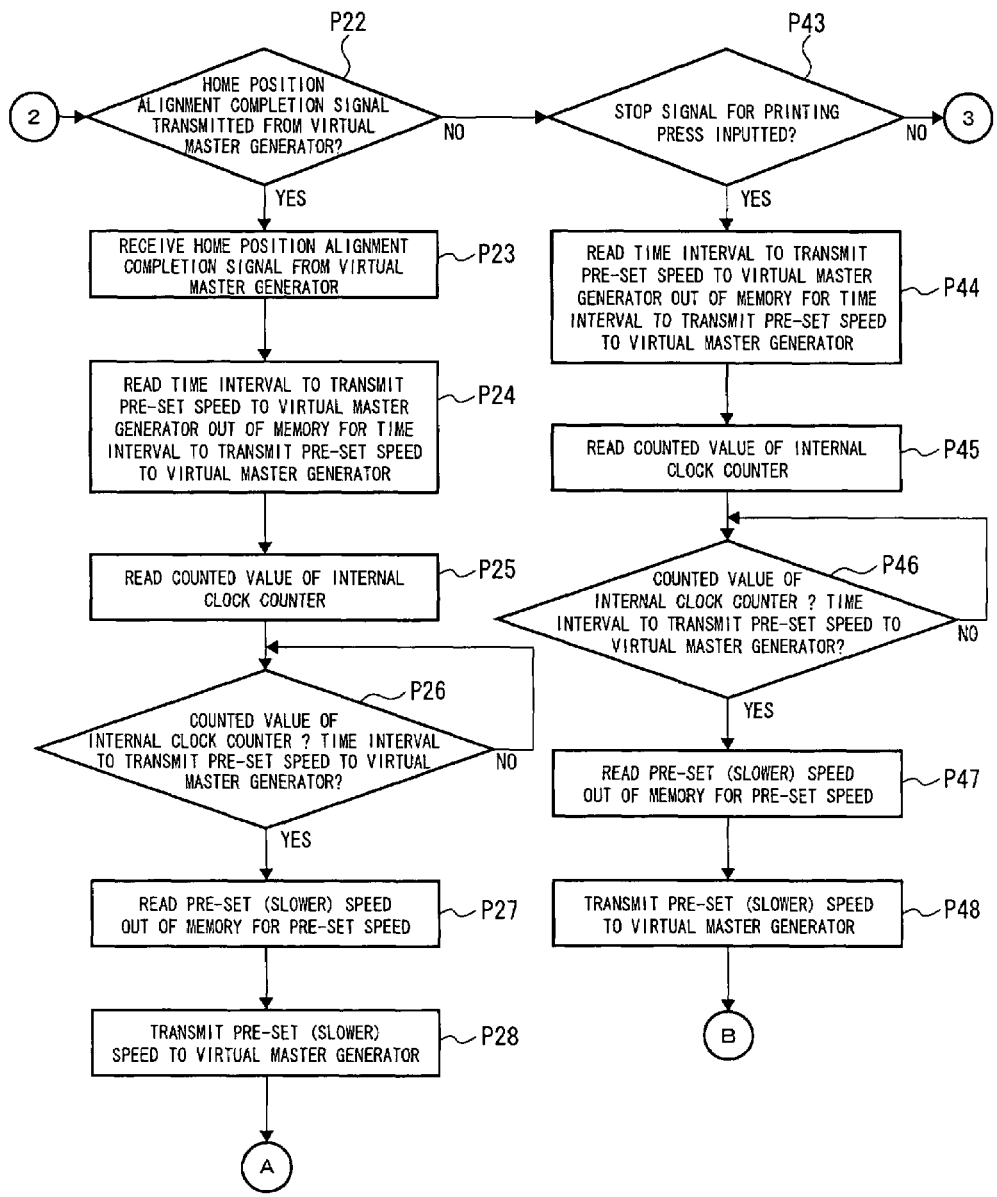
FIG. 5C is another operational flowchart of the central control unit.
Figure 6:
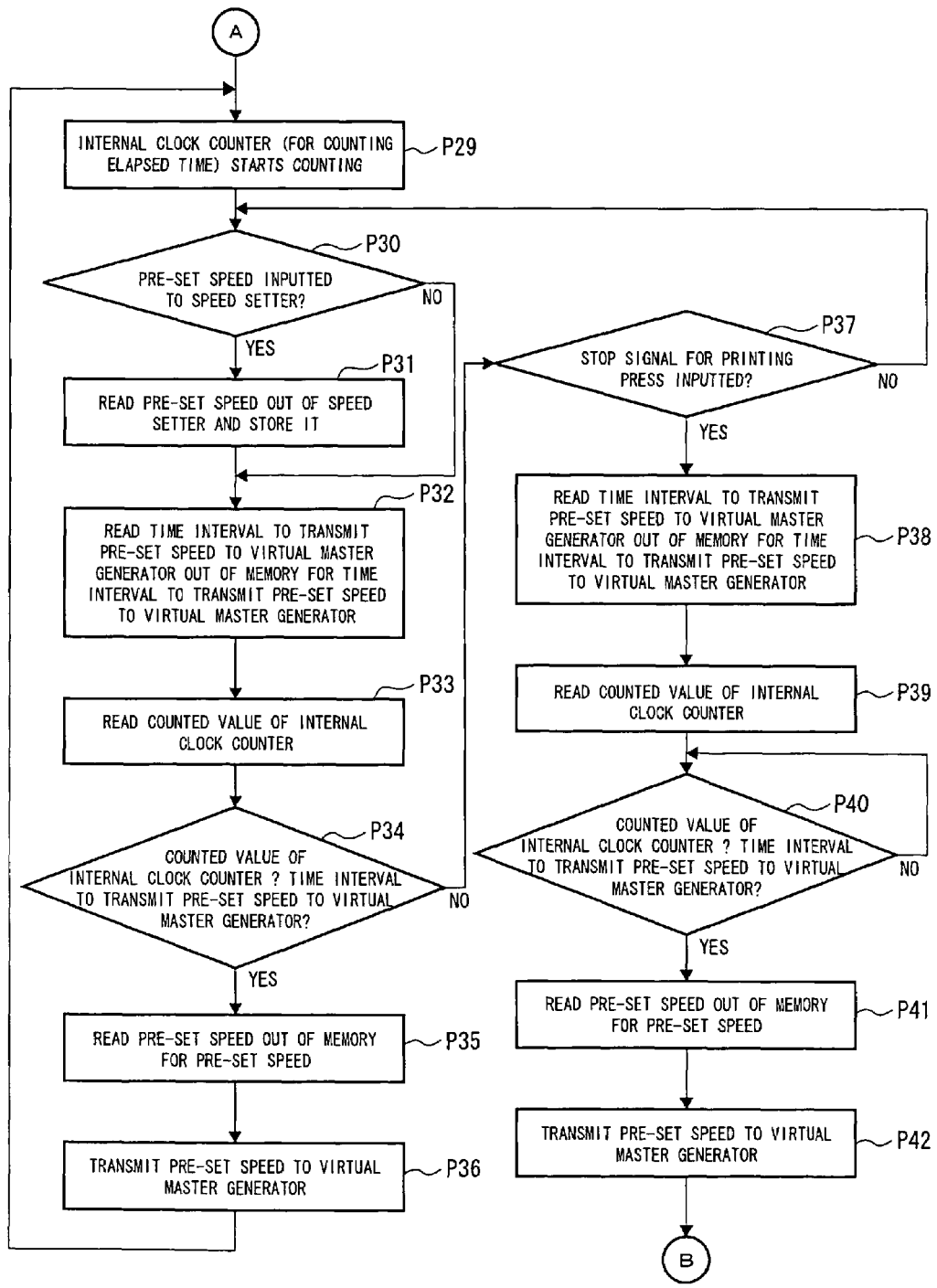
FIG. 6 is another operational flowchart of the central control unit.
Figure 7:
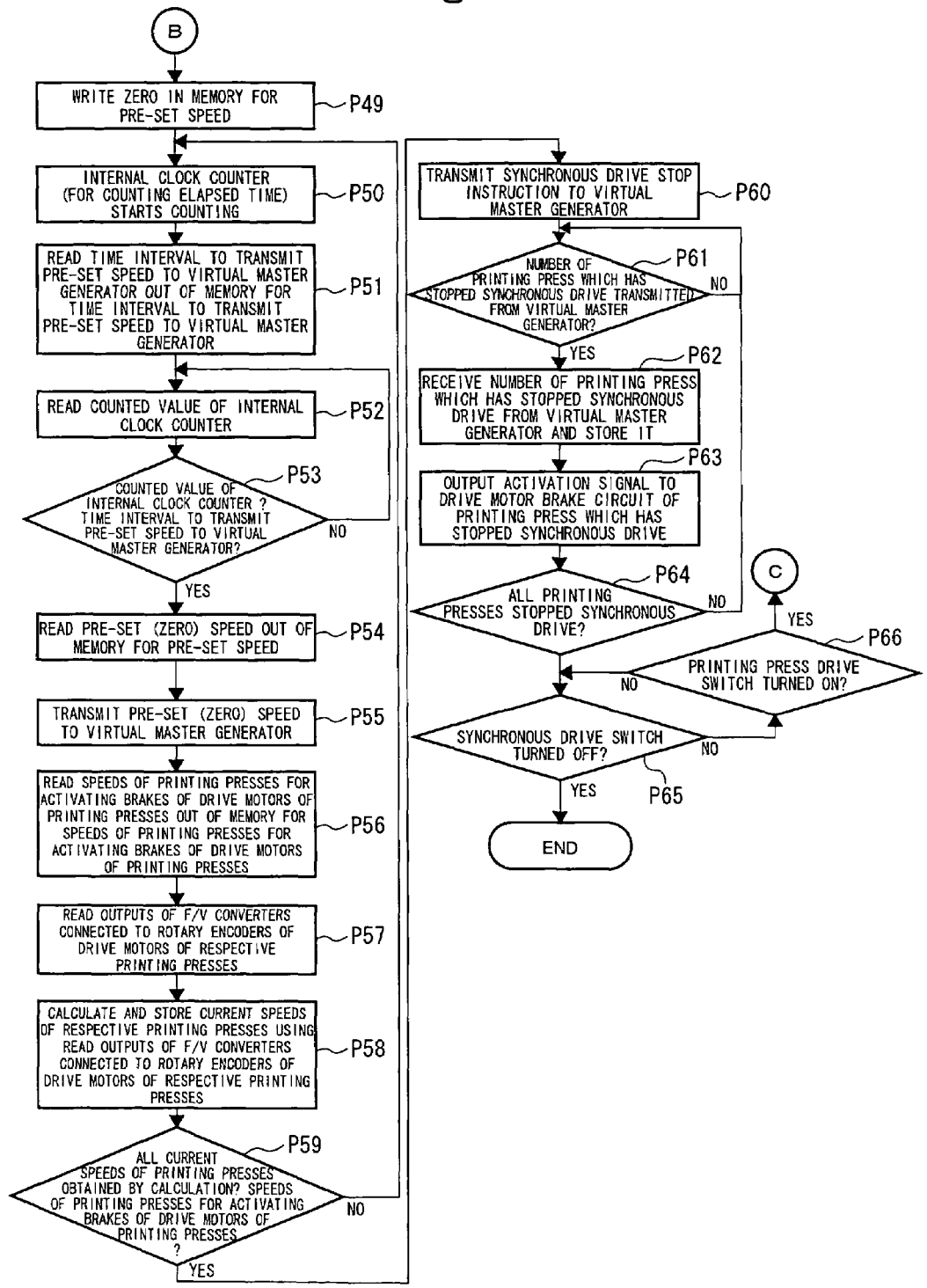
FIG. 7 is another operational flowchart of the central control unit.
Figure 8A:
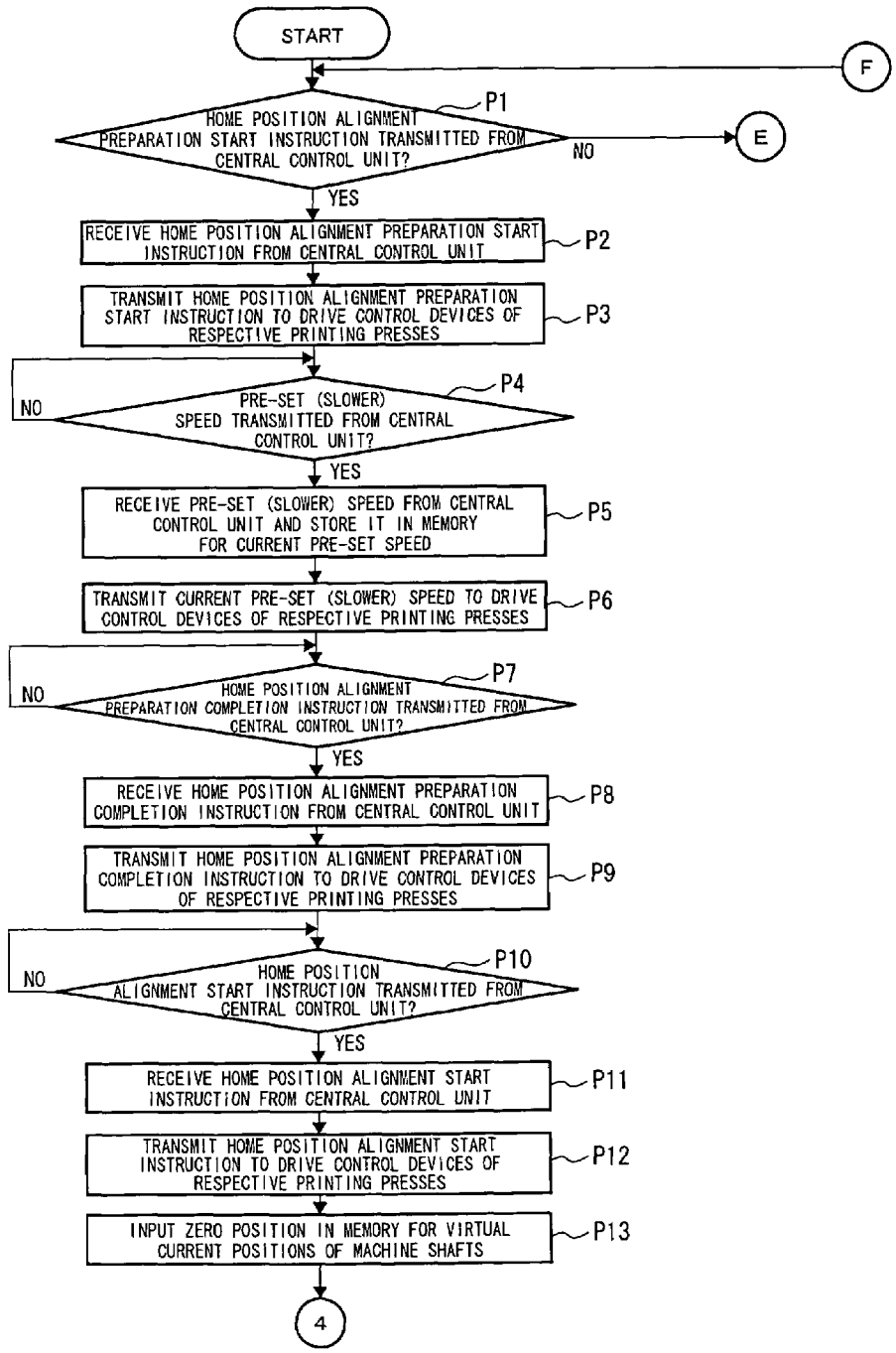
FIG. 8A is an operational flowchart of the virtual master generator.
Figure 8C:
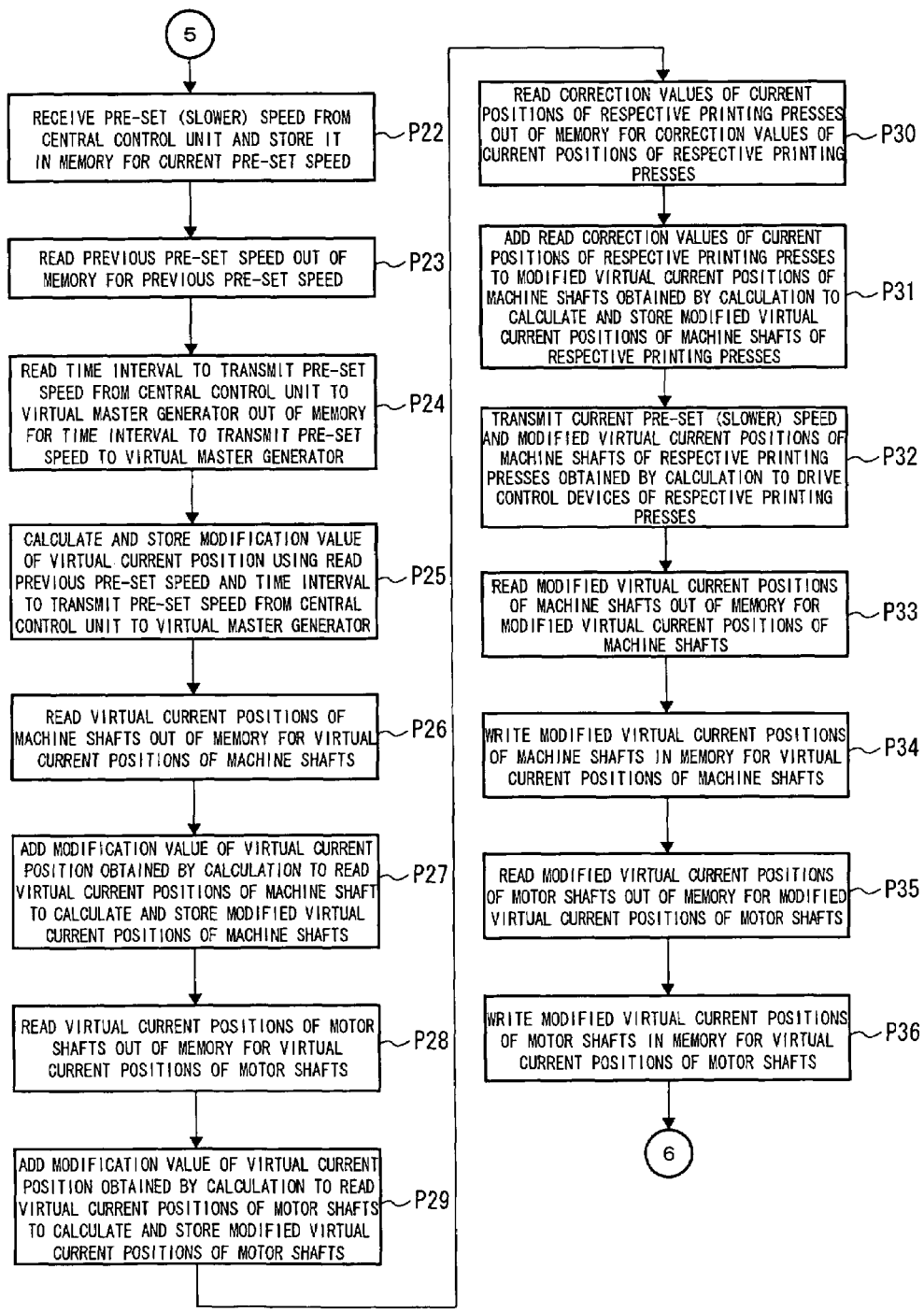
FIG. 8C is another operational flowchart of the virtual master generator.
Figure 9B:
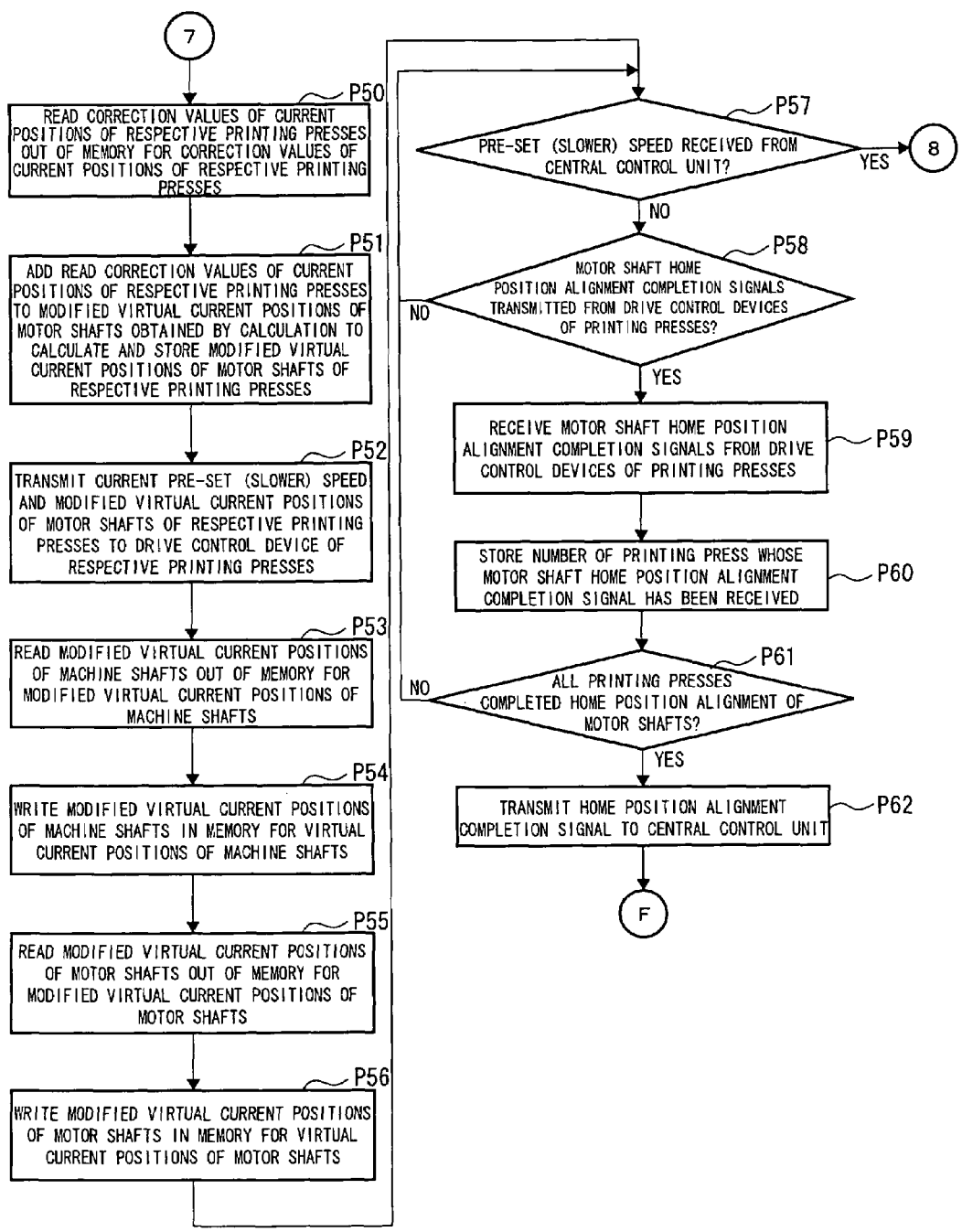
FIG. 9B is another operational flowchart of the virtual master generator.
Figure 10A:
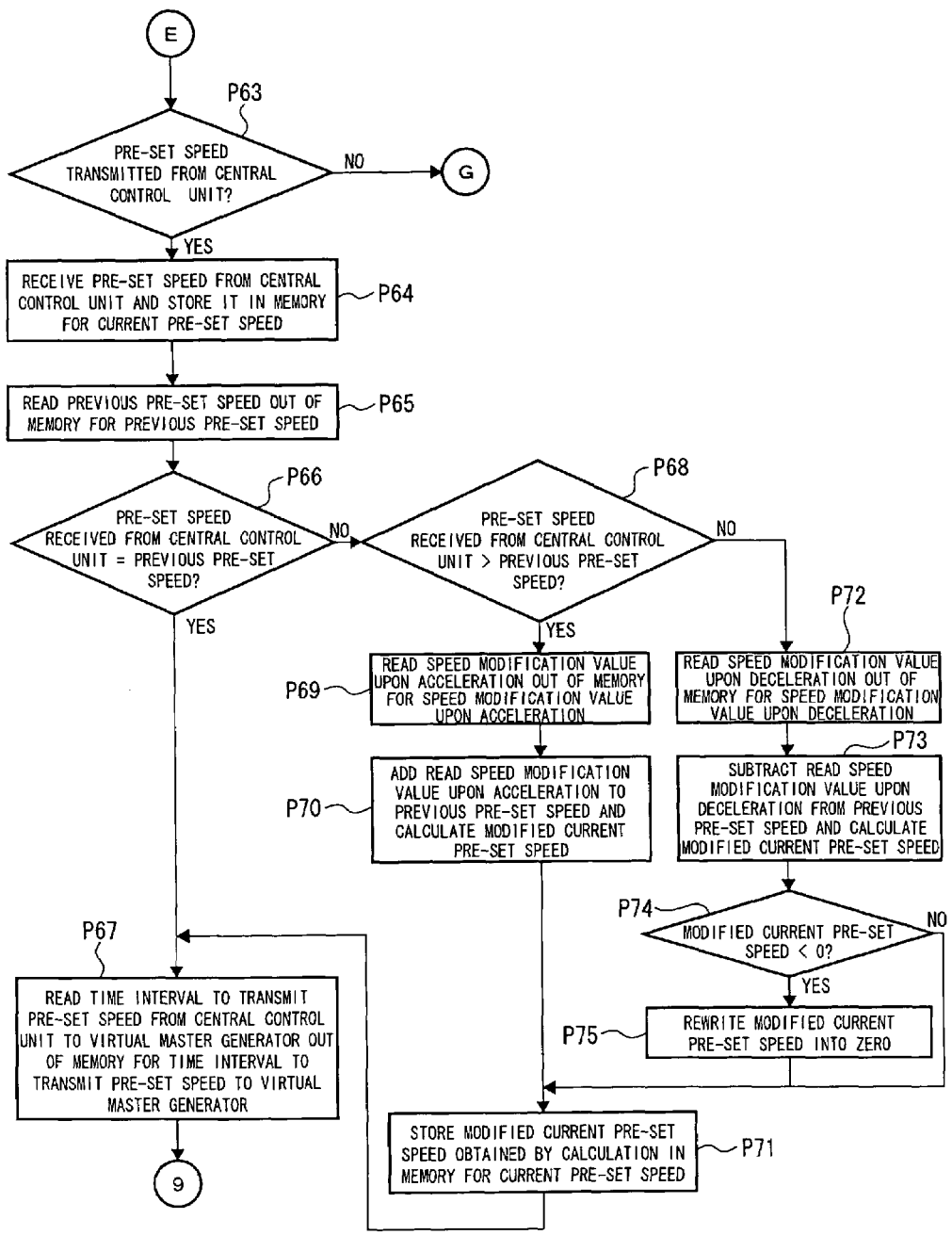
FIG. 10A is another operational flowchart of the virtual master generator.
Figure 10B:
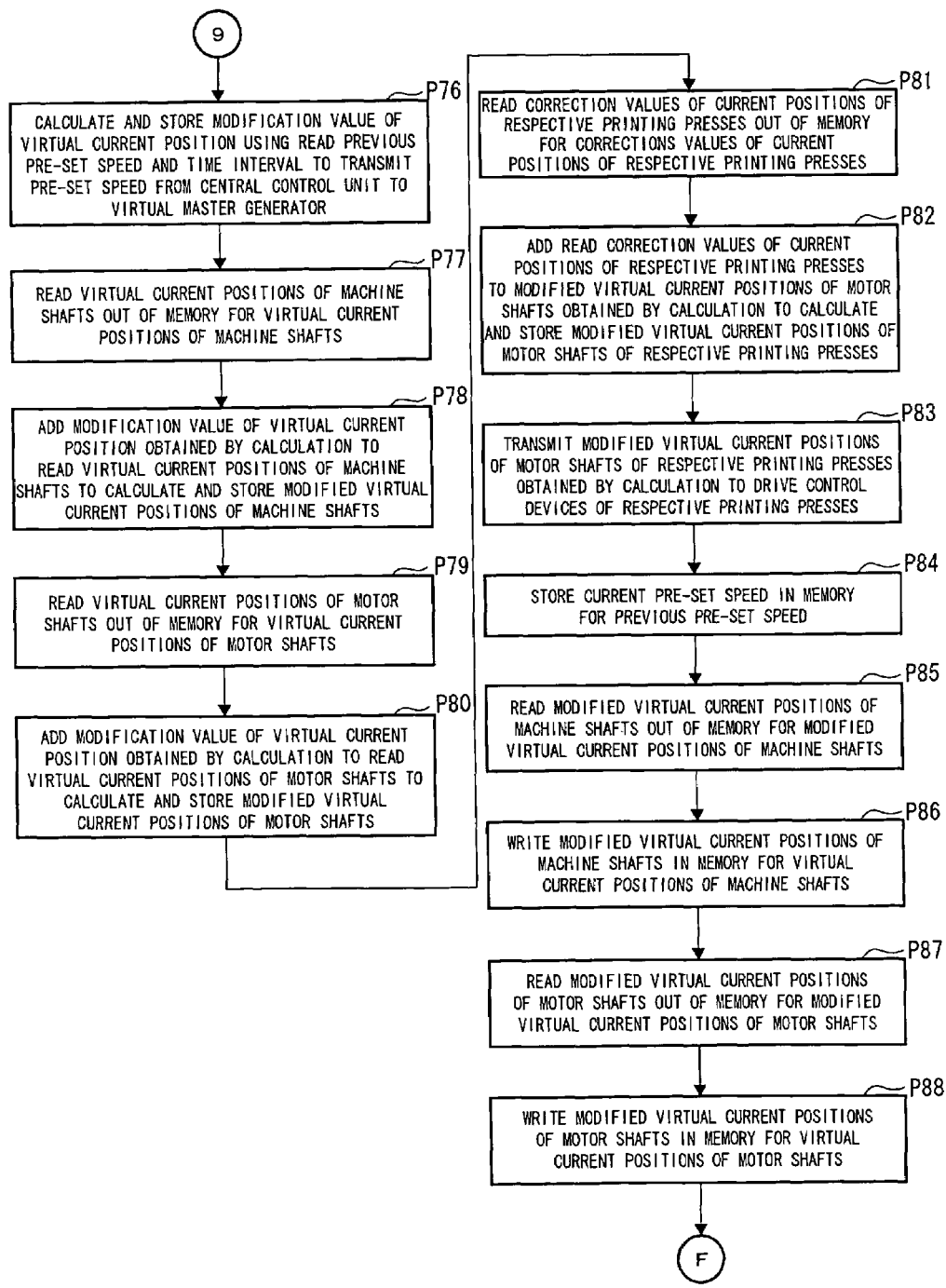
FIG. 10B is another operational flowchart of the virtual master generator.
Figure 11:
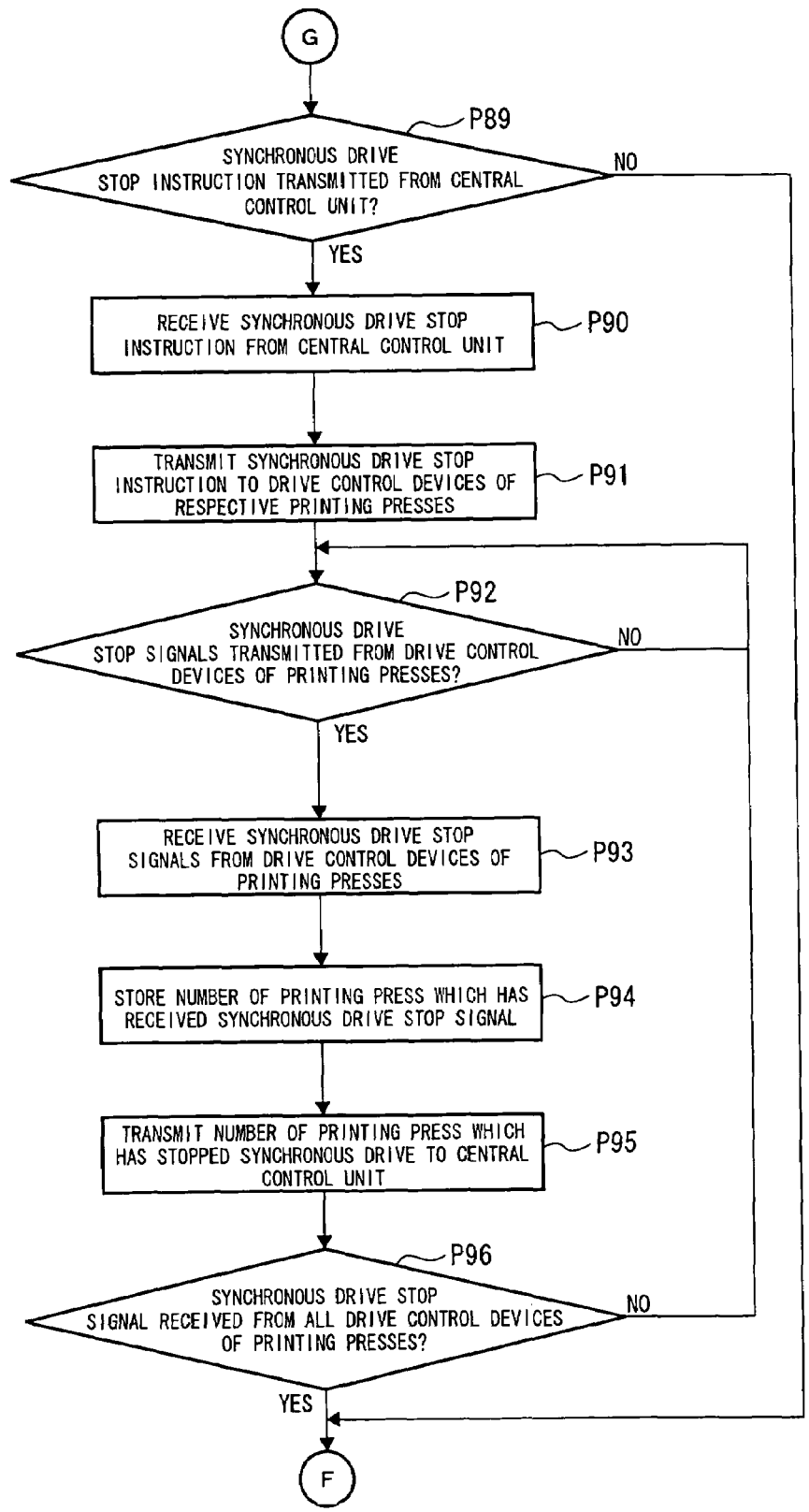
FIG. 11 is another operational flowchart of the virtual master generator.
Figure 12A:
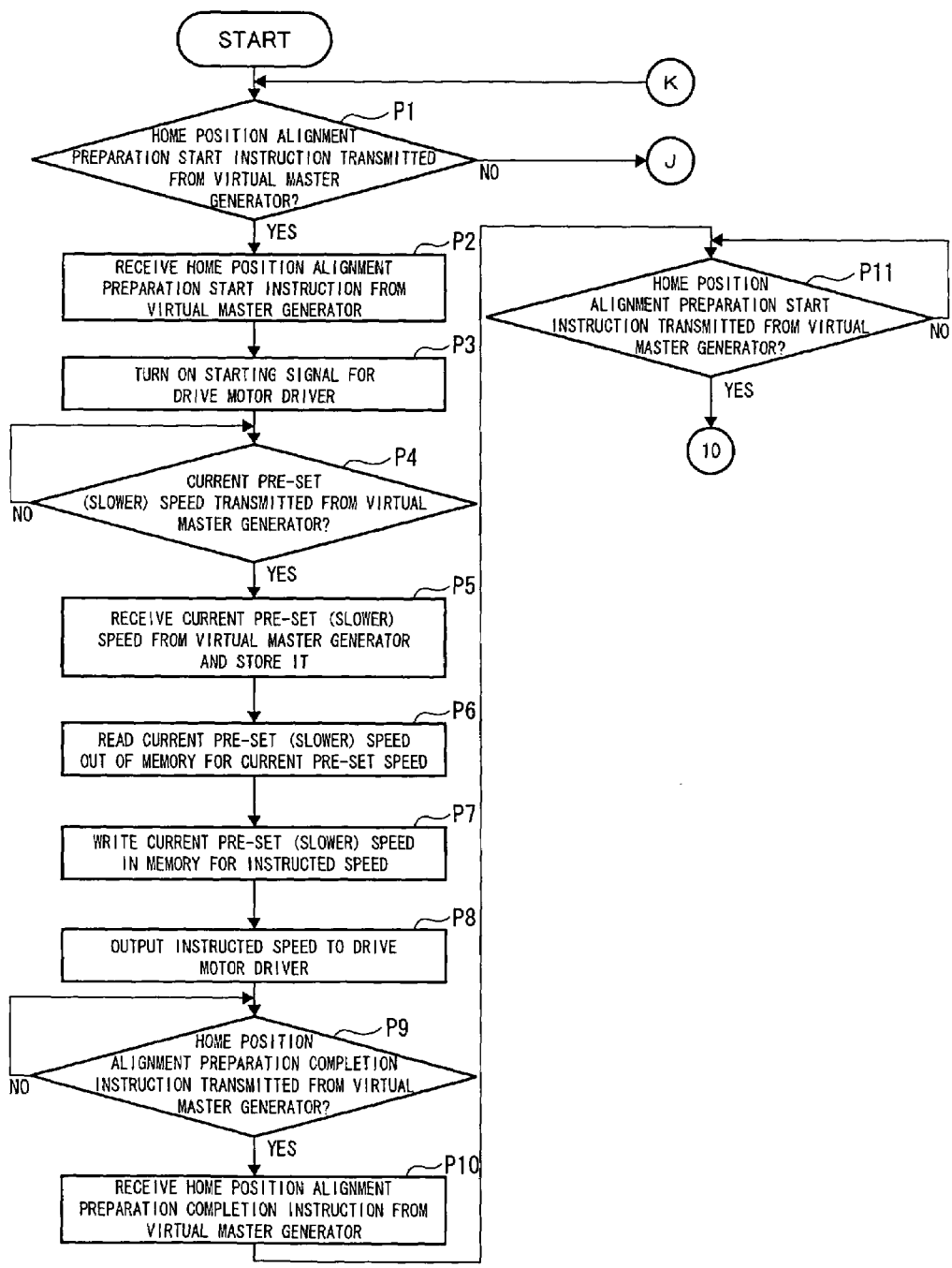
FIG. 12A is an operational flowchart of the drive control device of each of the printing presses.
Figure 12C:
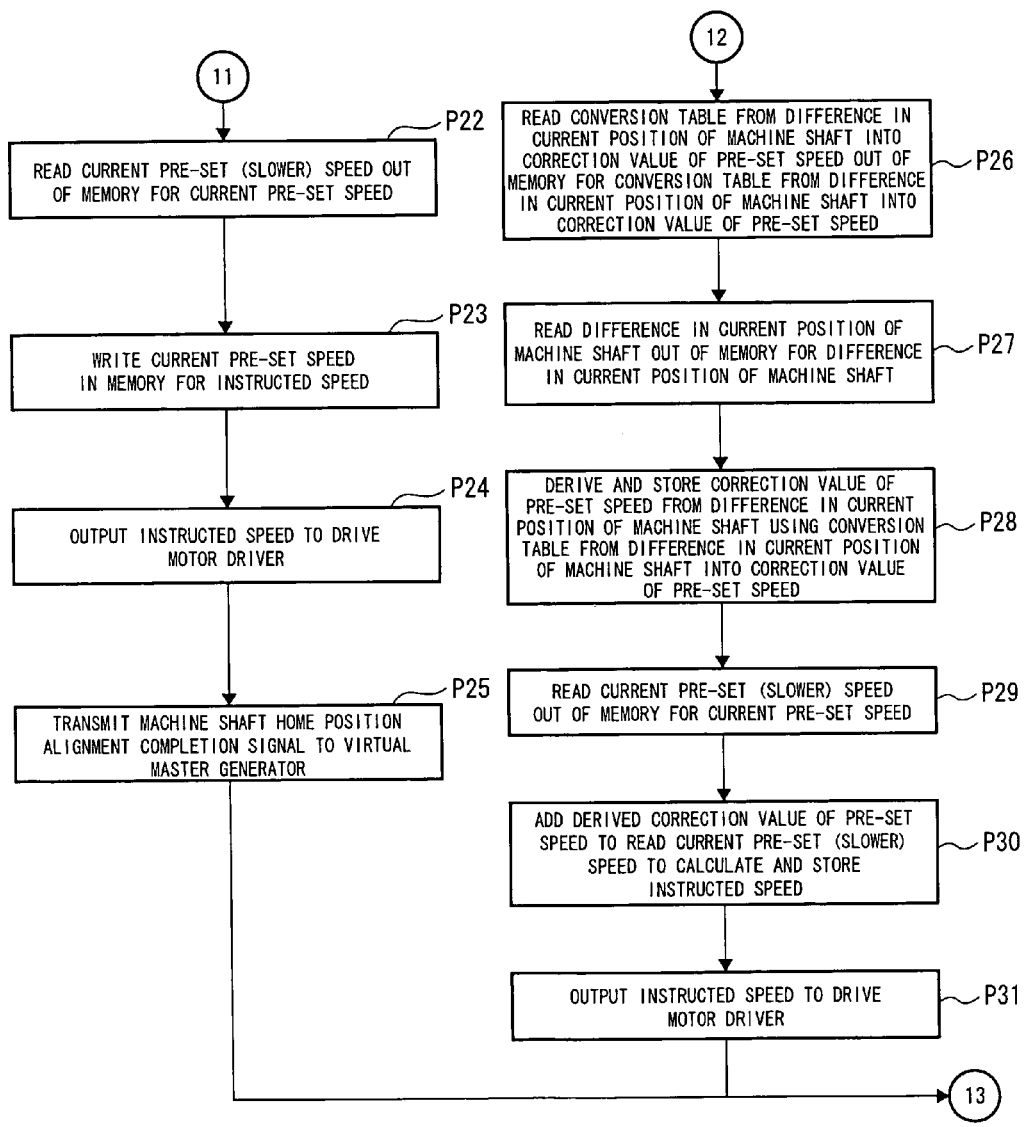
FIG. 12C is another operational flowchart of the drive control device of each of the printing presses.
Figure 13:
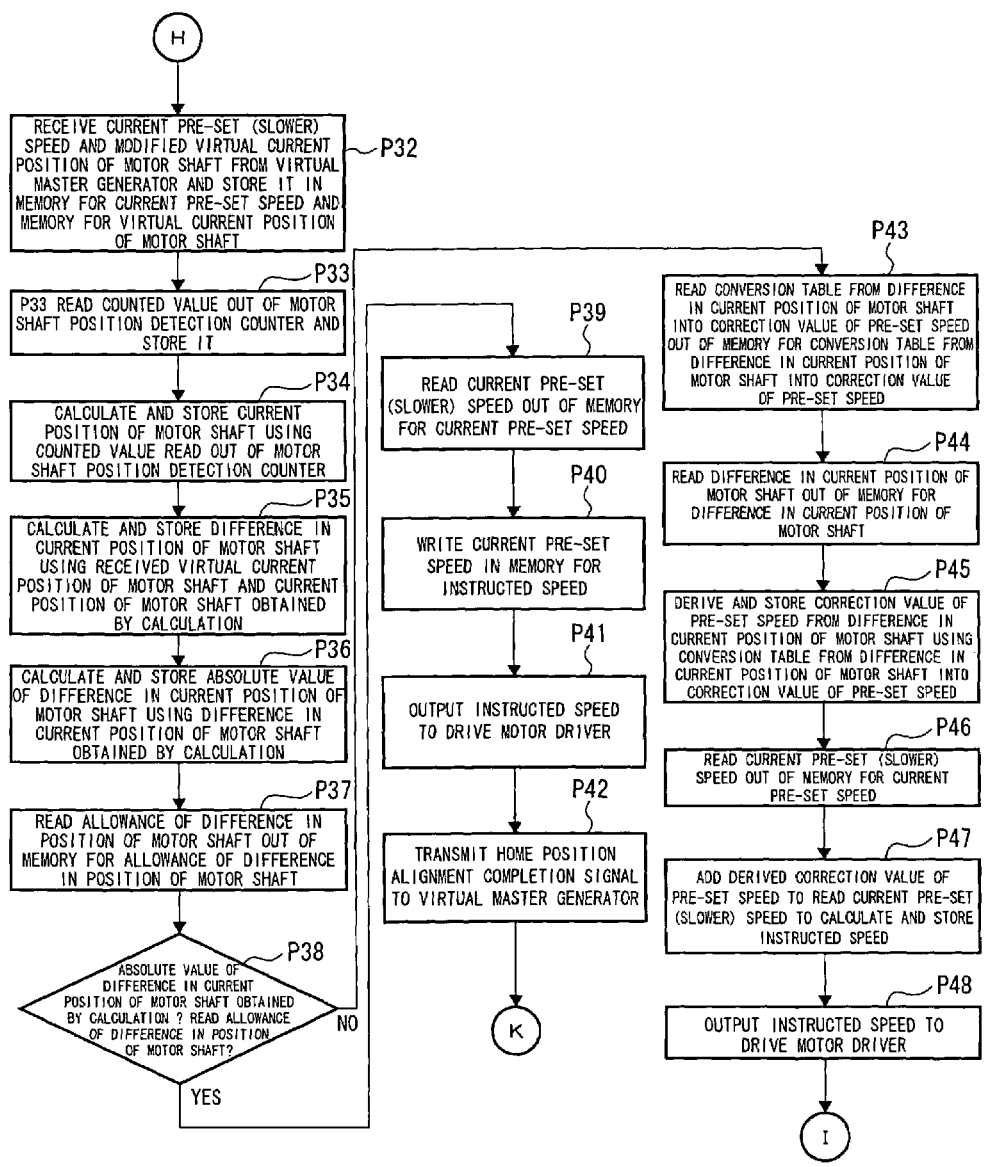
FIG. 13 is another operational flowchart of the drive control device of each of the printing presses.
Figure 14A:
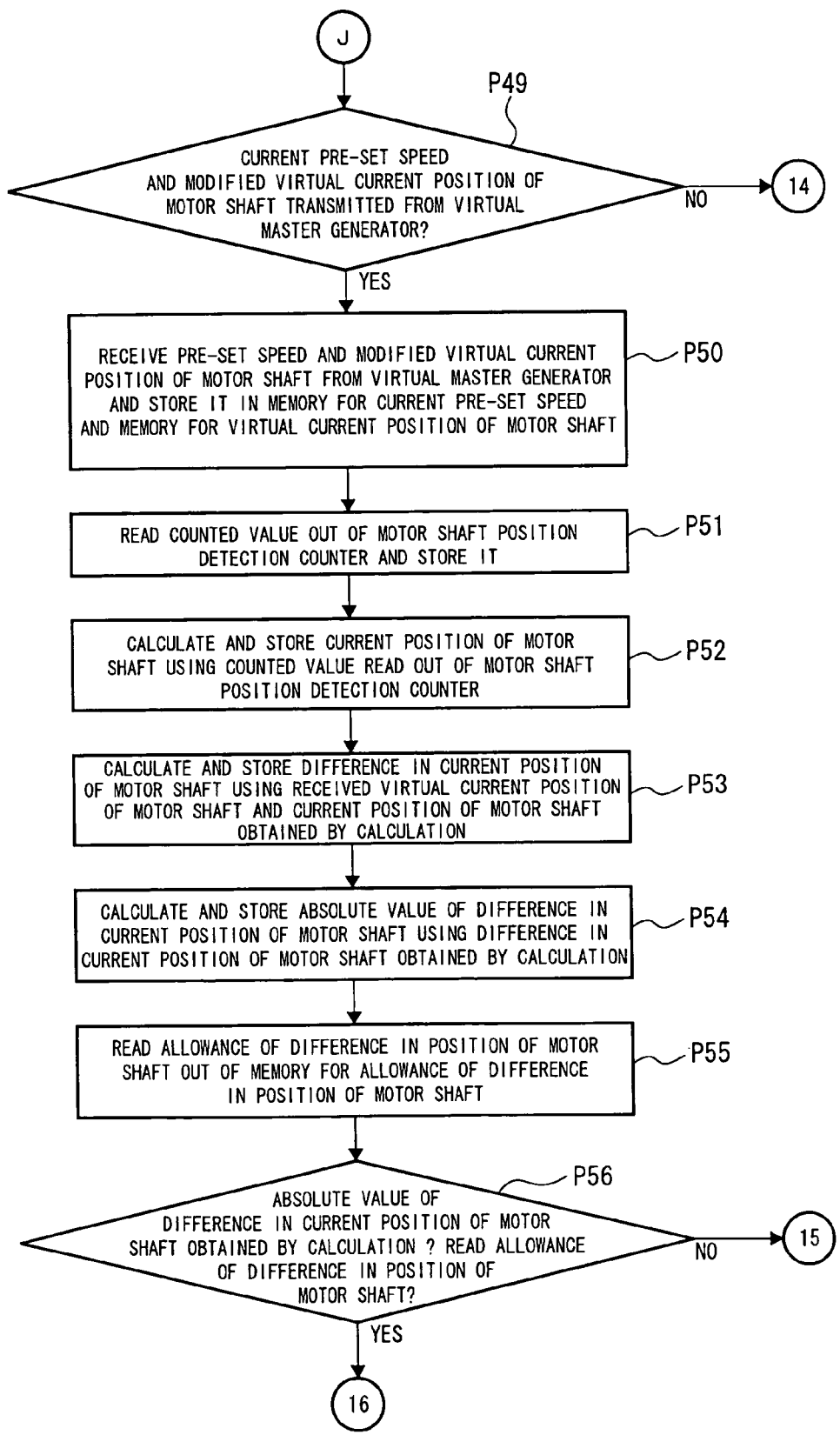
FIG. 14A is another operational flowchart of the drive control device of each of the printing presses.
Figure 14B:
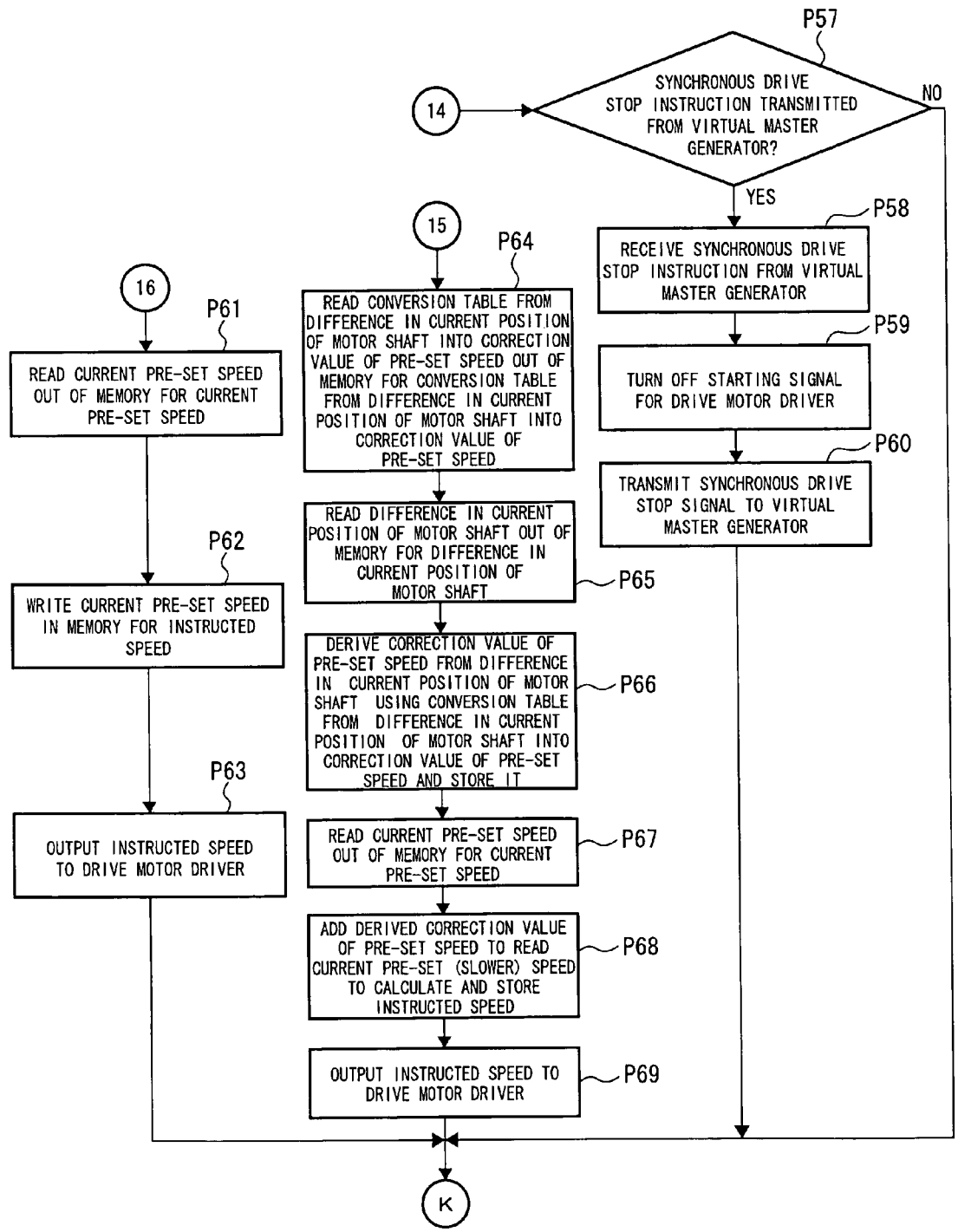
FIG. 14B is another operational flowchart of the drive control device of each of the printing presses.

FIG. 1 is a schematic configuration diagram of a device for synchronously controlling multiple printing presses showing a first embodiment of the present invention. FIG. 2 is a block diagram of a central control unit. FIG. 3 is a block diagram of a virtual master generator. FIG. 4 is a block diagram of a drive control device of each of the printing presses. FIG. 5A is an operational flowchart of the central control unit. FIG. 5B is another operational flowchart of the central control unit. FIG. 5C is another operational flowchart of the central control unit. FIG. 6 is another operational flowchart of the central control unit. FIG. 7 is another operational flowchart of the central control unit. FIG. 8A is an operational flowchart of the virtual master generator. FIG. 8B is another operational flowchart of the virtual master generator. FIG. 8C is another operational flowchart of the virtual master generator. FIG. 9A is another operational flowchart of the virtual master generator. FIG. 9B is another operational flowchart of the virtual master generator. FIG. 10A is another operational flowchart of the virtual master generator. FIG. 10B is another operational flowchart of the virtual master generator. FIG. 11 is another operational flowchart of the virtual master generator. FIG. 12A is an operational flowchart of the drive control device of each of the printing presses. FIG. 12B is another operational flowchart of the drive control device of each of the printing presses. FIG. 12C is another operational flowchart of the drive control device of each of the printing presses. FIG. 13 is another operational flowchart of the drive control device of each of the printing presses. FIG. 14A is another operational flowchart of the drive control device of each of the printing presses. FIG. 14B is another operational flowchart of the drive control device of each of the printing presses.

As shown in FIG. 1, in a first printing press A made of a web-fed rotary printing press, a web W1 which is continuously supplied from a feeder 1 and an infeed unit 2 is firstly subjected to a variety of printing when the web W1 passes through first to fourth printing units 3 to 6. Subsequently, the web W1 is heated and dried when the web W1 passes through a drier 7, and is then cooled down when the web W1 passes through a cooling unit 8. Thereafter, the web W1 is subjected to tension control or a direction change when the web W1 passes through a drag unit 9, and is then cut into predetermined forms and folded by a folding machine 10.

The first to fourth printing units 3 to 6 and the folding machine 10 are driven by a drive motor 15 of the printing press through a machine shaft (a line shaft) 11. A drive motor brake (braking means) 16 such as an electromagnetic brake for braking rotation of the drive motor 15, and a rotary encoder (speed detecting means) 18 for detecting a rotation speed of the drive motor 15 are attached to the drive motor 15. Moreover, the drive motor 15 is subjected to drive control by a drive control device 14 of the printing press. A detection signal of the rotary encoder 18 is inputted to this drive control device 14, and a detection signal from a machine home position detector 17 attached to the machine shaft 11 is also inputted thereto.

Meanwhile, in a second printing press B, a web W2 which is continuously supplied from a feeder 101 and an infeed unit 102 is firstly subjected to a variety of printing when the web W2 passes through first to fourth printing units 103 to 106. Subsequently, the web W2 is heated and dried when the web W2 passes through a drier 107, and is then cooled down when the web W2 passes through a cooling unit 108. Thereafter, the web W2 is subjected to tension control or a direction change when the web W2 passes through a drag unit 109, and is then cut into predetermined forms and folded by a folding machine 110.

The first to fourth printing units 103 to 106 and the folding machine 110 are driven by a drive motor 115 of the printing press through a machine shaft (a line shaft) 111. A drive motor brake (braking means) 116 such as an electromagnetic brake for braking rotation of the drive motor 115, and a rotary encoder (speed detecting means) 118 for detecting a rotation speed of the drive motor 115 are attached to the drive motor 115. Moreover, the drive motor 115 is subjected to drive control by a drive control device 114 of the printing press. A detection signal of the rotary encoder 118 is inputted to this drive control device 114, and a detection signal from a machine home position detector 117 attached to the machine shaft 111 is also inputted thereto.

Moreover, the drive control devices 14 and 114 are connected to a central control unit 12 through a virtual master generator 13, and the first printing press A and the second printing press B are synchronously controlled (driven) by this central control unit 12. That is, in this embodiment, the webs W1 and W2 printed respectively by the first printing press A and the second printing press B are guided to and folded by the folding machine 110 of the second printing press B.

As shown in FIG. 2, the central control unit 12 includes a CPU 40, a ROM 41, a RAM 42, a memory 43 for a slower speed of the printing press, a memory 44 for a pre-set speed, a memory 45 for home position alignment preparation time, a memory 46 for a time interval to transmit the pre-set speed to the virtual master generator, a memory 47 for speeds of the printing presses for activating the brakes of the drive motors of the printing presses, a memory 48 for current speeds of the respective printing presses, a memory 49 for a number of the printing press which has stopped synchronous drive, and an internal clock counter 50, which are connected to one another by a bus 56 together with respective input and output devices 51 to 54 and an interface 55.

An input device 57 such as a keyboard or various switches and buttons, a display 58 such as a CRT or a lamp, and an output device 59 such as a printer or a FD drive are connected to the input and output device 51. A speed setter 60 is connected to the input and output device 52. The drive motor brake 16 of the first printing press is connected to the input and output device 53 through a drive motor brake circuit 61 of the first printing press, and the drive motor brake 116 of the second printing press is also connected thereto through a drive motor brake circuit 62 of the second printing press. The rotary encoder 18 for the drive motor of the first printing press is connected to the input and output device 54 through an A/D converter 63 and a F/V converter 64, and the rotary encoder 118 for the drive motor of the second printing press is also connected thereto through an A/D converter 65 and a F/V converter 65. Moreover, the virtual master generator 13 to be described later is connected to the interface 55.

As shown in FIG. 3, the virtual master generator 13 includes a CPU 70, a ROM 71, a RAM 72, a memory 73 for a current pre-set speed, a memory 74 for a previous pre-set speed, a memory 75 for virtual current positions of machine shafts, a memory 76 for correction values of current positions of the respective printing presses, a memory 77 for modified virtual current positions of machine shafts of the respective printing presses, a memory 78 for a time interval to transmit the pre-set speed to the virtual master generator, a memory 79 for a modification value of a virtual current position, a memory 80 for modified virtual current positions of machine shafts, a memory 81 for a number of a printing press whose machine shaft home position completion signal has been received, a memory 82 for virtual current positions of motor shafts, a memory 83 for modification values of the virtual current positions of the motor shafts, a memory 84 for modified virtual current positions of the motor shafts, a memory 85 for modified virtual current positions of the motor shafts of the respective printing presses, a memory 86 for a number of a printing press whose motor shaft home position completion signal has been received, a memory 87 for a speed modification value upon acceleration, a memory 88 for a speed modification value upon deceleration, and a memory 89 for a number of a printing press which has received a synchronous drive stop signal, which are connected to one another by a bus 91 together with an interface 90. Moreover, the drive control device 14 of the first printing press and the drive control device 114 of the second printing press, which are to be described later, as well as the above-described central control unit 12 are connected to the interface 90.

As shown in FIG. 4, the drive control device 14 (or 114) of each of the printing presses includes a CPU 120, a ROM, 121, a RAM 122, a memory 123 for a current pre-set speed, a memory 124 for an instructed speed, a memory 125 for virtual current positions of machine shafts, a memory 126 for a counted value of a machine shaft position detection counter, a memory 127 for current positions of machine shafts, a memory 128 for a difference in the current position of the machine shaft, a memory 129 for an absolute value of the difference in the current position of the machine shaft, a memory 130 for an allowance of the difference in the position of the machine shaft, a memory 131 for a conversion table from the difference in the current position of the machine shaft into a correction value of the pre-set speed, a memory 132 for a correction value of the pre-set speed, a memory 133 for virtual current positions of motor shafts, a memory 134 for a counted value of a motor shaft position detection counter, a memory 135 for current positions of motor shafts, a memory 136 for a difference in the current position of the motor shaft, a memory 137 for an absolute value of the difference in the current position of the motor shaft, a memory 138 for an allowance of the difference in the position of the motor shaft, and a memory 139 for a conversion table from the difference in the current position of the motor shaft into the correction value of the pre-set speed, which are connected to one another by a bus 144 together with respective input and output devices 140 to 142 and an interface 143.

A drive motor driver 146 of the printing press is connected to the input and output device 140 through a D/A converter 145, and this drive motor driver 146 is connected to the drive motor 15 (or 115) of the printing press and to the rotary encoder 18 (or 118) for the drive motor of the printing press. The machine home position detector 17 (or 117) is connected to the input and output device 141 through a machine shaft position detection counter 147. The rotary encoder 18 (or 118) for the drive motor of the printing press is connected to the input and output device 142 through a motor shaft position detection counter 148. Moreover, the above-described virtual master generator 13 is connected to the interface 143.

Based on the above-described configuration, the central control unit 12 is firstly operated in accordance with operational flows shown in FIG. 5A, FIG. 5B, FIG. 5C, FIG. 6, and FIG. 7 in order to perform synchronous control of the first printing press A and the second printing press B.

Specifically, when a synchronous drive switch is turned on in Step P1 and a printing press drive switch is turned on in Step P2, an operation release signal is outputted to the drive motor brake circuits 61 and 62 of the respective printing presses in Step P3. Next, when a home position alignment preparation start instruction is transmitted to the virtual master generator 13 in Step P4, a slower speed is read out of the memory 43 for a slower speed in Step P5. Next, when the slower speed is written in the memory 44 for a pre-set speed in Step P6, the pre-set (slower) speed is transmitted to the virtual master generator 13 in Step P7. Next, when the internal clock counter (for counting elapsed time) 50 starts counting in Step P8, home position alignment preparation time is read out of the memory 45 for home position alignment preparation time in Step P9. Next, the counted value of the internal clock counter 50 is read out in Step P10, and when the counted value of the internal clock counter 50 becomes equal to or greater than the home position alignment preparation time in Step P11, a home position alignment preparation completion instruction is transmitted to the virtual master generator 13 in Step P12.

Next, after the home position alignment preparation start instruction is transmitted to the virtual master generator 13 in Step P13, when the slower speed is read out of the memory 43 for a slower speed in Step P14, the slower speed is written in the memory 44 for a pre-set speed in Step P15. Next, when the internal clock counter 50 starts counting in Step P16, a time interval to transmit the pre-set speed to the virtual master generator 13 is read out of the memory 46 for a time interval to transmit the pre-set speed to the virtual master generator in Step P17. Next, when the counted value of the internal clock counter 50 is read out in Step P18, a judgment is made in Step P19 as to whether or not the counted value of the internal clock counter 50 is equal to or greater than the time interval to transmit the pre-set speed to the virtual master generator 13. If the result is YES, the pre-set (slower) speed is read out of the memory 44 for a pre-set speed in Step P20, and then the pre-set (slower) speed is transmitted to the virtual master generator 13 in Step P21. Thereafter, the operation returns to Step P16.

In the result is NO in the above-described Step P19, a judgment is made in Step P22 as to whether or not a home position alignment completion signal has been transmitted from the virtual master generator 13. If the result is YES, the home position alignment completion signal is received from the virtual master generator 13 in Step P23. Next, the time interval to transmit the pre-set speed to the virtual master generator 13 is read out of the memory 46 for a time interval to transmit the pre-set speed to the virtual master generator in Step P24. Next, the counted value of the internal clock counter 50 is read out in Step P25. When the counted value of the internal clock counter 50 becomes equal to or greater than the time interval to transmit the pre-set speed to the virtual master generator 13 in Step P26, the pre-set (slower) speed is read out of the memory 44 for a pre-set speed in Step P27, and then the pre-set (slower) speed is transmitted to the virtual master generator 13 in Step P28.

Next, when the internal clock counter 50 starts counting in Step P29, a judgment is made in Step P30 as to whether or not the pre-set speed has been inputted to the speed setter 60. If the result is YES, the pre-set speed is read out of the speed setter 60 and stored in Step P31, and then the time interval to transmit the pre-set speed to the virtual master generator 13 is read out of the memory 46 for a time interval to transmit the pre-set speed to the virtual master generator in Step P32. If the result is NO in the above-described Step P30, then the operation directly goes to the above-described Step P32. Next, when the counted value of the internal clock counter 50 is read out in Step P33, a judgment is made in Step P34 as to whether or not the counted value of the internal clock counter 50 is equal to or greater than the time interval to transmit the pre-set speed to the virtual master generator 13. If the result is YES, the pre-set speed is read out of the memory 44 for a pre-set speed in Step P35, and then the pre-set speed is transmitted to the virtual master generator 13 in Step P36. Thereafter, the operation returns to Step P29.

If the result is NO in the above-described Step P34, a judgment is made in Step P37 as to whether or not a stop signal for the printing press has been inputted. If the result is NO, then the operation returns to Step P30. On the other hand, if the result is YES, the time interval to transmit the pre-set speed to the virtual master generator 13 is read out of the memory 46 for a time interval to transmit the pre-set speed to the virtual master generator in Step P38. Next, the counted value of the internal clock counter 50 is read out in Step P39. When the counted value of the internal clock counter 50 becomes equal to or greater than the time interval to transmit the pre-set speed to the virtual master generator 13 in Step P40, the pre-set speed is read out of the memory 44 for a pre-set speed in Step P41. Thereafter, the pre-set speed is transmitted to the virtual master generator 13 in Step P42, and the operation goes to Step P49.

If the result is NO in the above-described Step P22, a judgment is made in Step P43 as to whether or not the stop signal for the printing press has been inputted. If the result is NO, then the operation returns to Step P17. On the other hand, if the result is YES, the time interval to transmit the pre-set speed to the virtual master generator 13 is read out of the memory 46 for a time interval to transmit the pre-set speed to the virtual master generator in Step P44. Next, the counted value of the internal clock counter 50 is read out in Step P45. When the counted value of the internal clock counter 50 becomes equal to or greater than the time interval to transmit the pre-set speed to the virtual master generator 13 in Step P46, the pre-set (slower) speed is read out of the memory 44 for a pre-set speed in Step P47. Thereafter, the pre-set (slower) speed is transmitted to the virtual master generator 13 in Step P48, and the operation goes to Step P49.

Next, zero is written in the memory 44 for a pre-set speed in Step P49. When the internal clock counter 50 starts counting in Step P50, the time interval to transmit the pre-set speed to the virtual master generator 13 is read out of the memory 46 for a time interval to transmit the pre-set speed to the virtual master generator in Step P51. Next, the counted value of the internal clock counter 50 is read out in Step P52. When the counted value of the internal clock counter 50 becomes equal to or greater than the time interval to transmit the pre-set speed to the virtual master generator 13 in Step P53, the pre-set speed (zero) is read out of the memory 44 for a pre-set speed in Step P54.

Next, after the pre-set speed (zero) is transmitted to the virtual master generator 13 in Step P55, speeds of the printing presses for activating the brakes of the drive motors of the printing presses are read out of the memory 47 for speeds of the printing presses for activating the brakes of the drive motors of the printing presses in Step P56. Next, outputs of the F/V converters 64 and 66 connected to the rotary encoders 18 and 118 of the drive motors 15 and 115 of the respective printing presses are read out in Step P57, and current speeds of the respective printing presses are calculated and stored in Step P58 by use of the outputs of the F/V converters 64 and 66 connected to the rotary encoders 18 and 118 of the drive motors 15 and 115 of the respective printing presses, which are read out as described above.

Next, a judgment is made in Step P59 as to whether or not all the current speeds of the printing presses obtained by the calculation are speeds equal to or smaller than the speeds of the printing presses for activating the brakes of the drive motors of the printing presses. If the result is NO, the operation returns to Step P50. On the other hand, if the result is YES, a synchronous drive stop instruction is transmitted to the virtual master generator 13 in Step P60. Next, when the number of the printing press which has stopped synchronous drive is transmitted from the virtual master generator 13 in Step P61, the number of the printing press which has stopped synchronous drive is received from the virtual master generator 13 and stored in Step P62. Next, when an activation signal is outputted to the drive motor brake circuit of the printing press which has stopped synchronous drive in Step P63, a judgment is made in Step P64 as to whether or not all the printing presses have stopped synchronous drive. If the result is NO, the operation returns to Step P61. On the other hand, if the result is YES, the synchronous drive switch is turned off in Step P65 and the operation is terminated. Here, if the synchronous drive switch is not turned off in Step P65 and if the printing press drive switch is turned on in Step P66, the operation returns to Step P3.

Next, the virtual master generator 13 is operated in accordance with operational flows shown in FIG. 8A, FIG. 8B, FIG. 8C, FIG. 9A, FIG. 9B, FIG. 10A, FIG. 10B, and FIG. 11.

Specifically, a judgment is made in Step P1 as to whether or not the home position alignment preparation start instruction has been transmitted from the central control unit 12. If the result is NO, the operation goes to Step P63 to be described later. On the other hand, if the result is YES, the home position alignment preparation start instruction is received from the central control unit 12 in Step P2. Next, the home position alignment preparation start instruction is transmitted to the drive control devices 14 and 114 of the respective printing presses in Step P3. When the pre-set (slower) speed is transmitted from the central control unit 12 in Step P4, the pre-set (slower) speed is received from the central control unit 12 and stored in the memory 73 for a current pre-set speed in Step P5.

Next, the current pre-set (slower) speed is transmitted to the drive control devices 14 and 114 of the respective printing presses in Step P6. Thereafter, when the home position alignment preparation completion instruction is transmitted from the central control unit 12 in Step P7, the home position alignment preparation completion instruction is received from the central control unit 12 in Step P8. Next, the home position alignment preparation completion instruction is transmitted to the drive control devices 14 and 114 of the respective printing presses in Step P9. Thereafter, when the home position alignment start instruction is transmitted from the central control unit 12 in Step P10, the home position alignment start instruction is received from the central control unit 12 in Step P11. Next, when the home position alignment start instruction is transmitted to the drive control devices 14 and 114 of the respective printing presses in Step P12, a zero position is inputted to the memory 75 for virtual current positions of machine shafts in Step P13, and a zero position is inputted to the memory 82 for virtual current positions of motor shafts in Step P14.

Next, when the pre-set (slower) speed is transmitted from the central control unit 12 in Step P15, the pre-set (slower) speed is received from the central control unit 12 and stored in the memory 73 for a current pre-set speed and the memory 74 for a previous pre-set speed in Step P16. Next, the virtual current positions of the machine shafts are read out of the memory 75 for virtual current positions of machine shafts in Step P17. Thereafter, correction values of the current positions of the respective printing presses are read out of the memory 76 for correction values of current positions of the respective printing presses in Step P18. Next, the correction values of the current positions of the respective printing presses are added to the virtual current positions of the machine shafts thus read out, and modified virtual current positions of the machine shafts of the respective printing presses are calculated and stored in Step P19. Thereafter, the current pre-set (slower) speed and the modified virtual current positions of the machine shafts of the respective printing presses obtained by the calculation are transmitted to the drive control devices 14 and 114 of the respective printing presses in Step P20.

Next, a judgment is made in Step P21 as to whether or not the pre-set (slower) speed has been transmitted from the central control unit 12. If the result is YES, the pre-set (slower) speed is received from the central control unit 12 and stored in the memory 73 for a current pre-set speed in Step P22. Next, the previous pre-set speed is read out of the memory 74 for a previous pre-set speed in Step P23. Thereafter, the time interval to transmit the pre-set speed from the central control unit 12 to the virtual master generator 13 is read out of the memory 78 for a time interval to transmit the pre-set speed to the virtual master generator in Step P24. Next, a modification value of a virtual current position is calculated by use of the previous pre-set speed thus read out and by use of the time interval to transmit the pre-set speed from the central control unit 12 to the virtual master generator 13 thus read out, and is stored in Step P25. Thereafter, the virtual current positions of the machine shafts are read out of the memory 75 for virtual current positions of machine shafts in Step P26.

Next, the modification value of the virtual current position obtained by the calculation is added to the virtual current positions of the machine shafts thus read out, and the modified virtual current positions of the machine shafts are calculated and stored in Step P27. Thereafter, virtual current positions of motor shafts are read out of the memory 82 for virtual current positions of motor shafts in Step P28. Next, the modification value of the virtual current position obtained by the calculation is added to the virtual current positions of the motor shafts thus read out, and modified virtual current positions of the motor shafts are calculated and stored in Step P29. Thereafter, the correction values of the current positions of the respective printing presses are read out of the memory 76 for correction values of current positions of the respective printing presses in Step P30. Next, the correction values of the current positions of the respective printing presses thus read out are added to the modified virtual current positions of the machine shafts obtained by the calculation, and modified virtual current positions of the machine shafts of the respective printing presses are calculated and stored in Step P31. Thereafter, the current pre-set (slower) speed and the modified virtual current positions of the machine shafts of the respective printing presses obtained by the calculation are transmitted to the drive control devices 14 and 114 of the respective printing presses in Step P32.

Next, the modified virtual current positions of the machine shafts are read out of the memory 80 for modified virtual current positions of machine shafts in Step P33. Thereafter, the modified virtual current positions of the machine shafts are written in the memory 75 for virtual current positions of machine shafts in Step P34. Next, the modified virtual current positions of the motor shafts are read out of the memory 84 for modified virtual current positions of motor shafts in Step P35. Then, the modified virtual current positions of the motor shafts are written in the memory 82 for virtual current positions of motor shafts in Step P36. Thereafter, the operation returns to the above-described Step P21.

On the other hand, if the result is NO in Step P21, home position alignment completion signals of the machine shafts are transmitted from the drive control devices 14 and 114 of the printing presses in Step P37, and the home position alignment completion signals of the machine shafts are received from the drive control devices 14 and 114 of the printing presses in Step P38. Next, a number of the printing press whose home position alignment completion signal of the machine shaft has been received is stored in Step P39, and then a judgment is made in Step P40 as to whether or not home position alignment is completed in terms of the machine shafts of all the printing presses.

If the result is NO in the above-described Step P40, the operation returns to the above-described Step P21. On the other hand, if the result is YES, the pre-set (slower) speed is transmitted from the central control unit 12 in Step P41, and the pre-set (slower) speed is received from the central control unit 12 and stored in the memory 73 for a current pre-set speed Step P42. Next, the previous pre-set speed is read out of the memory 74 for a previous pre-set speed in Step P43, and then the time interval to transmit the pre-set speed from the central control unit 12 to the virtual master generator 13 is read out of the memory 78 for a time interval to transmit the pre-set speed to the virtual master generator in Step P44. Next, the modification value of the virtual current position is calculated by use of the previous pre-set speed thus read out and the time interval to transmit the pre-set speed from the central control unit 12 to the virtual master generator 13 thus read out, and stored in Step P45. Thereafter, the virtual current positions of the machine shafts are read out of the memory 75 for virtual current positions of machine shafts in Step P46.

Next, the modification value of the virtual current position obtained by the calculation is added to the virtual current positions of the machine shafts thus read out, and the modified virtual current positions of the machine shafts are thereby calculated and stored in Step P47. Thereafter, the virtual current positions of the motor shafts are read out of the memory 82 for virtual current positions of motor shafts in Step P48. Next, the modification value of the virtual current position obtained by the calculation is added to the virtual current positions of the motor shafts thus read out, and the modified virtual current positions of the motor shafts are thereby calculated and stored in Step P49. Thereafter, the correction values of the current positions of the respective printing presses are read out of the memory 76 for current positions of the respective printing presses in Step P50. Next, the corrections values of the current positions of the respective printing presses thus read out are added to the modified virtual current positions of the motor shafts obtained by the calculation, and the modified virtual current positions of the motor shafts are thereby calculated and stored in Step P51. Thereafter, the current pre-set (slower) speed and the modified virtual current positions of the motor shafts of the respective printing presses are transmitted to the drive control devices 14 and 114 of the respective printing presses in Step P52.

Next, the modified virtual current positions of the machine shafts are read out of the memory 80 for modified virtual current positions of machine shafts in Step P53. Thereafter, the modified virtual current positions of the machine shafts are written in the memory 75 for virtual current positions of machine shafts in Step P54. Next, the modified virtual current positions of the motor shafts are read out of the memory 84 for modified virtual current positions of motor shafts in Step P55. Thereafter, the modified virtual current positions of the motor shafts are written in the memory 82 for virtual current positions of motor shafts in Step P56. Next, a judgment is made in Step P57 as to whether or not the pre-set (slower) speed has been received from the central control unit 12. If the result is YES, the operation returns to Step P42. On the other hand, if the result is NO, home position alignment completion signals of the motor shafts are transmitted from the drive control devices 14 and 114 of the printing presses in Step P58, and the home position alignment completion signals of the motor shafts are received from the drive control devices 14 and 114 of the printing presses in Step P59.

Next, a number of the printing press whose home position alignment completion signal of the motor shaft has been received is stored in Step P60, and then a judgment is made in Step P61 as to whether or not home position alignment of the motor shaft is completed in terms of all the printing presses. If the result is NO, the operation returns to Step P57. On the other hand, if the result is YES, the home position alignment completion signal is transmitted to the central control unit 12 in Step P62, and then the operation returns to Step P1.

On the other hand, if the result is NO in the above-described Step P1, a judgment is made in Step P63 as to whether or not the pre-set speed has been transmitted from the central control unit 12. Here, if the result is YES, the pre-set speed is received from the central control unit 12 and stored in the memory 73 for a current pre-set speed in Step P64. Next, the previous pre-set speed is read out of the memory 74 for a previous pre-set speed in Step P65. Thereafter, a judgment is made in Step P66 as to whether or not the pre-set speed received from the central control unit 12 is equal to the previous pre-set speed.

If the result is YES in the above-described Step P66, the time interval to transmit the pre-set speed from the central control unit 12 to the virtual master generator 13 is read out of the memory 78 for a time interval to transmit the pre-set speed to the virtual master generator in Step P67. On the other hand, if the result is NO, a judgment is made in Step P68 as to whether or not the pre-set speed received from the central control unit 12 is greater than the previous pre-set speed.

If the result is YES in the above-described Step P68, a speed modification value upon acceleration is read out of the memory 87 for a speed modification value upon acceleration in Step P69. Thereafter, the speed modification value upon acceleration thus read out is added to the previous pre-set speed and a modified current pre-set speed is thereby calculated in Step P70. Next, the modified current pre-set speed obtained by the calculation is stored in the memory 73 for a current pre-set speed in Step P71 and the operations goes to Step P67. On the other hand, if the result is NO in the above-described Step P68, a speed modification value upon deceleration is read out of the memory 88 for a speed modification value upon deceleration in Step P72. Thereafter, the speed modification value upon deceleration thus read out is subtracted from the previous pre-set speed and the modified current pre-set speed is thereby calculated in Step P73. Next, a judgment is made in Step P74 as to whether or not the modified current pre-set speed is smaller than 0. If the result is YES, the modified current pre-set speed is rewritten into zero in Step P75, and then the operation goes to the above-described Step P71. On the other hand, if the result is NO, the operation directly goes to Step P71.

Next, the modification value of the virtual current position is calculated by use of the previous pre-set speed thus read out and by use of the time interval to transmit the pre-set speed from the central control unit 12 to the virtual master generator 13 thus read out, and is stored in Step P76. Thereafter, the virtual current positions of the machine shafts are read out of the memory 75 for virtual current positions of machine shafts in Step P77. Next, the modification value of the virtual current position obtained by the calculation is added to the virtual current positions of the machine shafts thus read out, and the modified virtual current positions of the machine shafts are calculated and stored in Step P78. Thereafter, the virtual current positions of motor shafts are read out of the memory 82 for virtual current positions of motor shafts in Step P79. Next, the modification value of the virtual current position obtained by the calculation is added to the virtual current positions of the motor shafts thus read out, and modified virtual current positions of the motor shafts are calculated and stored in Step P80. Thereafter, the correction values of the current positions of the respective printing presses are read out of the memory 76 for correction values of current positions of the respective printing presses in Step P81.

Next, the correction values of the current positions of the respective printing presses thus read out are added to the modified virtual current positions of the motor shafts obtained by the calculation, and the modified virtual current positions of the motor shafts of the respective printing presses are calculated and stored in Step P82. Thereafter, the current pre-set speed and the modified virtual current positions of the motor shafts of the respective printing presses obtained by the calculation are transmitted to the drive control devices 14 and 114 of the respective printing presses in Step P83. Next, the current pre-set speed is stored in the memory 74 for a previous pre-set speed in Step P84. Thereafter, the modified virtual current positions of the machine shafts are read out of the memory 80 for modified virtual current positions of machine shafts in Step P85. Next, the modified virtual current positions of the machine shafts are written in the memory 75 for virtual current positions of machine shafts in Step P86. Then, the modified virtual current positions of the motor shafts are read out of the memory 84 for modified virtual current positions of motor shafts in Step P87. Thereafter, the modified virtual current positions of the motor shafts are written in the memory 82 for virtual current positions of motor shafts in Step P88. Then, the operation returns to Step P1.

On the other hand, if the result is NO in the above-described Step P63, a judgment is made in Step P89 as to whether or not the synchronous drive stop instruction has been transmitted from the central control unit 12. Here, if the result is NO, the operation returns to Step P1. On the other hand, if the result is YES, the synchronous drive stop instruction is received from the central control unit 12 in Step P90, and the synchronous drive stop instruction is transmitted to the drive control devices 14 and 114 of the respective printing presses in Step P91. Next, when the synchronous drive stop signals are transmitted from the drive control devices 14 and 114 of the printing presses in Step P92, the synchronous drive stop signals are received from the drive control devices 14 and 114 of the printing presses in Step P93. Next, a number of the printing press which has received the synchronous drive stop signal is stored in Step P94, and then the number of the printing press which has received the synchronous drive stop signal is transmitted to the central control unit 12 in Step P95. Thereafter, a judgment is made in Step P96 as to whether or not the synchronous drive stop signals have been received from all the drive control devices 14 and 114 of the printing presses. If the result is YES, the operation returns to Step P1. On the other hand, if the result is NO, the operation returns to Step P92.

Next, each of the drive control devices 14 and 114 of the printing presses is operated in accordance with operational flows shown in FIG. 12A, FIG. 12B, FIG. 12C, FIG. 13, FIG. 14A, and FIG. 14B.

Specifically, a judgment is made in Step P1 as to whether or not the home position alignment preparation start instruction has been transmitted from the virtual master generator 13. If the result is NO, the operation goes to Step P49 to be described later. On the other hand, if the result is YES, the home position alignment preparation start instruction is received from the virtual master generator 13 in Step P2. Next, a starting signal for the drive motor driver 146 is turned on in Step P3. When the current pre-set (slower) speed is transmitted from the virtual master generator 13 in Step P4, the current pre-set (slower) speed is received from the central control unit 12 and stored in Step P5. Next, the current pre-set (slower) speed is read out of the memory 123 for a current pre-set speed in Step P6, and then the current pre-set (slower) speed is written in the memory 124 for an instructed speed in Step P7.

Next, an instructed speed is outputted to the drive motor driver 146 in Step P8. Thereafter, when the home position alignment preparation completion instruction is transmitted from the virtual master generator 13 in Step P9, the home position alignment preparation completion instruction is received from the virtual master generator 13 in Step P10. Next, when the home position alignment start instruction is transmitted from the virtual master generator 13 in Step P11, the home position alignment start instruction is received from the virtual master generator 13 in Step P12. Next, a judgment is made in Step P13 as to whether or not the current pre-set (slower) speed and the modified virtual current position of the machine shaft has been transmitted from the virtual master generator 13. If the result is NO, the current pre-set (slower) speed and the modified virtual current position of the machine shaft are transmitted from the virtual master generator 13 in Step P14, and the operation goes to Step P32 to be described later.

If the result is YES in the above-described Step P13, the current pre-set (slower) speed and the modified virtual current position of the machine shaft is received from the virtual master generator 13 and stored in the memory 123 for a current pre-set speed and the memory 125 for virtual current positions of machine shafts in Step P15. Thereafter, a counted value is read out of the machine shaft position detection counter 147 and stored in Step P16. Next, the current position of the machine shaft is calculated by use of the counted value of the machine shaft position detection counter 147 thus read out, and is stored in Step P17. Thereafter, a difference in the current position of the machine shaft is calculated by use of the received virtual current position of the machine shaft and the current position of the machine shaft obtained by the calculation, and is stored in Step P18. Next, an absolute value of the difference in the current position of the machine shaft is calculated by use of the difference in the current position of the machine shaft obtained by the calculation, and is stored in Step P19. Thereafter, an allowance of the difference in the position of the machine shaft is read out of the memory 130 for an allowance of the difference in the position of the machine shaft in Step P20.

Next, a judgment is made in Step P21 as to whether or not the absolute value of the difference in the current position of the machine shaft obtained by the calculation is equal to or smaller than the allowance of the position of the machine shaft thus read out. If the result is YES, the current pre-set (slower) speed is read out of the memory 123 for a current pre-set speed in Step P22. Next, the current pre-set (slower) speed is written in the memory 124 for an instructed speed in Step P23, and then the instructed speed is outputted to the drive motor driver 146 in Step P24. Thereafter, the home position alignment completion signal of the machine shaft is transmitted to the virtual master generator 13 in Step P25, and the operation returns to Step P13.

On the other hand, if the result is NO in the above-described Step P21, a conversion table from the difference in the current position of the machine shaft into a correction value of the pre-set speed is read out of the memory 131 for a conversion table from the difference in the current position of the machine shaft into a correction value of the pre-set speed in Step P26. Thereafter, a difference in the current position of the machine shaft is read out of the memory 128 for a difference in the position of the machine shaft in Step P27. Next, the correction value of the pre-set speed is derived from the difference in the current position of the machine shaft by use of the conversion table from the difference in the current position of the machine shaft into a correction value of the pre-set speed, and is stored in Step P28. Next, the current pre-set (slower) speed is read out of the memory 123 for a current pre-set speed in Step P29. Then, the derived correction value of the pre-set speed is added to the current pre-set (slower) speed thus read out, and the instructed speed is thereby calculated and stored in Step P30. Thereafter, the instructed speed is outputted to the drive motor driver 146 in Step P31, and the operation returns to the above-described Step P13.

The current pre-set (slower) speed and the modified virtual current position of the motor shaft are received from the virtual master generator 13 and stored in the memory 123 for a current pre-set speed and the memory 133 for virtual current positions of motor shafts in the above-mentioned Step P32. Thereafter, a counted value is read out of the motor shaft position detection counter 148 and is stored in Step P33. Next, the current position of the motor shaft is calculated by use of the counted value of the motor shaft position detection counter 148 thus read out, and is stored in Step P34. Thereafter, a difference in the current position of the motor shaft is calculated by use of the received virtual current position of the motor shaft and the current position of the motor shaft obtained by the calculation, and is stored in Step P35. Next, an absolute value of the difference in the current position of the motor shaft is calculated by use of the difference in the current position of the motor shaft obtained by the calculation, and is stored in Step P36. Thereafter, an allowance of the difference in the position of the motor shaft is read out of the memory 138 for an allowance of the difference in the position of the motor shaft in Step P37.

Next, a judgment is made in Step P38 as to whether or not the absolute value of the difference in the current position of the motor shaft obtained by the calculation is equal to or smaller than the allowance of the position of the motor shaft thus read out. If the result is YES, the current pre-set (slower) speed is read out of the memory 123 for a current pre-set speed in Step P39. Next, the current pre-set (slower) speed is written in the memory 124 for an instructed speed in Step P40, and then the instructed speed is outputted to the drive motor driver 146 in Step P41. Thereafter, the home position alignment completion signal of the motor shaft is transmitted to the virtual master generator 13 in Step P42, and the operation returns to Step P1.

On the other hand, if the result is NO in the above-described Step P38, a conversion table from the difference in the current position of the motor shaft into a correction value of the pre-set speed is read out of the memory 139 for a conversion table from the difference in the current position of the motor shaft into a correction value of the pre-set speed in Step P43. Thereafter, a difference in the current position of the motor shaft is read out of the memory 136 for a difference in the position of the motor shaft in Step P44. Next, the correction value of the pre-set speed is derived from the difference in the current position of the motor shaft by use of the conversion table from the difference in the current position of the motor shaft into a correction value of the pre-set speed, and is stored in Step P45. Thereafter, the current pre-set (slower) speed is read out of the memory 123 for a current pre-set speed in Step P46. Next, the derived correction value of the pre-set speed is added to the current pre-set (slower) speed thus read out, and the instructed speed is thereby calculated and stored in Step P47. Thereafter, the instructed speed is outputted to the drive motor driver 146 in Step P48, and the operation returns to the above-described Step P13.

A judgment is made in the above-mentioned Step P49 as to whether or not the current pre-set speed and the modified virtual current position of the motor shaft have been transmitted from the virtual master generator 13. If the result is YES, the current pre-set speed and the modified virtual current position of the motor shaft are received from the virtual master generator 13 and stored in the memory 123 for a current pre-set speed and the memory 133 for virtual current positions of motor shafts in Step P50. Next, the counted value is read out of the motor shaft position detection counter 148 and is stored in Step P51. Thereafter, the current position of the motor shaft is calculated by use of the counted value of the motor shaft position detection counter 148 thus read out, and is stored in Step P52. Next, the difference in the current position of the motor shaft is calculated by use of the received virtual current position of the motor shaft and the current position of the motor shaft obtained by the calculation, and is stored in Step P53. Thereafter, the absolute value of the difference in the current position of the motor shaft is calculated by use of the difference in the current position of the motor shaft obtained by the calculation, and is stored in Step P54.

Next, the allowance of the difference in the position of the motor shaft is read out of the memory 138 for an allowance of the difference in the position of the motor shaft in Step P55. Thereafter, a judgment is made in Step P56 as to whether or not the absolute value of the difference in the current position of the motor shaft obtained by the calculation is equal to or smaller than the allowance of the position of the motor shaft thus read out. Here, if the result is YES, the current pre-set speed is read out of the memory 123 for a current pre-set speed in Step P61. Thereafter, the current pre-set speed is written in the memory 124 for an instructed speed in Step P62. Next, the instructed speed is outputted to the drive motor driver 146 in Step P63, and the operation returns to Step P1. On the other hand, if the result is NO, the conversion table from the difference in the current position of the motor shaft into a correction value of the pre-set speed is read out of the memory 139 for a conversion table from the difference in the current position of the motor shaft into a correction value of the pre-set speed in Step P64. Thereafter, the difference in the current position of the motor shaft is read out of the memory 136 for a difference in the position of the motor shaft in Step P65. Next, the correction value of the pre-set speed is derived from the difference in the current position of the motor shaft by use of the conversion table from the difference in the current position of the motor shaft into a correction value of the pre-set speed, and is stored in Step P66. Thereafter, the current pre-set speed is read out of the memory 123 for a current pre-set speed in Step P67. Then, the derived correction value of the pre-set speed is added to the current pre-set speed thus read out, and the instructed speed is thereby calculated and stored in Step P68. Thereafter, the instructed speed is outputted to the drive motor driver 146 in Step P69, and the operation returns to Step P1.

If the result is NO in the above-described Step P49, a judgment is made in Step P57 as to whether or not the synchronous drive stop instruction has been transmitted from the virtual master generator 13. Here, if the result is NO, the operation directly returns to Step P1. On the other hand, if the result is YES, the synchronous drive stop instruction is received from the virtual master generator 13 in Step P58. Then, the starting signal for the drive motor driver 146 is turned off in Step P59. Thereafter, the synchronous drive stop signal is transmitted to the virtual master generator 13 in Step P60, and the operation returns to Step P1.

In this way, according to this embodiment, when the first printing press A and the second printing press B are in shutdown, phase deviation between the first printing press A and the second printing press B is prevented and the synchronous condition thereof is retained by stopping the synchronous control by the drive motors 15 and 115 and by starting the drive motor brakes 16 and 116 attached to the drive motors 15 and 115.

In this case, according to this embodiment, when the speeds of the respective printing presses A and B are detected by the rotary encoders 18 and 118 and the speeds are reduced to a predetermined speed (such as 8 rpm) by the stop instruction, the phase of the virtual master generator 13 is stopped in the relevant position and the synchronous control of the respective printing presses A and B is released. Simultaneously, the drive motor brakes 16 and 116 of the drive motors 15 and 115 of the respective printing presses A and B are started. Accordingly, rotations of the respective printing presses A and B are stopped by the drive motor brakes 16 and 116 when the respective printing presses A and B are in shutdown.

In this way, it is not necessary to supply currents to the drive motors 15 and 115 and to the drive motor driver 146 when the respective printing presses A and B are in shutdown. Therefore, it is possible to reduce power consumption and to improve durability of motors and motor bearings. Although this embodiment has been described on the synchronous control between the two printing presses A and B, it is needless to say that the present invention is also applicable to synchronous control of three or more printing presses.

Second Embodiment

Figure 16:
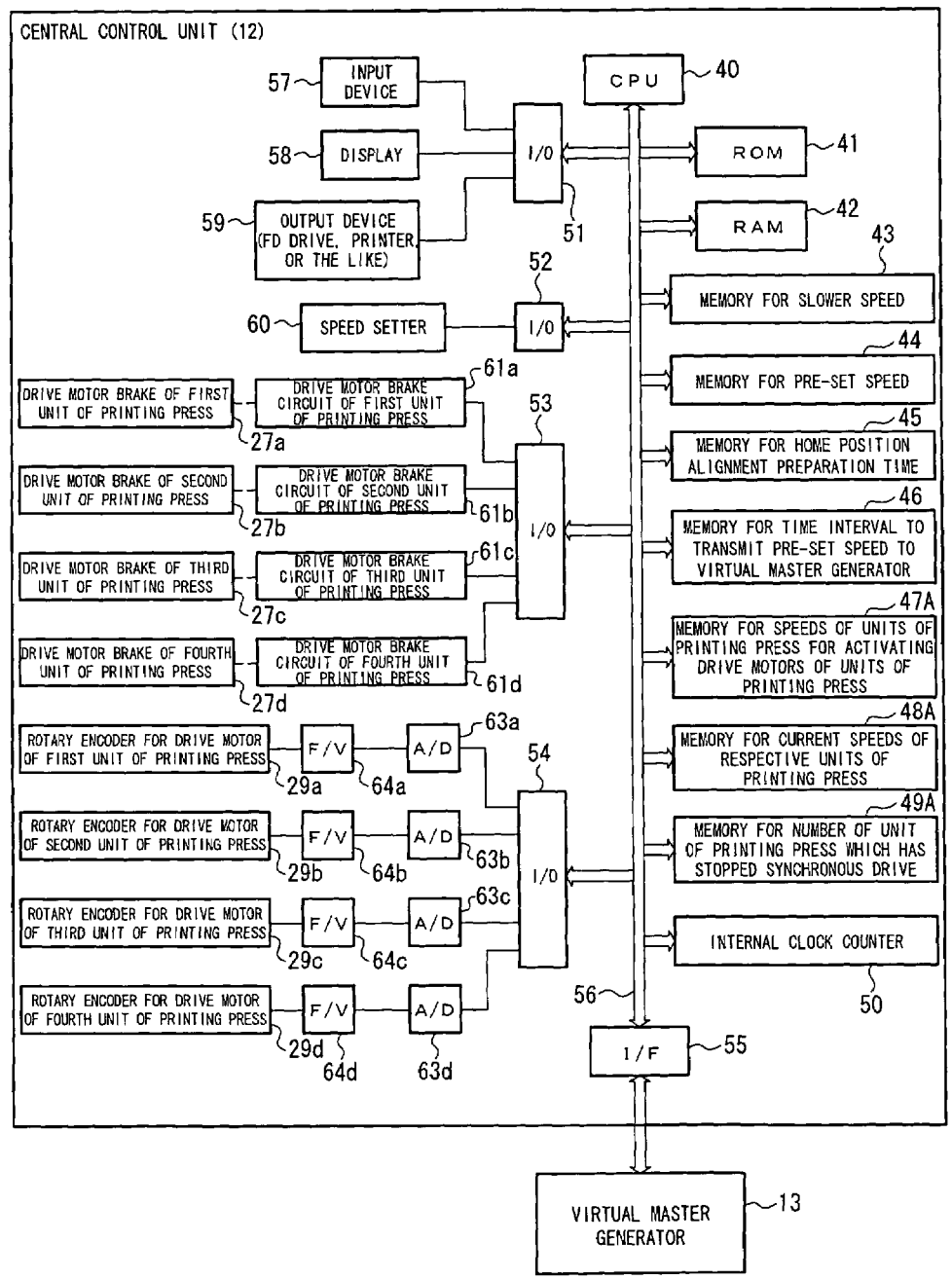
FIG. 16 is a block diagram of a central control unit.
Figure 17:
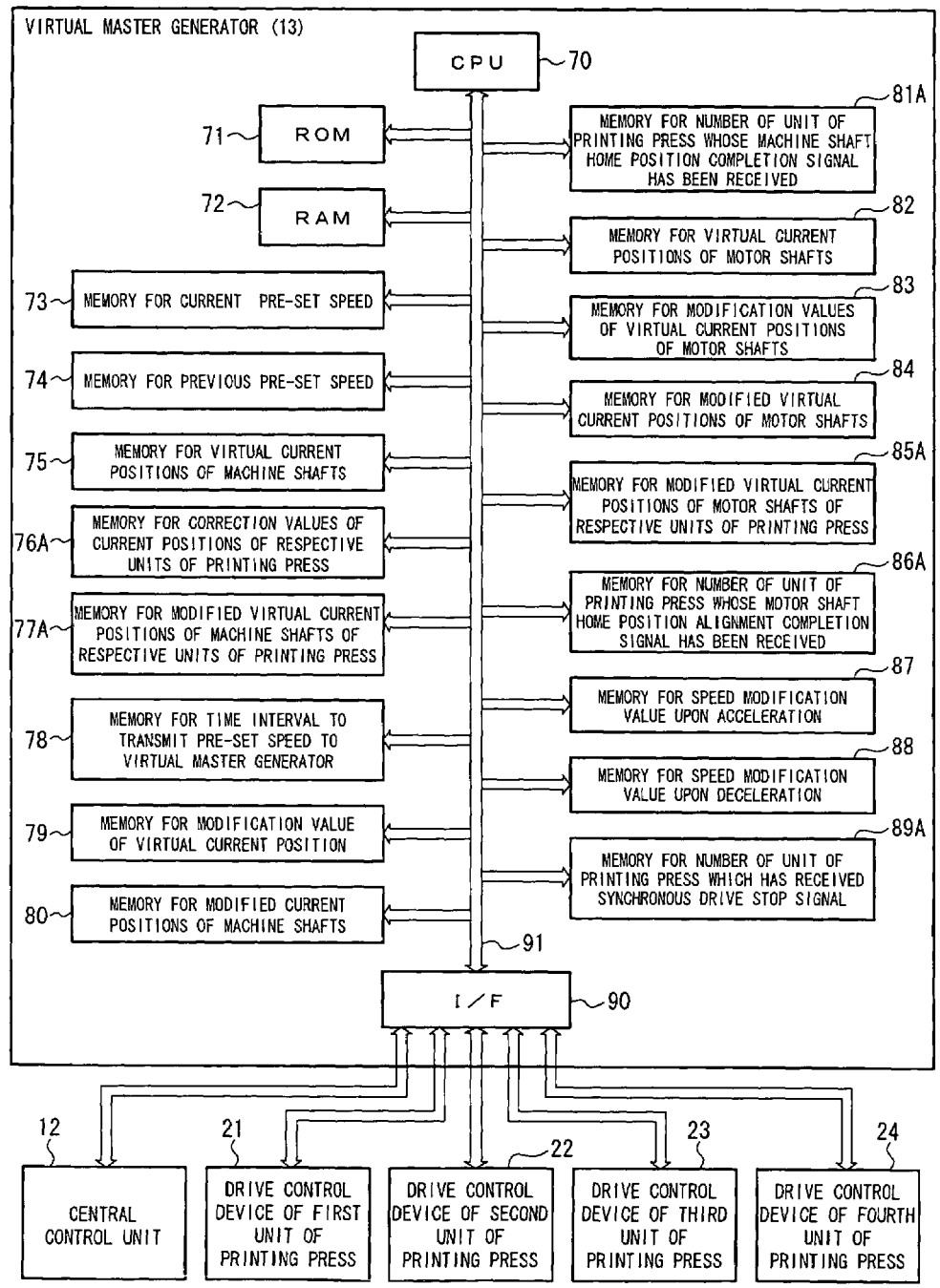
FIG. 17 is a block diagram of a virtual master generator.
Figure 18:
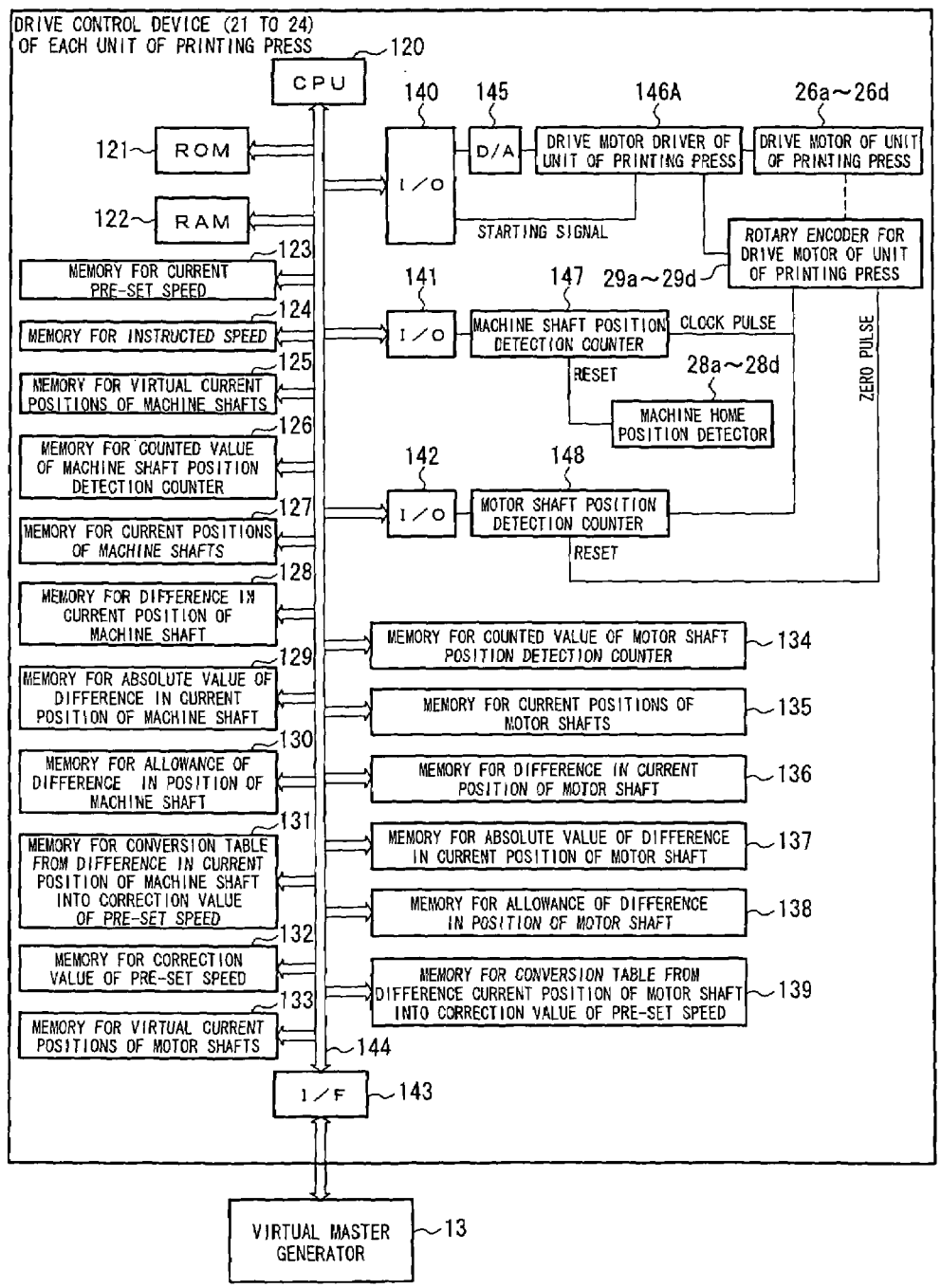
FIG. 18 is a block diagram of a drive control device of each of the units in the printing press.
Figure 19A:
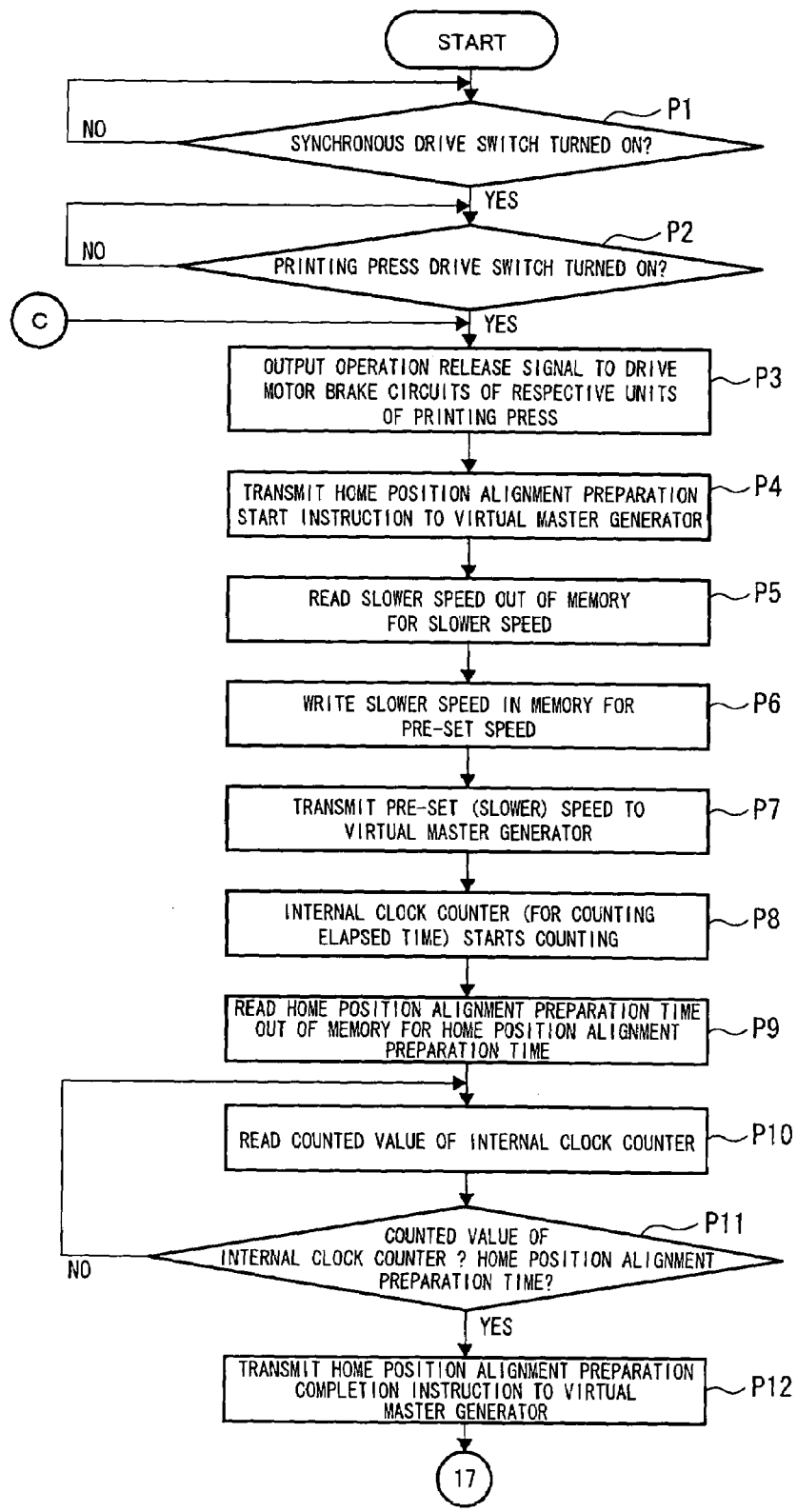
FIG. 19A is an operational flowchart of the central control unit.
Figure 19B:
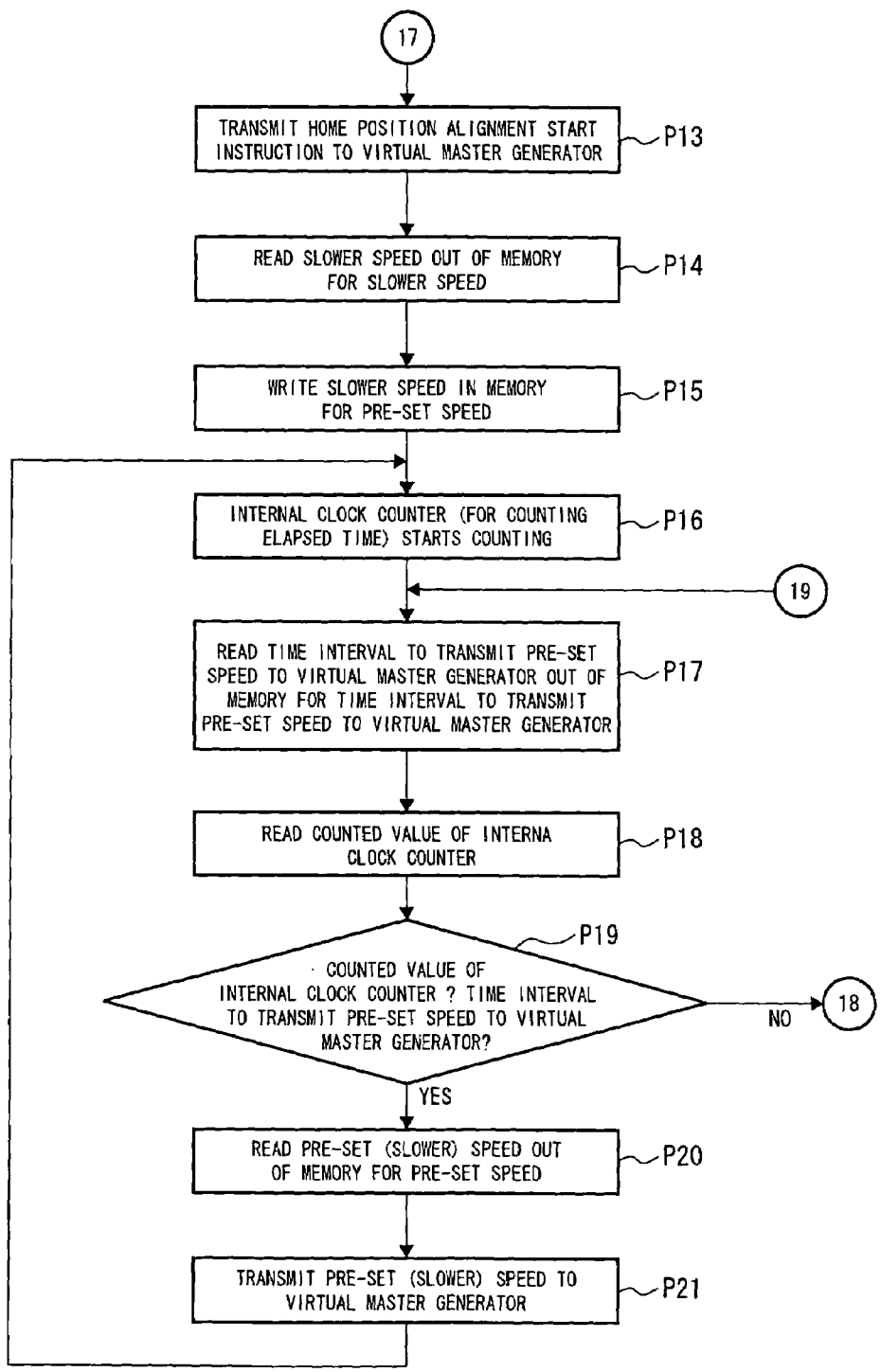
FIG. 19B is another operational flowchart of the central control unit.
Figure 19C:
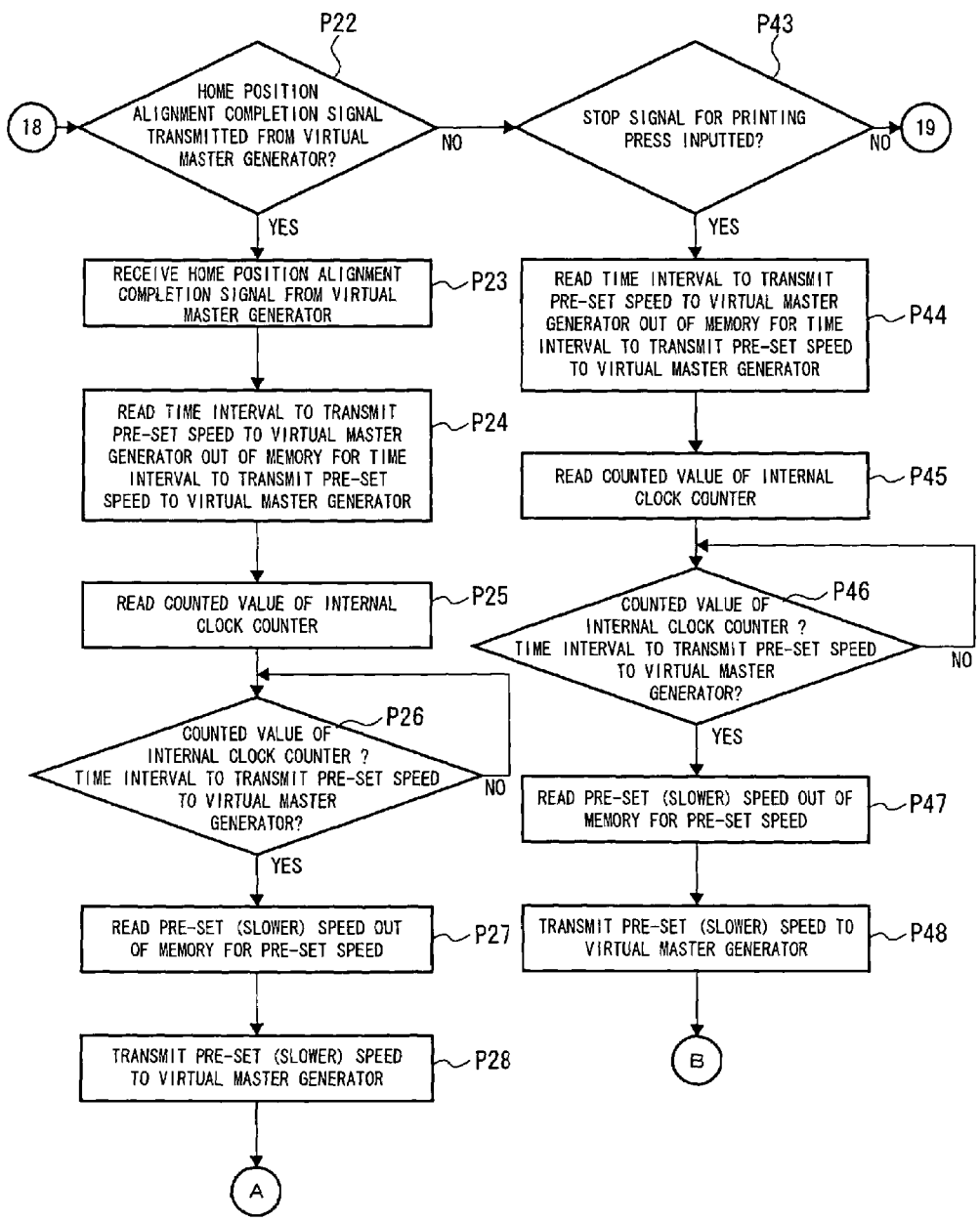
FIG. 19C is another operational flowchart of the central control unit.
Figure 20:
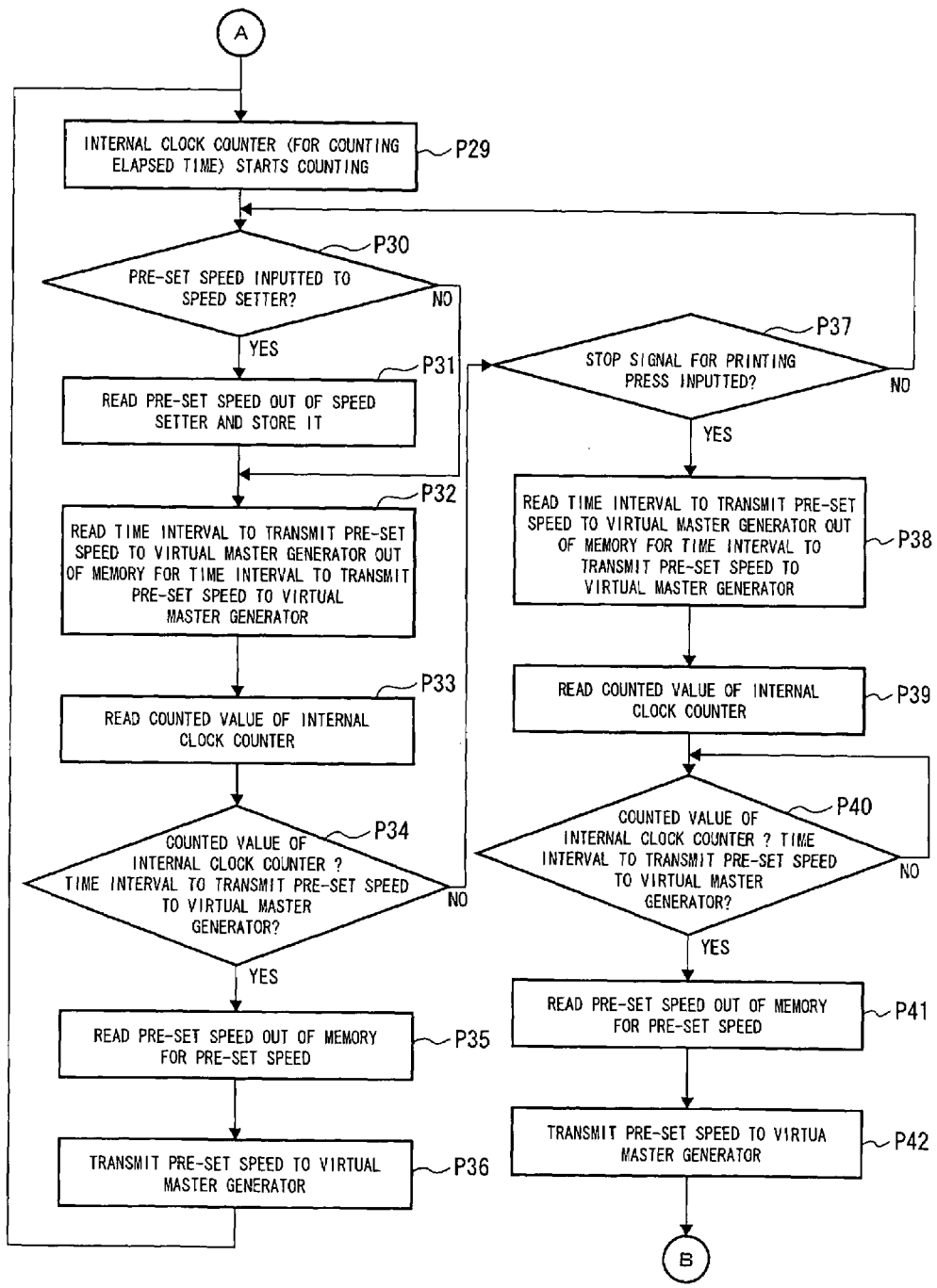
FIG. 20 is another operational flowchart of the central control unit.
Figure 21:
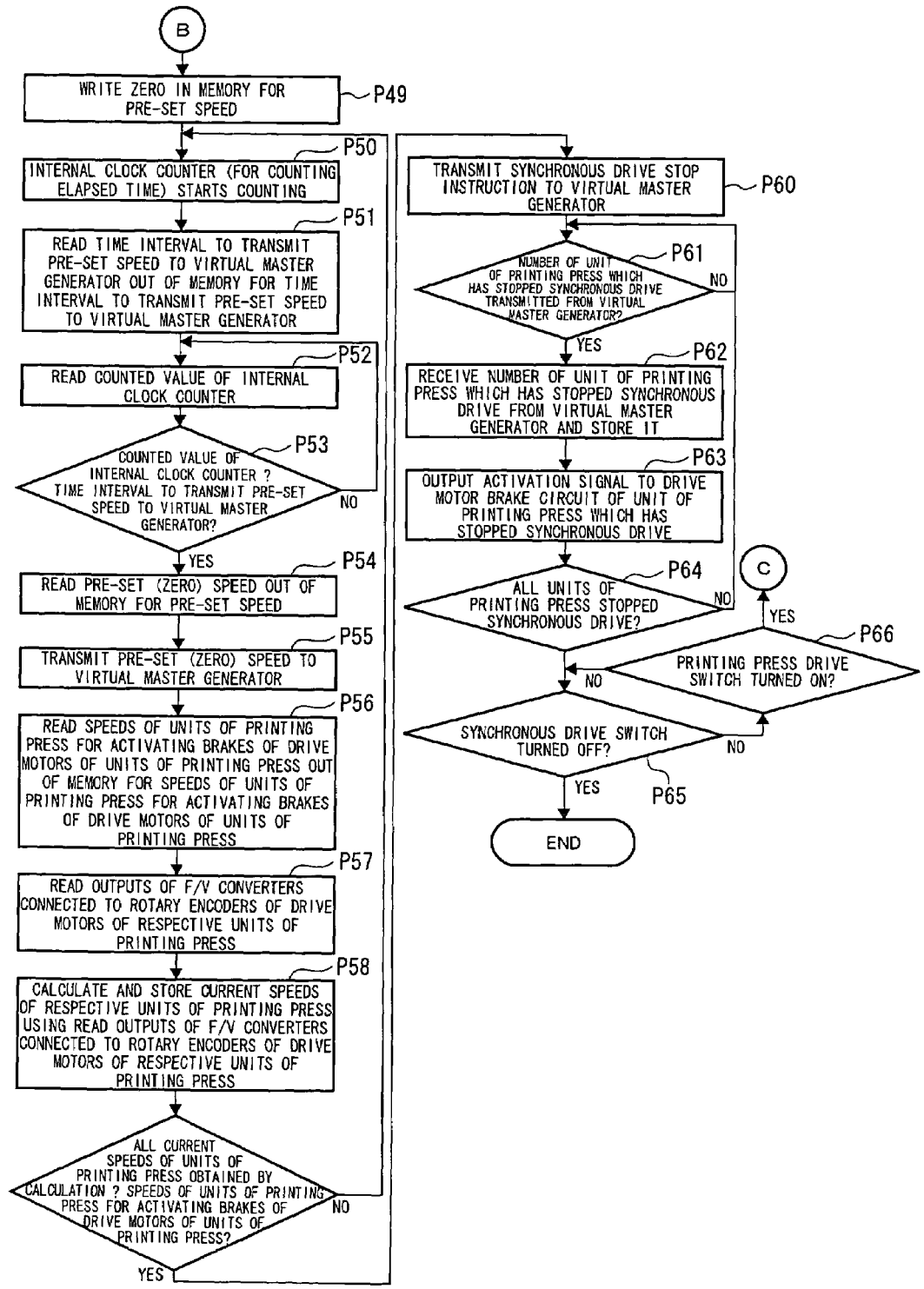
FIG. 21 is another operational flowchart of the central control unit.
Figure 22A:
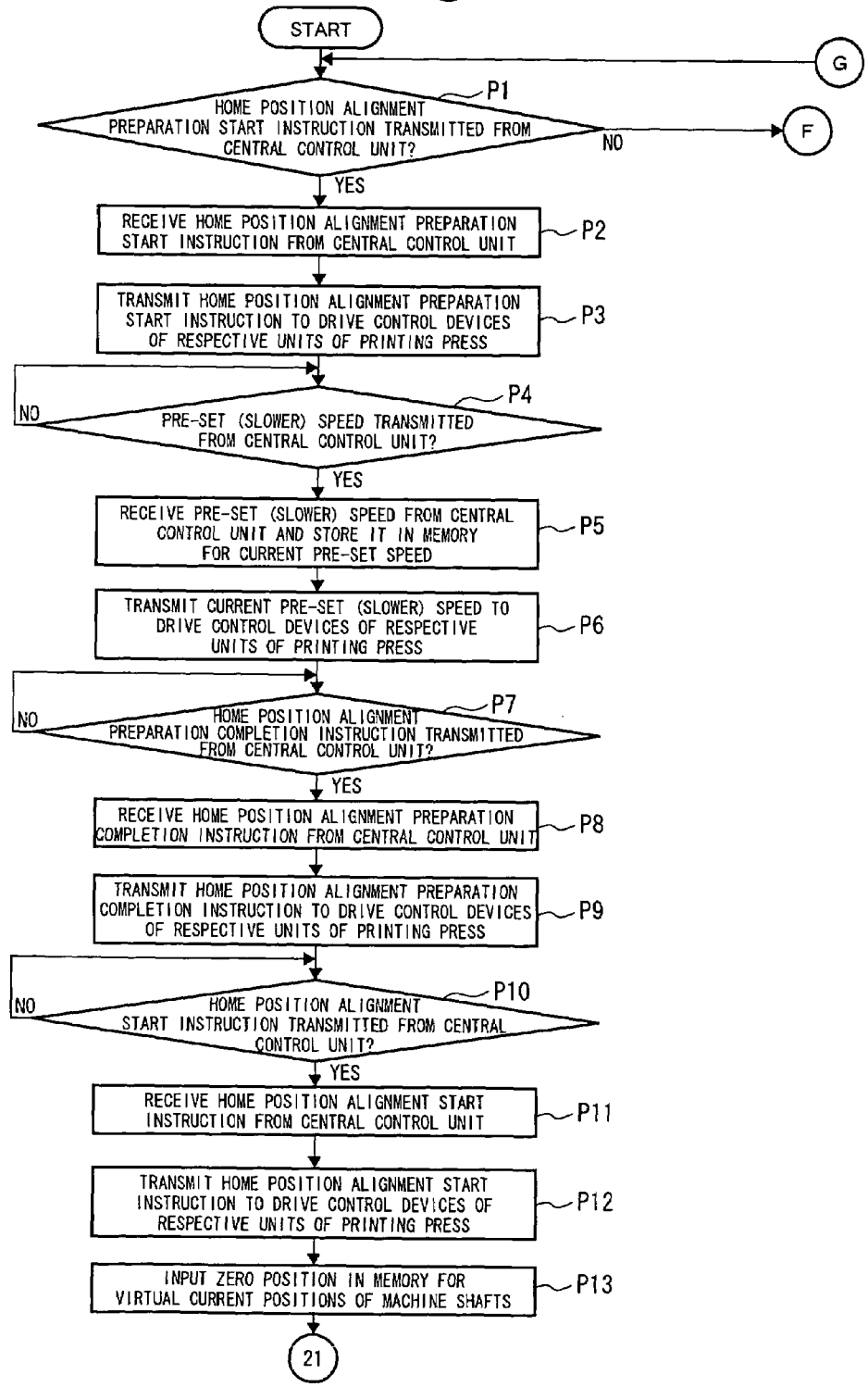
FIG. 22A is an operational flowchart of the virtual master generator.
Figure 22B:
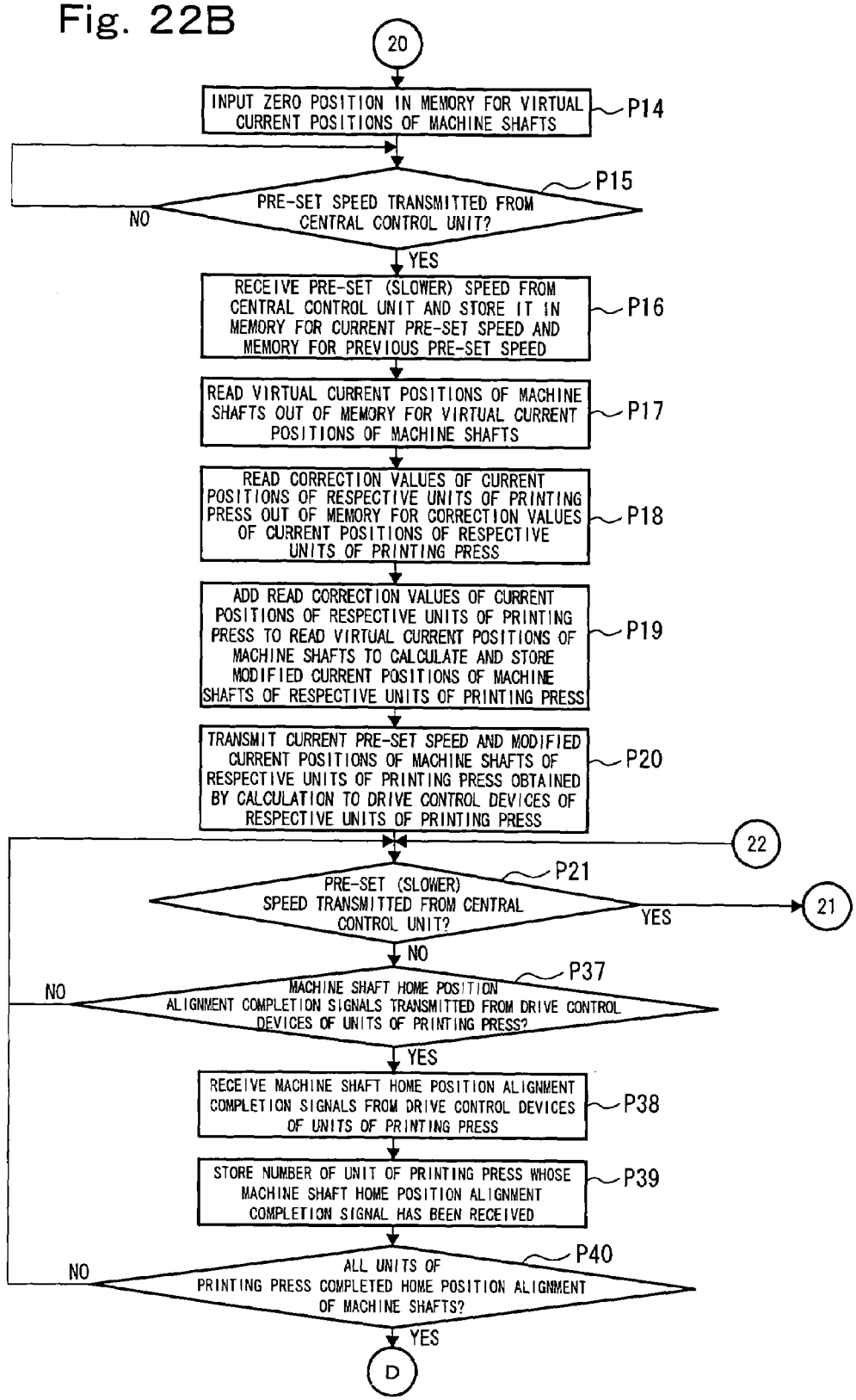
FIG. 22B is another operational flowchart of the virtual master generator.
Figure 22C:
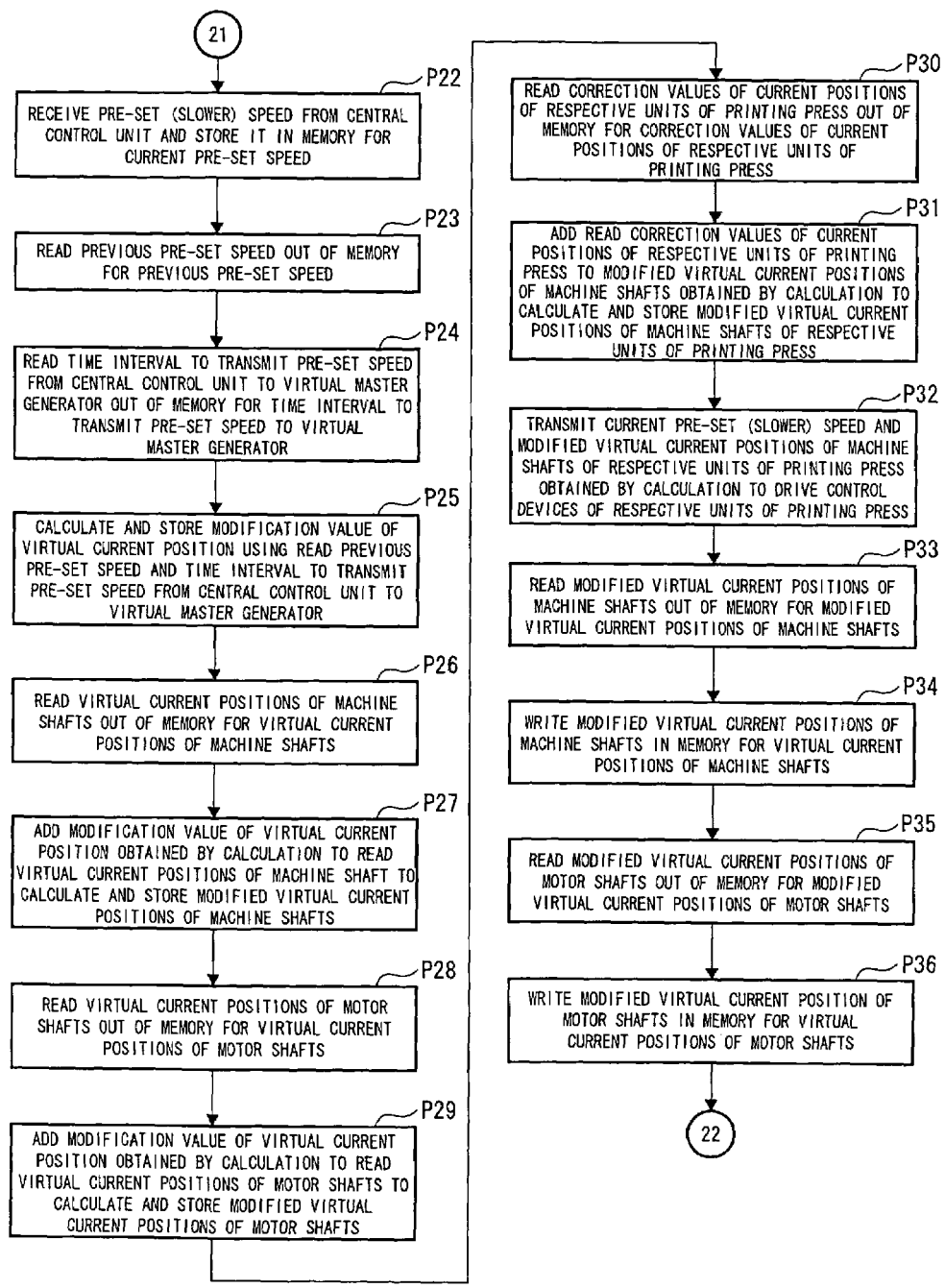
FIG. 22C is another operational flowchart of the virtual master generator.
Figure 23A:
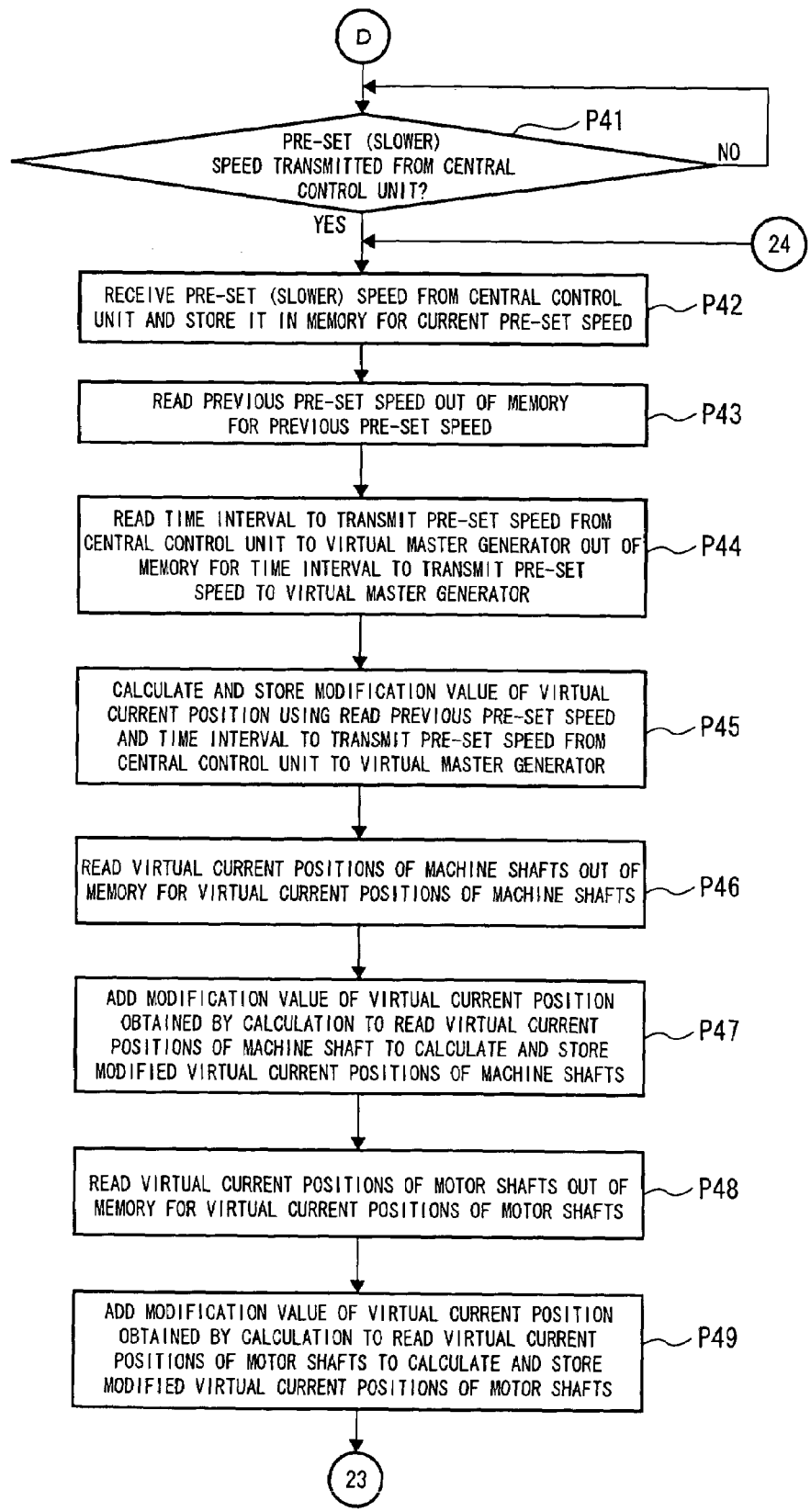
FIG. 23A is another operational flowchart of the virtual master generator.
Figure 23B:
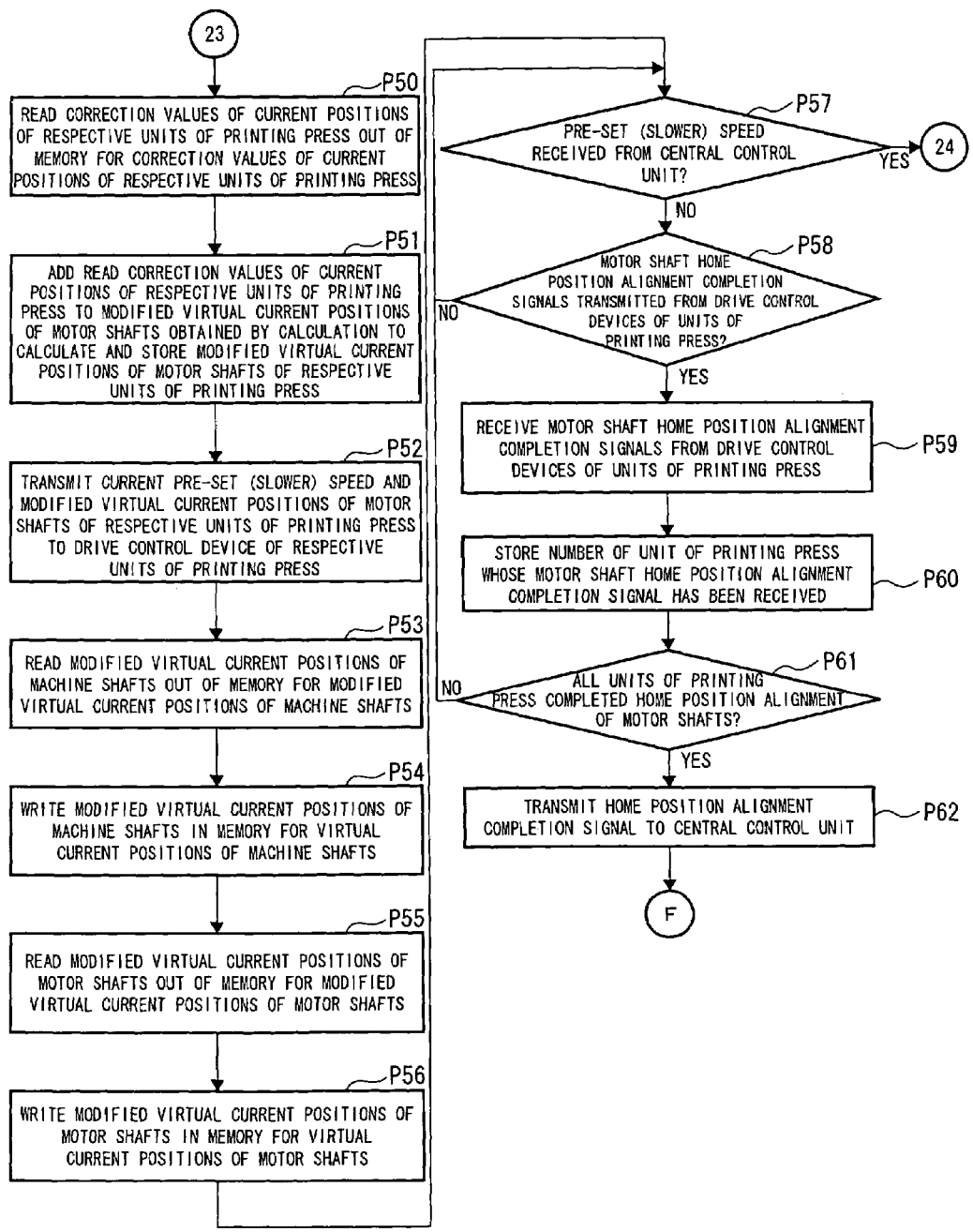
FIG. 23B is another operational flowchart of the virtual master generator.
Figure 24A:
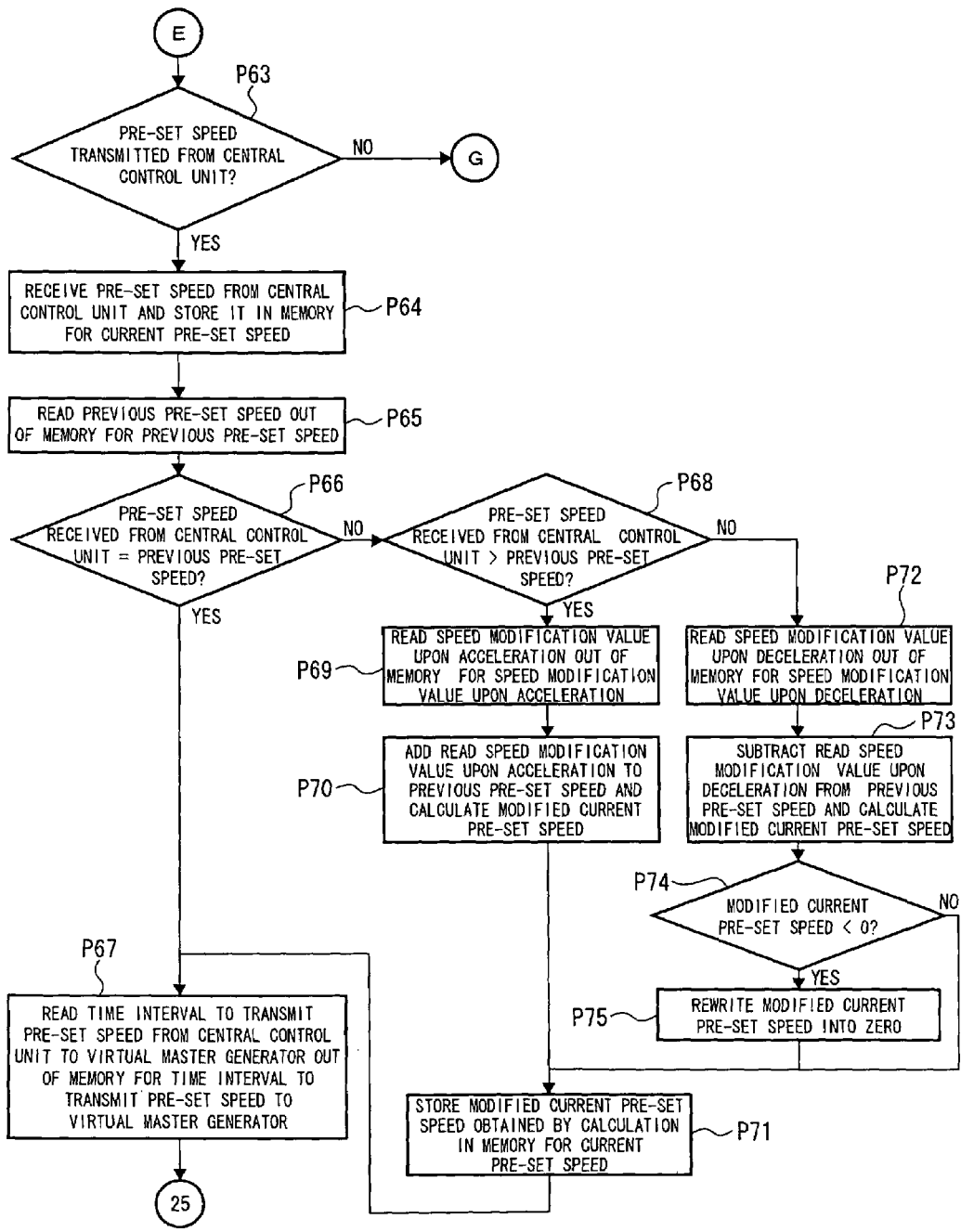
FIG. 24A is another operational flowchart of the virtual master generator.
Figure 24B:
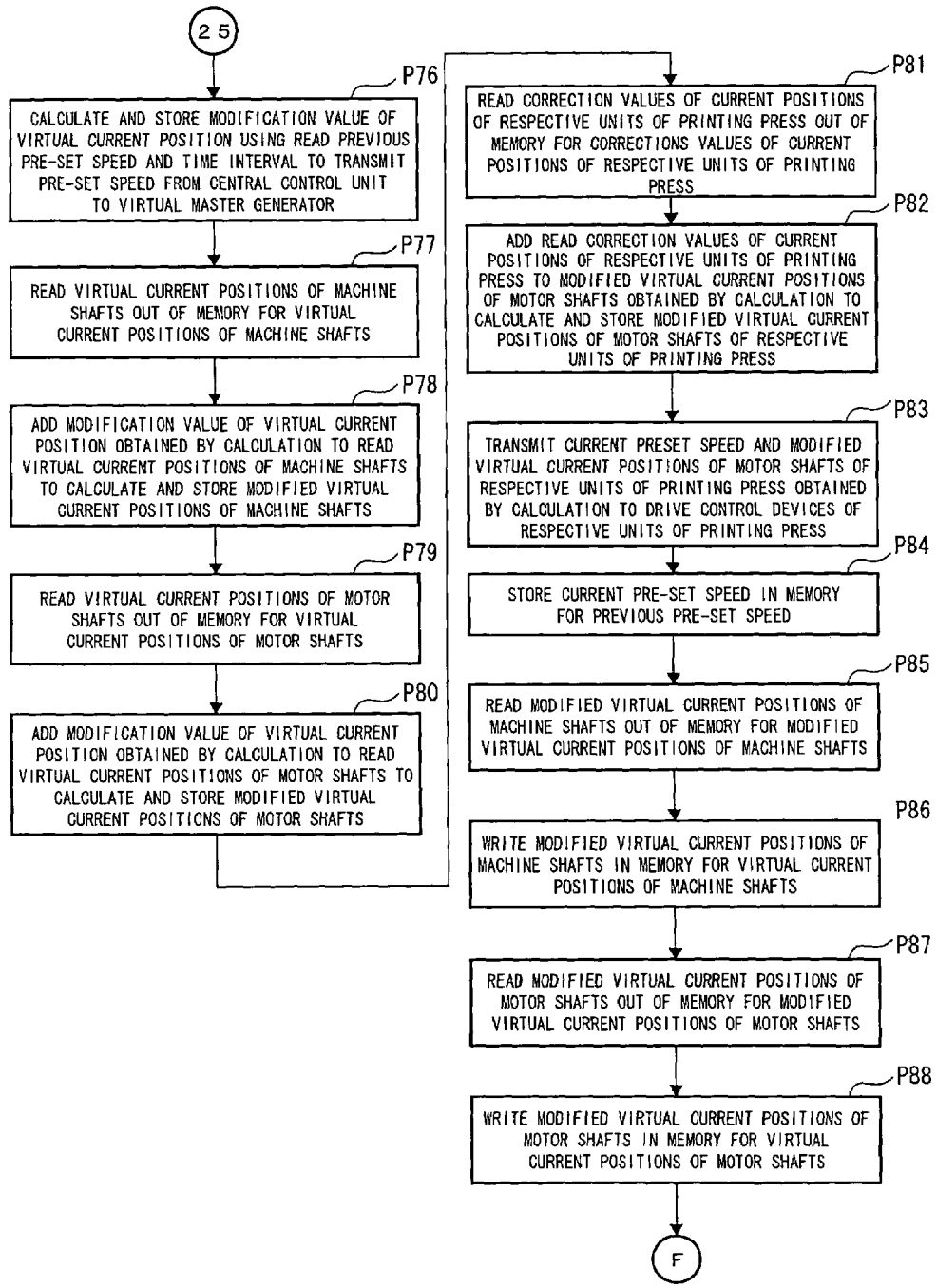
FIG. 24B is another operational flowchart of the virtual master generator.
Figure 25:
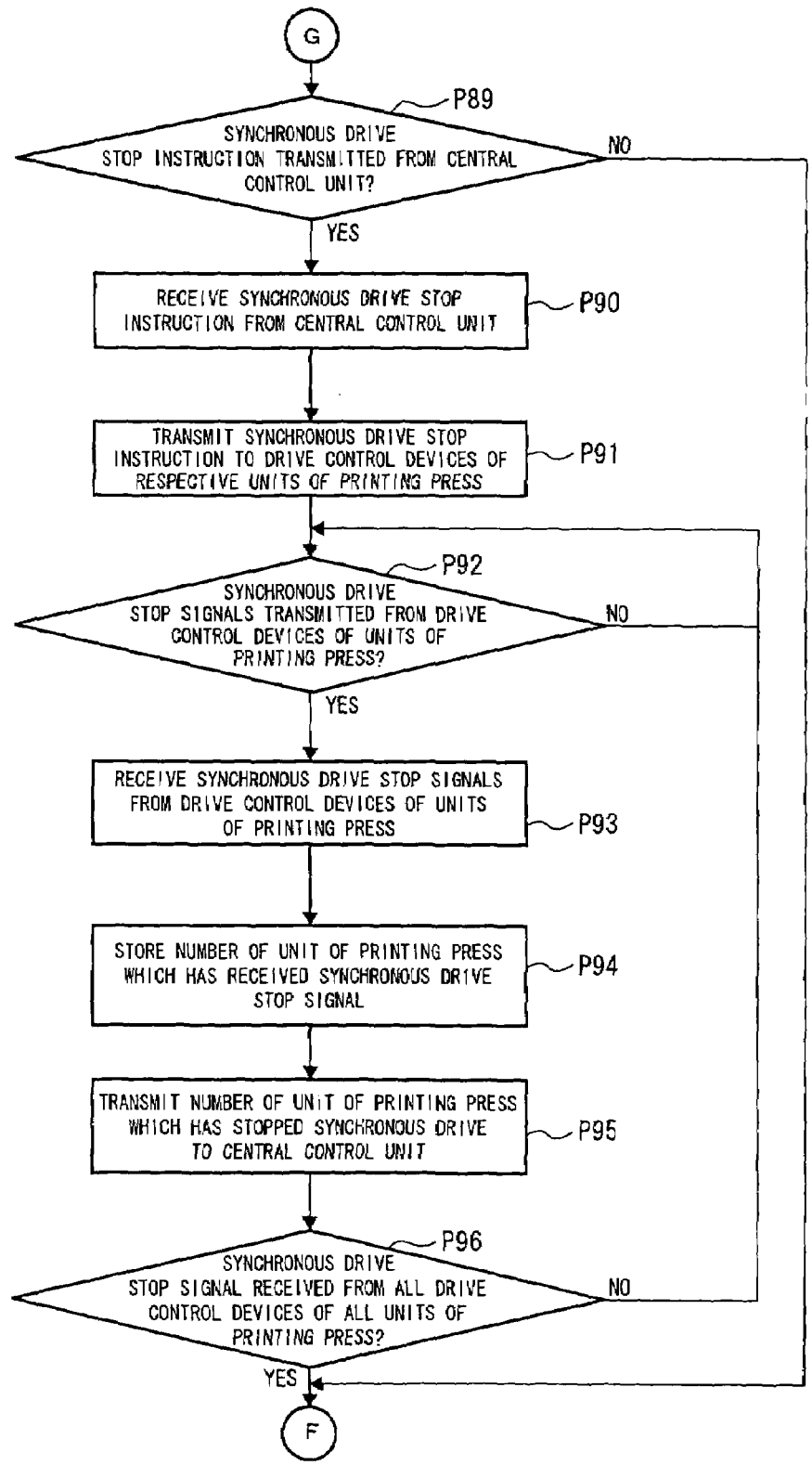
FIG. 25 is another operational flowchart of the virtual master generator.
Figure 26A:
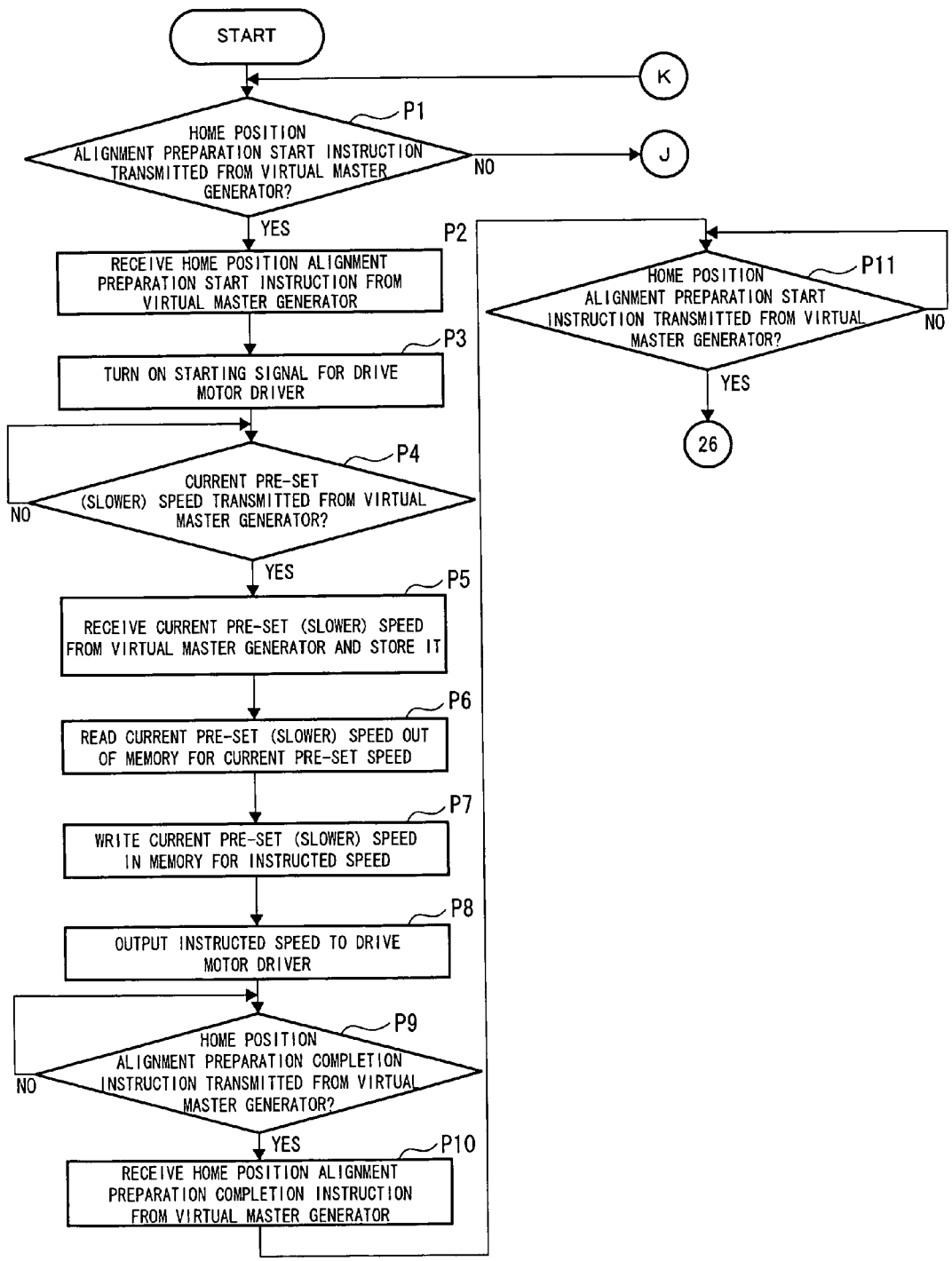
FIG. 26A is an operational flowchart of the drive control device of each of the units in the printing press.
Figure 26B:
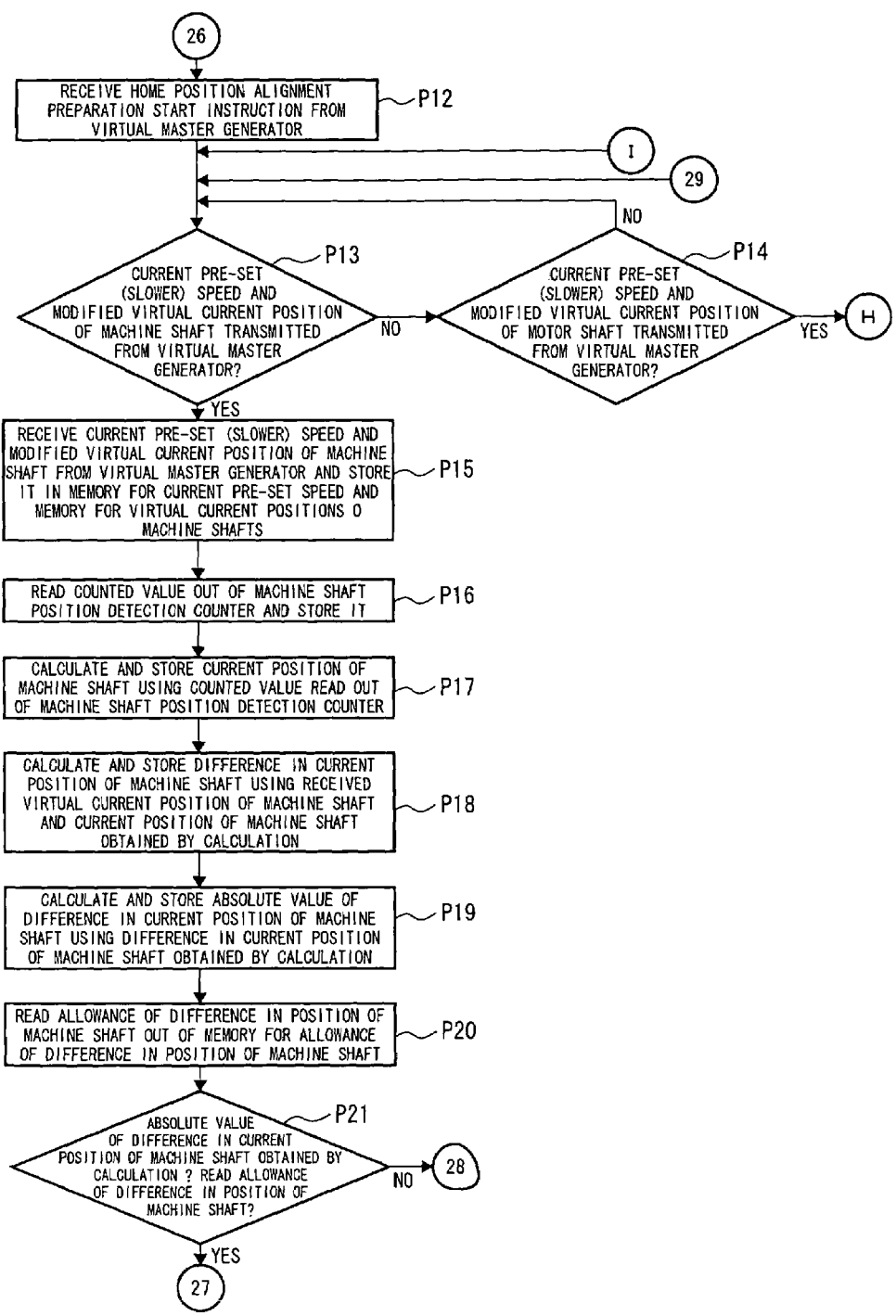
FIG. 26B is another operational flowchart of the drive control device of each of the units in the printing press.
Figure 26C:
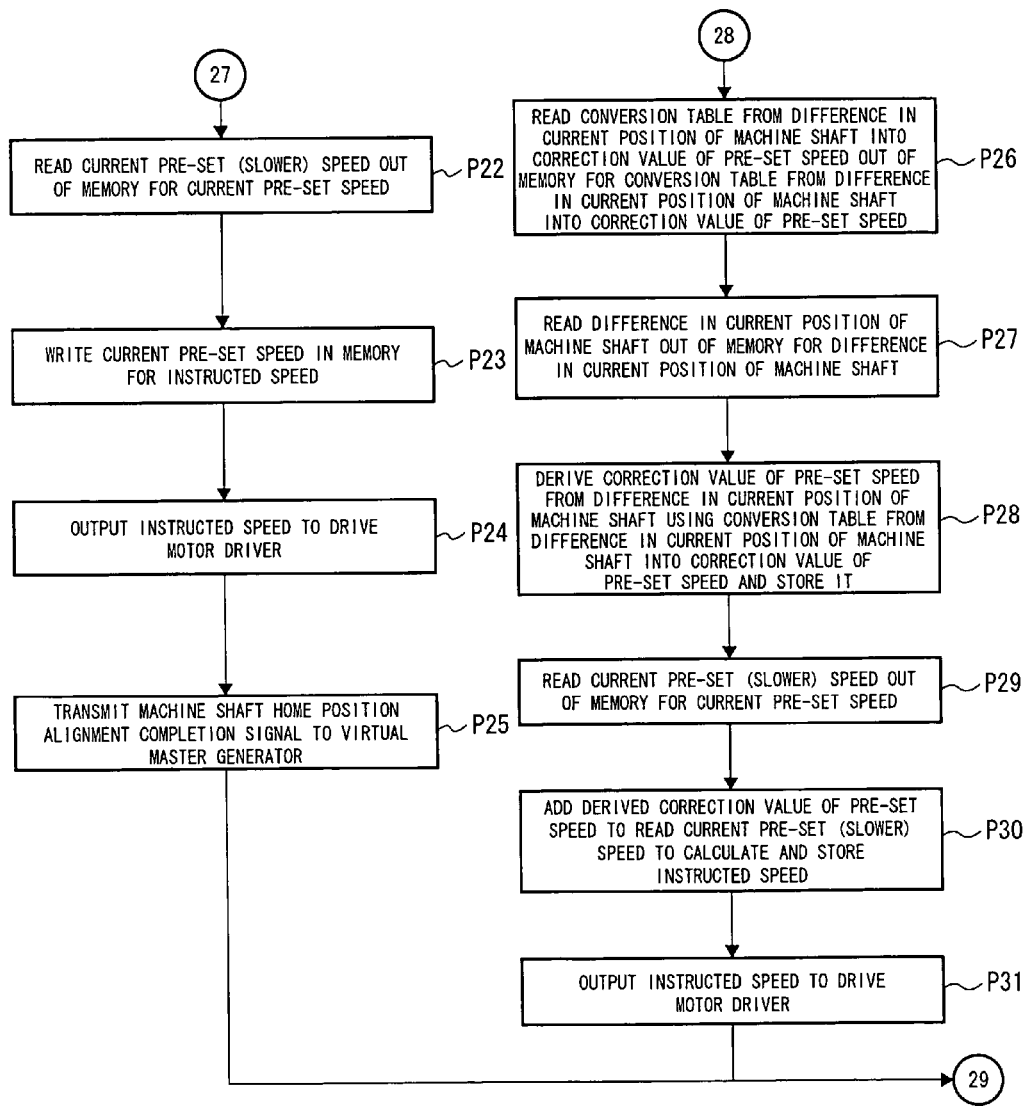
FIG. 26C is another operational flowchart of the drive control device of each of the units in the printing press.
Figure 27:
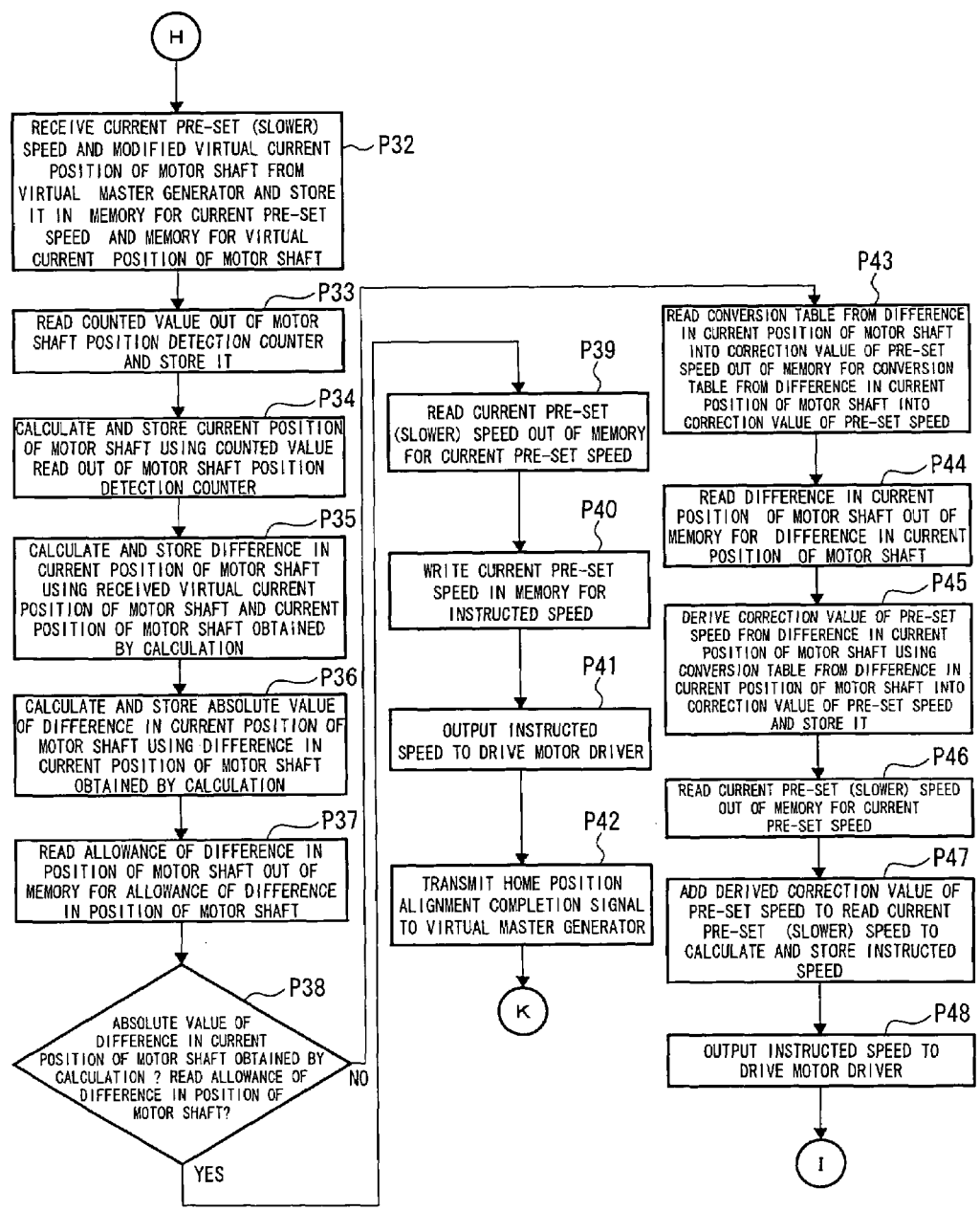
FIG. 27 is another operational flowchart of the drive control device of each of the units in the printing press.
Figure 28A:
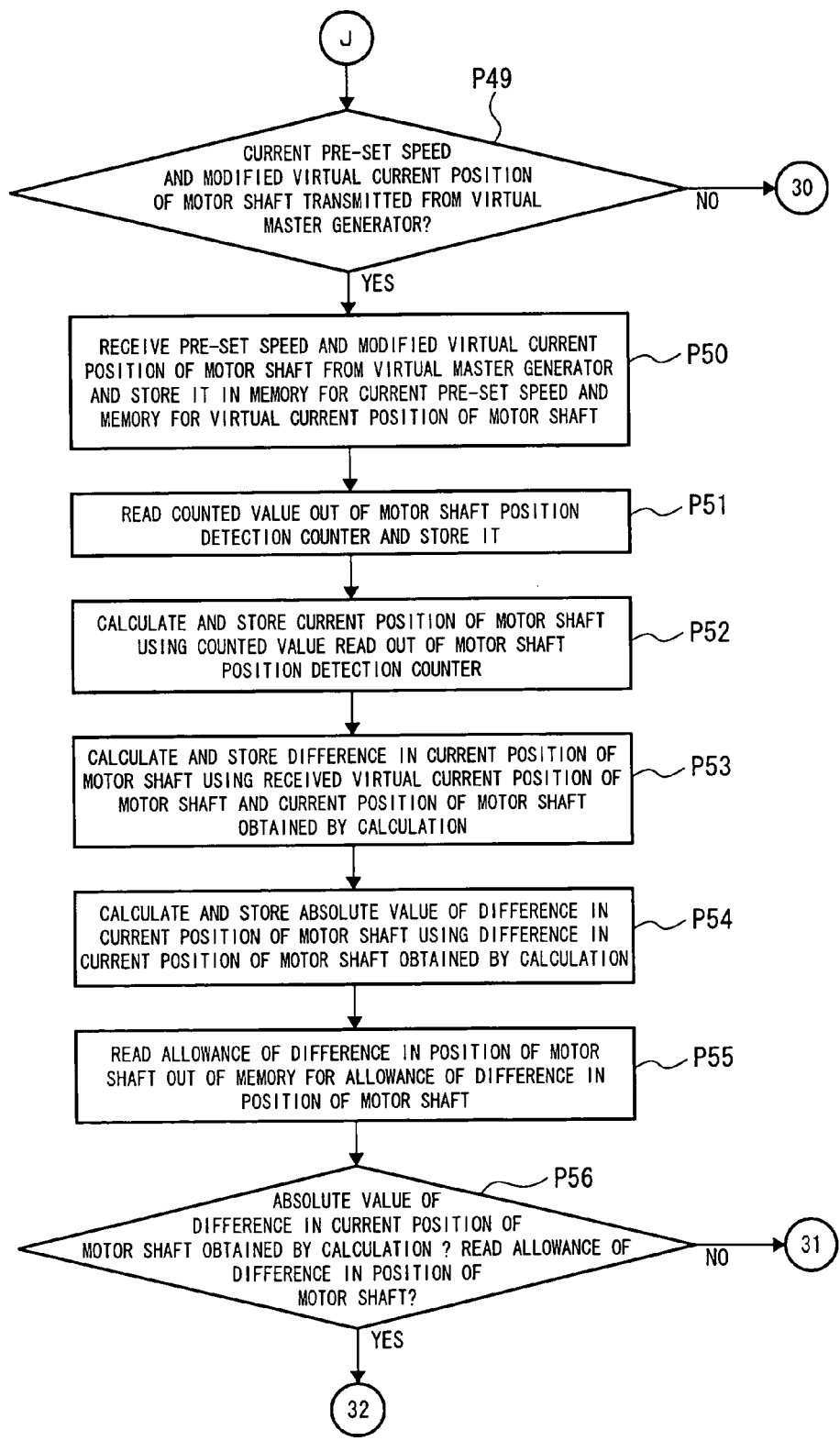
FIG. 28A is another operational flowchart of the drive control device of each of the units in the printing press.
Figure 28B:
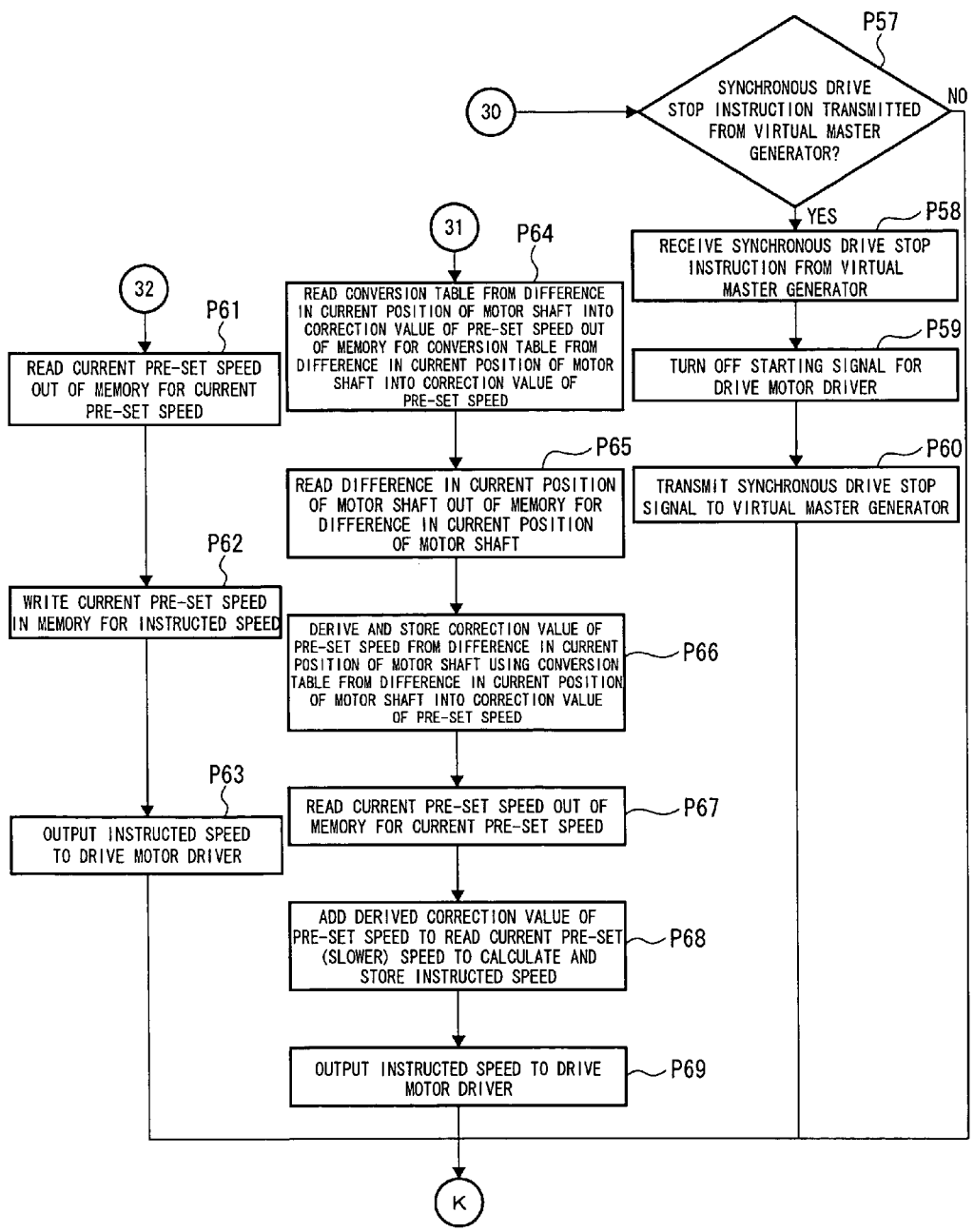
FIG. 28B is another operational flowchart of the drive control device of each of the units in the printing press.

FIG. 15 is a schematic configuration diagram of a device for synchronously controlling multiple units in a printing press showing a second embodiment of the present invention. FIG. 16 is a block diagram of a central control unit. FIG. 17 is a block diagram of a virtual master generator. FIG. 18 is a block diagram of a drive control device of each of the units in the printing press. FIG. 19A is an operational flowchart of the central control unit. FIG. 19B is another operational flowchart of the central control unit. FIG. 19C is another operational flowchart of the central control unit. FIG. 20 is another operational flowchart of the central control unit. FIG. 21 is another operational flowchart of the central control unit. FIG. 22A is an operational flowchart of the virtual master generator. FIG. 22B is another operational flowchart of the virtual master generator. FIG. 22C is another operational flowchart of the virtual master generator. FIG. 23A is another operational flowchart of the virtual master generator. FIG. 23B is another operational flowchart of the virtual master generator. FIG. 24A is another operational flowchart of the virtual master generator. FIG. 24B is another operational flowchart of the virtual master generator. FIG. 25 is another operational flowchart of the virtual master generator. FIG. 26A is an operational flowchart of the drive control device of each of the units in the printing press. FIG. 26B is another operational flowchart of the drive control device of each of the units in the printing press. FIG. 26C is another operational flowchart of the drive control device of each of the units in the printing press. FIG. 27 is another operational flowchart of the drive control device of each of the units in the printing press. FIG. 28A is another operational flowchart of the drive control device of each of the units in the printing press. FIG. 28B is another operational flowchart of the drive control device of each of the units in the printing press.

As shown in FIG. 15, in a printing press made of a web-fed rotary printing press, a web W which is continuously supplied from a feeder 1 and an infeed unit 2 is firstly subjected to a variety of printing when the web W passes through first to fourth (printing) units 3 to 6. Subsequently, the web W is heated and dried when the web W passes through a drier 7, and is then cooled down when the web W passes through a cooling unit 8. Thereafter, the web W is subjected to tension control or a direction change when the web W passes through a drag unit 9, and is then cut into predetermined forms and folded by a folding machine 10.

The first to fourth units 3 to 6 and the folding machine 10 are independently driven by drive motors 26a to 26e. Drive motor brakes (braking means) 27a to 27e such as electromagnetic brakes for braking rotation of the drive motors 26a to 26e, and rotary encoders (speed detecting means) 29a to 29e for detecting rotation speeds of the drive motors 26a to 26e are attached to these drive motors 26a to 26e. Moreover, the drive motors 26a to 26e are subjected to drive control respectively by drive control devices 21 to 25. Detection signals of the rotary encoders 29a to 29e are inputted to these drive control devices 21 to 25, and detection signals from machine home position detectors 28a to 28e attached to machine shafts (not shown) of the respective units 3 to 6 and of the folding machine 10 are also inputted thereto.

Moreover, the drive control devices 21 to 25 are connected to a central control unit 12 through a virtual master generator 13, and the respective units 3 to 6 (and the folding machine 10) of the printing press are synchronously controlled (driven) by this central control unit 12.

As shown in FIG. 16, the central control unit 12 includes a CPU 40, a ROM 41, a RAM 42, a memory 43 for a slower speed of the printing press, a memory 44 for a pre-set speed, a memory 45 for home position alignment preparation time, a memory 46 for a time interval to transmit the pre-set speed to the virtual master generator, a memory 47A for speeds of units in the printing press for activating the brakes of the drive motors of the units in the printing press, a memory 48A for current speeds of the respective units in the printing press, a memory 49A for a number of the unit in the printing press which has stopped synchronous drive, and an internal clock counter 50, which are connected to one another by a bus 56 together with respective input and output devices 51 to 54 and an interface 55.

An input device 57 such as a keyboard or various switches and buttons, a display 58 such as a CRT or a lamp, and an output device 59 such as a printer or a FD drive are connected to the input and output device 51. A speed setter 60 is connected to the input and output device 52. The drive motor brakes 27a to 27d of first to fourth units in the printing press are connected to the input and output device 53 respectively through drive motor brake circuits 61a to 61d of the first to fourth units in the printing press. The rotary encoders 29a to 29d for the drive motors of the first to fourth units in the printing press are connected to the input and output device 54 through A/D converters 63a to 63d and F/V converters 64a to 64d. Moreover, the virtual master generator 13 to be described later is connected to the interface 55.

As shown in FIG. 17, the virtual master generator 13 includes a CPU 70, a ROM 71, a RAM 72, a memory 73 for a current pre-set speed, a memory 74 for a previous pre-set speed, a memory 75 for virtual current positions of machine shafts, a memory 76A for correction values of current positions of the respective units in the printing press, a memory 77A for modified virtual current positions of machine shafts of the respective units in the printing press, a memory 78 for a time interval to transmit the pre-set speed to the virtual master generator, a memory 79 for a modification value of a virtual current position, a memory 80 for modified virtual current positions of machine shafts, a memory 81A for a number of a unit in the printing press whose machine shaft home position completion signal has been received, a memory 82 for virtual current positions of motor shafts, a memory 83 for modification values of the virtual current positions of the motor shafts, a memory 84 for modified virtual current positions of the motor shafts, a memory 85A for modified virtual current positions of the motor shafts of the respective units in the printing press, a memory 86A for a number of a unit in the printing press whose motor shaft home position completion signal has been received, a memory 87 for a speed modification value upon acceleration, a memory 88 for a speed modification value upon deceleration, and a memory 89A for a number of a unit in the printing press which has received a synchronous drive stop signal, which are connected to one another by a bus 91 together with an interface 90. Moreover, the above-described central control unit 12 and the drive control devices 21 to 24 of the first to fourth units in the printing press to be described later are connected to the interface 90.

As shown in FIG. 18, each of the drive control devices 21 to 24 of the respective units in the printing press includes a CPU 120, a ROM, 121, a RAM 122, a memory 123 for a current pre-set speed, a memory 124 for an instructed speed, a memory 125 for virtual current positions of machine shafts, a memory 126 for a counted value of a machine shaft position detection counter, a memory 127 for current positions of machine shafts, a memory 128 for a difference in the current position of the machine shaft, a memory 129 for an absolute value of the difference in the current position of the machine shaft, a memory 130 for an allowance of the difference in the position of the machine shaft, a memory 131 for a conversion table from the difference in the current position of the machine shaft into a correction value of the pre-set speed, a memory 132 for a correction value of the pre-set speed, a memory 133 for virtual current positions of motor shafts, a memory 134 for a counted value of a motor shaft position detection counter, a memory 135 for current positions of motor shafts, a memory 136 for a difference in the current position of the motor shaft, a memory 137 for an absolute value of the difference in the current position of the motor shaft, a memory 138 for an allowance of the difference in the position of the motor shaft, and a memory 139 for a conversion table from the difference in the current position of the motor shaft into the correction value of the pre-set speed, which are connected to one another by a bus 144 together with respective input and output devices 140 to 142 and an interface 143.

A drive motor driver 146A of the unit in the printing press is connected to the input and output device 140 through a D/A converter 145, and this drive motor driver 146A is connected to one of the drive motors 26a to 26d of the units in the printing press and to one of the rotary encoders 29a to 29d for the drive motors of the units in the printing press. One of the machine home position detectors 28a to 28d is connected to the input and output device 141 through a machine shaft position detection counter 147. One of the rotary encoders 29a to 29d for the drive motors of the units in the printing press is connected to the input and output device 142 through a motor shaft position detection counter 148. Moreover, the above-described virtual master generator 13 is connected to the interface 143.

Based on the above-described configuration, the central control unit 12 is firstly operated in accordance with operational flows shown in FIG. 19A, FIG. 19B, FIG. 19C, FIG. 20, and FIG. 21 in order to perform synchronous control of the first to fourth units 3 to 6 in the printing press.

Specifically, when a synchronous drive switch is turned on in Step P1 and a printing press drive switch is turned on in Step P2, an operation release signal is outputted to the drive motor brake circuits 61a to 61d of the respective units in the printing press in Step P3. Next, when a home position alignment preparation start instruction is transmitted to the virtual master generator 13 in Step P4, a slower speed is read out of the memory 43 for a slower speed in Step P5. Next, when the slower speed is written in the memory 44 for a pre-set speed in Step P6, the pre-set (slower) speed is transmitted to the virtual master generator 13 in Step P7. Next, when the internal clock counter (for counting elapsed time) 50 starts counting in Step P8, home position alignment preparation time is read out of the memory 45 for home position alignment preparation time in Step P9. Next, the counted value of the internal clock counter 50 is read out in Step P10, and when the counted value of the internal clock counter 50 becomes equal to or greater than the home position alignment preparation time in Step P11, a home position alignment preparation completion instruction is transmitted to the virtual master generator 13 in Step P12.

Next, after the home position alignment preparation start instruction is transmitted to the virtual master generator 13 in Step P13, when the slower speed is read out of the memory 43 for a slower speed in Step P14, the slower speed is written in the memory 44 for a pre-set speed in Step P15. Next, when the internal clock counter 50 starts counting in Step P16, a time interval to transmit the pre-set speed to the virtual master generator 13 is read out of the memory 46 for a time interval to transmit the pre-set speed to the virtual master generator in Step P17. Next, when the counted value of the internal clock counter 50 is read out in Step P18, a judgment is made in Step P19 as to whether or not the counted value of the internal clock counter 50 is equal to or greater than the time interval to transmit the pre-set speed to the virtual master generator 13. If the result is YES, the pre-set (slower) speed is read out of the memory 44 for a pre-set speed in Step P20, and then the pre-set (slower) speed is transmitted to the virtual master generator 13 in Step P21. Thereafter, the operation returns to Step P16.

In the result is NO in the above-described Step P19, a judgment is made in Step P22 as to whether or not a home position alignment completion signal is transmitted from the virtual master generator 13. If the result is YES, the home position alignment completion signal is received from the virtual master generator 13 in Step P23. Next, the time interval to transmit the pre-set speed to the virtual master generator 13 is read out of the memory 46 for a time interval to transmit the pre-set speed to the virtual master generator in Step P24. Next, the counted value of the internal clock counter 50 is read out in Step P25. When the counted value of the internal clock counter 50 becomes equal to or greater than the time interval to transmit the pre-set speed to the virtual master generator 13 in Step P26, the pre-set (slower) speed is read out of the memory 44 for a pre-set speed in Step P27, and then the pre-set (slower) speed is transmitted to the virtual master generator 13 in Step P28.

Next, when the internal clock counter 50 starts counting in Step P29, a judgment is made in Step P30 as to whether or not the pre-set speed has been inputted to the speed setter 60. If the result is YES, the pre-set speed is read out of the speed setter 60 and stored in Step P31, and then the time interval to transmit the pre-set speed to the virtual master generator 13 is read out of the memory 46 for a time interval to transmit the pre-set speed to the virtual master generator in Step P32. If the result is NO in the above-described Step P30, then the operation directly goes to the above-described Step P32. Next, when the counted value of the internal clock counter 50 is read out in Step P33, a judgment is made in Step P34 as to whether or not the counted value of the internal clock counter 50 is equal to or greater than the time interval to transmit the pre-set speed to the virtual master generator 13. If the result is YES, the pre-set speed is read out of the memory 44 for a pre-set speed in Step P35, and then the pre-set speed is transmitted to the virtual master generator 13 in Step P36. Thereafter, the operation returns to Step P29.

If the result is NO in the above-described Step P34, a judgment is made in Step P37 as to whether or not a stop signal for the printing press has been inputted. If the result is NO, then the operation returns to Step P30. On the other hand, if the result is YES, the time interval to transmit the pre-set speed to the virtual master generator 13 is read out of the memory 46 for a time interval to transmit the pre-set speed to the virtual master generator in Step P38. Next, the counted value of the internal clock counter 50 is read out in Step P39. When the counted value of the internal clock counter 50 becomes equal to or greater than the time interval to transmit the pre-set speed to the virtual master generator 13 in Step P40, the pre-set speed is read out of the memory 44 for a pre-set speed in Step P41. Thereafter, the pre-set speed is transmitted to the virtual master generator 13 in Step P42, and the operation goes to Step P49.

If the result is NO in the above-described Step P22, a judgment is made in Step P43 as to whether or not the stop signal for the printing press is inputted. If the result is NO, then the operation returns to Step P17. On the other hand, if the result is YES, the time interval to transmit the pre-set speed to the virtual master generator 13 is read out of the memory 46 for a time interval to transmit the pre-set speed to the virtual master generator in Step P44. Next, the counted value of the internal clock counter 50 is read out in Step P45. When the counted value of the internal clock counter 50 becomes equal to or greater than the time interval to transmit the pre-set speed to the virtual master generator 13 in Step P46, the pre-set (slower) speed is read out of the memory 44 for a pre-set speed in Step P47. Thereafter, the pre-set (slower) speed is transmitted to the virtual master generator 13 in Step P48, and the operation goes to Step P49.

Next, zero is written in the memory 44 for a pre-set speed in Step P49. When the internal clock counter 50 starts counting in Step P50, the time interval to transmit the pre-set speed to the virtual master generator 13 is read out of the memory 46 for a time interval to transmit the pre-set speed to the virtual master generator in Step P51. Next, the counted value of the internal clock counter 50 is read out in Step P52. When the counted value of the internal clock counter 50 becomes equal to or greater than the time interval to transmit the pre-set speed to the virtual master generator 13 in Step P53, the pre-set speed (zero) is read out of the memory 44 for a pre-set speed in Step P54.

Next, after the pre-set speed (zero) is transmitted to the virtual master generator 13 in Step P55, speeds of the units in the printing presses for activating the brakes of the drive motors of the units in the printing press are read out of the memory 47A for speeds of the units in the printing press for activating the brakes of the drive motors of the printing press in Step P56. Next, outputs of the F/V converters 64*a* to 64*d* connected to the rotary encoders 29*a* to 29*d* of the drive motors 26*a* to 26*d* of the respective units are read out in Step P57, and current speeds of the respective units in the printing press are calculated and stored in Step P58 by use of the outputs of the F/V converters 64*a* to 64*d* connected to the rotary encoders 29*a* to 29*d* of the drive motors 26*a* to 26*d* of the respective units in the printing press, which are read out as described above.

Next, a judgment is made in Step P59 as to whether or not all the current speeds of the units in the printing press obtained by the calculation are equal to or smaller than the speeds of the units in the printing press for activating the brakes of the drive motors of the units in the printing press. If the result is NO, the operation returns to Step P50. On the other hand, if the result is YES, a synchronous drive stop instruction is transmitted to the virtual master generator 13 in Step P60. Next, when the number of the unit in the printing press which has stopped synchronous drive is transmitted from the virtual master generator 13 in Step P61, the number of the unit in the printing press which has stopped synchronous drive is received from the virtual master generator 13 and stored in Step P62. Next, when an activation signal is outputted to the drive motor brake circuit of the unit in the printing press which has stopped synchronous drive in Step P63, a judgment is made in Step P64 as to whether or not all the units press stop synchronous drive. If the result is NO, the operation returns to Step P61. On the other hand, if the result is YES, the synchronous drive switch is turned off in Step P65 and the operation is terminated. Here, if the synchronous drive switch is not turned off in Step P65 and if the printing press drive switch is turned on in Step P66, the operation returns to Step P3.

Next, the virtual master generator 13 is operated in accordance with operational flows shown in FIG. 22A, FIG. 22B, FIG. 22C, FIG. 23A, FIG. 23B, FIG. 24A, FIG. 24B, and FIG. 25.

Specifically, a judgment is made in Step P1 as to whether or not the home position alignment preparation start instruction has been transmitted from the central control unit 12. If the result is NO, the operation goes to Step P63 to be described later. On the other hand, if the result is YES, the home position alignment preparation start instruction is received from the central control unit 12 in Step P2. Next, the home position alignment preparation start instruction is transmitted to the drive control devices 21 to 24 of the respective units in the printing press in Step P3. When the pre-set (slower) speed is transmitted from the central control unit 12 in Step P4, the pre-set (slower) speed is received from the central control unit 12 and stored in the memory 73 for a current pre-set speed in Step P5.

Next, the current pre-set (slower) speed is transmitted to the drive control devices 21 to 24 of the respective units in the printing press in Step P6. Thereafter, when the home position alignment preparation completion instruction is transmitted from the central control unit 12 in Step P7, the home position alignment preparation completion instruction is received from the central control unit 12 in Step P8. Next, the home position alignment preparation completion instruction is transmitted to the drive control devices 21 to 24 of the respective units in the printing press in Step P9. Thereafter, when the home position alignment start instruction is transmitted from the central control unit 12 in Step P10, the home position alignment start instruction is received from the central control unit 12 in Step P11. Next, when the home position alignment start instruction is transmitted to the drive control devices 21 to 24 of the respective units in the printing press in Step P12, a zero position is inputted to the memory 75 for virtual current positions of machine shafts in Step P13, and a zero position is inputted to the memory 82 for virtual current positions of motor shafts in Step P14.

Next, when the pre-set (slower) speed is transmitted from the central control unit 12 in Step P15, the pre-set (slower) speed is received from the central control unit 12 and stored in the memory 73 for a current pre-set speed and the memory 74 for a previous pre-set speed in Step P16. Next, the virtual current positions of the machine shafts are read out of the memory 75 for virtual current positions of machine shafts in Step P17. Thereafter, correction values of the current positions of the respective units in the printing press are read out of the memory 76A for correction values of current positions of the respective units in the printing press in Step P18. Next, the correction values of the current positions of the respective units in the printing press are added to the virtual current positions of the machine shafts thus read out, and modified virtual current positions of the machine shafts of the respective units in the printing press are calculated and stored in Step P19. Thereafter, the current pre-set (slower) speed and the modified virtual current positions of the machine shafts of the respective units in the printing press obtained by the calculation are transmitted to the drive control devices 21 to 24 of the respective units in the printing press in Step P20.

Next, a judgment is made in Step P21 as to whether or not the pre-set (slower) speed is transmitted from the central control unit 12. If the result is YES, the pre-set (slower) speed is received from the central control unit 12 and stored in the memory 73 for a current pre-set speed in Step P22. Next, the previous pre-set speed is read out of the memory 74 for a previous pre-set speed in Step P23. Thereafter, the time interval to transmit the pre-set speed from the central control unit 12 to the virtual master generator 13 is read out of the memory 78 for a time interval to transmit the pre-set speed to the virtual master generator in Step P24. Next, a modification value of a virtual current position is calculated by use of the previous pre-set speed thus read out and by use of the time interval to transmit the pre-set speed from the central control unit 12 to the virtual master generator 13 thus read out, and is stored in Step P25. Thereafter, the virtual current positions of the machine shafts are read out of the memory 75 for virtual current positions of machine shafts in Step P26.

Next, the modification value of the virtual current position obtained by the calculation is added to the virtual current positions of the machine shafts thus read out, and the modified virtual current positions of the machine shafts are calculated and stored in Step P27. Thereafter, virtual current positions of motor shafts are read out of the memory 82 for virtual current positions of motor shafts in Step P28. Next, the modification value of the virtual current position obtained by the calculation is added to the virtual current positions of the motor shafts thus read out, and modified virtual current positions of the motor shafts are calculated and stored in Step P29. Thereafter, the correction values of the current positions of the respective units in the printing press are read out of the memory 76A for correction values of current positions of the respective units in the printing press in Step P30. Next, the correction values of the current positions of the respective units in the printing press thus read out are added to the modified virtual current positions of the machine shafts obtained by the calculation, and modified virtual current positions of the machine shafts of the respective units in the printing press are calculated and stored in Step P31. Thereafter, the current pre-set (slower) speed and the modified virtual current positions of the machine shafts of the respective units in the printing press obtained by the calculation are transmitted to the drive control devices 21 to 24 of the respective units in the printing press in Step P32.

Next, the modified virtual current positions of the machine shafts are read out of the memory 80 for modified virtual current positions of machine shafts in Step P33. Thereafter, the modified virtual current positions of the machine shafts are written in the memory 75 for virtual current positions of machine shafts in Step P34. Next, the modified virtual current positions of the motor shafts are read out of the memory 84 for modified virtual current positions of motor shafts in Step P35. Then, the modified virtual current positions of the motor shafts are written in the memory 82 for virtual current positions of motor shafts in Step P36. Thereafter, the operation returns to the above-described Step P21.

On the other hand, if the result is NO in Step P21, home position alignment completion signals of the machine shafts are transmitted from the drive control devices 21 to 24 of the respective units in the printing press in Step P37, and the home position alignment completion signals of the machine shafts are received from the drive control devices 21 to 24 of the respective units in the printing press in Step P38. Next, a number of the unit in the printing press whose home position alignment completion signal of the machine shaft has been received is stored in Step P39, and then a judgment is made in Step P40 as to whether or not home position alignment is completed in terms of all the machine shafts of the respective units in the printing press.

If the result is NO in the above-described Step P40, the operation returns to the above-described Step P21. On the other hand, if the result is YES, the pre-set (slower) speed is transmitted from the central control unit 12 in Step P41, and the pre-set (slower) speed is received from the central control unit 12 and stored in the memory 73 for a current pre-set speed Step P42. Next, the previous pre-set speed is read out of the memory 74 for a previous pre-set speed in Step P43, and then the time interval to transmit the pre-set speed from the central control unit 12 to the virtual master generator 13 is read out of the memory 78 for a time interval to transmit the pre-set speed to the virtual master generator in Step P44. Next, the modification value of the virtual current position is calculated by use of the previous pre-set speed thus read out and by use of the time interval to transmit the pre-set speed from the central control unit 12 to the virtual master generator 13 thus read out, and stored in Step P45. Thereafter, the virtual current positions of the machine shafts are read out of the memory 75 for virtual current positions of machine shafts in Step P46.

Next, the modification value of the virtual current position obtained by the calculation is added to the virtual current positions of the machine shafts thus read out, and the modified virtual current positions of the machine shafts are thereby calculated and stored in Step P47. Thereafter, the virtual current positions of the motor shafts are read out of the memory 82 for virtual current positions of motor shafts in Step P48. Next, the modification value of the virtual current position obtained by the calculation is added to the virtual current positions of the motor shafts thus read out, and the modified virtual current positions of the motor shafts are thereby calculated and stored in Step P49. Thereafter, the correction values of the current positions of the respective units in the printing press are read out of the memory 76A for current positions of the respective units in the printing press in Step P50. Next, the correction values of the current positions of the respective units in the printing press thus read out are added to the modified virtual current positions of the motor shafts obtained by the calculation, and the modified virtual current positions of the motor shafts are thereby calculated and stored in Step P51. Thereafter, the current pre-set (slower) speed and the modified virtual current positions of the motor shafts of the respective units in the printing press are transmitted to the drive control devices 21 to 24 of the respective units in the printing press in Step P52.

Next, the modified virtual current positions of the machine shafts are read out of the memory 80 for modified virtual current positions of machine shafts in Step P53. Thereafter, the modified virtual current positions of the machine shafts are written in the memory 75 for virtual current positions of machine shafts in Step P54. Next, the modified virtual current positions of the motor shafts are read out of the memory 84 for modified virtual current positions of motor shafts in Step P55. Thereafter, the modified virtual current positions of the motor shafts are written in the memory 82 for virtual current positions of motor shafts in Step P56. Next, a judgment is made in Step P57 as to whether or not the pre-set (slower) speed is received from the central control unit 12. If the result is YES, the operation returns to Step P42. On the other hand, if the result is NO, home position alignment completion signals of the motor shafts are transmitted from the drive control devices 21 to 24 of the respective units in the printing press in Step P58, and the home position alignment completion signals of the motor shafts are received from the drive control devices 21 to 24 of the respective units in the printing press in Step P59.

Next, a number of the unit in the printing press whose home position alignment completion signal of the motor shaft has been received is stored in Step P60, and then a judgment is made in Step P61 as to whether or not home position alignment of the motor shaft is completed in terms of all the units in the printing presses. If the result is NO, the operation returns to Step P57. On the other hand, if the result is YES, the home position alignment completion signal is transmitted to the central control unit 12 in Step P62, and then the operation returns to Step P1.

On the other hand, if the result is NO in the above-described Step P1, a judgment is made in Step P63 as to whether or not the pre-set speed has been transmitted from the central control unit 12. Here, if the result is YES, the pre-set speed is received from the central control unit 12 and stored in the memory 73 for a current pre-set speed in Step P64. Next, the previous pre-set speed is read out of the memory 74 for a previous pre-set speed in Step P65. Thereafter, a judgment is made in Step P66 as to whether or not the pre-set speed received from the central control unit 12 is equal to the previous pre-set speed.

If the result is YES in the above-described Step P66, the time interval to transmit the pre-set speed from the central control unit 12 to the virtual master generator 13 is read out of the memory 78 for a time interval to transmit the pre-set speed to the virtual master generator in Step P67. On the other hand, if the result is NO, a judgment is made in Step P68 as to whether or not the pre-set speed received from the central control unit 12 is greater than the previous pre-set speed.

If the result is YES in the above-described Step P68, a speed modification value upon acceleration is read out of the memory 87 for a speed modification value upon acceleration in Step P69. Thereafter, the speed modification value upon acceleration thus read out is added to the previous pre-set speed and a modified current pre-set speed is thereby calculated in Step P70. Next, the modified current pre-set speed obtained by the calculation is stored in the memory 73 for a current pre-set speed in Step P71, and the operations goes to Step P67. On the other hand, if the result is NO in the above-described Step P68, a speed modification value upon deceleration is read out of the memory 88 for a speed modification value upon deceleration in Step P72. Thereafter, the speed modification value upon deceleration thus read out is subtracted from the previous pre-set speed and the modified current pre-set speed is thereby calculated in Step P73. Next, a judgment is made in Step P74 as to whether or not the modified current pre-set speed is smaller than 0. If the result is YES, the modified current pre-set speed is rewritten into zero in Step P75, and then the operation goes to the above-described Step P71. On the other hand, if the result is NO, the operation directly goes to Step P71.

Next, the modification value of the virtual current position is calculated by use of the previous pre-set speed thus read out and by use of the time interval to transmit the pre-set speed from the central control unit 12 to the virtual master generator 13 thus read out, and is stored in Step P76. Thereafter, the virtual current positions of the machine shafts are read out of the memory 75 for virtual current positions of machine shafts in Step P77. Next, the modification value of the virtual current position obtained by the calculation is added to the virtual current positions of the machine shafts thus read out, and the modified virtual current positions of the machine shafts are calculated and stored in Step P78. Thereafter, the virtual current positions of motor shafts are read out of the memory 82 for virtual current positions of motor shafts in Step P79. Next, the modification value of the virtual current position obtained by the calculation is added to the virtual current positions of the motor shafts thus read out, and modified virtual current positions of the motor shafts are calculated and stored in Step P80. Thereafter, the correction values of the current positions of the respective units in the printing press are read out of the memory 76A for correction values of current positions of the respective units in the printing press in Step P81.

Next, the correction values of the current positions of the respective units in the printing press thus read out are added to the modified virtual current positions of the motor shafts obtained by the calculation, and the modified virtual current positions of the motor shafts of the respective units in the printing press are thus calculated and stored in Step P82. Thereafter, the current pre-set speed and the modified virtual current positions of the motor shafts of the respective units in the printing press obtained by the calculation are transmitted to the drive control devices 21 to 24 of the respective units in the printing press in Step P83. Next, the current pre-set speed is stored in the memory 74 for a previous pre-set speed in Step P84. Thereafter, the modified virtual current positions of the machine shafts are read out of the memory 80 for modified virtual current positions of machine shafts in Step P85. Next, the modified virtual current positions of the machine shafts are written in the memory 75 for virtual current positions of machine shafts in Step P86. Then, the modified virtual current positions of the motor shafts are read out of the memory 84 for modified virtual current positions of motor shafts in Step P87. Thereafter, the modified virtual current positions of the motor shafts are written in the memory 82 for virtual current positions of motor shafts in Step P88. Then, the operation returns to Step P1.

On the other hand, if the result is NO in the above-described Step P63, a judgment is made in Step P89 as to whether or not the synchronous drive stop instruction has been transmitted from the central control unit 12. Here, if the result is NO, the operation returns to Step P1. On the other hand, if the result is YES, the synchronous drive stop instruction is received from the central control unit 12 in Step P90, and the synchronous drive stop instruction is transmitted to the drive control devices 21 to 24 of the respective units in the printing press in Step P91. Next, when the synchronous drive stop signals are transmitted from the drive control devices 21 to 24 of the respective units in the printing press in Step P92, the synchronous drive stop signals are received from the drive control devices 21 to 24 of the respective units in the printing press in Step P93. Next, a number of the unit in the printing press which has received the synchronous drive stop signal is stored in Step P94, and then the number of the unit in the printing press which has received the synchronous drive stop signal is transmitted to the central control unit 12 in Step P95. Thereafter, a judgment is made in Step P96 as to whether or not the synchronous drive stop signals has been received from the drive control devices 21 to 24 of all the units in the printing press. If the result is YES, the operation returns to Step P1. On the other hand, if the result is NO, the operation returns to Step P92.

Next, each of the drive control devices 21 to 24 of the respective units in the printing press is operated in accordance with an operational flow shown in FIG. 26A, FIG. 26B, FIG. 26C, FIG. 27, FIG. 28A, and FIG. 28B.

Specifically, a judgment is made in Step P1 as to whether or not the home position alignment preparation start instruction has been transmitted from the virtual master generator 13. If the result is NO, the operation goes to Step P49 to be described later. On the other hand, if the result is YES, the home position alignment preparation start instruction is received from the virtual master generator 13 in Step P2. Next, a starting signal for the drive motor driver 146A is turned on in Step P3. When the current pre-set (slower) speed is transmitted from the virtual master generator 13 in Step P4, the current pre-set (slower) speed is received from the central control unit 12 and stored in Step P5. Next, the current pre-set (slower) speed is read out of the memory 123 for a current pre-set speed in Step P6, and then the current pre-set (slower) speed is written in the memory 124 for an instructed speed in Step P7.

Next, an instructed speed is outputted to the drive motor driver 146A in Step P8. Thereafter, when the home position alignment preparation completion instruction is transmitted from the virtual master generator 13 in Step P9, the home position alignment preparation completion instruction is received from the virtual master generator 13 in Step P10. Next, when the home position alignment start instruction is transmitted from the virtual master generator 13 in Step P11, the home position alignment start instruction is received from the virtual master generator 13 in Step P12. Next, a judgment is made in Step P13 as to whether or not the current pre-set (slower) speed and the modified virtual current position of the machine shaft has been transmitted from the virtual master generator 13. If the result is NO, the current pre-set (slower) speed and the modified virtual current position of the machine shaft are transmitted from the virtual master generator 13 in Step P14, and the operation goes to Step P32 to be described later.

If the result is YES in the above-described Step P13, the current pre-set (slower) speed and the modified virtual current position of the machine shaft are received from the virtual master generator 13 and stored in the memory 123 for a current pre-set speed and the memory 125 for virtual current positions of machine shafts in Step P15. Thereafter, a counted value is read out of the machine shaft position detection counter 147 and stored in Step P16. Next, the current position of the machine shaft is calculated by use of the counted value of the machine shaft position detection counter 147 thus read out, and is stored in Step P17. Thereafter, a difference in the current position of the machine shaft is calculated by use of the received virtual current position of the machine shaft and the current position of the machine shaft obtained by the calculation, and is stored in Step P18. Next, an absolute value of the difference in the current position of the machine shaft is calculated by use of the difference in the current position of the machine shaft obtained by the calculation, and is stored in Step P19. Thereafter, an allowance of the difference in the position of the machine shaft is read out of the memory 130 for an allowance of the difference in the position of the machine shaft in Step P20.

Next, a judgment is made in Step P21 as to whether or not the absolute value of the difference in the current position of the machine shaft obtained by the calculation is equal to or smaller than the allowance of the position of the machine shaft thus read out. If the result is YES, the current pre-set (slower) speed is read out of the memory 123 for a current pre-set speed in Step P22. Next, the current pre-set (slower) speed is written in the memory 124 for an instructed speed in Step P23, and then the instructed speed is outputted to the drive motor driver 146A in Step P24. Thereafter, the home position alignment completion signal of the machine shaft is transmitted to the virtual master generator 13 in Step P25, and the operation returns to Step P13.

On the other hand, if the result is NO in the above-described Step P21, a conversion table from the difference in the current position of the machine shaft into a correction value of the pre-set speed is read out of the memory 131 for a conversion table from the difference in the current position of the machine shaft into a correction value of the pre-set speed in Step P26. Thereafter, a difference in the current position of the machine shaft is read out of the memory 128 for a difference in the position of the machine shaft in Step P27. Next, the correction value of the pre-set speed is derived from the difference in the current position of the machine shaft by use of the conversion table from the difference in the current position of the machine shaft into a correction value of the pre-set speed, and is stored in Step P28. Next, the current pre-set (slower) speed is read out of the memory 123 for a current pre-set speed in Step P29. Then, the derived correction value of the pre-set speed is added to the current pre-set (slower) speed thus read out, and the instructed speed is thereby calculated and stored in Step P30. Thereafter, the instructed speed is outputted to the drive motor driver 146A in Step P31, and the operation returns to the above-described Step P13.

The current pre-set (slower) speed and the modified virtual current position of the motor shaft are received from the virtual master generator 13 and stored in the memory 123 for a current pre-set speed and the memory 133 for virtual current positions of motor shafts in the above-mentioned Step P32. Thereafter, a counted value is read out of the motor shaft position detection counter 148 and is stored in Step P33. Next, the current position of the motor shaft is calculated by use of the counted value of the motor shaft position detection counter 148 thus read out, and is stored in Step P34. Thereafter, a difference in the current position of the motor shaft is calculated by use of the received virtual current position of the motor shaft and the current position of the motor shaft obtained by the calculation, and is stored in Step P35. Next, an absolute value of the difference in the current position of the motor shaft is calculated by use of the difference in the current position of the motor shaft obtained by the calculation, and is stored in Step P36. Thereafter, an allowance of the difference in the position of the motor shaft is read out of the memory 138 for an allowance of the difference in the position of the motor shaft in Step P37.

Next, a judgment is made in Step P38 as to whether or not the absolute value of the difference in the current position of the motor shaft obtained by the calculation is equal to or smaller than the allowance of the position of the motor shaft thus read out. If the result is YES, the current pre-set (slower) speed is read out of the memory 123 for a current pre-set speed in Step P39. Next, the current pre-set (slower) speed is written in the memory 124 for an instructed speed in Step P40, and then the instructed speed is outputted to the drive motor driver 146A in Step P41. Thereafter, the home position alignment completion signal of the motor shaft is transmitted to the virtual master generator 13 in Step P42, and the operation returns to Step P1.

On the other hand, if the result is NO in the above-described Step P38, a conversion table from the difference in the current position of the motor shaft into a correction value of the pre-set speed is read out of the memory 139 for a conversion table from the difference in the current position of the motor shaft into a correction value of the pre-set speed in Step P43. Thereafter, a difference in the current position of the motor shaft is read out of the memory 136 for a difference in the position of the motor shaft in Step P44. Next, the correction value of the pre-set speed is derived from the difference in the current position of the motor shaft by use of the conversion table from the difference in the current position of the motor shaft into a correction value of the pre-set speed, and is stored in Step P45. Thereafter, the current pre-set (slower) speed is read out of the memory 123 for a current pre-set speed in Step P46. Next, the derived correction value of the pre-set speed is added to the current pre-set (slower) speed thus read out, and the instructed speed is thereby calculated and stored in Step P47. Thereafter, the instructed speed is outputted to the drive motor driver 146A in Step P48, and the operation returns to the above-described Step P13.

A judgment is made in the above-mentioned Step P49 as to whether or not the current pre-set speed and the modified virtual current position of the motor shaft have been transmitted from the virtual master generator 13. If the result is YES, the current pre-set speed and the modified virtual current position of the motor shaft are received from the virtual master generator 13 and stored in the memory 123 for a current pre-set speed and the memory 133 for virtual current positions of motor shafts in Step P50. Next, the counted value is read out of the motor shaft position detection counter 148 and is stored in Step P51. Thereafter, the current position of the motor shaft is calculated by use of the counted value of the motor shaft position detection counter 148 thus read out, and is stored in Step P52. Next, the difference in the current position of the motor shaft is calculated by use of the received virtual current position of the motor shaft and the current position of the motor shaft obtained by the calculation, and is stored in Step P53. Thereafter, the absolute value of the difference in the current position of the motor shaft is calculated by use of the difference in the current position of the motor shaft obtained by the calculation, and is stored in Step P54.

Next, the allowance of the difference in the position of the motor shaft is read out of the memory 138 for an allowance of the difference in the position of the motor shaft in Step P55. Thereafter, a judgment is made in Step P56 as to whether or not the absolute value of the difference in the current position of the motor shaft obtained by the calculation is equal to or smaller than the allowance of the position of the motor shaft thus read out. Here, if the result is YES, the current pre-set speed is read out of the memory 123 for a current pre-set speed in Step P61. Thereafter, the current pre-set speed is written in the memory 124 for an instructed speed in Step P62. Next, the instructed speed is outputted to the drive motor driver 146A in Step P63, and the operation returns to Step P1. On the other hand, if the result is NO, the conversion table from the difference in the current position of the motor shaft into a correction value of the pre-set speed is read out of the memory 139 for a conversion table from the difference in the current position of the motor shaft into a correction value of the pre-set speed in Step P64. Thereafter, the difference in the current position of the motor shaft is read out of the memory 136 for a difference in the position of the motor shaft in Step P65. Next, the correction value of the pre-set speed is derived from the difference in the current position of the motor shaft by use of the conversion table from the difference in the current position of the motor shaft into a correction value of the pre-set speed, and is stored in Step P66. Thereafter, the current pre-set speed is read out of the memory 123 for a current pre-set speed in Step P67. Then, the derived correction value of the pre-set speed is added to the current pre-set speed thus read out, and the instructed speed is thereby calculated and stored in Step P68. Thereafter, the instructed speed is outputted to the drive motor driver 146A in Step P69, and the operation returns to Step P1.

If the result is NO in the above-described Step P49, a judgment is made in Step P57 as to whether or not the synchronous drive stop instruction have been transmitted from the virtual master generator 13. Here, if the result is NO, the operation directly returns to Step P1. On the other hand, if the result is YES, the synchronous drive stop instruction is received from the virtual master generator 13 in Step P58. Then, the starting signal for the drive motor driver 146A is turned off in Step P59. Thereafter, an off signal of the starting signal for the drive motor driver is transmitted to the virtual master generator 13 in Step P60, and the operation returns to Step P1.

In this way, according to this embodiment, when the printing press is in shutdown, phase deviation among the respective units 3 to 6 is prevented and the synchronous condition is retained by stopping the synchronous control by the drive motors 26a to 26d and by starting the drive motor brakes 27a to 27d attached to the drive motors 26a to 26d instead.

In this case, according to this embodiment, when the speeds of the respective units 3 to 6 are detected by the rotary encoders 29a to 29d and the speeds are reduced to a predetermined speed (such as 8 rpm) by the stop instruction, the phase of the virtual master generator 13 is stopped in the relevant position and the synchronous control of the respective units 3 to 6 is released. Simultaneously, the drive motor brakes 27a to 27d of the drive motors 26a to 26d of the respective units 3 to 6 are started. Accordingly, rotation of the respective units 3 to 6 in the printing press is stopped by the drive motor brakes 27a to 27d when the printing press is in shutdown.

In this way, it is not necessary to supply currents to the drive motors 26a to 26d and to the drive motor driver 146A when the printing press is in shutdown. Therefore, it is possible to reduce power consumption and to improve durability of motors and motor bearings. Although this embodiment has been described on the synchronous control among the respective units 3 to 6 of the printing press, it is needless to say that the present invention is also applicable to synchronous control between each of the units 3 to 6 in the printing press and the folding machine 10.

Third Embodiment

Figure 29:
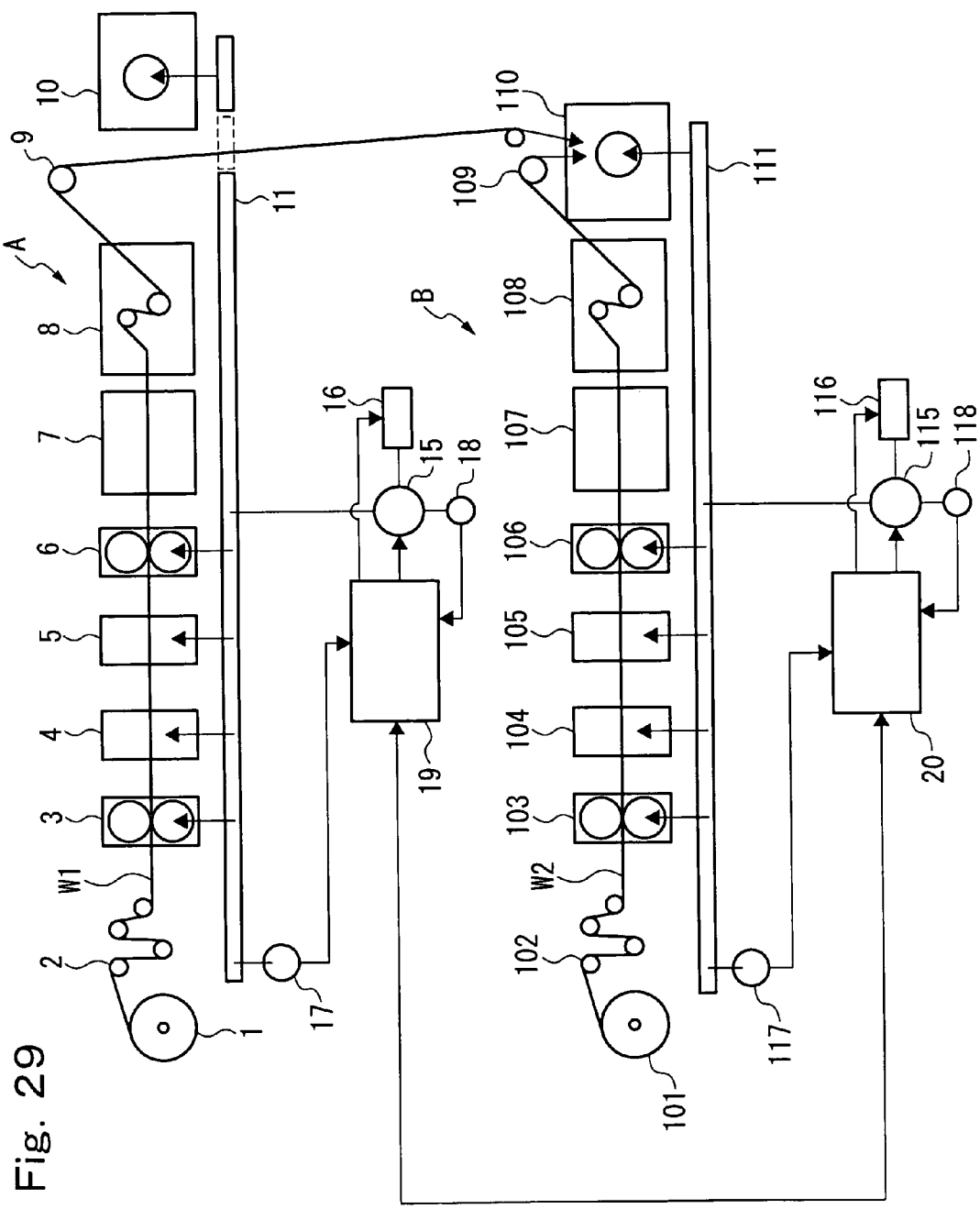
FIG. 29 is a schematic configuration diagram of a device for synchronously controlling multiple printing presses, showing a third embodiment of the present invention.
Figure 30:
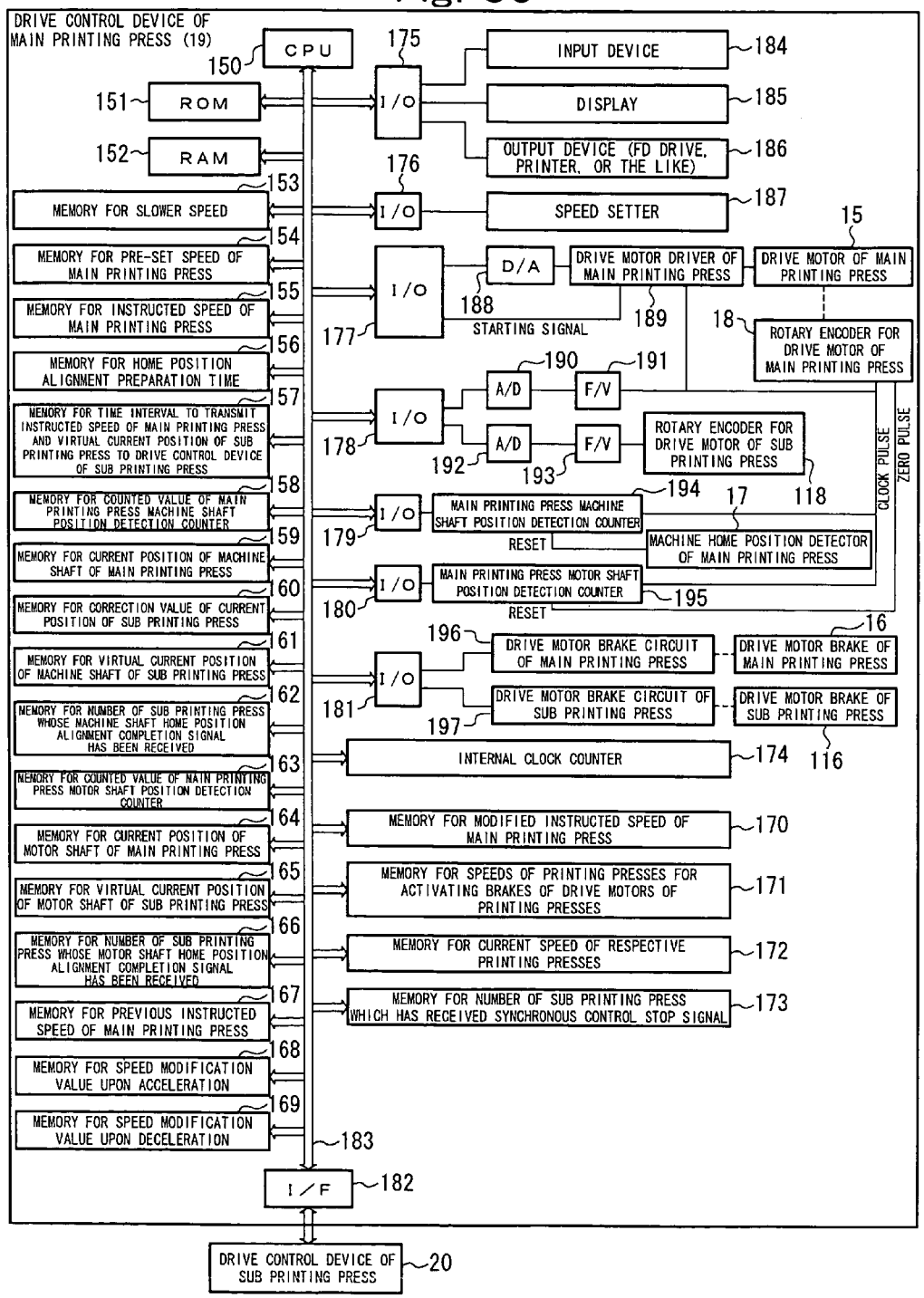
FIG. 30 is a block diagram of a drive control device for a main printing press.
Figure 31:
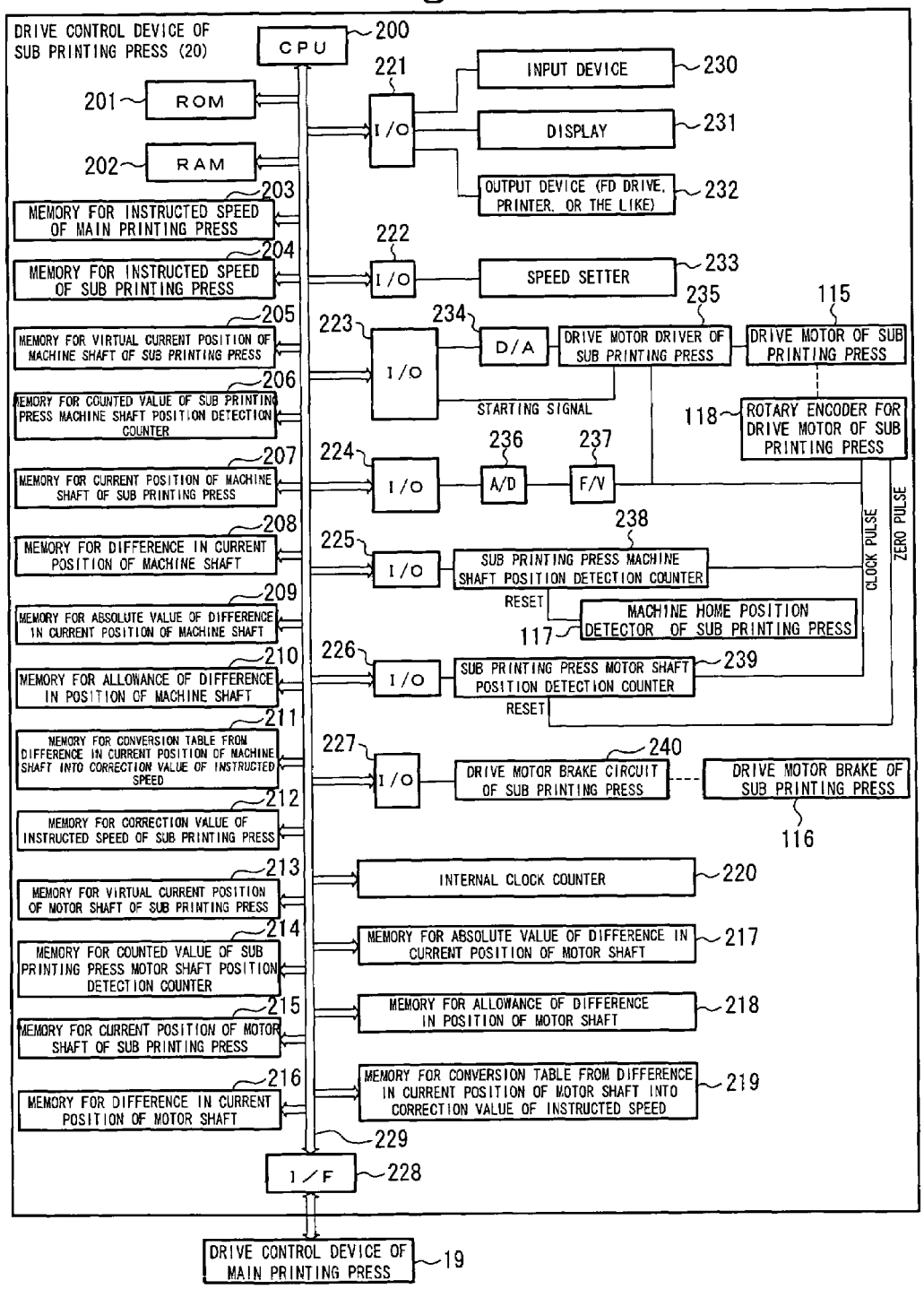
FIG. 31 is a block diagram of a drive control device for a sub printing press.
Figure 32A:
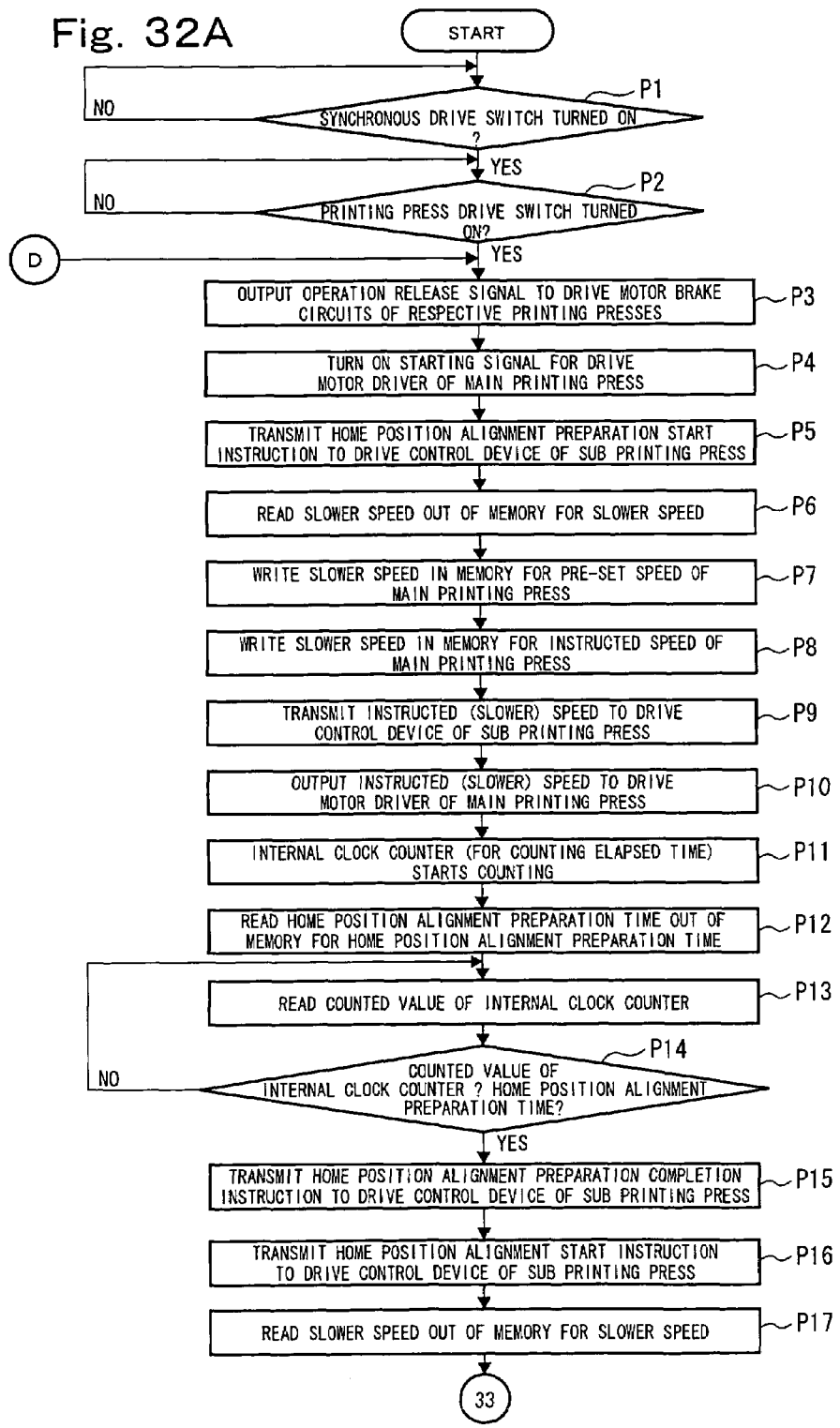
FIG. 32A is an operational flowchart of the drive control device for the main printing press.
Figure 32B:
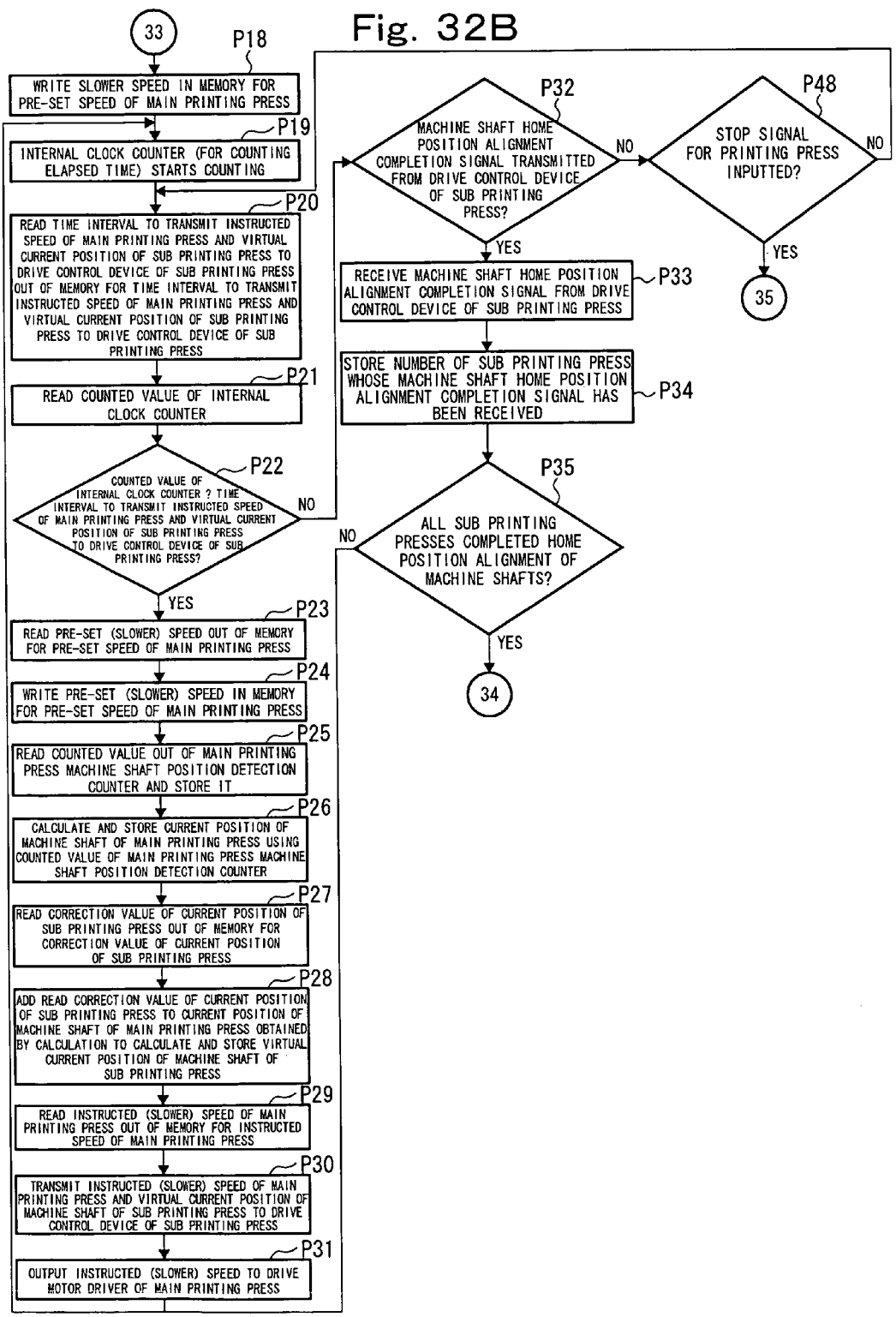
FIG. 32B is another operational flowchart of the drive control device for the main printing press.
Figure 32C:
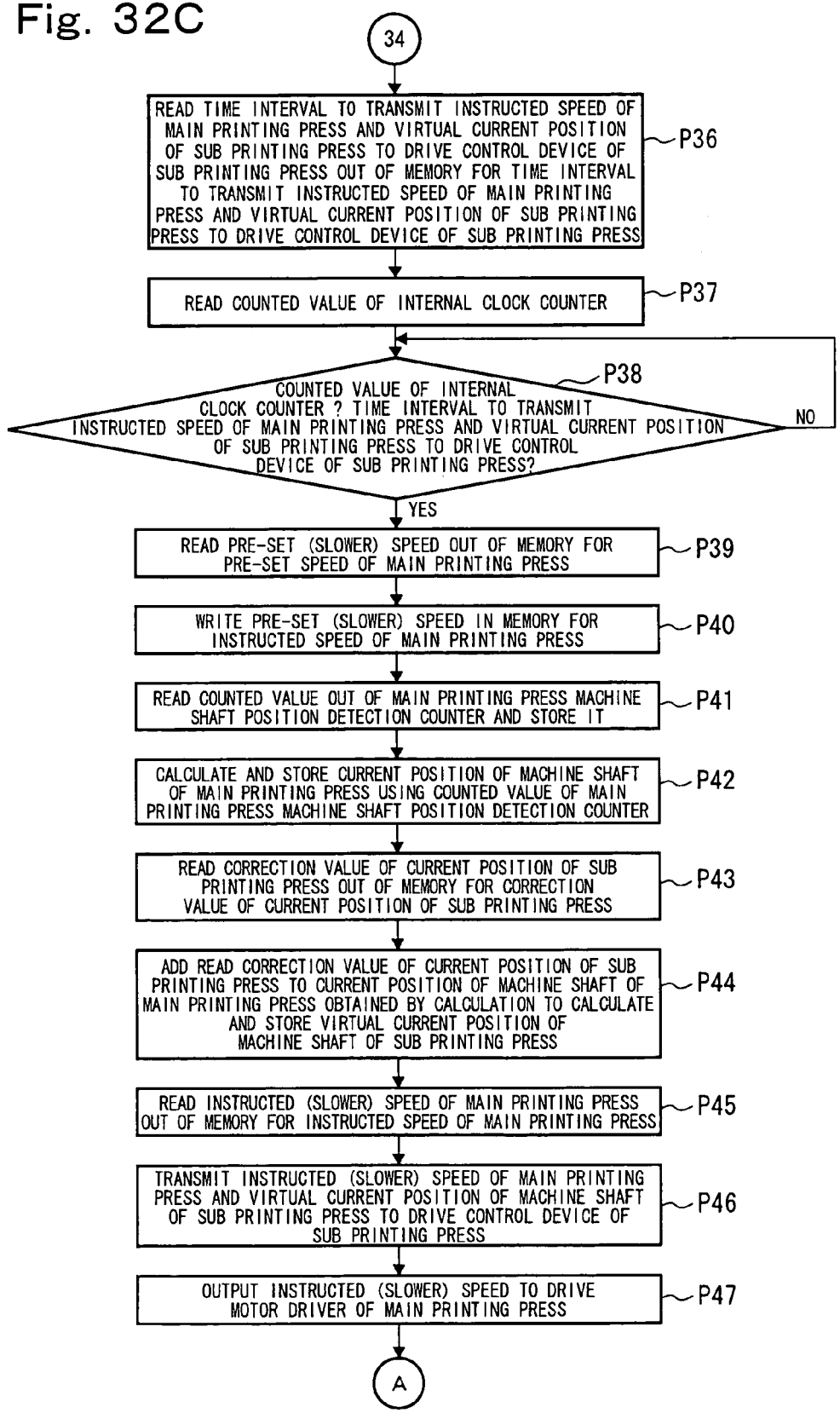
FIG. 32C is another operational flowchart of the drive control device for the main printing press.
Figure 32D:
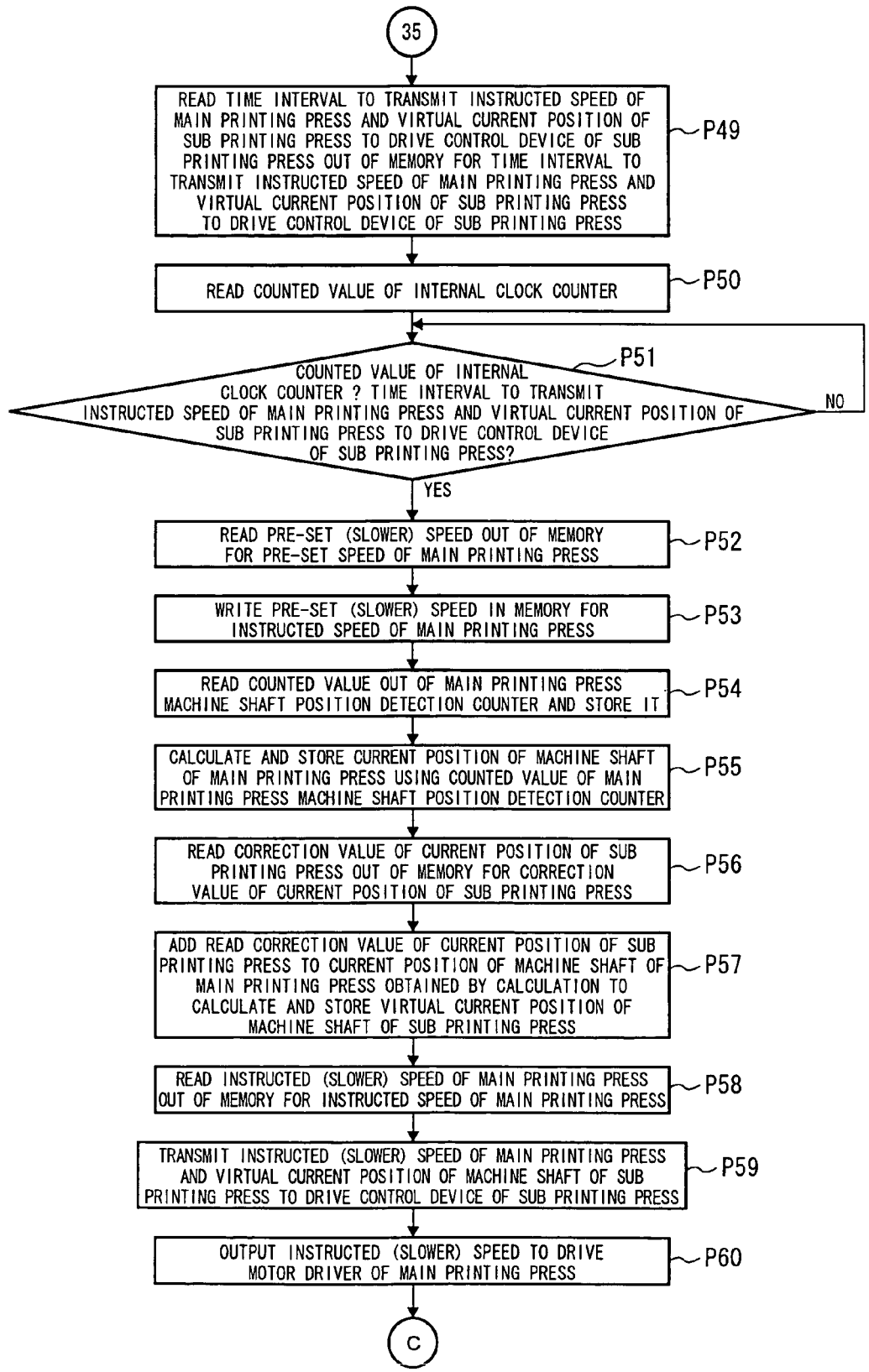
FIG. 32D is another operational flowchart of the drive control device for the main printing press.
Figure 33A:
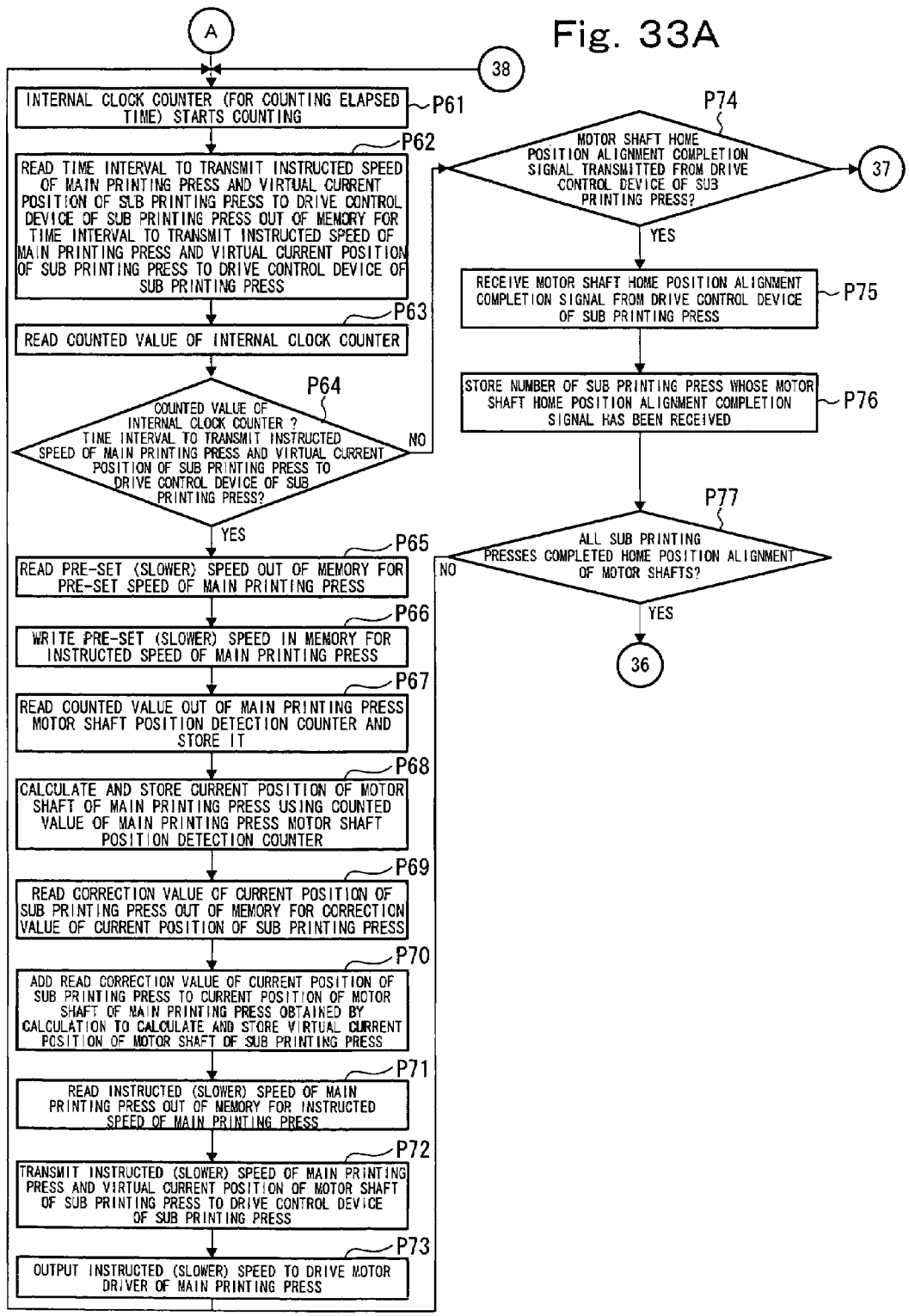
FIG. 33A is another operational flowchart of the drive control device for the main printing press.
Figure 33B:
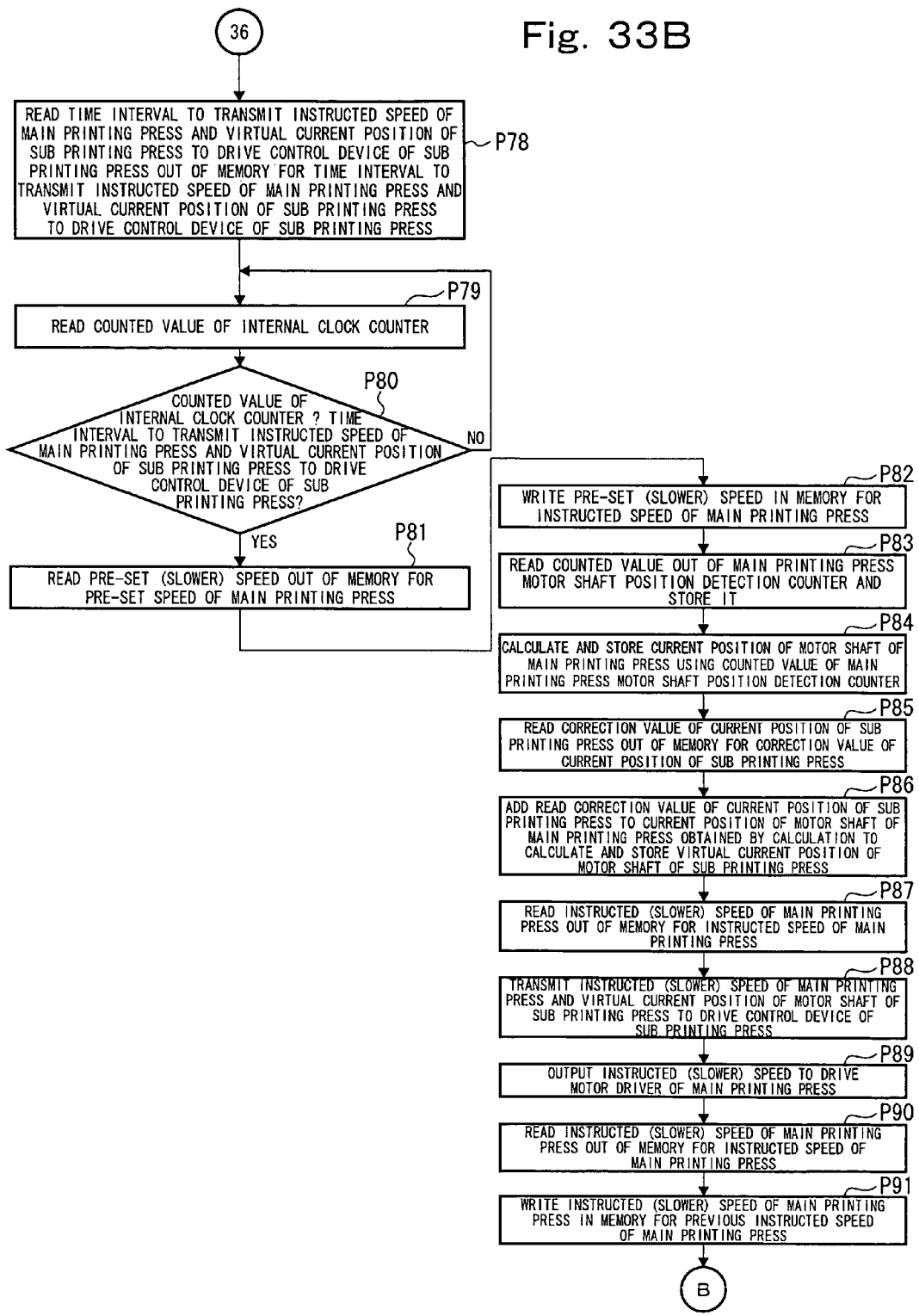
FIG. 33B is another operational flowchart of the drive control device for the main printing press.
Figure 34A:
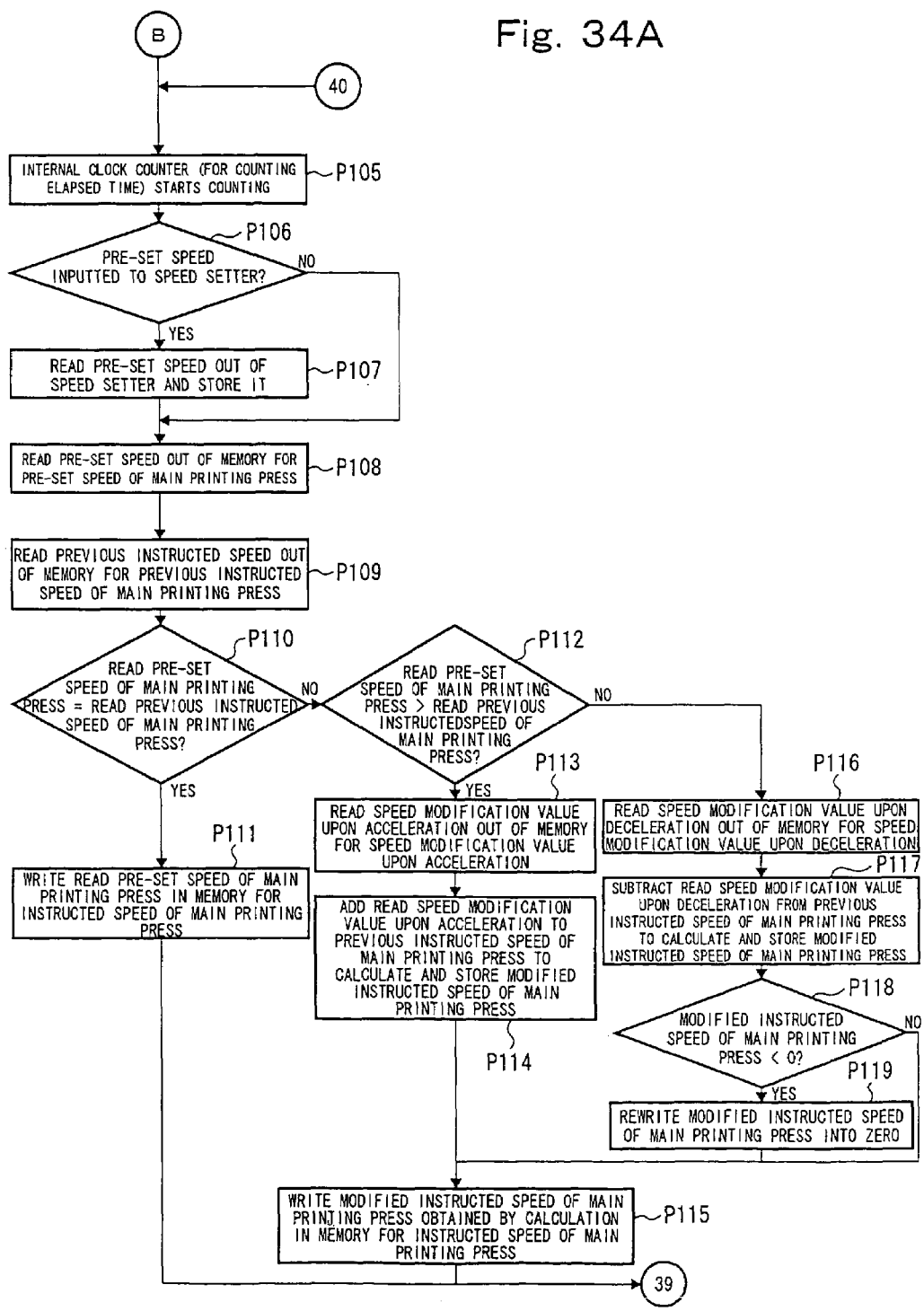
FIG. 34A is another operational flowchart of the drive control device for the main printing press.
Figure 34B:
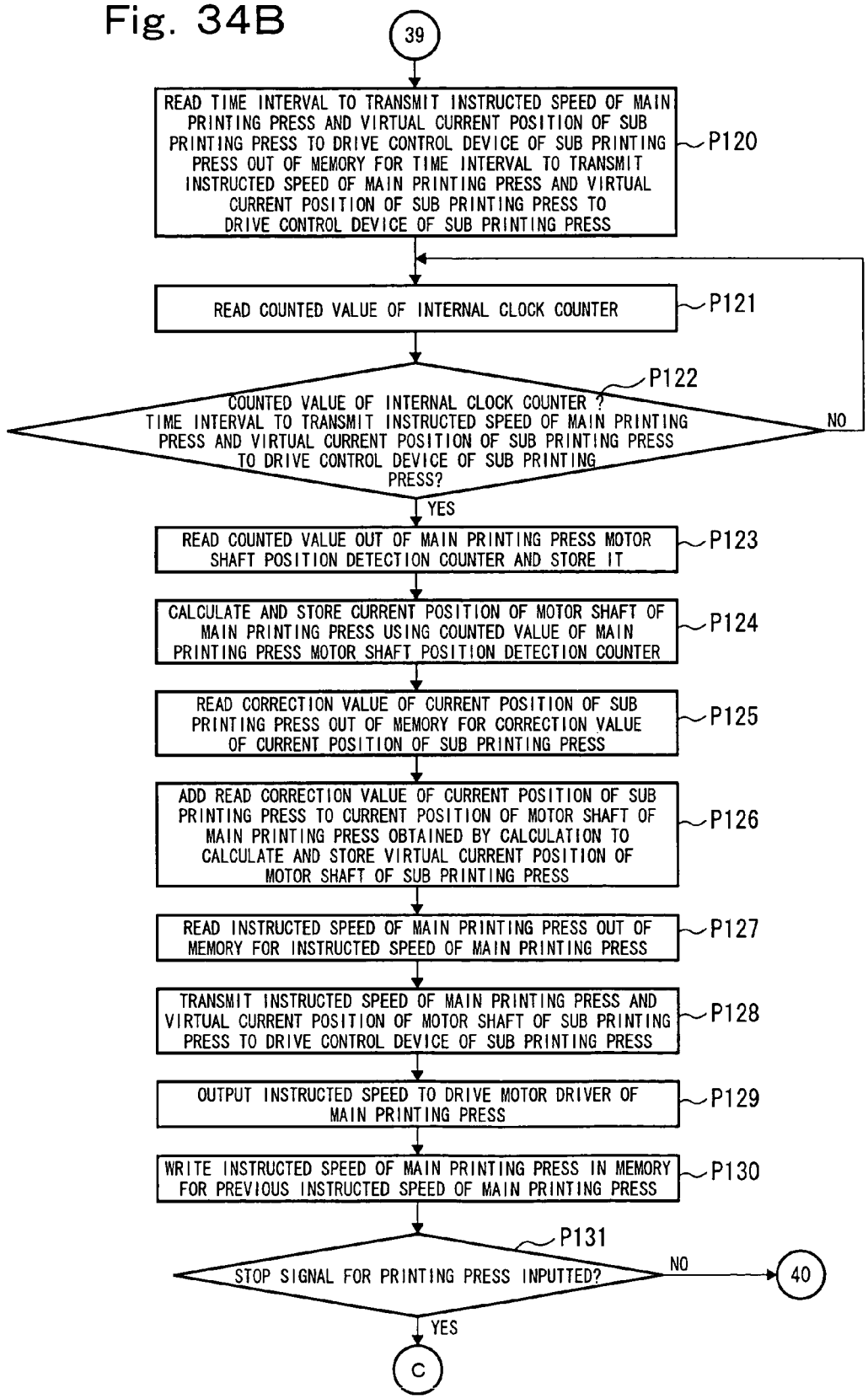
FIG. 34B is another operational flowchart of the drive control device for the main printing press.
Figure 35A:
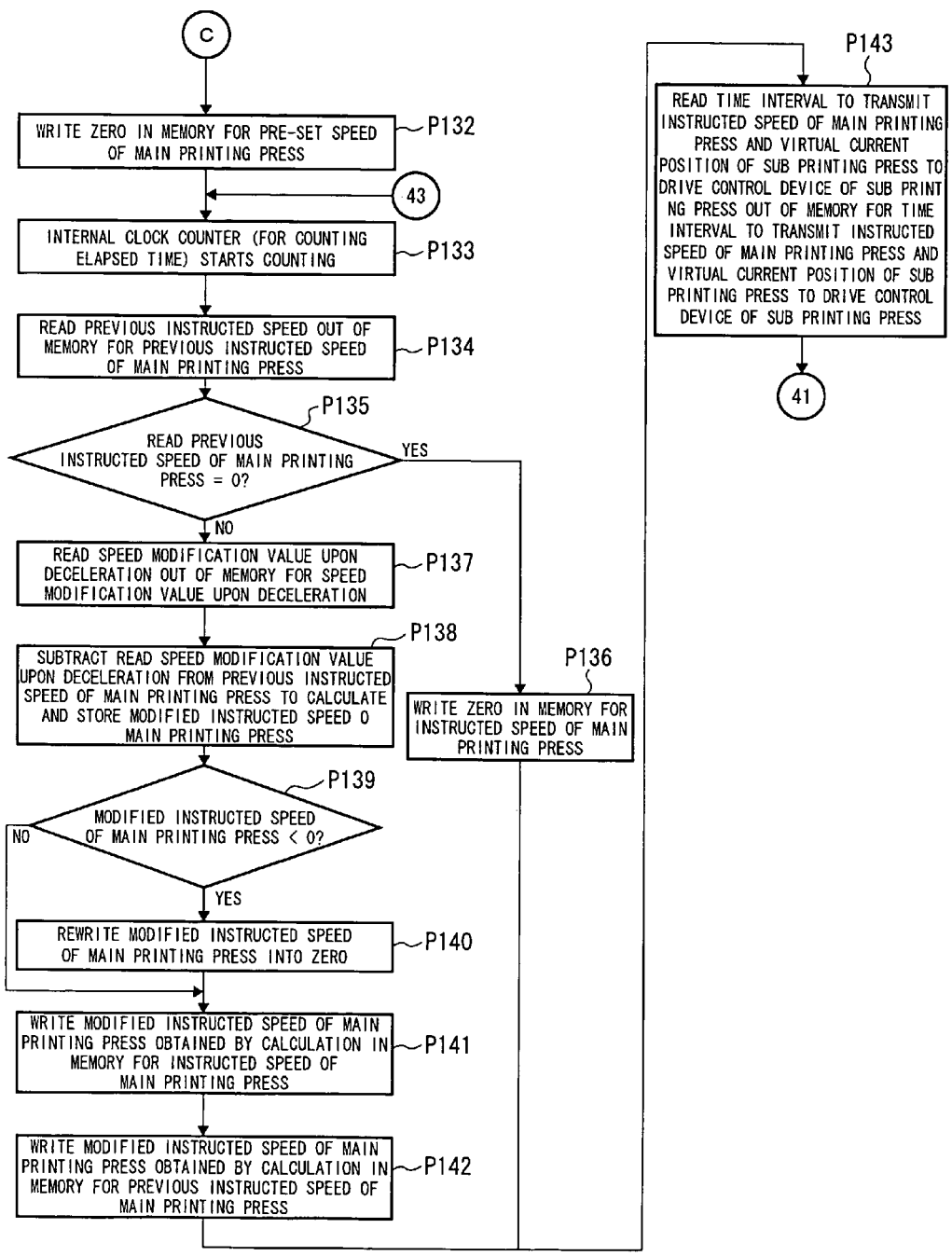
FIG. 35A is another operational flowchart of the drive control device for the main printing press.
Figure 35B:
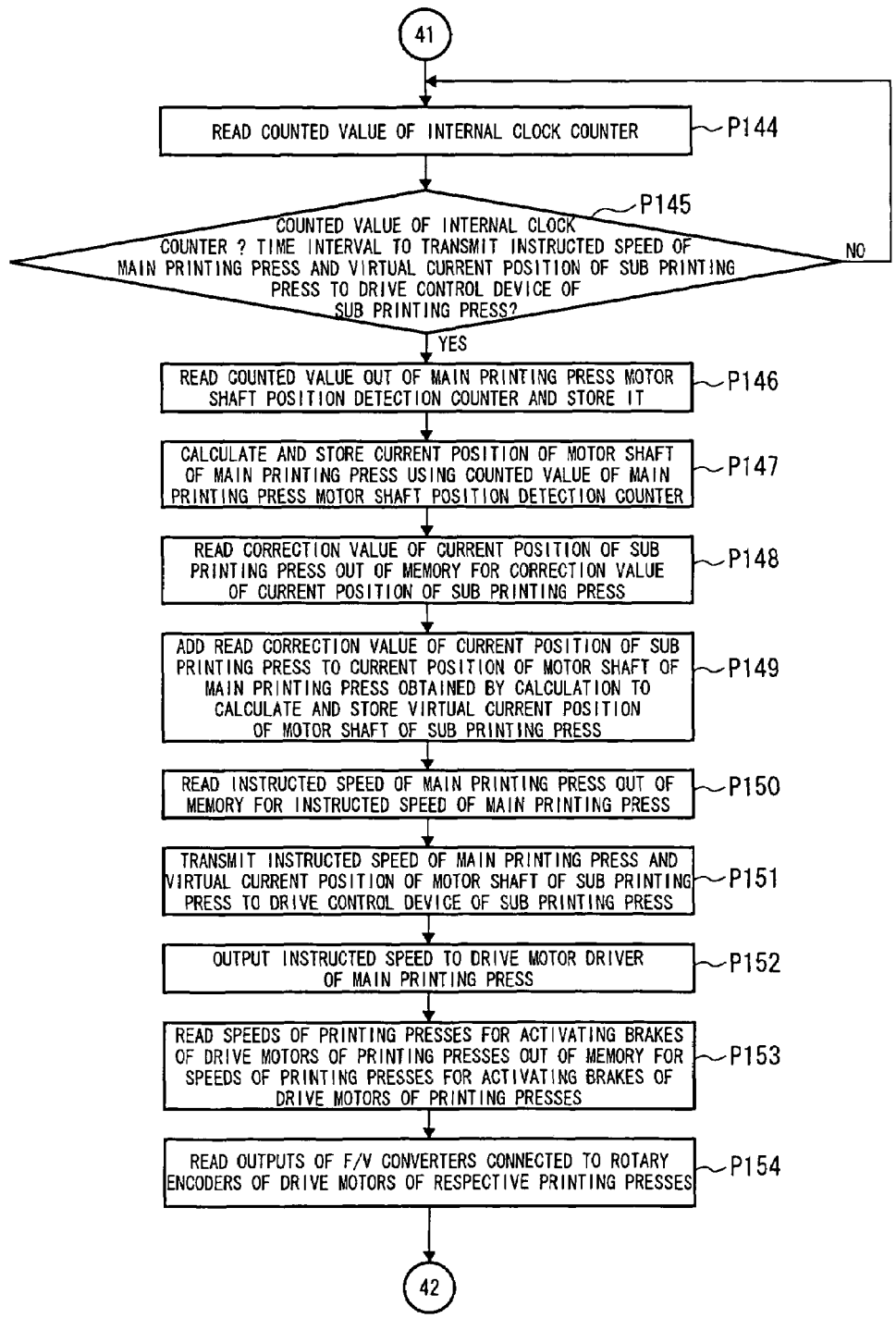
FIG. 35B is another operational flowchart of the drive control device for the main printing press.
Figure 35C:
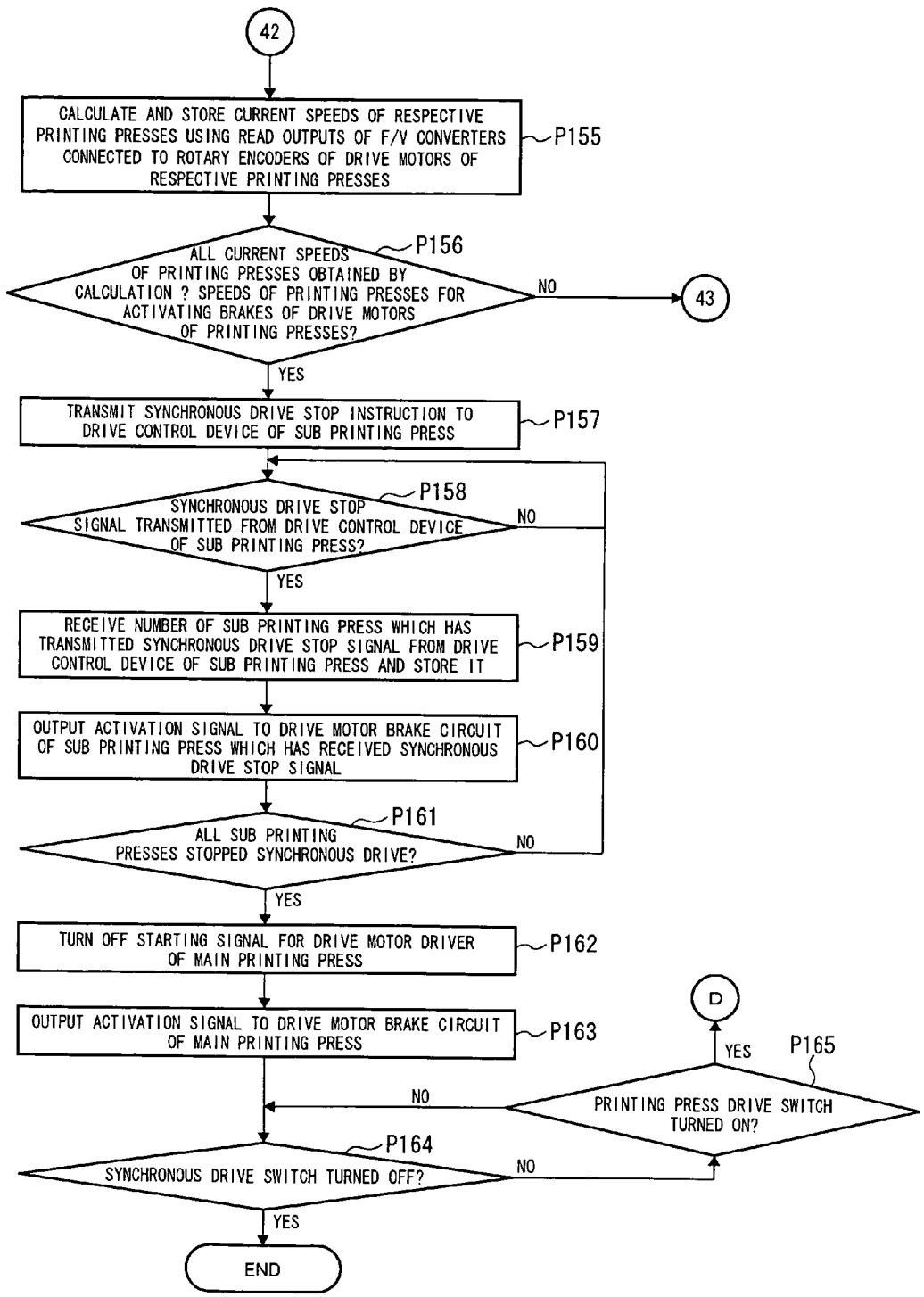
FIG. 35C is another operational flowchart of the drive control device for the main printing press.
Figure 36A:
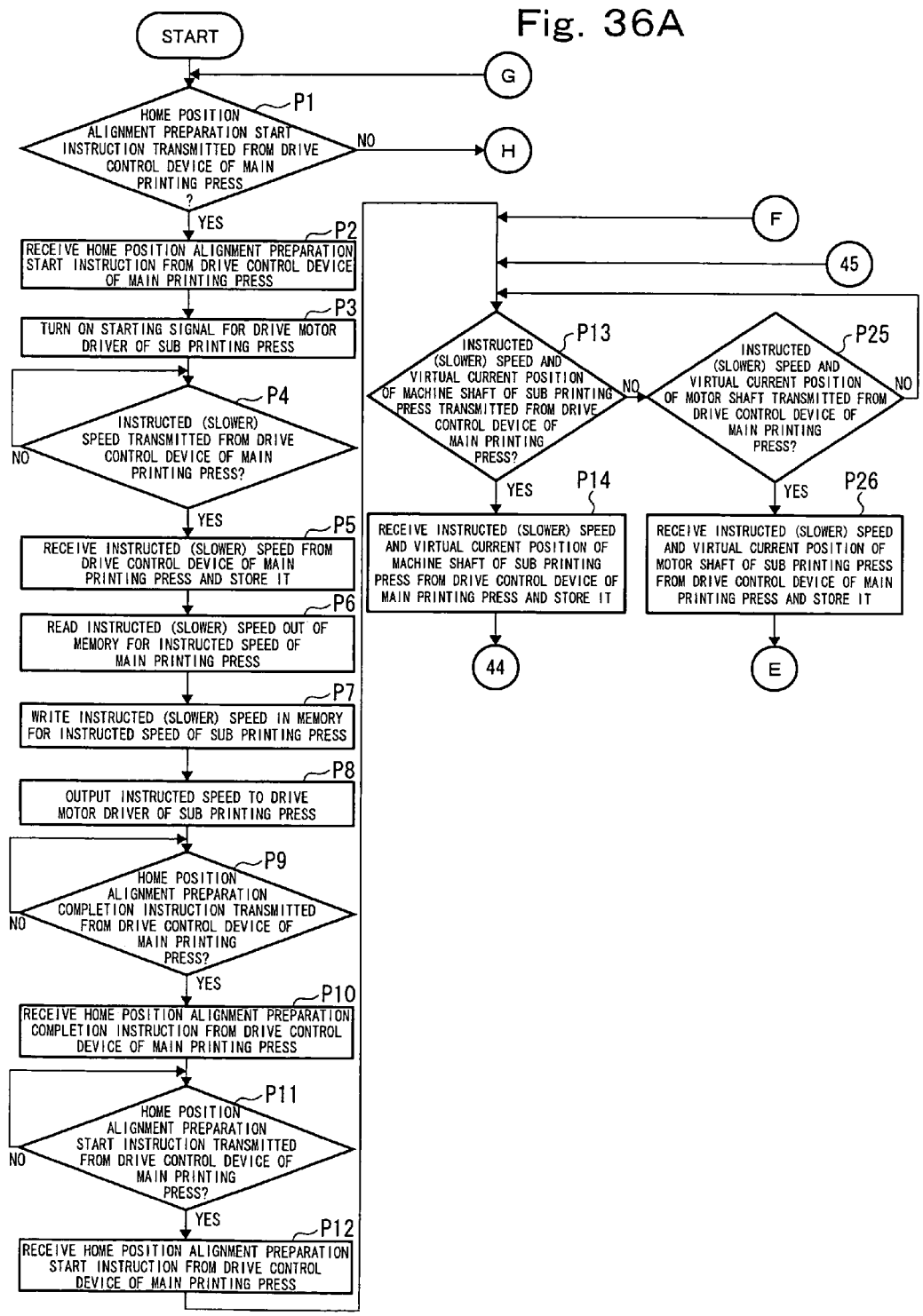
FIG. 36A is an operational flowchart of the drive control device for the sub printing press.
Figure 36B:
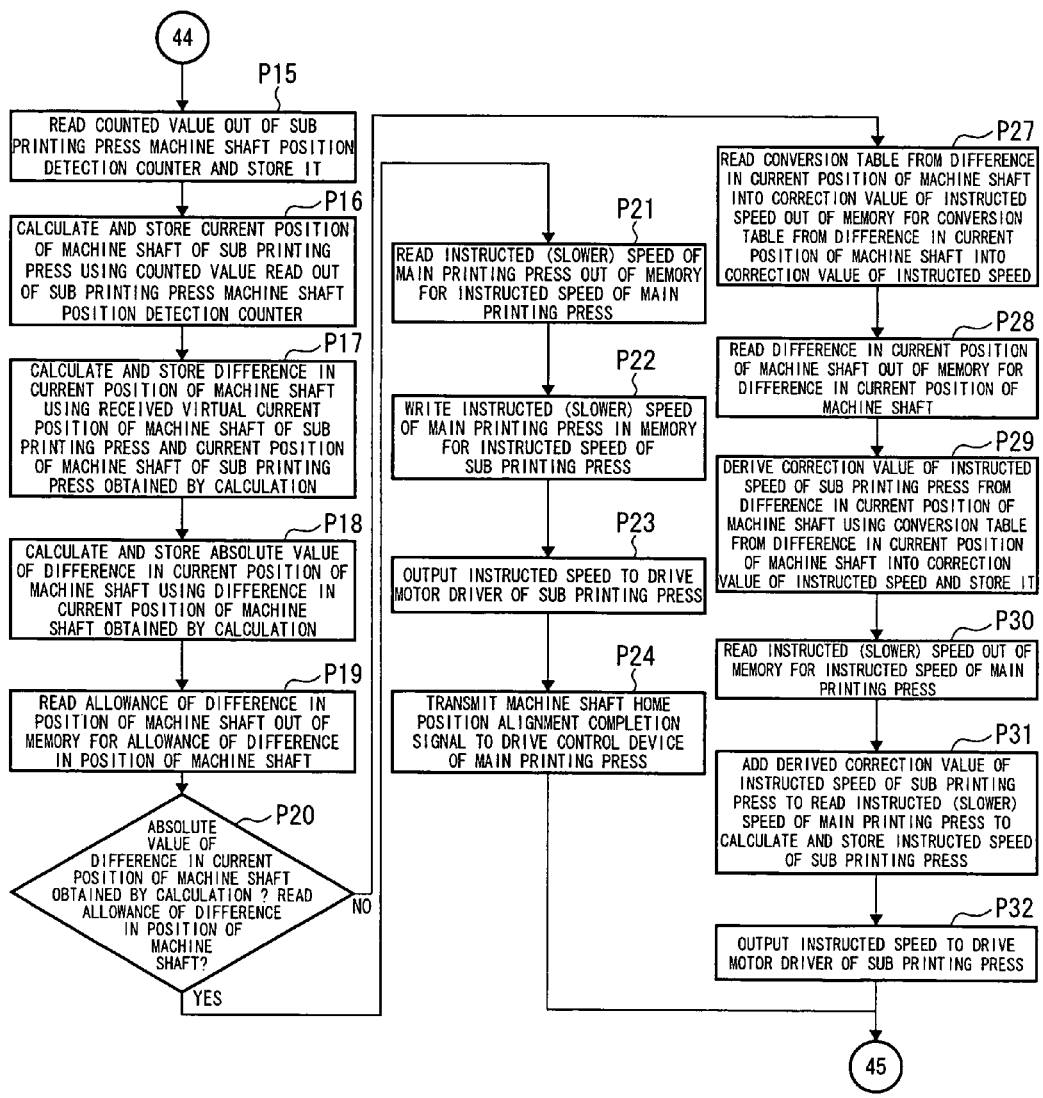
FIG. 36B is another operational flowchart of the drive control device for the sub printing press.
Figure 37:
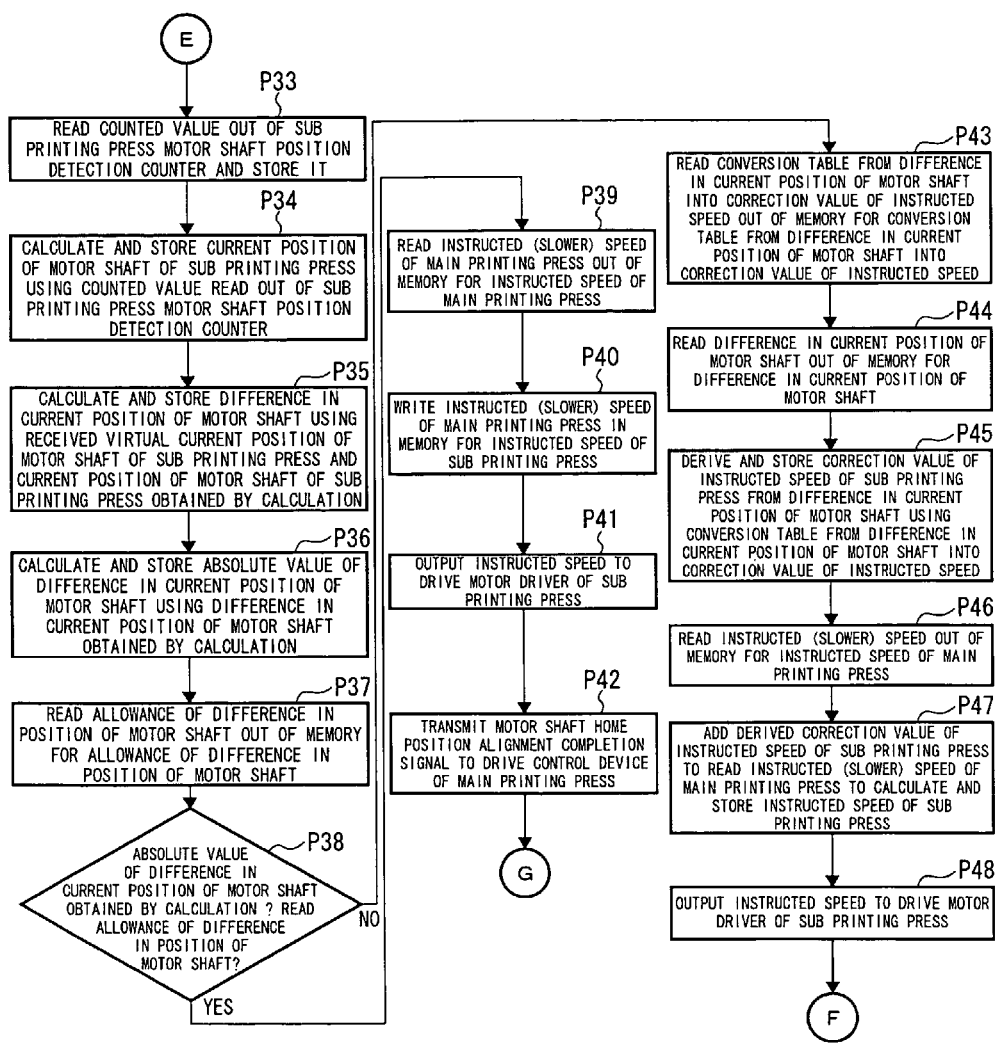
FIG. 37 is another operational flowchart of the drive control device for the sub printing press.
Figure 38A:
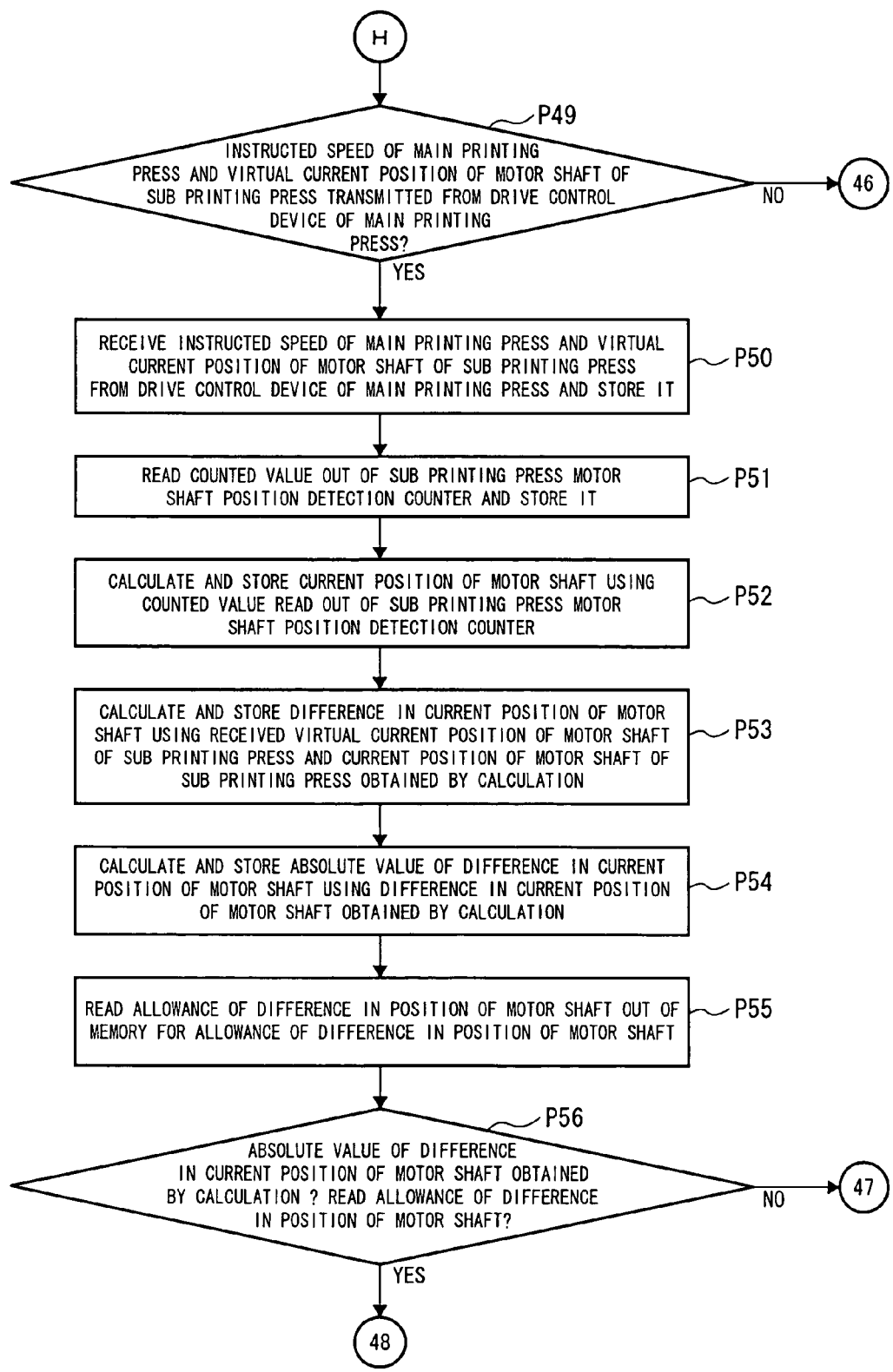
FIG. 38A is another operational flowchart of the drive control device for the sub printing press.
Figure 38B:
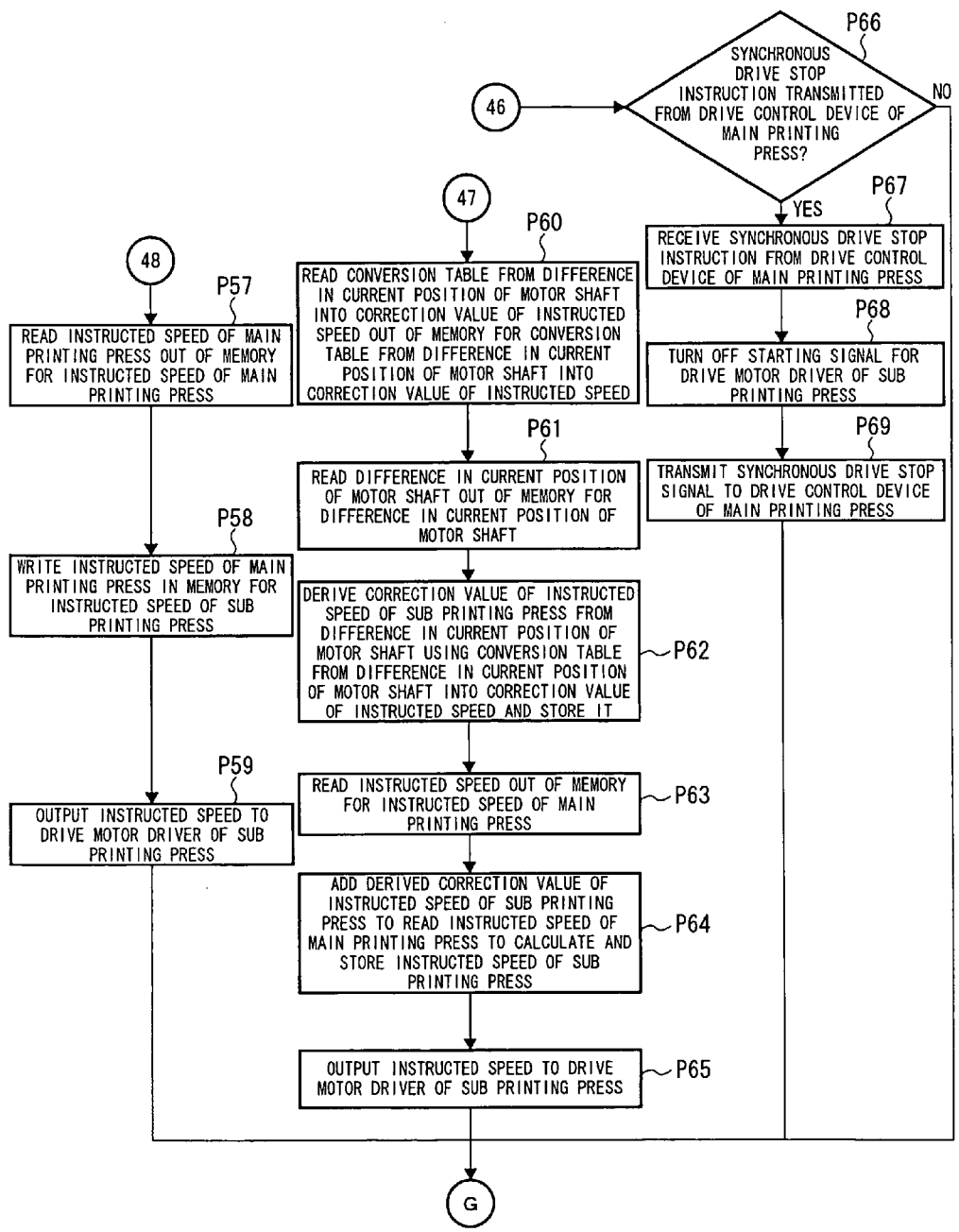
FIG. 38B is another operational flowchart of the drive control device for the sub printing press.

FIG. 29 is a schematic configuration diagram of a device for synchronously controlling multiple printing presses showing a third embodiment of the present invention. FIG. 30 is a block diagram of a drive control device for a main printing press. FIG. 31 is a block diagram of a drive control device for a sub printing press. FIG. 32A is an operational flowchart of the drive control device for the main printing press. FIG. 32B is another operational flowchart of the drive control device for the main printing press. FIG. 32C is another operational flowchart of the drive control device for the main printing press. FIG. 32D is another operational flowchart of the drive control device for the main printing press. FIG. 33A is another operational flowchart of the drive control device for the main printing press. FIG. 33B is another operational flowchart of the drive control device for the main printing press. FIG. 33C is another operational flowchart of the drive control device for the main printing press. FIG. 34A is another operational flowchart of the drive control device for the main printing press. FIG. 34B is another operational flowchart of the drive control device for the main printing press. FIG. 35A is another operational flowchart of the drive control device for the main printing press. FIG. 35B is another operational flowchart of the drive control device for the main printing press. FIG. 35C is another operational flowchart of the drive control device for the main printing press. FIG. 36A is an operational flowchart of the drive control device for the sub printing press. FIG. 36B is another operational flowchart of the drive control device for the sub printing press. FIG. 37 is another operational flowchart of the drive control device for the sub printing press. FIG. 38A is another operational flowchart of the drive control device for the sub printing press. FIG. 38B is another operational flowchart of the drive control device for the sub printing press.

As shown in FIG. 29, in a main printing press A constituted of a web-fed rotary printing press, a web W1 which is continuously supplied from a feeder 1 and an infeed unit 2 is firstly subjected to a variety of printing when the web W1 passes through first to fourth printing units 3 to 6. Subsequently, the web W1 is heated and dried when the web W1 passes through a drier 7, and is then cooled down when the web W1 passes through a cooling unit 8. Thereafter, the web W1 is subjected to tension control or a direction change when the web W1 passes through a drag unit 9, and is then cut into predetermined pieces and folded by a folding machine 10.

The first to fourth printing units 3 to 6 and the folding machine 10 are driven by a drive motor (a first drive motor) 15 of the printing press through a machine shaft (a line shaft) 11. A drive motor brake (braking means) 16 such as an electromagnetic brake for braking rotation of the drive motor 15, and a rotary encoder (speed detecting means) 18 for detecting a rotation speed of the drive motor 15 are attached to the drive motor 15. Moreover, the drive motor 15 is subjected to drive control by a drive control device 19 of the main printing press. A detection signal of the rotary encoder 18 is inputted to this drive control device 19, and a detection signal from a machine home position detector 17 attached to the machine shaft 11 is also inputted thereto.

Meanwhile, in a sub printing press B, a web W2 which is continuously supplied from a feeder 101 and an infeed unit 102 is firstly subjected to a variety of printing when the web W2 passes through first to fourth printing units 103 to 106. Subsequently, the web W2 is heated and dried when the web W2 passes through a drier 107, and is then cooled down when the web W2 passes through a cooling unit 108. Thereafter, the web W2 is subjected to tension control or a direction change when the web W2 passes through a drag unit 109, and is then cut into predetermined pieces and folded by a folding machine 110.

The first to fourth printing units 103 to 106 and the folding machine 110 are driven by a drive motor 115 (a second drive motor) through a machine shaft (a line shaft) 111. A drive motor brake (braking means) 116 such as an electromagnetic brake for braking rotation of the drive motor 115, and a rotary encoder 118 (speed detecting means) for detecting a rotation speed of the drive motor 115 are attached to the drive motor 115. Moreover, the drive motor 115 is subjected to drive control by a drive control device 20 of the sub printing press. A detection signal of the rotary encoder 118 is inputted to this drive control device 20, and a detection signal from a machine home position detector 117 attached to the machine shaft 111 is also inputted thereto.

Moreover, the drive control devices 19 and 20 are connected to each other, whereby the sub printing press B is synchronously controlled (driven) with respect to the main printing press A. That is, in this embodiment, the webs W1 and W2 printed by both of the main printing press A and the sub printing press B are guided to and folded by the folding machine 110 of the sub printing press B. Although only one sub printing press B is illustrated in FIG. 29, it is needless to say that it is possible to provide a plurality of sub printing presses.

As shown in FIG. 30, the device control device 19 of the main printing press includes a CPU 150, a ROM 151, a RAM 152, a memory 153 for a slower speed, a memory 154 for a pre-set speed of the main printing press, a memory 155 for an instructed speed of the main printing press, a memory 156 for home position alignment preparation time, a memory 157 for a time interval to transmit the instructed speed of the main printing press and a virtual current position of the sub printing press to the drive control device of the sub printing press, a memory 158 for a counted value of a main printing press machine shaft position detection counter, a memory 159 for a current position of the machine shaft of the main printing press, a memory 160 for a correction value of a current position of the sub printing press, a memory 161 for a virtual current position of a machine shaft of the sub printing press, a memory 162 for a number of the sub printing press whose machine shaft home position alignment completion signal has been received, a memory 163 for a counted value of a main printing press motor shaft position detection counter, a memory 164 for a current position of a motor shaft of the main printing press, a memory 165 for a virtual current position of a motor shaft of the sub printing press, a memory 166 for a number of the sub printing press whose motor shaft home position alignment completion signal has been received, a memory 167 for a previous instructed speed of the main printing press, a memory 168 for a speed modification value upon acceleration, a memory 169 for a speed modification value upon deceleration, a memory 170 for a modified instructed speed of the main printing press, a memory 171 for speeds of the printing presses for activating brakes of the drive motors of the printing presses, a memory 172 for current speeds of the respective printing presses, a memory 173 for a number of the sub printing press which has received a synchronous control stop signal, and an internal clock counter 174, which are connected to one another by a bus 183 together with respective input and output devices 175 to 181 and an interface 182.

An input device 184 such as a keyboard or various switches and buttons, a display 185 such as a CRT or a lamp, and an output device 186 such as a printer or a FD drive are connected to the input and output device 175. A speed setter 187 is connected to the input and output device 176. A drive motor driver 189 of the main printing press is connected to the input and output device 177 through a D/A converter 188, and the drive motor 15 of the main printing press and the rotary encoder 18 for the drive motor of the main printing press are connected to this drive motor driver 189. The rotary encoder 18 for the drive motor of the main printing press is connected to the input and output device 178 through an A/D converter 190 and a F/V converter 191, and the rotary encoder 118 for the drive motor of the sub printing press is similarly connected thereto through an A/D converter 192 and a F/V converter 193. A main printing press machine shaft position detection counter 194 is connected to the input and output device 179, and the rotary encoder 18 for the drive motor of the main printing press and the machine home position detector 17 of the main printing press are connected to this counter 194. A main printing press motor shaft position detection counter 195 is connected to the input and output device 180, and the rotary encoder 18 for the drive motor of the main printing press is connected to this counter 195. The drive motor brake 16 of the main printing press is connected to the input and output device 181 through a drive motor brake circuit 196 of the main printing press, and the drive motor brake 116 of the sub printing press is also connected thereto through a drive motor brake circuit 197 of the sub printing press. Moreover, the drive control device 20 of the sub printing press to be described later is connected to the interface 182.

As shown in FIG. 31, the drive control device 20 of the sub printing press includes a CPU 200, a ROM 201, a RAM 202, a memory 203 for an instructed speed of the main printing press, a memory 204 for an instructed speed of the sub printing press, a memory 205 for a virtual current position of the machine shaft of the sub printing press, a memory 206 for a counted value of a sub printing press machine shaft position detection counter, a memory 207 for a current position of the machine shaft of the sub printing press, a memory 208 for a difference in the current position of the machine shaft, a memory 209 for an absolute value of the difference in the current position of the machine shaft, a memory 210 for an allowance of the difference in the position of the machine shaft, a memory 211 for a conversion table from the difference in the current position of the machine shaft into a correction value of the instructed speed, a memory 212 for a correction value of the instructed speed of the sub printing press, a memory 213 for a virtual current position of a motor shaft of the sub printing press, a memory 214 for a counted value of a sub printing press motor shaft position detection counter, a memory 215 for a current position of a motor shaft of the sub printing press, a memory 216 for a difference in the current position of the motor shaft, a memory 217 for an absolute value of the difference in the current position of the motor shaft, a memory 218 for an allowance of the difference in the position of the motor shaft, a memory 219 for a conversion table from the difference in the current position of the motor shaft into the correction value of the instructed speed, and an internal clock counter 220, which are connected to one another by a bus 229 together with respective input and output devices 221 to 227 and an interface 228.

An input device 230 such as a keyboard or various switches and buttons, a display 231 such as a CRT or a lamp, and an output device 232 such as a printer or a FD drive are connected to the input and output device 221. A speed setter 233 is connected to the input and output device 222. A drive motor driver 235 of the sub printing press is connected to the input and output device 223 through a D/A converter 234, and the drive motor 115 of the sub printing press and the rotary encoder 118 for the drive motor of the sub printing press are connected to this drive motor driver 235. The rotary encoder 118 for the drive motor of the sub printing press is connected to the input and output device 224 through an A/D converter 236 and an F/V converter 237. A sub printing press machine shaft position detection counter 238 is connected to the input and output device 225, and the rotary encoder 118 for the drive motor of the sub printing press and the machine home position detector 117 of the sub printing press are connected to this counter 238. A sub printing press motor shaft position detection counter 239 is connected to the input and output device 226, and the rotary encoder 118 for the drive motor of the sub printing press is connected to this counter 239. The drive motor brake 116 of the sub printing press is connected to the input and output device 227 through a drive motor brake circuit 240 of the sub printing press. Moreover, the above-described drive control device 19 of the main printing press is connected to the interface 228.

Based on the above-described configurations, the device control device 19 of the main printing press is firstly operated in accordance with operational flows shown in FIG. 32A, FIG. 32B, FIG. 32C, FIG. 32D, FIG. 33A, FIG. 33B, FIG. 33C, FIG. 34A, FIG. 34B, FIG. 35A, FIG. 35B, and FIG. 35C in order to perform synchronous control of the sub printing press B with respect to the main printing press A.

Specifically, when a synchronous drive switch is turned on in Step P1 and a printing press drive switch is turned on in Step P2, an operation release signal is outputted to the drive motor brake circuits 196 and 197 of the respective printing presses in Step P3. Next, when a starting signal for the drive motor driver 189 of the main printing press is turned on in Step P4, a home position alignment preparation start instruction is transmitted to the drive control device 20 of the sub printing press in Step P5. Next, when a slower speed is read out of the memory 153 for a slower speed in Step P6, the slower speed is written in the memory 154 for a pre-set speed of the main printing press in Step P7. Next, when the slower speed is written in memory 155 for an instructed speed of the main printing press in Step P8, the instructed (slower) speed is transmitted to the drive control device 20 of the sub printing press in Step P9. Next, when the instructed (slower) speed is outputted to the drive motor driver 189 of the main printing press in Step P10, the internal clock counter (for counting elapsed time) 174 starts counting in Step P11. Next, when home position alignment preparation time is read out of the memory 156 for home position alignment preparation time in Step P12, the counted value of the internal clock counter 174 is read out in Step P13.

When the counted value of the internal clock counter 174 becomes equal to or greater than the home position alignment preparation time in Step P14, a home position alignment preparation completion instruction is transmitted to the drive control device 20 of the sub printing press in Step P15. Next, when the home position alignment preparation start instruction is transmitted to the drive control device 20 of the sub printing press in Step P16, the slower speed is read out of the memory 153 for a slower speed in Step P17. Next, when the slower speed is written in the memory 154 for a pre-set speed of the main printing press in Step P18, the internal clock counter (for counting elapsed time) 174 starts counting in Step P19. Next, when a time interval to transmit the instructed speed of the main printing press and a virtual current position of the sub printing press to the drive control device 20 of the sub printing press is read out of the memory 157 for a time interval to transmit the instructed speed of the main printing press and a virtual current position of the sub printing press to the drive control device of the sub printing press in Step P20, the counted value of the internal clock counter 174 is read out in Step P21.

Next, a judgment is made in Step P22 as to whether or not the counted value of the internal clock counter 174 is equal to or greater than the time interval to transmit the instructed speed of the main printing press and the virtual current position of the sub printing press to the drive control device 20 of the sub printing press. If the result is YES, the pre-set (slower) speed is read out of the memory 154 for a pre-set speed of the main printing press in Step P23. Next, when the pre-set (slower) speed is written in the memory 155 for an instructed speed of the main printing press in Step P24, a counted value is read out of the main printing press machine shaft position detection counter 194, and is stored in Step P25. Next, when a current position of the machine shaft of the main printing press is calculated by use of the counted value of the main printing press machine shaft position detection counter 194 and is stored in Step P26, a correction value of a current position of the sub printing press is read out of the memory 160 for a correction value of a current position of the sub printing press in Step P27.

Next, when the correction value of the current position of the sub printing press thus read out is added to the current position of the machine shaft of the main printing press obtained by the calculation, and a virtual current position of the machine shaft of the sub printing press is calculated and stored in Step P28, the instructed (slower) speed of the main printing press is read out of the memory 155 for an instructed speed of the main printing press in Step P29. Next, when the instructed (slower) speed of the main printing press and the virtual current position of the machine shaft of the sub printing press are transmitted to the drive control device 20 of the sub printing press in Step P30, the instructed (slower) speed is outputted to the drive motor driver 189 of the main printing press in Step P31. Thereafter, the operation returns to Step P19.

If the result is NO in the above-described Step P22, a judgment is made in Step P32 as to whether or not a machine shaft home position alignment completion signal has been transmitted from the drive control device 20 of the sub printing press. If the result is YES, the machine shaft home position alignment completion signal is received from the drive control device 20 of the sub printing press in Step P33. Next, when a number of the sub printing press whose machine shaft home position alignment completion signal has been received is stored in Step P34, a judgment is made in Step P35 as to whether or not machine shaft home position alignment is completed in terms of all the sub printing presses. If the result is NO, the operation returns to the above-described Step P19.

On the other hand, if the result is YES, the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in Step P36. Then, the counted value of the internal clock counter 174 is read out in Step P37. Next, when the counted value of the internal clock counter 174 becomes equal to or greater than the time interval to transmit the instructed speed of the main printing press and the virtual current position of the sub printing press to the drive control device 20 of the sub printing press in Step P38, the pre-set (slower) speed is read out of the memory 154 for a pre-set speed of the main printing press in Step P39. Next, when the pre-set (slower) speed is written in the memory 155 for an instructed speed of the main printing press in Step P40, the counted value is read out of the main printing press machine shaft position detection counter 194, and is stored in Step P41. Next, when the current position of the machine shaft of the main printing press is calculated by use of the counted value of the main printing press machine shaft position detection counter 194 and is stored in Step P42, the correction value of the current position of the sub printing press is read out of the memory 160 for a correction value of a current position of the sub printing press in Step P43.

Next, when the correction value of the current position of the sub printing press thus read out is added to the current position of the machine shaft of the main printing press obtained by the calculation, and the virtual current position of the machine shaft of the sub printing press is calculated and stored in Step P44, the instructed (slower) speed of the main printing press is read out of the memory 155 for an instructed speed of the main printing press in Step P45. Next, when the instructed (slower) speed of the main printing press and the virtual current position of the machine shaft of the sub printing press are transmitted to the drive control device 20 of the sub printing press in Step P46, the instructed (slower) speed is outputted to the drive motor driver 189 of the main printing press in Step P47. Thereafter, the operation goes to Step P61 to be described later.

If the result is NO in the above-described Step P32, a judgment is made in Step P48 as to whether or not a stop signal for the printing press has been inputted. Here, if the result is NO, the operation returns to Step P20. If the result is YES, the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in Step P49, and then the counted value of the internal clock counter 174 is read out in Step P50. Next, when the counted value of the internal clock counter 174 becomes equal to or greater than the time interval to transmit the instructed speed of the main printing press and the virtual current position of the sub printing press to the drive control device 20 of the sub printing press in Step P51, the pre-set (slower) speed is read out of the memory 154 for a pre-set speed of the main printing press in Step P52. Next, when the pre-set (slower) speed is written in memory 155 for an instructed speed of the main printing press in Step P53, the counted value is read out of the main printing press machine shaft position detection counter 194 and is stored in Step P54. Next, when the current position of the machine shaft of the main printing press is calculated by use of the counted value of the main printing press machine shaft position detection counter 194 and is stored in Step P55, the correction value of the current position of the sub printing press is read out of the memory 160 for a correction value of a current position of the sub printing press in Step P56.

Next, when the correction value of the current position of the sub printing press thus read out is added to the current position of the machine shaft of the main printing press obtained by the calculation, and the virtual current position of the machine shaft of the sub printing press is calculated and stored in Step P57, the instructed (slower) speed of the main printing press is read out of the memory 155 for an instructed speed of the main printing press in Step P58. Next, when the instructed (slower) speed of the main printing press and the virtual current position of the machine shaft of the sub printing press are transmitted to the drive control device 20 of the sub printing press in Step P59, the instructed (slower) speed is outputted to the drive motor driver 189 of the main printing press in Step P60. Thereafter, the operation goes to Step P131 to be described later.

The internal clock counter (for counting elapsed time) 174 starts counting in the above-mentioned Step P61. Next, when the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in Step P62, the counted value of the internal clock counter 174 is read out in Step P63. Next, when the counted value of the internal clock counter 174 becomes equal to or greater than the time interval to transmit the instructed speed of the main printing press and the virtual current position of the sub printing press to the drive control device 20 of the sub printing press in Step P64, the pre-set (slower) speed is read out of the memory 154 for a pre-set speed of the main printing press in Step P65. Next, when the pre-set (slower) speed is written in memory 155 for an instructed speed of the main printing press in Step P66, a counted value is read out of the main printing press motor shaft position detection counter 195 and is stored in Step P67. Next, a current position of a motor shaft of the main printing press is calculated by use of the counted value of the main printing press motor shaft position detection counter 195 and is stored in Step P68, the correction value of the current position of the sub printing press is read out of the memory 160 for a correction value of a current position of the sub printing press in Step P69.

Next, when the correction value of the current position of the sub printing press thus read out is added to the current position of the motor shaft of the main printing press obtained by the calculation, and a virtual current position of a motor shaft of the sub printing press is calculated and stored in Step P70, the instructed (slower) speed of the main printing press is read out of the memory 155 for an instructed speed of the main printing press in Step P71. Next, when the instructed (slower) speed of the main printing press and the virtual current position of the motor shaft of the sub printing press are transmitted to the drive control device 20 of the sub printing press in Step P72, the instructed (slower) speed is outputted to the drive motor driver 189 of the main printing press in Step P73. Thereafter, the operation goes to the above-described Step P61.

If the result is NO in the above-described Step P64, a judgment is made in Step P74 as to whether or not a motor shaft home position alignment completion signal has been transmitted from the drive control device 20 of the sub printing press. If the result is YES, the motor shaft home position alignment completion signal is received from the drive control device 20 of the sub printing press in Step P75. Next, when a number of the sub printing press whose motor shaft home position alignment completion signal has been received is stored in Step P76, a judgment is made in Step P77 as to whether or not motor shaft home position alignment is completed in terms of all the sub printing presses. If the result is NO, the operation returns to the above-described Step P61.

On the other hand, if the result is YES, the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in Step P78. Then, the counted value of the internal clock counter 174 is read out in Step P79. Next, when the counted value of the internal clock counter 174 becomes equal to or greater than the time interval to transmit the instructed speed of the main printing press and the virtual current position of the sub printing press to the drive control device 20 of the sub printing press in Step P80, the pre-set (slower) speed is read out of the memory 154 for a pre-set speed of the main printing press in Step P81. Next, when the pre-set (slower) speed is written in the memory 155 for an instructed speed of the main printing press in Step P82, the counted value is read out of the main printing press motor shaft position detection counter 195, and is stored in Step P83. Next, when the current position of the motor shaft of the main printing press is calculated by use of the counted value of the main printing press motor shaft position detection counter195 and is stored in Step P84, the correction value of the current position of the sub printing press is read out of the memory 160 for a correction value of a current position of the sub printing press in Step P85.

Next, when the correction value of the current position of the sub printing press thus read out is added to the current position of the motor shaft of the main printing press obtained by the calculation, and the virtual current position of the motor shaft of the sub printing press is calculated and stored in Step P86, the instructed (slower) speed of the main printing press is read out of the memory 155 for an instructed speed of the main printing press in Step P87. Next, when the instructed (slower) speed of the main printing press and the virtual current position of the motor shaft of the sub printing press are transmitted to the drive control device 20 of the sub printing press in Step P88, the instructed (slower) speed is outputted to the drive motor driver 189 of the main printing press in Step P89. Next, when the instructed (slower) speed of the main printing press is read out of the memory 155 for an instructed speed of the main printing press in Step P90, the instructed (slower) speed is written in the memory 167 for a previous instructed speed of the main printing press in Step P91. Thereafter, the operation goes to Step P105 to be described later.

If the result is NO in the above-described Step P74, a judgment is made in Step P92 as to whether or not the stop signal for the printing press has been inputted. Here, if the result is NO, the operation returns to Step P61. If the result is YES, the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in Step P93, and then the counted value of the internal clock counter 174 is read out in Step P94. Next, when the counted value of the internal clock counter 174 becomes equal to or greater than the time interval to transmit the instructed speed of the main printing press and the virtual current position of the sub printing press to the drive control device 20 of the sub printing press in Step P95, the pre-set (slower) speed is read out of the memory 154 for a pre-set speed of the main printing press in Step P96. Next, when the pre-set (slower) speed is written in memory 155 for an instructed speed of the main printing press in Step P97, the counted value is read out of the main printing press motor shaft position detection counter 195 and is stored in Step P98. Next, when the current position of the motor shaft of the main printing press is calculated by use of the counted value of the main printing press motor shaft position detection counter 195 and is stored in Step P99, the correction value of the current position of the sub printing press is read out of the memory 160 for a correction value of a current position of the sub printing press in Step P100.

Next, when the correction value of the current position of the sub printing press thus read out is added to the current position of the motor shaft of the main printing press obtained by the calculation, and the virtual current position of the motor shaft of the sub printing press is calculated and stored in Step P101, the instructed (slower) speed of the main printing press is read out of the memory 155 for an instructed speed of the main printing press in Step P102. Next, when the instructed (slower) speed of the main printing press and the virtual current position of the motor shaft of the sub printing press are transmitted to the drive control device 20 of the sub printing press in Step P103, the instructed (slower) speed is outputted to the drive motor driver 189 of the main printing press in Step P104. Thereafter, the operation goes to Step P131 to be described later.

When the internal clock counter (for counting elapsed time) 174 starts counting in Step P105, a judgment is made in Step P106 as to whether or not the pre-set speed has been inputted to the speed setter 187. If the result is YES, the pre-set speed is read out of the speed setter 187 and stored in Step P107, and then the pre-set speed is read out of the memory 154 for a pre-set speed of the main printing press in Step P108. On the other hand, if the result is NO, the operation directly goes to Step P108.

Next, when a previous pre-set speed is read out of the memory 167 for a previous instructed speed of the main printing press in Step P109, a judgment is made in Step P110 as to whether or not the pre-set speed of the main printing press thus read out is equal to the previous instructed speed of the main printing press. Here, if the result is YES, the pre-set speed of the main printing press thus read out is written in the memory 155 for an instructed speed of the main printing press in Step P111, and then the operation goes to Step P120 to be described later. On the other hand, if the result is NO, a judgment is made in Step P112 as to whether or not the pre-set speed of the main printing press thus read out is greater than the previous instructed speed of the main printing press thus read out. If the result is YES, a speed modification value upon acceleration is read out of the memory 168 for a speed modification value upon acceleration in Step P113. Next, the speed modification value upon acceleration thus read out is added to the previous instructed speed of the main printing press and a modified instructed speed of the main printing press is thereby calculated and stored in Step P114. Then, the modified instructed speed of the main printing press obtained by the calculation is written in the memory 155 for an instructed speed of the main printing press in Step P115. Thereafter, the operation goes to Step P120 to be described later.

If the result is NO in the above-described Step P112, a speed modification value upon deceleration is read out of the memory 169 for a speed modification value upon deceleration in Step P116. Then, the speed modification value upon deceleration thus read out is subtracted from the previous instructed speed of the main printing press and the modified instructed speed of the main printing press is thereby calculated and stored in Step P117. Next, a judgment is made in Step P118 as to whether or not the modified instructed speed of the main printing press is smaller than 0. If the result is YES, the modified instructed speed of the main printing press is rewritten with zero in Step P119, and then the operation goes to the above-described Step P115. On the other hand, if the result is NO, the operation directly goes to Step P115.

Next, the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in the above-mentioned Step P120, and then the counted value of the internal clock counter 174 is read out in Step P121. Next, when the counted value of the internal clock counter 174 becomes equal to or greater than the time interval to transmit the instructed speed of the main printing press and the virtual current position of the sub printing press to the drive control device of the sub printing press in Step P122, the counted value is read out of the main printing press motor shaft position detection counter 195 and is stored in Step P123.

Next, when the current position of the motor shaft of the main printing press is calculated by use of the counted value of the main printing press motor shaft position detection counter 195 and is stored in Step P124, the correction value of the current position of the sub printing press is read out of the memory 160 for a correction value of a current position of the sub printing press in Step P125. Next, the correction value of the current position of the sub printing press thus read out is added to the current position of the motor shaft of the main printing press obtained by the calculation, and the virtual current position of the motor shaft of the sub printing press is calculated and stored in Step P126, and then the instructed speed of the main printing press is read out of the memory 155 for an instructed speed of the main printing press in Step P127.

Next, when the instructed speed of the main printing press and the virtual current position of the motor shaft of the sub printing press are transmitted to the drive control device 20 of the sub printing press in Step P128, the instructed speed is outputted to the drive motor driver 189 of the main printing press in Step P129. Next, when the instructed speed of the main printing press is written in the memory 167 for a previous instructed speed of the main printing press in Step P130, a judgment is made in Step P131 as to whether or not the stop signal for the printing press has been inputted. Here, if the result is NO, the operation returns to the above-described Step P105. If the answer is YES, zero is written in the memory 154 for a pre-set speed of the main printing press in Step P132.

Next, when the internal clock counter (for counting elapsed time) 174 starts counting in Step P133, the previous instructed speed is read out of the memory 167 for a previous instructed speed of the main printing press in Step P134. Next, a judgment is made in Step P135 as to whether or not the previous instructed speed of the main printing press thus read out is equal to 0. Here, if the result is YES, zero is written in the memory 155 for an instruction speed of the main printing press in Step P136, and then the operation goes to Step P143 to be described later. If the result is NO, the speed modification value upon deceleration is read out of the memory 169 for a speed modification value upon deceleration in Step P137.

Next, the speed modification value upon deceleration thus read out is subtracted from the previous instructed speed of the main printing press and the modified instructed speed of the main printing press is thereby calculated and stored in Step P138. Thereafter, a judgment is made in Step P139 as to whether or not the modified instructed speed of the main printing press is smaller than 0. Here, if the result is YES, the modified instructed speed of the main printing press is rewritten with zero in Step P140, and then the modified instructed speed of the main printing press obtained by the calculation is written in the memory 155 for an instructed speed of the main printing press in Step P141. If the result is NO, the operation directly goes to Step P141. Thereafter, the modified instructed speed obtained by the calculation is written in the memory 167 for a previous instructed speed of the main printing press in Step P142.

Next, when the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in the above-mentioned Step P143, the counted value of the internal clock counter 174 is read out in Step P144. Next, when the counted value of the internal clock counter 174 becomes equal to or greater than the time interval to transmit the instructed speed of the main printing press and the virtual current position of the sub printing press to the drive control device 20 of the sub printing press in Step P145, the counted value is read out of the main printing press motor shaft position detection counter 195 and is stored in Step P146.

Next, when the current position of the motor shaft of the main printing press is calculated by use of the counted value of the main printing press motor shaft position detection counter 195 and is stored in Step P147, the correction value of the current position of the sub printing press is read out of the memory 160 for a correction value of a current position of the sub printing press in Step P148. Next, the correction value of the current position of the sub printing press thus read out is added to the current position of the motor shaft of the main printing press obtained by the calculation, and the virtual current position of the motor shaft of the sub printing press is calculated and stored in Step P149, and then the instructed speed of the main printing press is read out of the memory 155 for an instructed speed of the main printing press in Step P150.

Next, when the instructed speed of the main printing press and the virtual current position of the motor shaft of the sub printing press are transmitted to the drive control device 20 of the sub printing press in Step P151, the instructed speed is outputted to the drive motor driver 189 of the main printing press in Step P152. Next, when speeds of the printing presses for activating the brakes of the drive motors of the printing presses are read out of the memory 171 for speeds of the printing presses for activating brakes of the drive motors of the printing presses in Step P153, outputs of the F/V converters 191 and 193 connected to the rotary encoders 18 and 118 of the drive motors of the respective printing presses are read out in Step P154. Next, current speeds of the respective printing presses are calculated and stored in Step P155 by use of the outputs of the F/V converters 191 and 193 connected to the rotary encoders 18 and 118 of the drive motors of the respective printing presses, which are read out as described above. Then, a judgment is made in Step P156 as to whether or not all the current speeds of the printing presses obtained by the calculation are equal to or smaller than the speeds of the printing presses for activating the brakes of the drive motors of the printing presses.

If the result is NO in the above-described Step P156, the operation returns to the above-described Step P133. On the other hand, if the result is YES, a synchronous drive stop instruction is transmitted to the drive control device 20 of the sub printing press in Step P157. Next, when a synchronous drive stop signal is transmitted from the drive control device 20 of the sub printing press in Step P158, the number of the sub printing press which has transmitted the synchronous drive stop signal is received from the drive control device 20 of the sub printing press and stored in Step P159. Next, when an activation signal is outputted to the drive motor brake circuit 197 of the sub printing press which has received the synchronous drive stop signal in Step P160, a judgment is made in Step P161 as to whether or not all the sub printing presses have stopped synchronous drive.

If the result is NO in the above-described Step P161, the operation returns to Step P158. On the other hand, if the result is YES, the starting signal for the drive motor driver 189 of the main printing press is turned off in Step P162. Next, when an activation signal is outputted to the drive motor brake circuit 196 of the main printing press in Step P163, the synchronous drive switch is turned off in Step P164. Here, if the synchronous drive switch is not turned off and if the printing press drive switch is turned on in Step P165, the operation returns to Step P3.

Next, the drive control device 20 of the sub printing press is operated in accordance with operational flows shown in FIG. 36A, FIG. 36B, FIG. 37, FIG. 38A, and FIG. 38B.

Specifically, a judgment is made in Step P1 as to whether or not the home position alignment preparation start instruction has been transmitted from the drive control device 19 of the main printing press. If the result is NO, the operation goes to Step P49 to be described later. On the other hand, if the result is YES, the home position alignment preparation start instruction is received from the drive control device 19 of the main printing press in Step P2. Next, when a starting signal for the drive motor driver 235 of the sub printing press is turned on in Step P3 and the instructed (slower) speed is transmitted from the drive control device 19 of the main printing press in Step P4, the instructed (slower) speed is received from the drive control device 19 of the main printing press and stored in Step P5. Next, the instructed (slower) speed of the main printing press is read out of the memory 203 for an instructed speed of the main printing press in Step P6, and the instructed (slower) speed of the main printing press is written in the memory 204 for an instructed speed of the sub printing press in Step P7.

Next the instructed speed is outputted to the drive motor driver 235 of the sub printing press in Step P8. When the home position alignment preparation completion instruction is transmitted from the drive control device 19 of the main printing press in Step P9, the home position alignment preparation completion instruction is received from the drive control device 19 of the main printing press in Step P10. Next, when the home position alignment start instruction is transmitted from the drive control device 19 of the main printing press in Step P11, the home position alignment start instruction is received from the drive control device 19 of the main printing press in Step P12.

Next, a judgment is made in Step P13 as to whether or not the instructed (slower) speed of the main printing press and the virtual current position of the machine shaft of the sub printing press have been transmitted from the drive control device 19 of the main printing press. Here, if the result is NO, the instructed (slower) speed of the main printing press and the virtual current position of the motor shaft of the sub printing press are transmitted from the drive control device 19 of the main printing press in Step P25, and then the instructed (slower) speed of the main printing press and the virtual current position of the motor shaft of the sub printing press are received from the drive control device 19 of the main printing press and are stored in Step P26. Thereafter, the operation goes to Step P33 to be described later.

If the result is YES in the above-described Step P13, the instructed (slower) speed of the main printing press and the virtual current position of the machine shaft of the sub printing press are received from the drive control device 19 of the main printing press and are stored in Step P14. Next, when a counted value is read out of the sub printing press machine shaft position detection counter 238 and is stored in Step P15, the current position of the machine shaft of the sub printing press is calculated by use of the counted value of the sub printing press machine shaft position detection counter 238, and is stored in Step P16.

Next, when a difference in the current position of the machine shaft is calculated by use of the received virtual current position of the machine shaft of the sub printing press and the current position of the machine shaft of the sub printing press obtained by the calculation and is stored in Step P17, an absolute value of the difference in the current position of the machine shaft is calculated by use of the difference in the current position of the machine shaft obtained by the calculation, and is stored in Step P18. Next, when an allowance of the difference in the position of the machine shaft is read out of the memory 210 for an allowance of the difference in the position of the machine shaft in Step P19, a judgment is made in Step P20 as to whether or not the absolute value of the difference in the current position of the machine shaft obtained by the calculation is equal to or smaller than the allowance of the position of the machine shaft thus read out.

If the result is YES in the above-described Step P20, the instructed (slower) speed of the main printing press is read out of the memory 203 for an instructed speed of the main printing press in Step P21, and then the instructed (slower) speed of the main printing press is written in the memory 204 for an instructed speed of the sub printing press in Step P22. Next, when the instructed speed is outputted to the drive motor driver 235 of the sub printing press in Step P23, the home position alignment completion signal of the machine shaft is transmitted to the drive control device 19 of the main printing press in Step P24. Thereafter, the operation returns to the above-described Step P13.

If the result is NO in the above-described Step P20, a conversion table from the difference in the current position of the machine shaft into a correction value of the instructed speed is read out of the memory 211 for a conversion table from the difference in the current position of the machine shaft into a correction value of the instructed speed in Step P27. Then, a difference in the current position of the machine shaft is read out of the memory 208 for a difference in the position of the machine shaft in Step P28. Next, the correction value of the instruction speed of the sub printing press is derived from the difference in the current position of the machine shaft by use of the conversion table from the difference in the current position of the machine shaft into a correction value of the instructed speed, and is stored in Step P29. Thereafter, the instructed (slower) speed is read out of the memory 203 for an instructed speed of the main printing press in Step P30. Next, the derived correction value of the instructed speed of the sub printing press is added to the instructed (slower) speed of the main printing press thus read out, and the instructed speed of the sub printing press is thereby calculated and stored in Step P31. Thereafter, the instructed speed is outputted to the drive motor driver 235 of the sub printing press in Step P32. Thereafter, the operation returns to the above-described Step P13.

When a counted value is read out of the sub printing press motor shaft position detection counter 239 and is stored in Step P33, the current position of the motor shaft of the sub printing press is calculated by use of the counted value of the sub printing press motor shaft position detection counter 239 thus read out, and is stored in Step P34. Next, a difference in the current position of the motor shaft is calculated by use of the received virtual current position of the motor shaft of the sub printing press and the current position of the motor shaft of the sub printing press obtained by the calculation, and is stored in Step P35. Then, an absolute value of the difference in the current position of the motor shaft is calculated by use of the difference in the current position of the motor shaft obtained by the calculation, and is stored in Step P36. Next, when an allowance of the difference in the position of the motor shaft is read out of the memory 218 for an allowance of the difference in the position of the motor shaft in Step P37, a judgment is made in Step P38 as to whether or not the absolute value of the difference in the current position of the motor shaft obtained by the calculation is equal to or smaller than the allowance of the position of the motor shaft thus read out.

If the result is YES in the above-described Step P38, the instructed (slower) speed of the main printing press is read out of the memory 203 for an instructed speed of the main printing press in Step P39. When the instructed (slower) speed of the main printing press is written in the memory 204 for an instructed speed of the sub printing press in Step P40, the instructed speed is outputted to the drive motor driver 235 of the sub printing press in Step P41. Next, the home position alignment completion signal of the motor shaft is transmitted to the drive control device 19 of the main printing press in Step P42, and the operation returns to Step P1.

On the other hand, if the result is NO in the above-described Step P38, a conversion table from the difference in the current position of the motor shaft into a correction value of the instructed speed is read out of the memory 219 for a conversion table from the difference in the current position of the motor shaft into a correction value of the instructed speed in Step P43. Next, when a difference in the current position of the motor shaft is read out of the memory 216 for a difference in the position of the motor shaft in Step P44, the correction value of the instructed speed of the sub printing press is derived from the difference in the current position of the motor shaft by use of the conversion table from the difference in the current position of the motor shaft into a correction value of the instructed speed in Step P45. Next, when instructed (slower) speed is read out of the memory 203 for an instructed speed of the main printing press in Step P46, the derived correction value of the instructed speed of the sub printing press is added to the instructed (slower) speed of the main printing press thus read out, and the instructed speed of the sub printing press is thereby calculated and stored in Step P47. Next, when the instructed speed is outputted to the drive motor driver 235 of the sub printing press in Step P48, the operation returns to the above-described Step P13.

A judgment is made in the above-mentioned Step P49 as to whether or not the instructed speed of the main printing press and the virtual current position of the motor shaft of the sub printing press have been transmitted from the drive control device 19 of the main printing press. Here, if the result is NO, a judgment is made in Step P66 as to whether or not the synchronous drive stop instruction has been transmitted from the drive control device 19 of the main printing press. Here, if the result is YES, the synchronous drive stop instruction is received from the drive control device 19 of the main printing press in Step P67. Next, when the starting signal for the drive motor driver 235 of the sub printing press is turned off in Step P68, the synchronous drive stop signal is transmitted to the drive control device 19 of the main printing press in Step P69, and the operation returns to Step P1. On the other hand, if the result is NO in the above-described Step P66, the operation directly returns to Step P1.

If the result is YES in the above-described Step P49, the instructed (slower) speed of the main printing press and the virtual current position of the motor shaft of the sub printing press are received from the drive control device 19 of the main printing press and stored in Step P50. Next, when the counted value is read out of the sub printing press motor shaft position detection counter 239 and is stored in Step P51, the current position of the motor shaft of the sub printing press is calculated by use of the counted value of the sub printing press motor shaft position detection counter 239 thus read out, and is stored in Step P52.

Next, the difference in the current position of the machine shaft is calculated by use of the received virtual current position of the motor shaft of the sub printing press and the current position of the motor shaft obtained by the calculation, and is stored in Step P53. Then, the absolute value of the difference in the current position of the motor shaft is calculated by use of the difference in the current position of the motor shaft obtained by the calculation, and is stored in Step P54. Next, when the allowance of the difference in the position of the motor shaft is read out of the memory 218 for an allowance of the difference in the position of the motor shaft in Step P55, a judgment is made in Step P56 as to whether or not the absolute value of the difference in the current position of the motor shaft obtained by the calculation is equal to or smaller than the allowance of the position of the motor shaft thus read out.

Here, if the result is YES in the above-described Step P56, the instructed speed of the main printing press is read out of the memory 203 for an instructed speed of the main printing press in Step P57. Then, the instructed speed of the main printing press is written in the memory 204 for an instructed speed of the sub printing press in Step P58. Next, the instructed speed is outputted to the drive motor driver 235 of the sub printing press in Step P59, and the operation returns to Step P1.

If the result is NO in the above-described Step P56, the conversion table from the difference in the current position of the motor shaft into a correction value of the instructed speed is read out of the memory 219 for a conversion table from the difference in the current position of the motor shaft into a correction value of the instructed speed in Step P60. Then, the difference in the current position of the motor shaft is read out of the memory 216 for a difference in the position of the motor shaft in Step P61. Next, the correction value of the instructed speed of the sub printing press is derived from the difference in the current position of the motor shaft by use of the conversion table from the difference in the current position of the motor shaft into a correction value of the instructed speed, and is stored in Step P62. Thereafter, the instructed speed is read out of the memory 203 for an instructed speed of the main printing press in Step P63. Next, the derived correction value of the instructed speed of the sub printing press is added to the instructed speed of the main printing press thus read out, and the instructed speed of the sub printing press is thereby calculated and stored in Step P64. Then, the instructed speed is outputted to the drive motor driver 235 of the sub printing press in Step P65. Thereafter, the operation returns to Step P1.

In this way, according to this embodiment, when the main printing press A and the sub printing press B are in shutdown, phase deviation between the main printing press A and the sub printing press B is prevented and the synchronous condition is retained by stopping the synchronous control by the drive motors 15 and 115 and by starting the drive motor brakes 16 and 116 attached to the drive motors 15 and 115 instead.

In this case, according to this embodiment, when the speeds of the respective printing presses A and B are detected by the rotary encoders 18 and 118 and the speeds are reduced to a predetermined speed (such as 8 rpm) by the stop instruction, the phase of the main printing press A is stopped in the relevant position and the synchronous control of the sub printing presses B with respect to the main printing press A is released. Simultaneously, the drive motor brakes 16 and 116 of the drive motors 15 and 115 of the respective printing presses A and B are started. Accordingly, rotation of the respective printing presses A and B is stopped by the drive motor brakes 16 and 116 when the respective printing presses A and B are in shutdown.

In this way, it is not necessary to supply currents to the drive motors 15 and 115 and to the drive motor drivers 189 and 235 when the respective printing presses A and B are in shutdown. Therefore, it is possible to reduce power consumption and to improve durability of motors and motor bearings.

Fourth Embodiment

Figure 39:
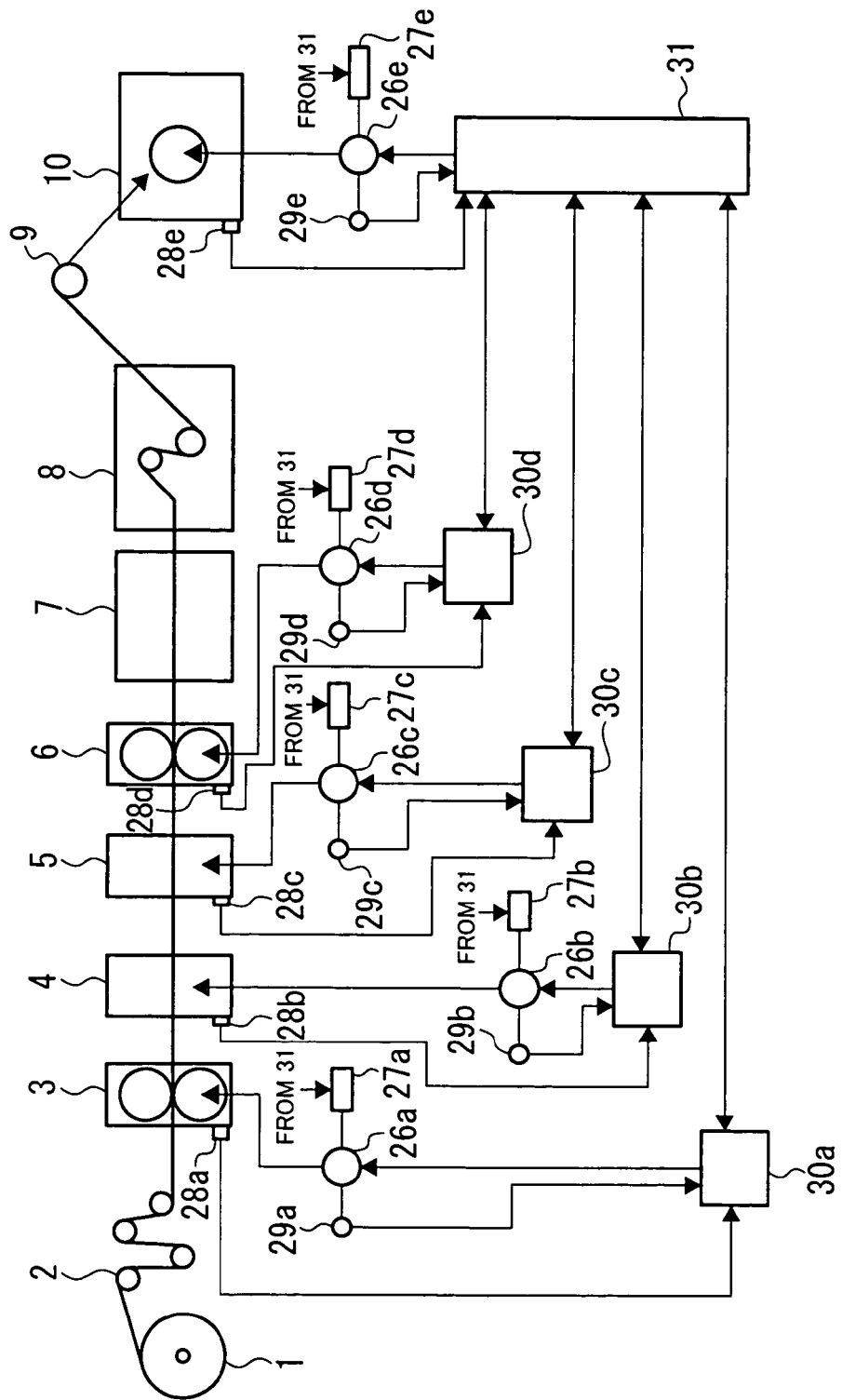
FIG. 39 is a schematic configuration diagram of a device for synchronously controlling multiple units in a printing press, showing a fourth embodiment of the present invention.
Figure 40:
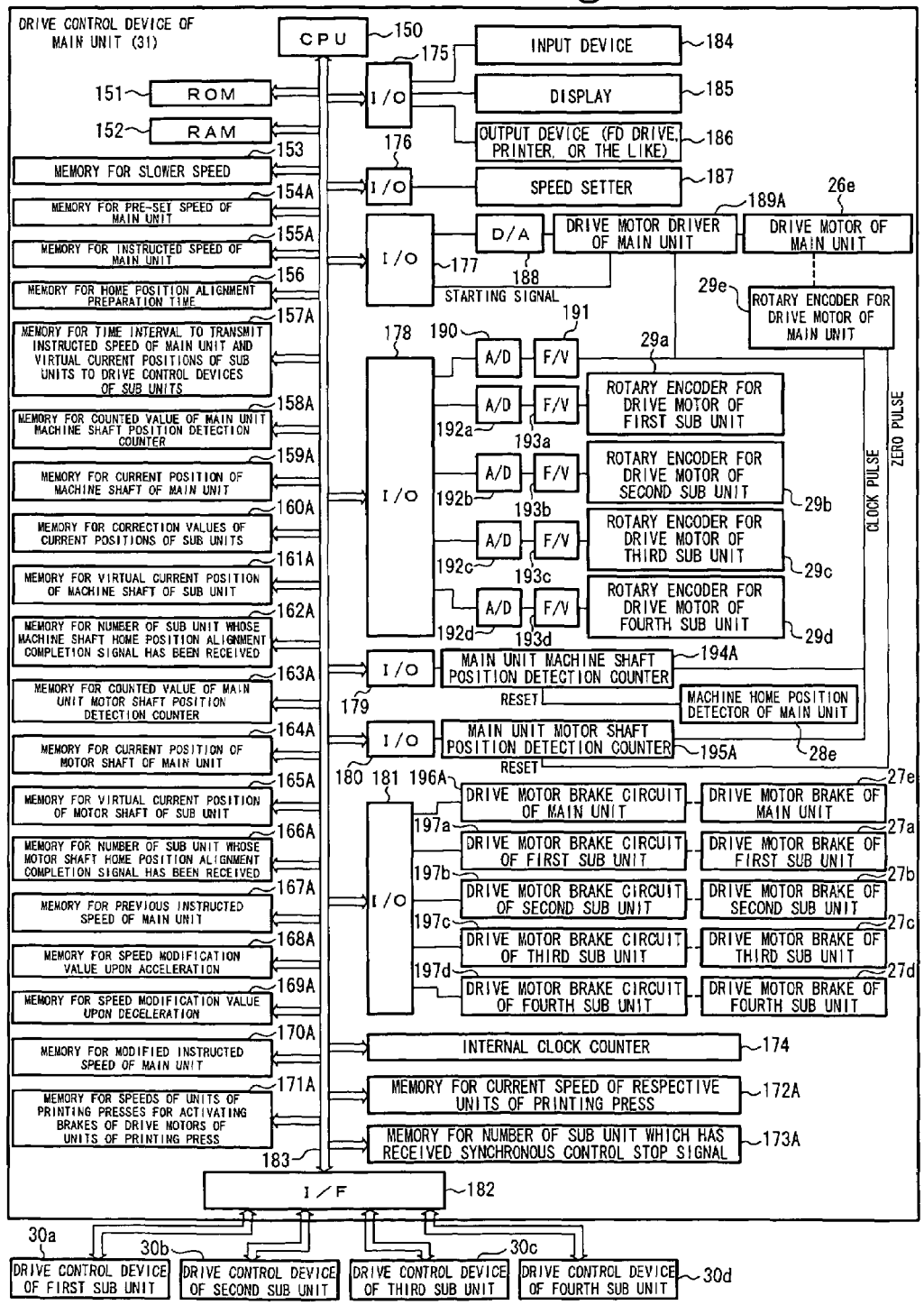
FIG. 40 is a block diagram of a drive control device for a main unit.
Figure 41:
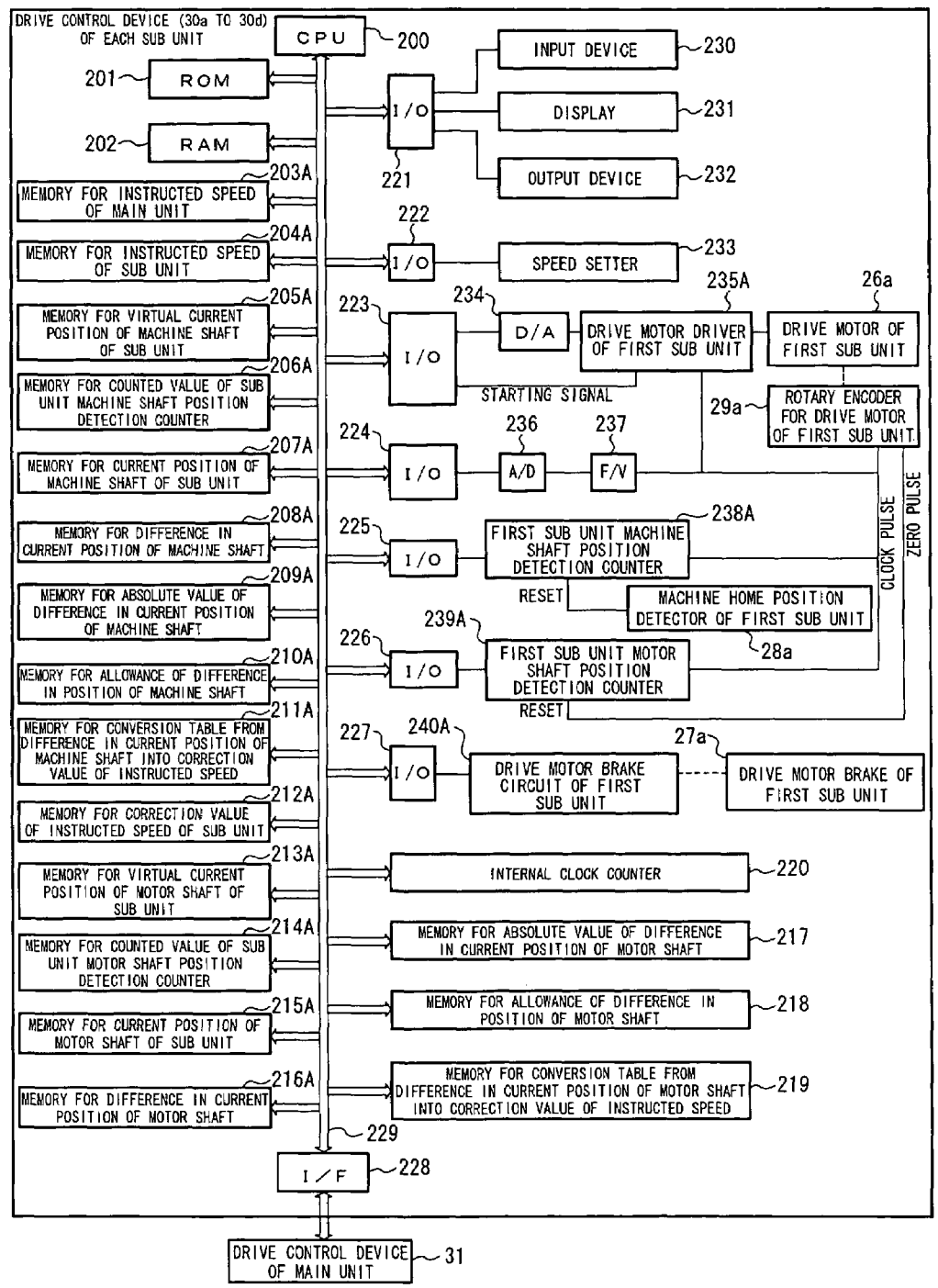
FIG. 41 is a block diagram of a drive control device for a sub unit.
Figure 42A:
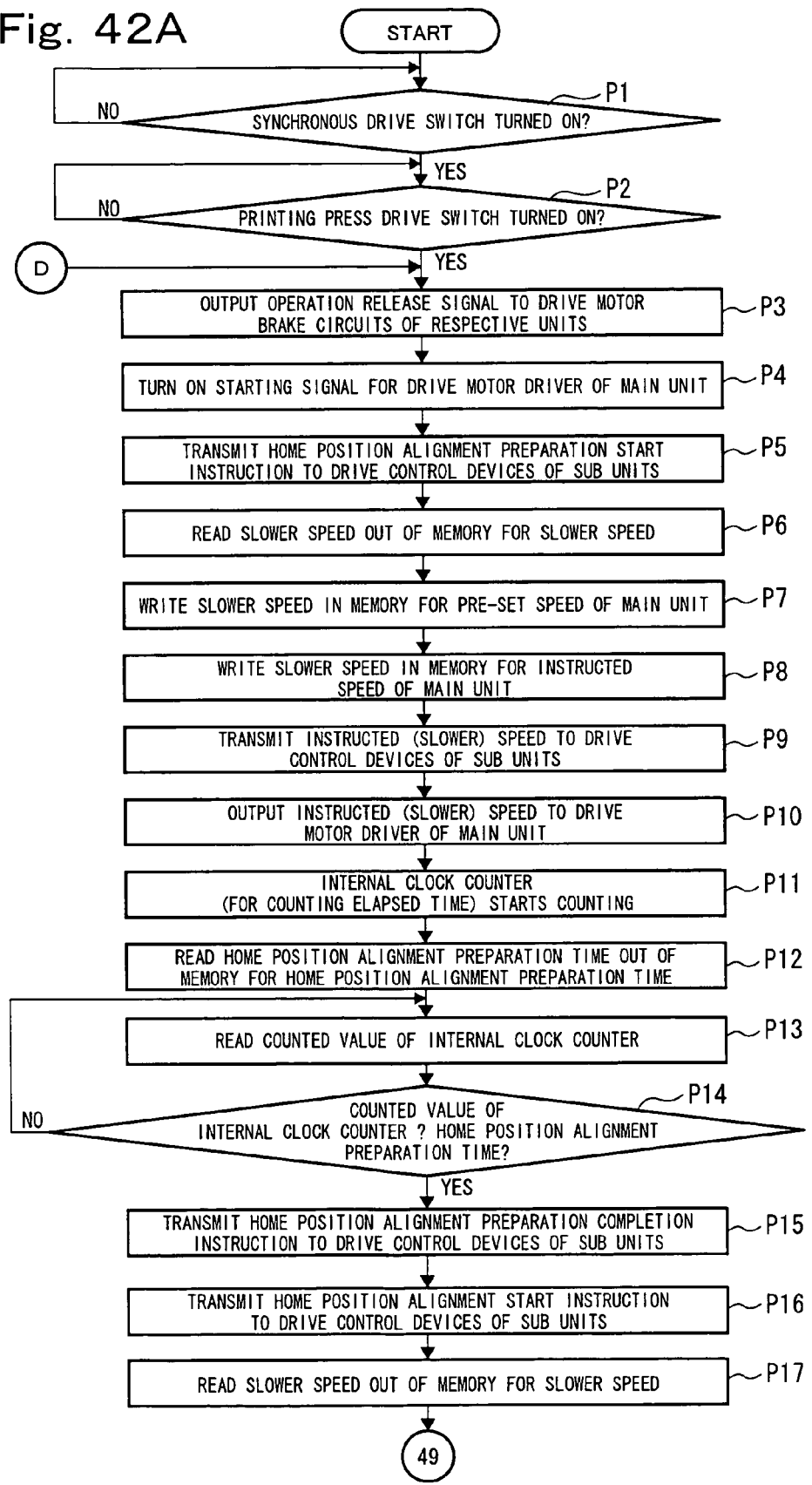
FIG. 42A is an operational flowchart of the drive control device for the main unit.
Figure 42B:
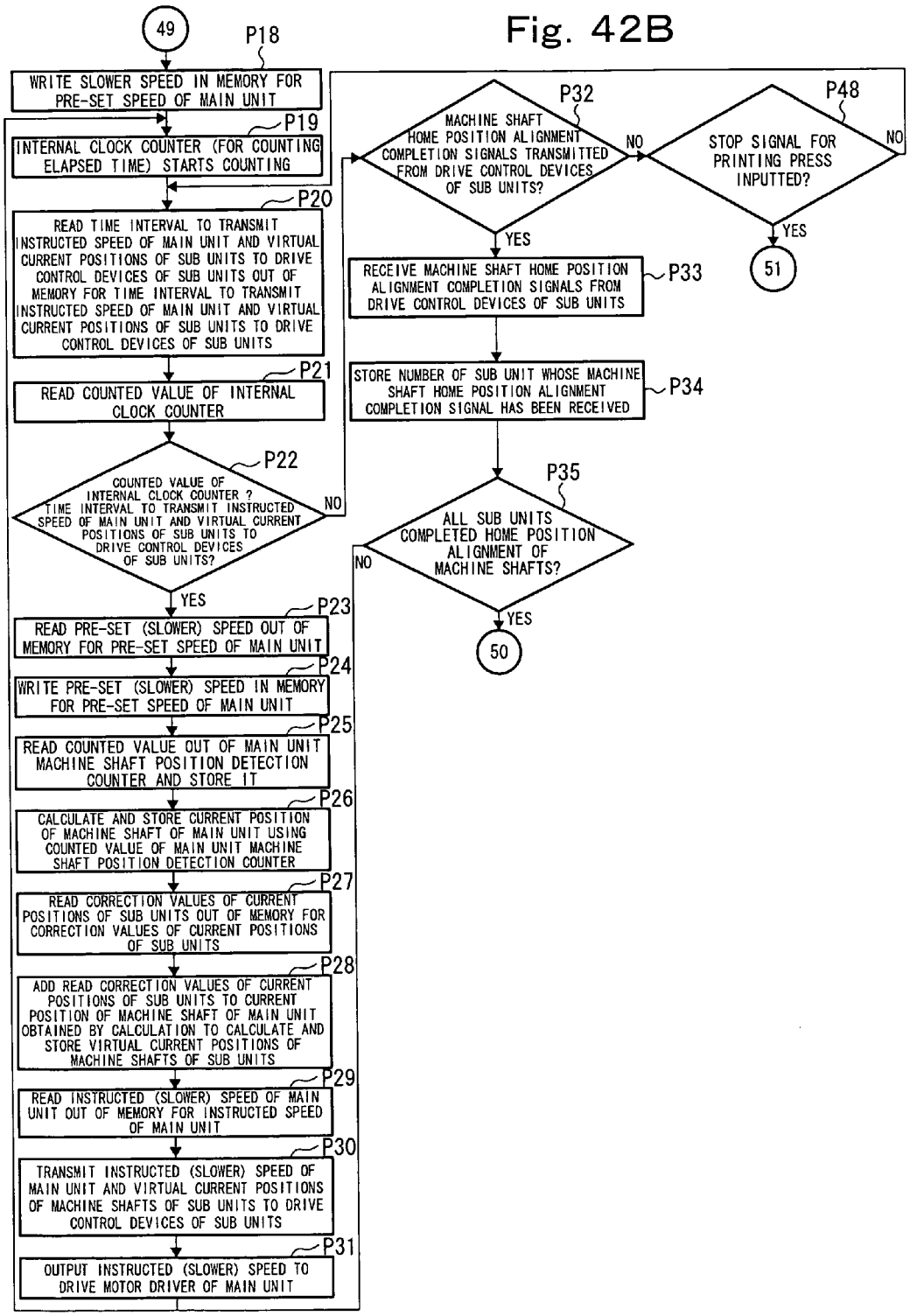
FIG. 42B is another operational flowchart of the drive control device for the main unit.
Figure 42C:
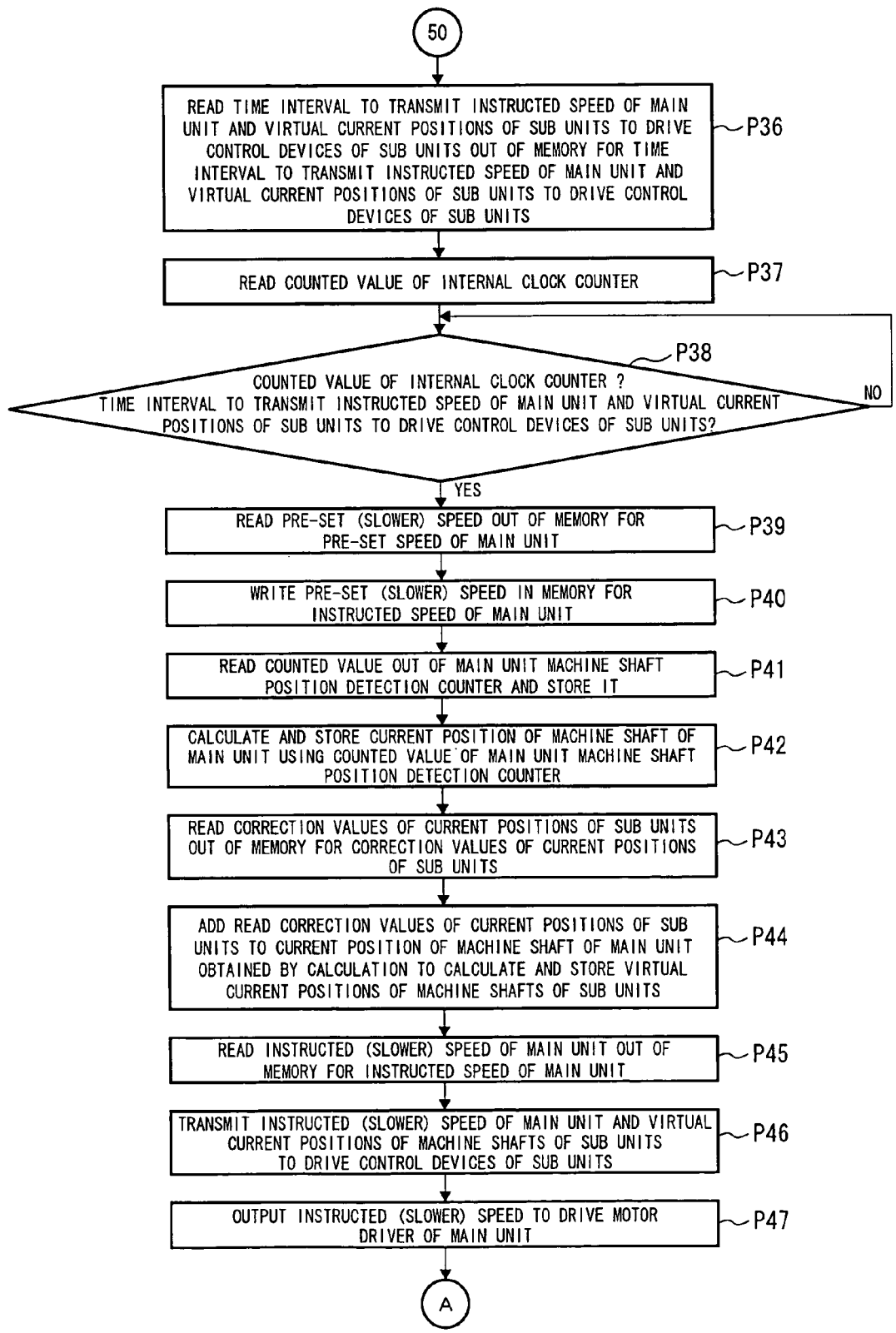
FIG. 42C is another operational flowchart of the drive control device for the main unit.
Figure 42D:
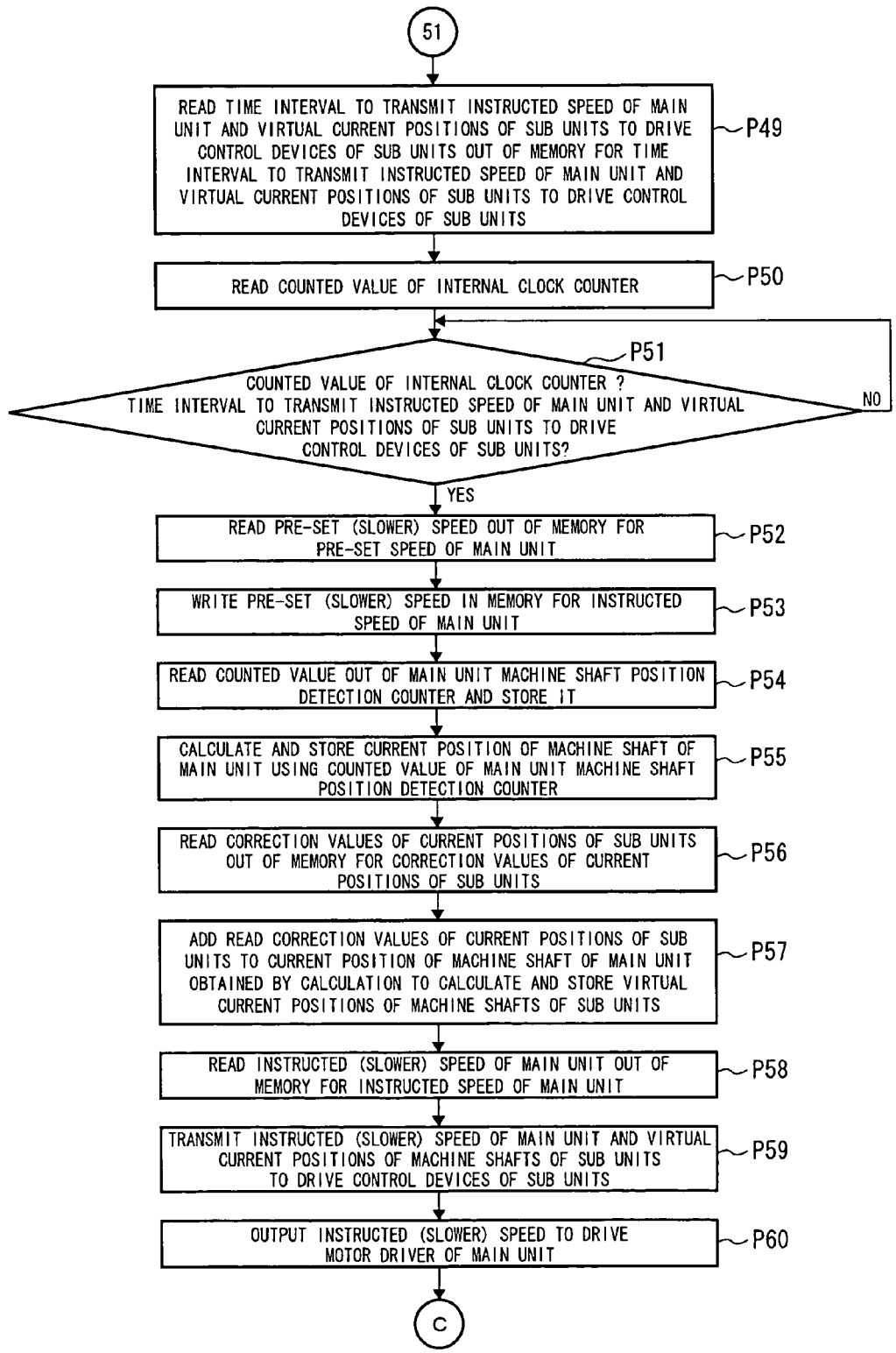
FIG. 42D is another operational flowchart of the drive control device for the main unit.
Figure 43A:
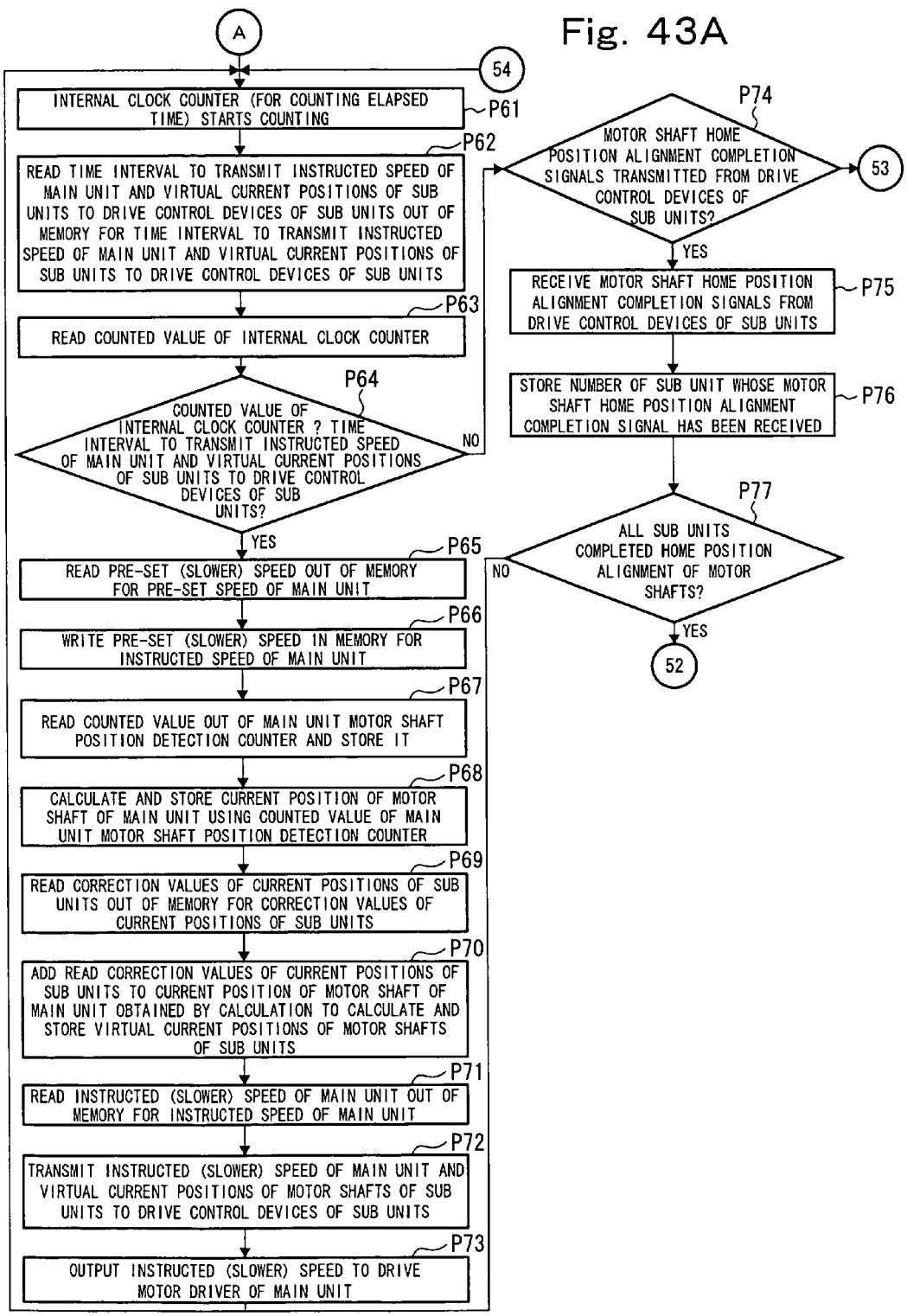
FIG. 43A is another operational flowchart of the drive control device for the main unit.
Figure 43B:
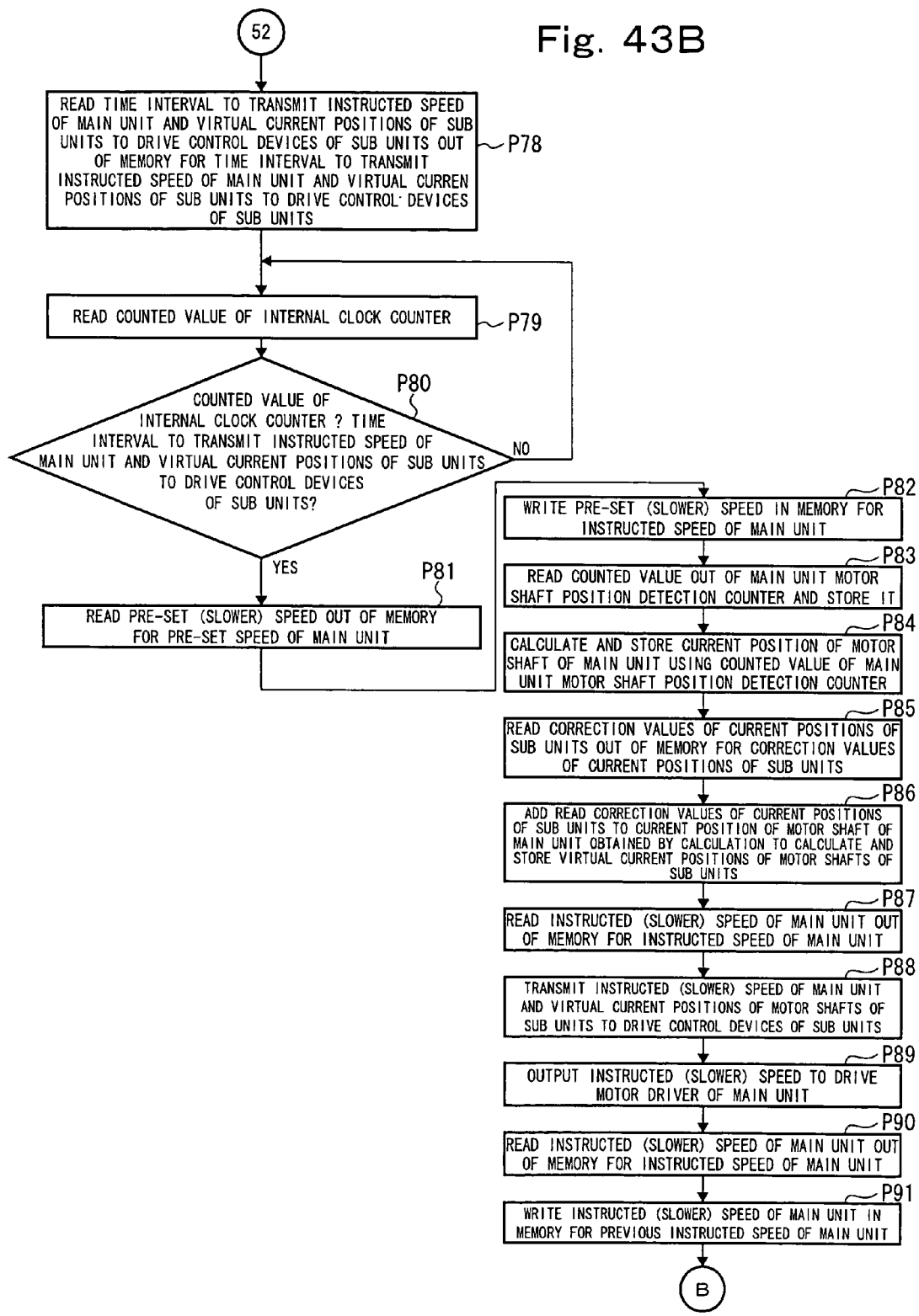
FIG. 43B is another operational flowchart of the drive control device for the main unit.
Figure 43C:
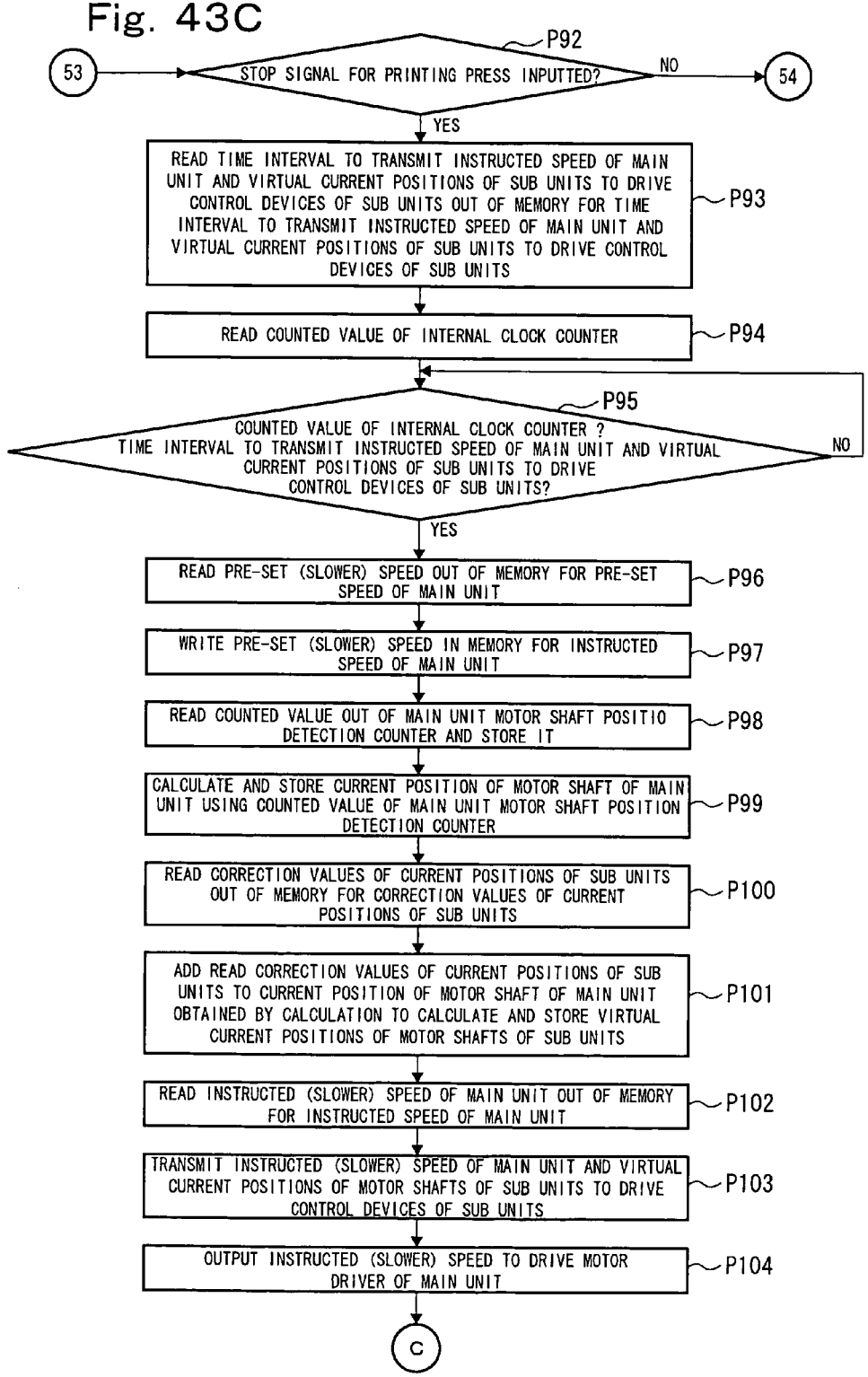
FIG. 43C is another operational flowchart of the drive control device for the main unit.
Figure 44A:
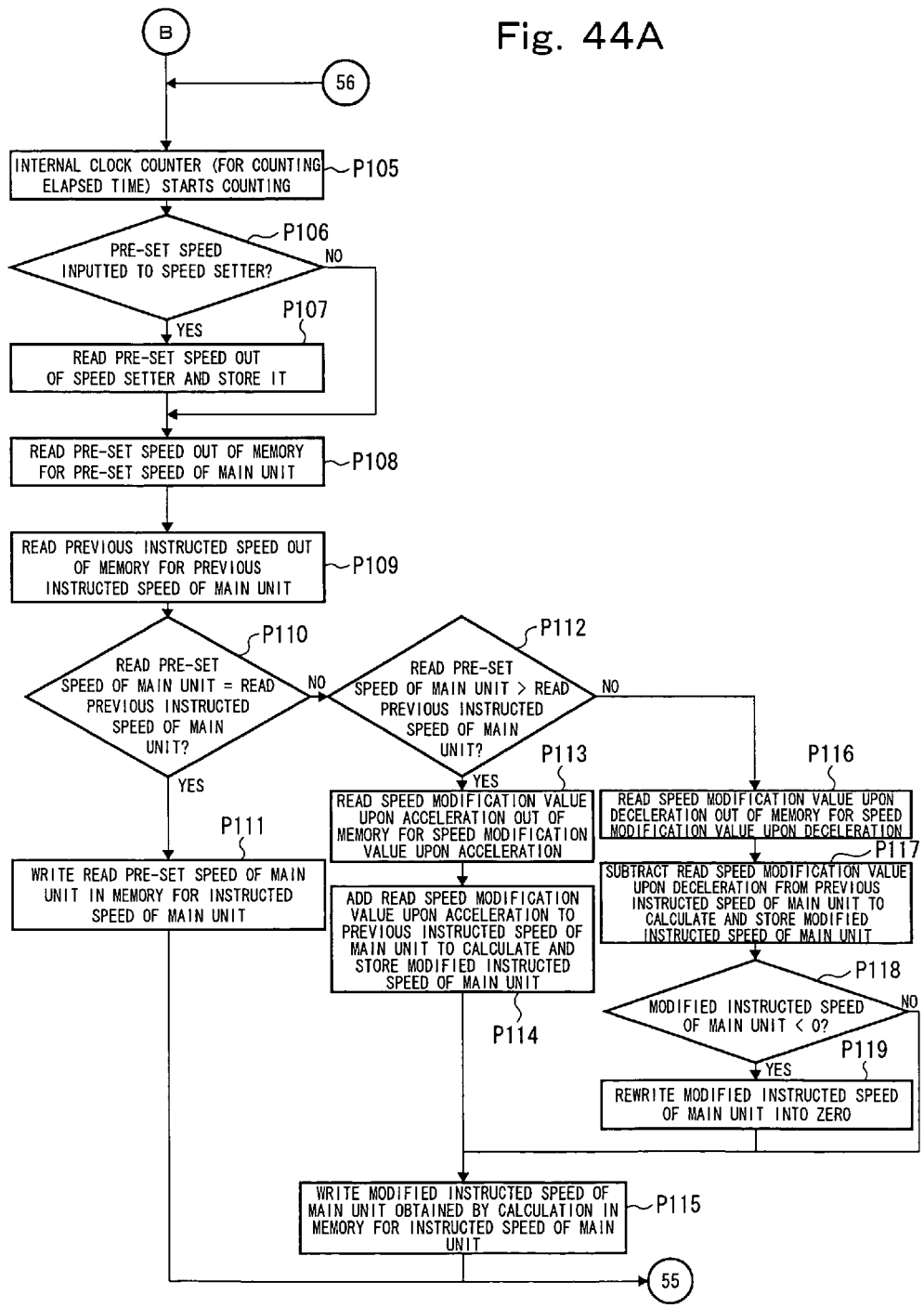
FIG. 44A is another operational flowchart of the drive control device for the main unit.
Figure 44B:
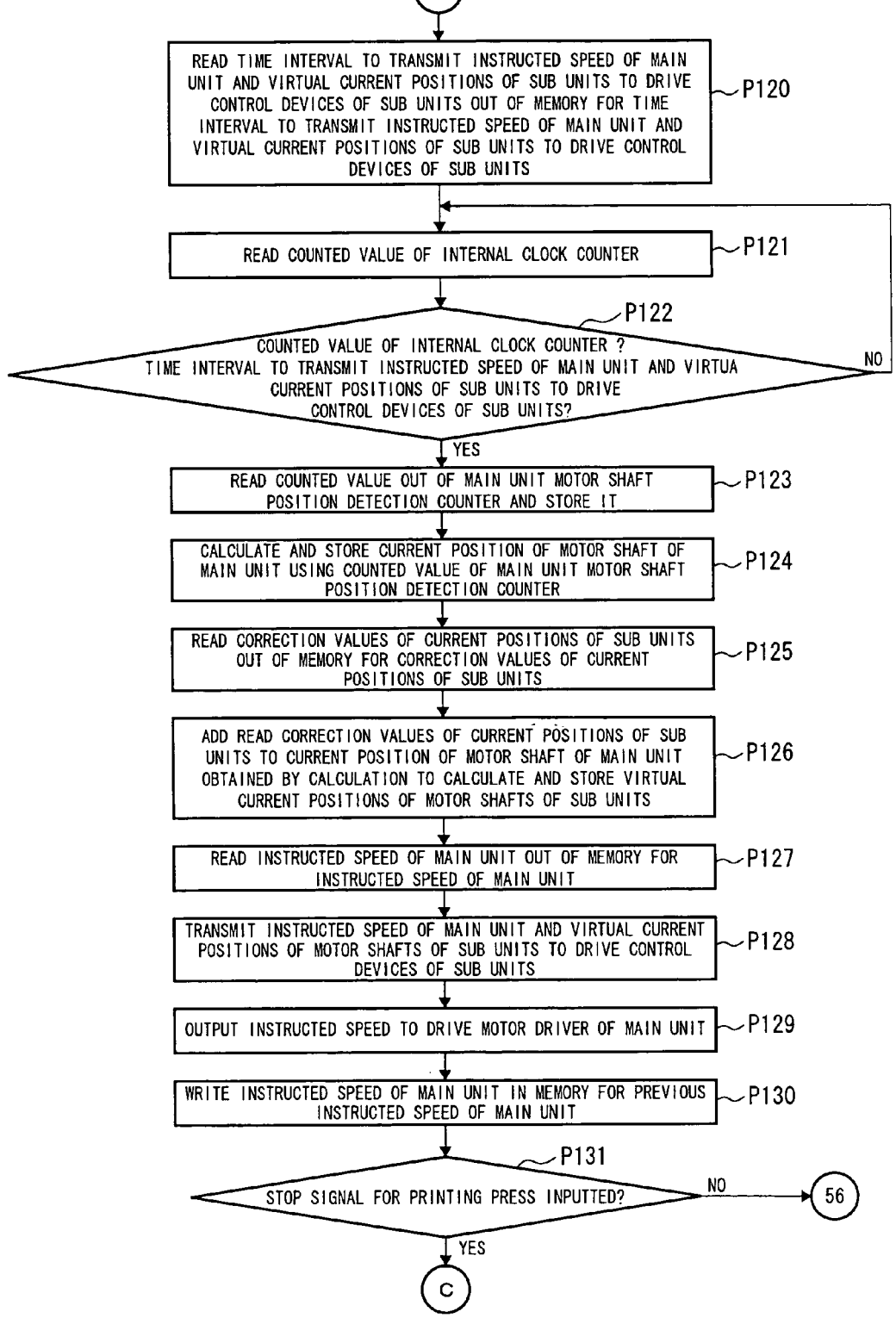
FIG. 44B is another operational flowchart of the drive control device for the main unit.
Figure 45A:
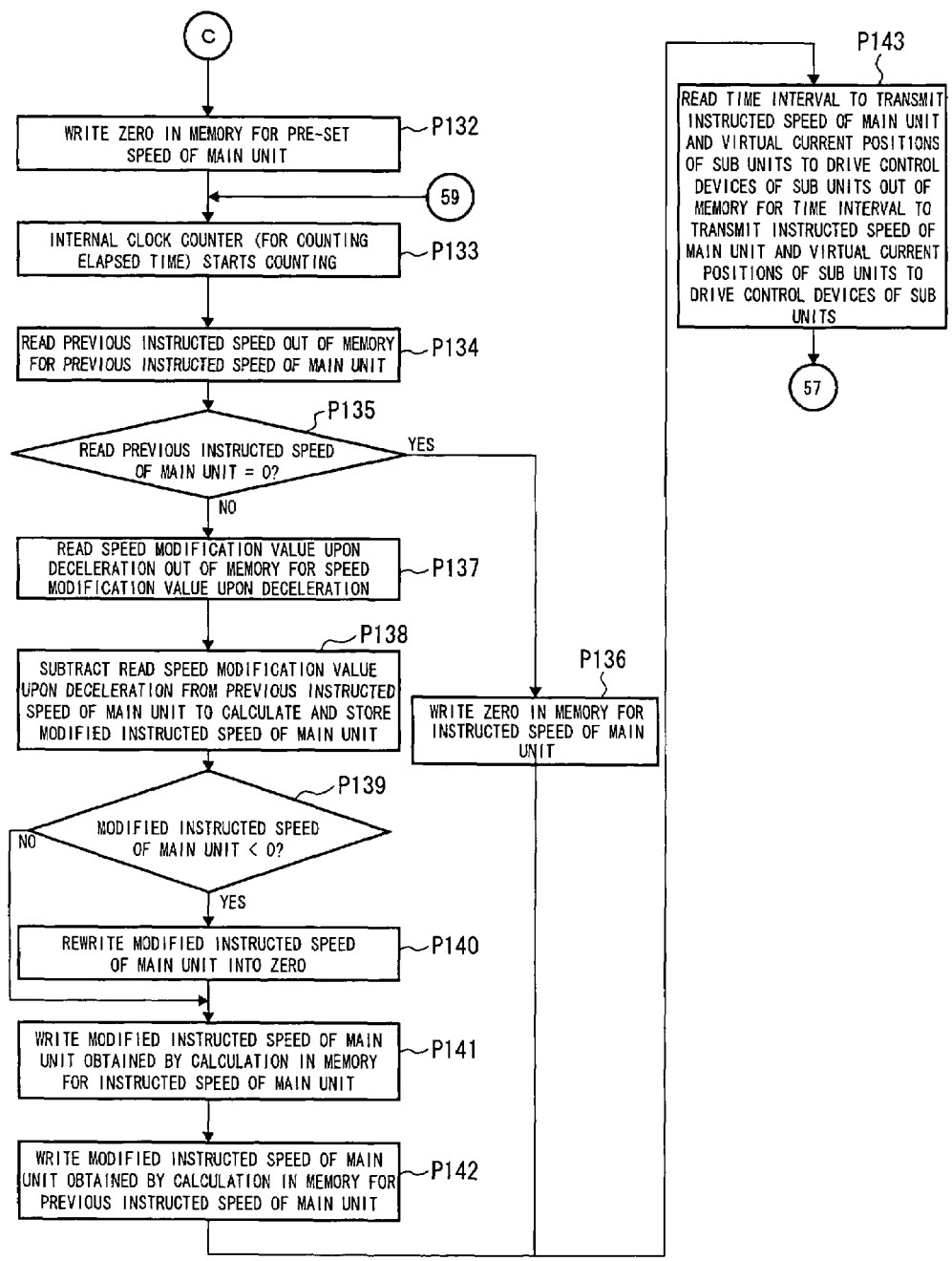
FIG. 45A is another operational flowchart of the drive control device for the main unit.
Figure 45B:
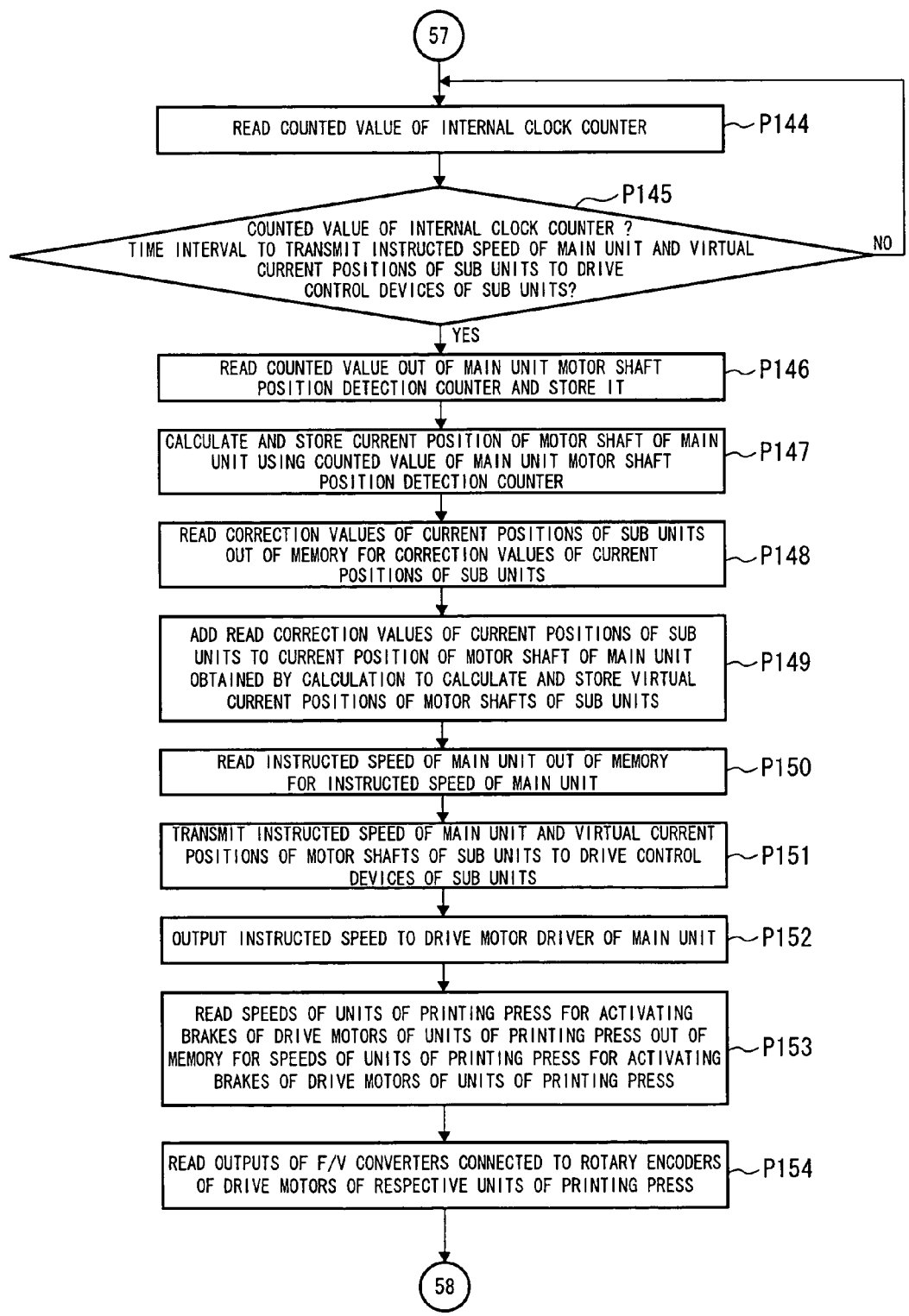
FIG. 45B is another operational flowchart of the drive control device for the main unit.
Figure 45C:
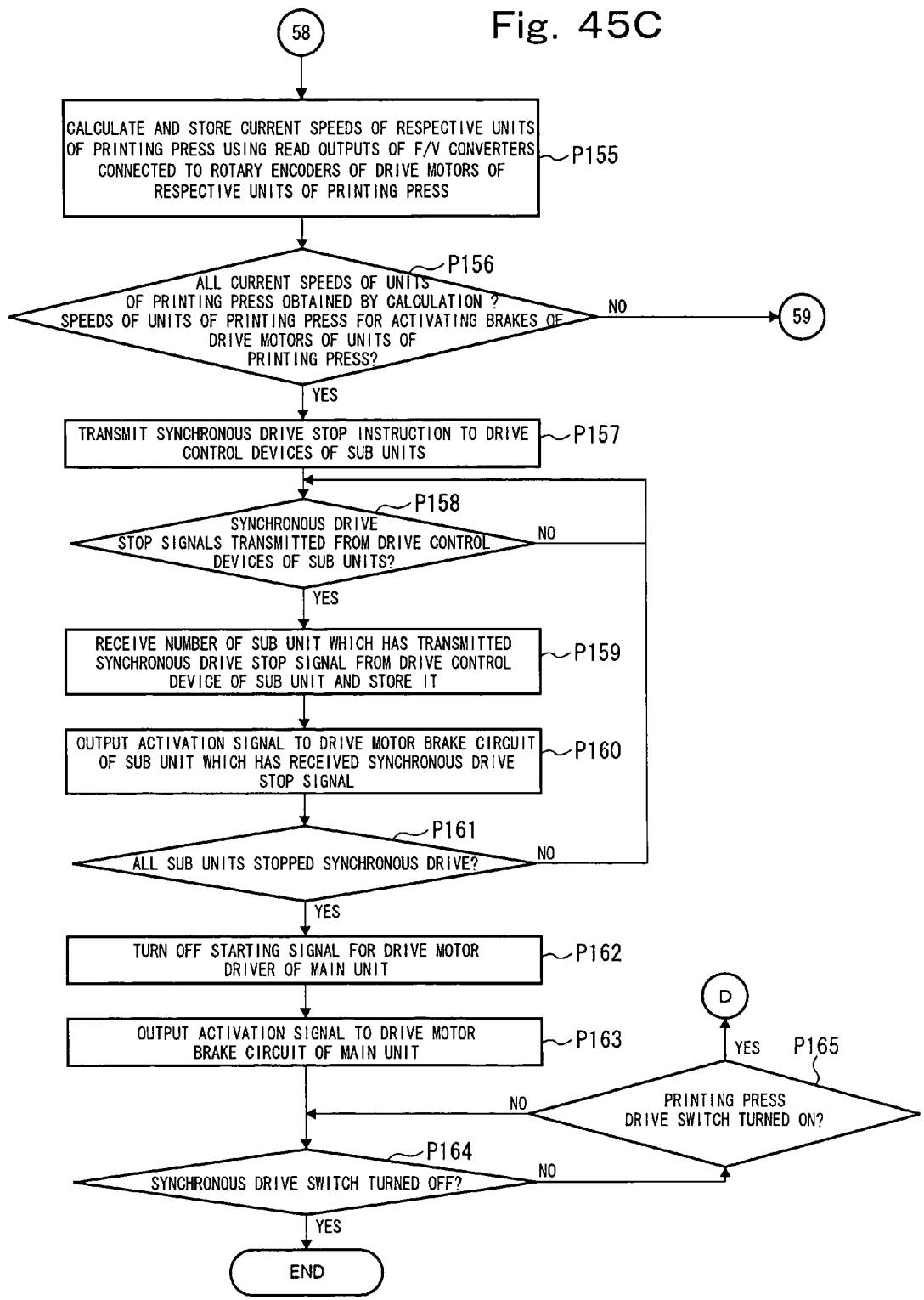
FIG. 45C is another operational flowchart of the drive control device for the main unit.
Figure 46A:
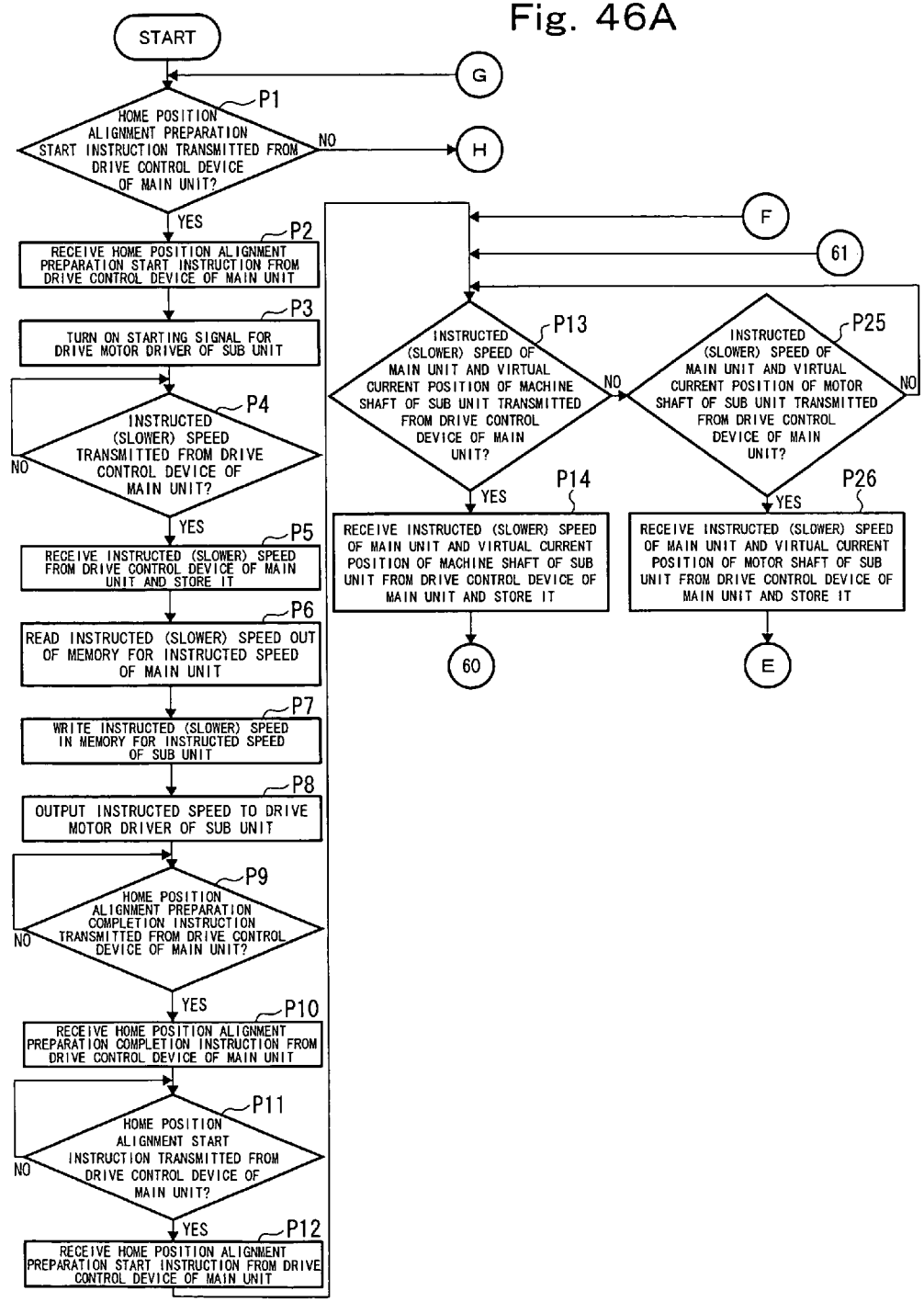
FIG. 46A is an operational flowchart of the drive control device for the sub unit.
Figure 46B:
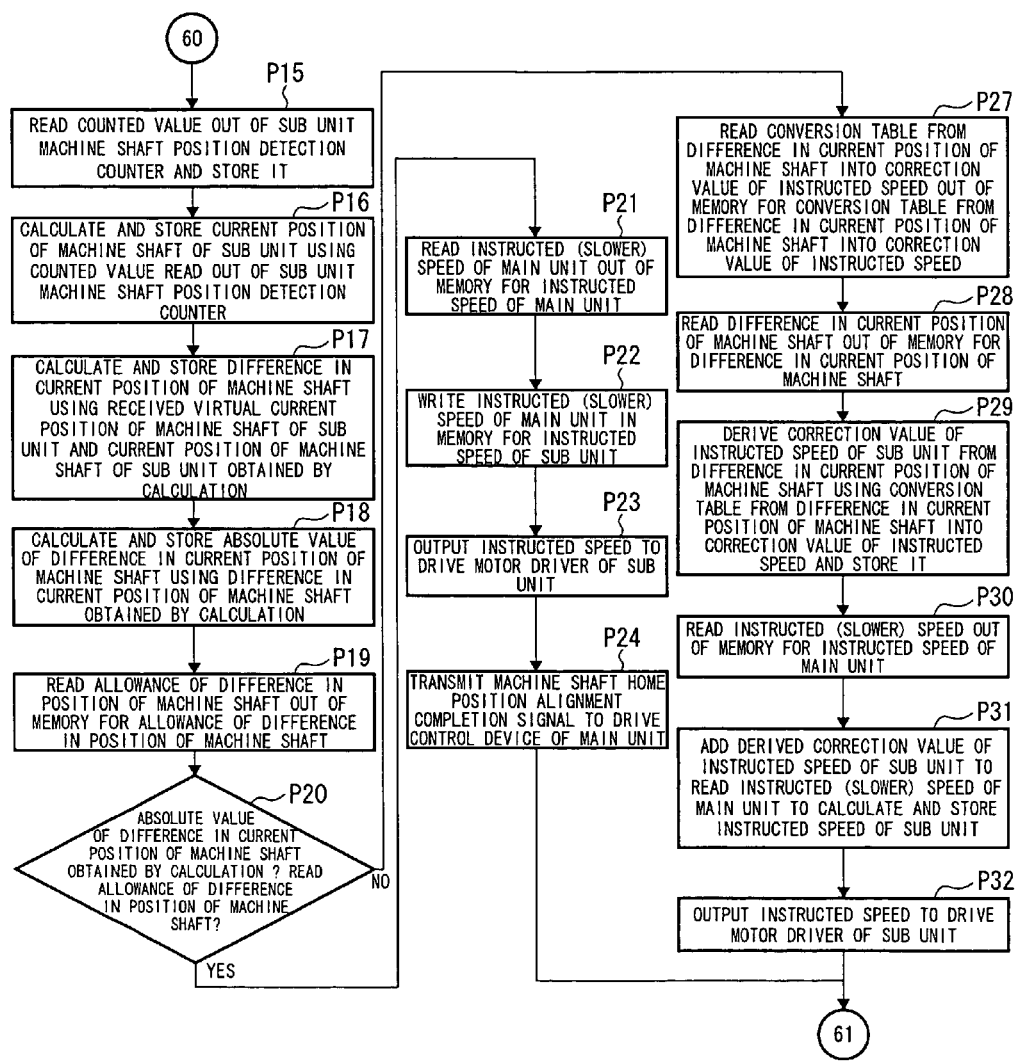
FIG. 46B is another operational flowchart of the drive control device for the sub unit.
Figure 47:
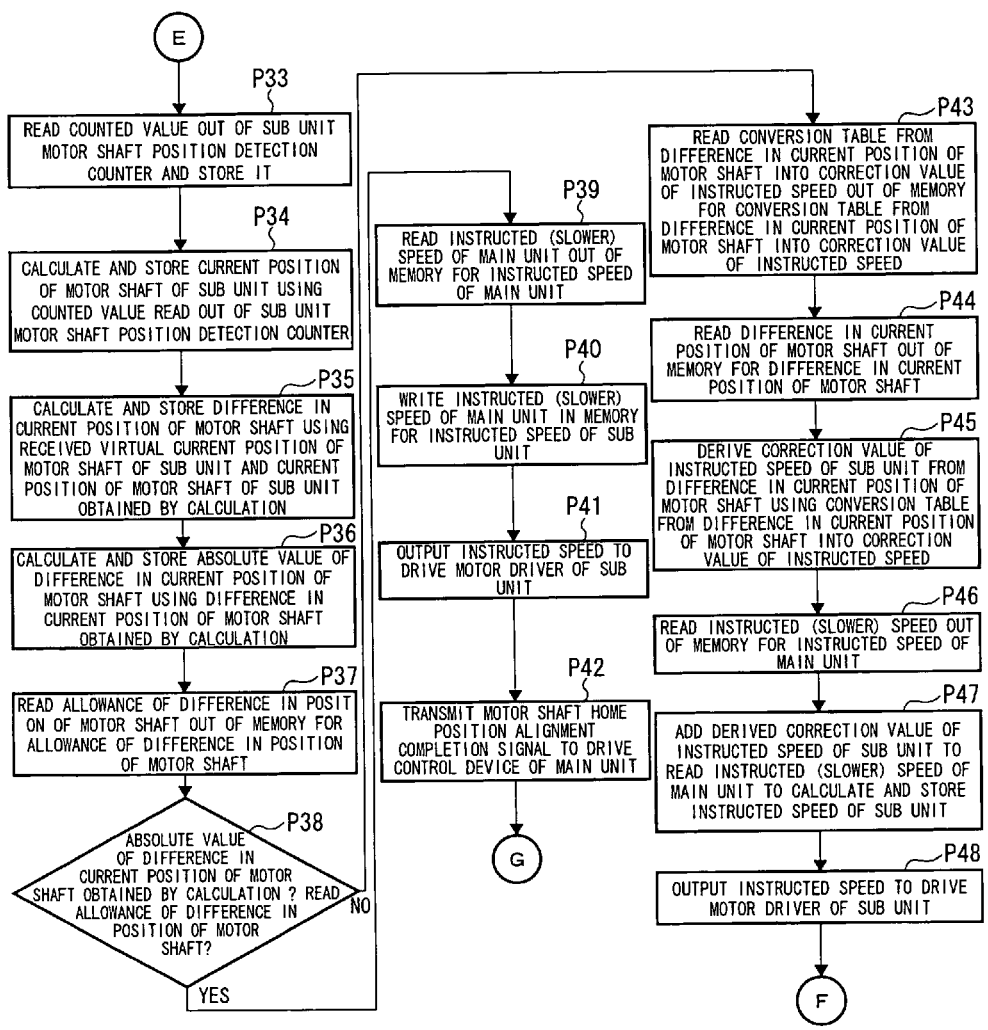
FIG. 47 is another operational flowchart of the drive control device for the sub unit.
Figure 48A:
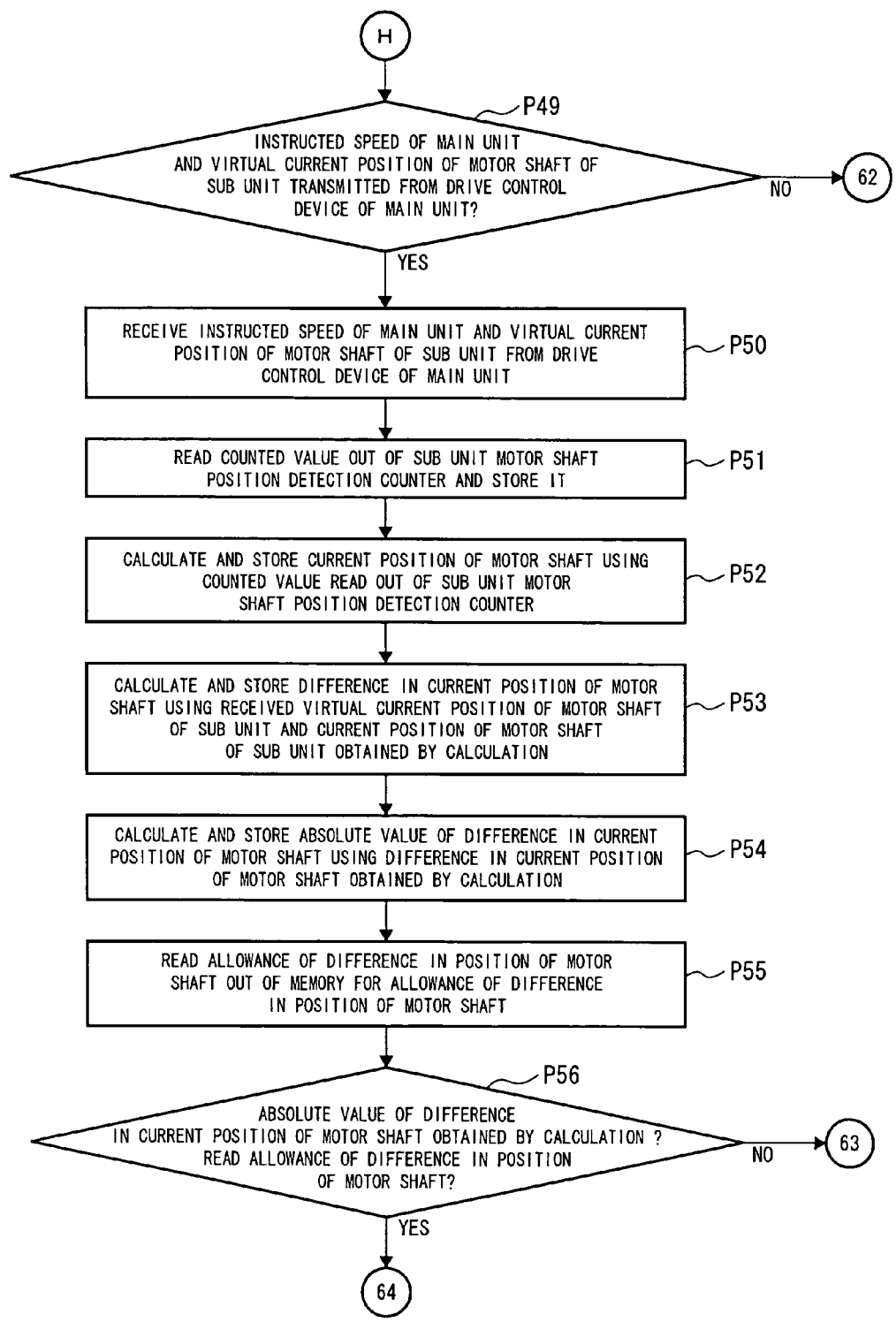
FIG. 48A is an operational flowchart of the drive control device for the sub unit.
Figure 48B:
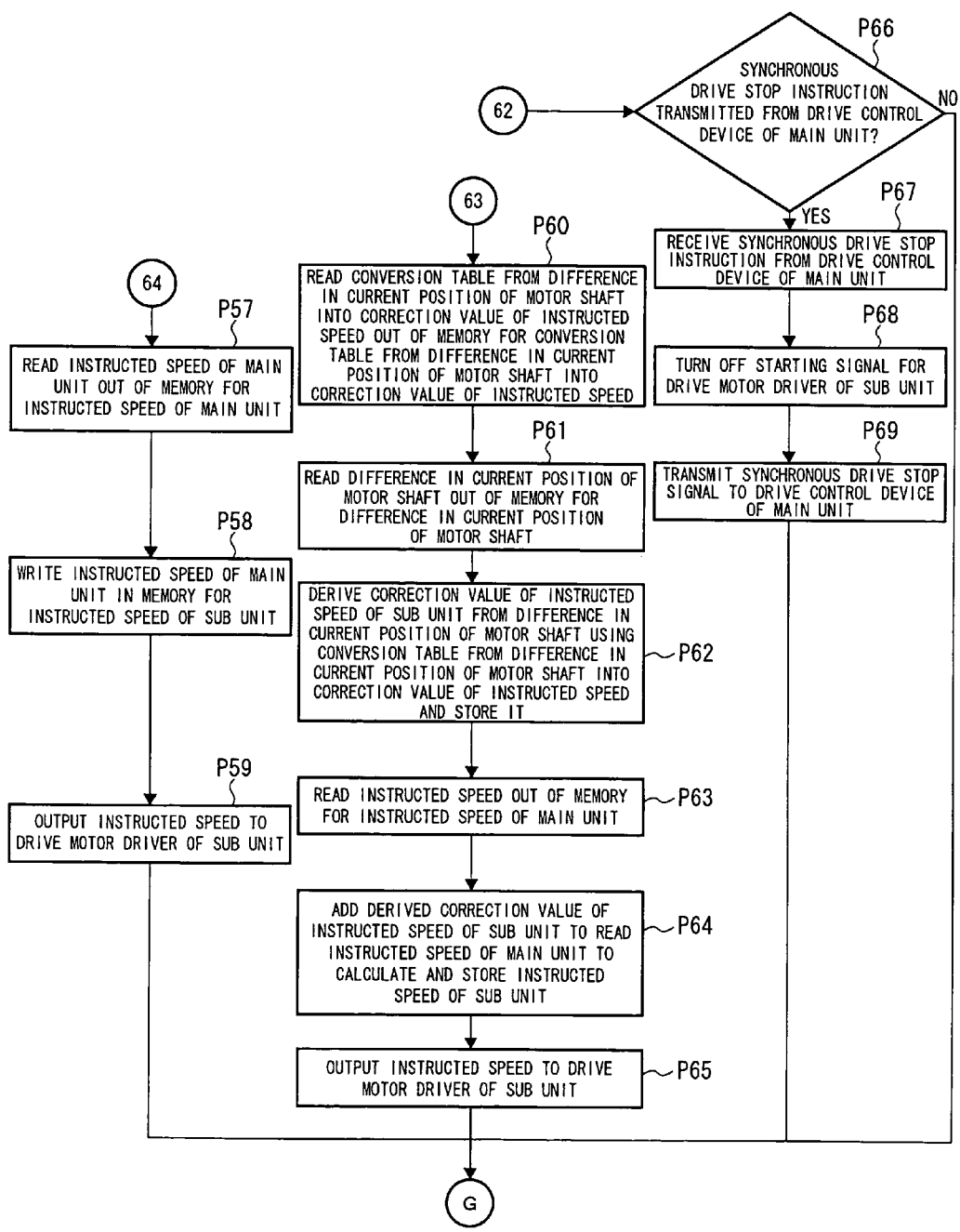
FIG. 48B is another operational flowchart of the drive control device for the sub unit.

FIG. 39 is a schematic configuration diagram of a device for synchronously controlling multiple units in a printing press showing a fourth embodiment of the present invention. FIG. 40 is a block diagram of a drive control device for a main unit. FIG. 41 is a block diagram of a drive control device for a sub unit. FIG. 42A is an operational flowchart of the drive control device for the main unit. FIG. 42B is another operational flowchart of the drive control device for the main unit. FIG. 42C is another operational flowchart of the drive control device for the main unit. FIG. 42D is another operational flowchart of the drive control device for the main unit. FIG. 43A is another operational flowchart of the drive control device for the main unit. FIG. 43B is another operational flowchart of the drive control device for the main unit. FIG. 43C is another operational flowchart of the drive control device for the main unit. FIG. 44A is another operational flowchart of the drive control device for the main unit. FIG. 44B is another operational flowchart of the drive control device for the main unit. FIG. 45A is another operational flowchart of the drive control device for the main unit. FIG. 45B is another operational flowchart of the drive control device for the main unit. FIG. 45C is another operational flowchart of the drive control device for the main unit. FIG. 46A is an operational flowchart of the drive control device for the sub unit. FIG. 46B is another operational flowchart of the drive control device for the sub unit. FIG. 47 is another operational flowchart of the drive control device for the sub unit. FIG. 48A is an operational flowchart of the drive control device for the sub unit. FIG. 48B is another operational flowchart of the drive control device for the sub unit.

As shown in FIG. 39, in a printing press constituted of a web-fed rotary printing press, a web W which is continuously supplied from a feeder 1 and an infeed unit 2 is firstly subjected to a variety of printing when the web W passes through first to fourth (printing) units 3 to 6 constituting sub units. Subsequently, the web W is heated and dried when the web W passes through a drier 7, and is then cooled down when the web W passes through a cooling unit 8. Thereafter, the web W is subjected to tension control or a direction change when the web W passes through a drag unit 9, and is then cut into predetermined pieces and folded by a folding machine 10 constituting a main unit.

The first to fourth units 3 to 6 and the folding machine 10 are independently driven by drive motors 26a to 26e. Drive motor brakes (braking means) 27a to 27e such as electromagnetic brakes for braking rotation of the drive motors 26a to 26e, and rotary encoders (speed detecting means) 29a to 29e for detecting rotation speeds of the drive motors 26a to 26e are attached to these drive motors 26a to 26e. Moreover, the drive motors 26a to 26d of the first to fourth units 3 to 6 are subjected to drive control by drive control devices 30a to 30d of the sub units, while the drive motor 26e of the folding machine 10 is subjected to drive control by a drive control device 31 of the main unit, respectively. Detection signals of the rotary encoders 29a to 29e are inputted to these drive control devices 30a to 30d and 31, and detection signals from machine home position detectors 28a to 28e attached to machine shafts (not shown) of the first to fourth units 3 to 6 and of the folding machine 10 are also inputted thereto.

Moreover, the drive control devices 30a to 30d of the sub units are connected to the drive control device 31 of the main unit, and the first to fourth units 3 to 6 as the sub units are synchronously controlled (driven) with respect to the folding machine 10 as the main unit by this drive control device 31 of the main unit.

As shown in FIG. 40, the drive control device 31 of the main unit includes a CPU 150, a ROM 151, a RAM 152, a memory 153 for a slower speed, a memory 154A for a pre-set speed of the main unit, a memory 155A for an instructed speed of the main unit, a memory 156 for home position alignment preparation time, a memory 157A for a time interval to transmit the instructed speed of the main unit and virtual current positions of the sub units to the drive control devices of the sub units, a memory 158A for a counted value of a main unit machine shaft position detection counter, a memory 159A for a current position of the machine shaft of the main unit, a memory 160A for correction values of current positions of the sub units, a memory 161A for virtual current positions of machine shafts of the sub units, a memory 162A for a number of the sub unit whose machine shaft home position alignment completion signal has been received, a memory 163A for a counted value of a main unit motor shaft position detection counter, a memory 164A for a current position of a motor shaft of the main unit, a memory 165A for virtual current positions of motor shafts of the sub units, a memory 166A for a number of the sub unit whose motor shaft home position alignment completion signal has been received, a memory 167A for a previous instructed speed of the main unit, a memory 168A for a speed modification value upon acceleration, a memory 169A for a speed modification value upon deceleration, a memory 170A for a modified instructed speed of the main unit, a memory 171A for speeds of the units in the printing press for activating brakes of the drive motors of the units of the printing presses, a memory 172A for current speeds of the respective units in the printing presses, a memory 173A for a number of the sub unit which has received a synchronous control stop signal, and an internal clock counter 174, which are connected to one another by a bus 183 together with respective input and output devices 175 to 181 and an interface 182.

An input device 184 such as a keyboard or various switches and buttons, a display 185 such as a CRT or a lamp, and an output device 186 such as a printer or a FD drive are connected to the input and output device 175. A speed setter 187 is connected to the input and output device 176. A drive motor driver 189A of the main unit is connected to the input and output device 177 through a D/A converter 188, and the drive motor 26e of the main unit and the rotary encoder 29e for the drive motor of the main unit are connected to this drive motor driver 189A. The rotary encoder 29e for the drive motor of the main unit is connected to the input and output device 178 through an A/D converter 190 and a F/V converter 191, and the rotary encoders 29a to 29d for the drive motors of the first to fourth sub units are similarly connected thereto through A/D converters 192a to 192d and F/V converters 193a to 193d. A main unit machine shaft position detection counter 194A is connected to the input and output device 179, and the rotary encoder 29e for the drive motor of the main unit and the machine home position detector 28e of the main unit are connected to this counter 194A. A main unit motor shaft position detection counter 195A is connected to the input and output device 180, and the rotary encoder 29e for the drive motor of the main unit is connected to this counter 195A. The drive motor brake 27e of the main unit is connected to the input and output device 181 through a drive motor brake circuit 196A of the main unit, and the drive motor brakes 27a to 27d of the first to fourth sub units are also connected thereto through drive motor brake circuits 197a to 197d of the first to fourth sub units. Moreover, the drive control devices 30a to 30d of the sub units to be described later are connected to the interface 182.

As shown in FIG. 41, each of the drive control devices 30a to 30d of the sub units includes a CPU 200, a ROM 201, a RAM 202, a memory 203A for an instructed speed of the main unit, a memory 204A for an instructed speed of the sub unit, a memory 205A for a virtual current position of the machine shaft of the sub unit, a memory 206A for a counted value of a sub unit machine shaft position detection counter, a memory 207A for a current position of the machine shaft of the sub unit, a memory 208A for a difference in the current position of the machine shaft, a memory 209A for an absolute value of the difference in the current position of the machine shaft, a memory 210A for an allowance of the difference in the position of the machine shaft, a memory 211A for a conversion table from the difference in the current position of the machine shaft into a correction value of the instructed speed, a memory 212A for a correction value of the instructed speed of the sub unit, a memory 213A for a virtual current position of a motor shaft of the sub unit, a memory 214A for a counted value of a sub unit motor shaft position detection counter, a memory 215A for a current position of a motor shaft of the sub unit, a memory 216A for a difference in the current position of the motor shaft, a memory 217 for an absolute value of the difference in the current position of the motor shaft, a memory 218 for an allowance of the difference in the position of the motor shaft, a memory 219 for a conversion table from the difference in the current position of the motor shaft into the correction value of the instructed speed, and an internal clock counter 220, which are connected to one another by a bus 229 together with respective input and output devices 221 to 227 and an interface 228.

An input device 230 such as a keyboard or various switches and buttons, a display 231 such as a CRT or a lamp, and an output device 232 such as a printer or a FD drive are connected to the input and output device 221. A speed setter 233 is connected to the input and output device 222. A drive motor driver 235A of the first sub unit is connected to the input and output device 223 through a D/A converter 234, and the drive motor 26a of the first sub unit and the rotary encoder 29a for the drive motor of the first sub unit are connected to this drive motor driver 235A. The rotary encoder 29a for the drive motor of the first sub unit is connected to the input and output device 224 through an A/D converter 236 and an F/V converter 237. A first sub unit machine shaft position detection counter 238A is connected to the input and output device 225, and the rotary encoder 29a for the drive motor of the first sub unit and the machine home position detector 28a of the first sub unit are connected to this counter 238A. A first sub unit motor shaft position detection counter 239A is connected to the input and output device 226, and the rotary encoder 29a for the drive motor of the first sub unit is connected to this counter 239A. The drive motor brake 27a of the first sub unit is connected to the input and output device 227 through a drive motor brake circuit 240A of the first sub unit. Moreover, the above-described drive control device 31 of the main unit is connected to the interface 228.

Based on the above-described configurations, the drive control device 31 of the main unit is firstly operated in accordance with operational flows shown in FIG. 42A, FIG. 42B, FIG. 42C, FIG. 42D, FIG. 43A, FIG. 43B, FIG. 43C, FIG. 44A, FIG. 44B, FIG. 45A, FIG. 45B, and FIG. 45C in order to perform synchronous control of the first to fourth units 3 to 6 as the sub units with respect to the folding machine 10 as the main unit.

Specifically, when a synchronous drive switch is turned on in Step P1 and a printing press drive switch is turned on in Step P2, an operation release signal is outputted to the drive motor brake circuits 196A, and 197a to 197d of the respective units in Step P3. Next, when a starting signal for the drive motor driver 189A of the main unit is turned on in Step P4, a home position alignment preparation start instruction is transmitted to the drive control devices 30a to 30d of the sub units in Step P5. Next, when a slower speed is read out of the memory 153 for a slower speed in Step P6, the slower speed is written in the memory 154A for a pre-set speed of the main unit in Step P7. Next, when the slower speed is written in memory 155A for an instructed speed of the main unit in Step P8, the instructed (slower) speed is transmitted to the drive control devices 30a to 30d of the sub units in Step P9. Next, when the instructed (slower) speed is outputted to the drive motor driver 189A of the main unit in Step P10, the internal clock counter (for counting elapsed time) 174 starts counting in Step P11. Next, when home position alignment preparation time is read out of the memory 156 for home position alignment preparation time in Step P12, the counted value of the internal clock counter 174 is read out in Step P13.

When the counted value of the internal clock counter 174 becomes equal to or greater than the home position alignment preparation time in Step P14, a home position alignment preparation completion instruction is transmitted to the drive control devices 30a to 30d of the sub units in Step P15. Next, when the home position alignment preparation start instruction is transmitted to the drive control devices 30a to 30d of the sub units in Step P16, the slower speed is read out of the memory 153 for a slower speed in Step P17. Next, when the slower speed is written in the memory 154A for a pre-set speed of the main unit in Step P18, the internal clock counter (for counting elapsed time) 174 starts counting in Step P19. Next, when a time interval to transmit the instructed speed of the main unit and virtual current positions of the sub units to the drive control devices 30a to 30d of the sub units is read out of the memory 157A for a time interval to transmit the instructed speed of the main unit and virtual current positions of the sub units to the drive control devices of the sub units in Step P20, the counted value of the internal clock counter 174 is read out in Step P21.

Next, a judgment is made in Step P22 as to whether or not the counted value of the internal clock counter 174 is equal to or greater than the time interval to transmit the instructed speed of the main unit and the virtual current positions of the sub units to the drive control devices 30a to 30d of the sub units. If the result is YES, the pre-set (slower) speed is read out of the memory 154A for a pre-set speed of the main unit in Step P23. Next, when the pre-set (slower) speed is written in the memory 155A for an instructed speed of the main unit in Step P24, a counted value is read out of the main unit machine shaft position detection counter 194A, and is stored in Step P25. Next, when a current position of the machine shaft of the main unit is calculated by use of the counted value of the main unit machine shaft position detection counter 194A and is stored in Step P26, correction values of current positions of the sub units are read out of the memory 160A for correction values of current positions of the sub units in Step P27.

Next, when the correction values of the current positions of the sub units thus read out are added to the current position of the machine shaft of the main unit obtained by the calculation, and virtual current positions of the machine shafts of the sub units are calculated and stored in Step P28, the instructed (slower) speed of the main unit is read out of the memory 155A for an instructed speed of the main unit in Step P29. Next, when the instructed (slower) speed of the main unit and the virtual current positions of the machine shafts of the sub units are transmitted to the drive control devices 30a to 30d of the sub units in Step P30, the instructed (slower) speed is outputted to the drive motor driver 189A of the main unit in Step P31. Thereafter, the operation returns to Step P19.

If the result is NO in the above-described Step P22, a judgment is made in Step P32 as to whether or not machine shaft home position alignment completion signals have been transmitted from the drive control devices 30a to 30d of the sub units. If the result is YES, the machine shaft home position alignment completion signals are received from the drive control devices 30a to 30d of the sub units in Step P33. Next, when a number of the sub unit whose machine shaft home position alignment completion signal has been received is stored in Step P34, a judgment is made in Step P35 as to whether or not machine shaft home position alignment is completed in terms of all the sub units. If the result is NO, the operation returns to the above-described Step P19.

On the other hand, if the result is YES, the time interval to transmit the instructed speed of the main unit and the virtual current positions of the sub units to the drive control devices 30a to 30d of the sub units is read out of the memory 157A for a time interval to transmit the instructed speed of the main unit and virtual current positions of the sub units to the drive control devices of the sub units in Step P36. Then, the counted value of the internal clock counter 174 is read out in Step P37. Next, when the counted value of the internal clock counter 174 becomes equal to or greater than the time interval to transmit the instructed speed of the main unit and the virtual current positions of the sub units to the drive control devices 30a to 30d of the sub units in Step P38, the pre-set (slower)

speed is read out of the memory 154A for a pre-set speed of the main unit in Step P39. Next, when the pre-set (slower) speed is written in the memory 155A for an instructed speed of the main unit in Step P40, the counted value is read out of the main unit machine shaft position detection counter 194A, and is stored in Step P41. Next, when the current position of the machine shaft of the main unit is calculated by use of the counted value of the main unit machine shaft position detection counter 194A and is stored in Step P42, the correction values of the current positions of the sub units are read out of the memory 160A for correction values of current positions of the sub units in Step P43.

Next, when the correction values of the current positions of the sub units thus read out are added to the current position of the machine shaft of the main unit obtained by the calculation, and the virtual current positions of the machine shafts of the sub units are calculated and stored in Step P44, the instructed (slower) speed of the main unit is read out of the memory 155A for an instructed speed of the main unit in Step P45. Next, when the instructed (slower) speed of the main unit and the virtual current positions of the machine shafts of the sub units are transmitted to the drive control devices 30a to 30d of the sub units in Step P46, the instructed (slower) speed is outputted to the drive motor driver 189A of the main unit in Step P47. Thereafter, the operation goes to Step P61 to be described later.

If the result is NO in the above-described Step P32, a judgment is made in Step P48 as to whether or not a stop signal for the printing press has been inputted. Here, if the result is NO, the operation returns to Step P20. If the result is YES, the time interval to transmit the instructed speed of the main unit and the virtual current positions of the sub units to the drive control devices 30a to 30d of the sub units is read out of the memory 157A for a time interval to transmit the instructed speed of the main unit and a virtual current positions of the sub units to the drive control devices of the sub units in Step P49, and then the counted value of the internal clock counter 174 is read out in Step P50. Next, when the counted value of the internal clock counter 174 becomes equal to or greater than the time interval to transmit the instructed speed of the main unit and the virtual current positions of the sub units to the drive control devices 30a to 30d of the sub units in Step P51, the pre-set (slower) speed is read out of the memory 154A for a pre-set speed of the main unit in Step P52. Next, when the pre-set (slower) speed is written in memory 155A for an instructed speed of the main unit in Step P53, the counted value is read out of the main unit machine shaft position detection counter 194A and is stored in Step P54. Next, when the current position of the machine shaft of the main unit is calculated by use of the counted value of the main unit machine shaft position detection counter 194 and is stored in Step P55, the correction values of the current positions of the sub units are read out of the memory 160A for correction values of current positions of the sub units in Step P56.

Next, when the correction values of the current positions of the sub units thus read out are added to the current position of the machine shaft of the main unit obtained by the calculation, and the virtual current positions of the machine shafts of the sub units are calculated and stored in Step P57, the instructed (slower) speed of the main unit is read out of the memory 155A for an instructed speed of the main unit in Step P58. Next, when the instructed (slower) speed of the main unit and the virtual current positions of the machine shafts of the sub units are transmitted to the drive control devices 30a to 30d of the sub units in Step P59, the instructed (slower) speed is outputted to the drive motor driver 189A of the main unit in Step P60. Thereafter, the operation goes to Step P131 to be described later.

The internal clock counter. (for counting elapsed time) 174 starts counting in the above-mentioned Step P61. Next, when the time interval to transmit the instructed speed of the main unit and the virtual current positions of the sub units to the drive control devices 30a to 30d of the sub units is read out of the memory 157A for a time interval to transmit the instructed speed of the main unit and virtual current positions of the sub units to the drive control devices of the sub units in Step P62, the counted value of the internal clock counter 174 is read out in Step P63. Next, when the counted value of the internal clock counter 174 becomes equal to or greater than the time interval to transmit the instructed speed of the main unit and the virtual current positions of the sub units to the drive control devices 30a to 30d of the sub units in Step P64, the pre-set (slower) speed is read out of the memory 154A for a pre-set speed of the main unit in Step P65. Next, when the pre-set (slower) speed is written in memory 155A for an instructed speed of the main unit in Step P66, a counted value is read out of the main unit motor shaft position detection counter 195A and is stored in Step P67. Next, a current position of a motor shaft of the main unit is calculated by use of the counted value of the main unit motor shaft position detection counter 195A and is stored in Step P68, the correction values of the current positions of the sub units are read out of the memory 160A for correction values of current positions of the sub units in Step P69.

Next, when the correction values of the current positions of the sub units thus read out are added to the current position of the motor shaft of the main unit obtained by the calculation, and virtual current position of motor shafts of the sub units are calculated and stored in Step P70, the instructed (slower) speed of the main unit is read out of the memory 155A for an instructed speed of the main unit in Step P71. Next, when the instructed (slower) speed of the main unit and the virtual current positions of the motor shafts of the sub units are transmitted to the drive control devices 30a to 30d of the sub units in Step P72, the instructed (slower) speed is outputted to the drive motor driver 189A of the main unit in Step P73. Thereafter, the operation goes to the above-described Step P61.

If the result is NO in the above-described Step P64, a judgment is made in Step P74 as to whether or not motor shaft home position alignment completion signals have been transmitted from the drive control devices 30a to 30d of the sub units. If the result is YES, the motor shaft home position alignment completion signals are received from the drive control devices 30a to 30d of the sub units in Step P75. Next, when a number of the sub unit whose motor shaft home position alignment completion signal has been received is stored in Step P76, a judgment is made in Step P77 as to whether or not motor shaft home position alignment is completed in terms of all the sub units. If the result is NO, the operation returns to the above-described Step P61.

On the other hand, if the result is YES, the time interval to transmit the instructed speed of the main unit and the virtual current positions of the sub units to the drive control devices 30a to 30d of the sub units is read out of the memory 157A for a time interval to transmit the instructed speed of the main unit and virtual current positions of the sub units to the drive control devices of the sub units in Step P78. Then, the counted value of the internal clock counter 174 is read out in Step P79. Next, when the counted value of the internal clock counter 174 becomes equal to or greater than the time interval to transmit the instructed speed of the main unit and the virtual current positions of the sub units to the drive control devices 30a to 30d of the sub units in Step P80, the pre-set (slower) speed is read out of the memory 154A for a pre-set speed of the main unit in Step P81. Next, when the pre-set (slower) speed is written in the memory 155A for an instructed speed of the main unit in Step P82, the counted value is read out of the main unit motor shaft position detection counter 195A, and is stored in Step P83. Next, when the current position of the motor shaft of the main unit is calculated by use of the counted value of the main printing press motor shaft position detection counter195A and is stored in Step P84, the correction values of the current positions of the sub units are read out of the memory 160A for correction values of current positions of the sub units in Step P85.

Next, when the correction values of the current positions of the sub units thus read out are added to the current position of the motor shaft of the main unit obtained by the calculation, and the virtual current positions of the motor shafts of the sub units are calculated and stored in Step P86, the instructed (slower) speed of the main unit is read out of the memory 155A for an instructed speed of the main unit in Step P87. Next, when the instructed (slower) speed of the main unit and the virtual current positions of the motor shafts of the sub units are transmitted to the drive control devices 30a to 30d of the sub units in Step P88, the instructed (slower) speed is outputted to the drive motor driver 189A of the main unit in Step P89. Next, when the instructed (slower) speed of the main unit is read out of the memory 155A for an instructed speed of the main unit in Step P90, the instructed (slower) speed is written in the memory 167A for a previous instructed speed of the main unit in Step P91. Thereafter, the operation goes to Step P105 to be described later.

If the result is NO in the above-described Step P74, a judgment is made in Step P92 as to whether or not the stop signal for the printing press has been inputted. Here, if the result is NO, the operation returns to Step P61. If the result is YES, the time interval to transmit the instructed speed of the main unit and the virtual current positions of the sub units to the drive control devices 30a to 30d of the sub units is read out of the memory 157A for a time interval to transmit the instructed speed of the main unit and virtual current positions of the sub units to the drive control devices of the sub units in Step P93, and then the counted value of the internal clock counter 174 is read out in Step P94. Next, when the counted value of the internal clock counter 174 becomes equal to or greater than the time interval to transmit the instructed speed of the main unit and the virtual current positions of the sub units to the drive control devices 30a to 30d of the sub units in Step P95, the pre-set (slower) speed is read out of the memory 154A for a pre-set speed of the main unit in Step P96. Next, when the pre-set (slower) speed is written in memory 155A for an instructed speed of the main unit in Step P97, the counted value is read out of the main unit motor shaft position detection counter195A and is stored in Step P98. Next, when the current position of the motor shaft of the main unit is calculated by use of the counted value of the main unit motor shaft position detection counter 195A and is stored in Step P99, the correction values of the current positions of the sub units are read out of the memory 160A for correction values of current positions of the sub units in Step P100.

Next, when the correction values of the current positions of the sub units thus read out are added to the current position of the motor shaft of the main unit obtained by the calculation, and the virtual current positions of the motor shafts of the sub units are calculated and stored in Step P101, the instructed (slower) speed of the main unit is read out of the memory 155A for an instructed speed of the main unit in Step P102. Next, when the instructed (slower) speed of the main unit and the virtual current positions of the motor shafts of the sub units are transmitted to the drive control devices 30a to 30d of the sub units in Step P103, the instructed (slower) speed is outputted to the drive motor driver 189A of the main unit in Step P104. Thereafter, the operation goes to Step P132 to be described later.

When the internal clock counter (for counting elapsed time) 174 starts counting in Step P105, a judgment is made in Step P106 as to whether or not the pre-set speed has been inputted to the speed setter 187. If the result is YES, the pre-set speed is read out of the speed setter 187 and stored in Step P107, and then the pre-set speed is read out of the memory 154A for a pre-set speed of the main unit in Step P108. On the other hand, if the result is NO, the operation directly goes to Step P108.

Next, when a previous pre-set speed is read out of the memory 167A for a previous instructed speed of the main unit in Step P109, a judgment is made in Step P110 as to whether or not the pre-set speed of the main unit thus read out is equal to the previous instructed speed of the main unit. Here, if the result is YES, the pre-set speed of the main unit thus read out is written in the memory 155A for an instructed speed of the main unit in Step P111, and then the operation goes to Step P120 to be described later. On the other hand, if the result is NO, a judgment is made in Step P112 as to whether or not the pre-set speed of the main unit thus read out is grater than the previous instructed speed of the main unit thus read out. If the result is YES, a speed modification value upon acceleration is read out of the memory 168A for a speed modification value upon acceleration in Step P113. Next, the speed modification value upon acceleration thus read out is added to the previous instructed speed of the main unit and a modified instructed speed of the main unit is thereby calculated and stored in Step P114. Then, the modified instructed speed of the main unit obtained by the calculation is written in the memory 155A for an instructed speed of the main unit in Step P115. Thereafter, the operation goes to Step P120 to be described later.

If the result is NO in the above-described Step P112, a speed modification value upon deceleration is read out of the memory 169A for a speed modification value upon deceleration in Step P116. Then, the speed modification value upon deceleration thus read out is subtracted from the previous instructed speed of the main unit and the modified instructed speed of the main unit is thereby calculated and stored in Step P117. Next, a judgment is made in Step P118 as to whether or not the modified instructed speed of the main unit is smaller than 0. If the result is YES, the modified instructed speed of the main unit is rewritten into zero in Step P119, and then the operation goes to the above-described Step P115. On the other hand, if the result is NO, the operation directly goes to Step P115.

Next, the time interval to transmit the instructed speed of the main unit and the virtual current positions of the sub units to the drive control devices 30a to 30d of the sub units is read out of the memory 157A for a time interval to transmit the instructed speed of the main unit and virtual current positions of the sub units to the drive control devices of the sub units in the above-mentioned Step P120, and then the counted value of the internal clock counter 174 is read out in Step P121. Next, when the counted value of the internal clock counter 174 becomes equal to or greater than the time interval to transmit the instructed speed of the main unit and the virtual current positions of the sub units to the drive control devices of the sub units in Step P122, the counted value is read out of the main unit motor shaft position detection counter 195A and is stored in Step P123.

Next, when the current position of the motor shaft of the main unit is calculated by use of the counted value of the main unit motor shaft position detection counter 195A and is stored in Step P124, the correction values of the current positions of the sub units are read out of the memory 160A for a correction value of current positions of the sub units in Step P125. Next, the correction values of the current positions of the sub units thus read out are added to the current position of the motor shaft of the main unit obtained by the calculation, and the virtual current positions of the motor shafts of the sub units are calculated and stored in Step P126, and then the instructed speed of the main unit is read out of the memory 155A for an instructed speed of the main unit in Step P127.

Next, when the instructed speed of the main unit and the virtual current positions of the motor shafts of the sub units are transmitted to the drive control devices 30a to 30d of the sub units in Step P128, the instructed speed is outputted to the drive motor driver 189A of the main unit in Step P129. Next, when the instructed speed of the main unit is written in the memory 167A for a previous instructed speed of the main unit in Step P130, a judgment is made in Step P131 as to whether or not the stop signal for the printing press has been inputted. Here, if the result is NO, the operation returns to the above-described Step P105. If the answer is YES, zero is written in the memory 154A for a pre-set speed of the main unit in Step P132.

Next, when the internal clock counter (for counting elapsed time) 174 starts counting in Step P133, the previous instructed speed is read out of the memory 167A for a previous instructed speed of the main unit in Step P134. Next, a judgment is made in Step P135 as to whether or not the previous instructed speed of the main unit thus read out is equal to 0. Here, if the result is YES, zero is written in the memory 155A for an instruction speed of the main unit in Step P136, and then the operation goes to Step P143 to be described later. If the result is NO, the speed modification value upon deceleration is read out of the memory 169A for a speed modification value upon deceleration in Step P137.

Next, the speed modification value upon deceleration thus read out is subtracted from the previous instructed speed of the main unit and the modified instructed speed of the main unit is thereby calculated and stored in Step P138. Thereafter, a judgment is made in Step P139 as to whether or not the modified instructed speed of the main unit is smaller than 0. Here, if the result is YES, the modified instructed speed of the main unit is rewritten with zero in Step P140, and then the modified instructed speed of the main unit obtained by the calculation is written in the memory 155A for an instructed speed of the main unit in Step P141. If the result is NO, the operation directly goes to Step P141. Thereafter, the modified instructed speed obtained by the calculation is written in the memory 167A for a previous instructed speed of the main unit in Step P142.

Next, when the time interval to transmit the instructed speed of the main unit and the virtual current positions of the sub units to the drive control devices 30a to 30d of the sub units is read out of the memory 157 for a time interval to transmit the instructed speed of the main unit and virtual current positions of the sub units to the drive control devices of the sub units in the above-mentioned Step P143, the counted value of the internal clock counter 174 is read out in Step P144. Next, when the counted value of the internal clock counter 174 becomes equal to or greater than the time interval to transmit the instructed speed of the main unit and the virtual current positions of the sub units to the drive control devices of the sub units in Step P145, the counted value is read out of the main unit motor shaft position detection counter 195A and is stored in Step P146.

Next, when the current position of the motor shaft of the main unit is calculated by use of the counted value of the main unit motor shaft position detection counter 195A and is stored in Step P147, the correction values of the current positions of the sub units are read out of the memory 160A for correction values of current positions of the sub units in Step P148. Next, the correction values of the current positions of the sub units thus read out are added to the current position of the motor shaft of the main unit obtained by the calculation, and the virtual current positions of the motor shafts of the sub units are calculated and stored in Step P149, and then the instructed speed of the main unit is read out of the memory 155A for an instructed speed of the main unit in Step P150.

Next, when the instructed speed of the main unit and the virtual current positions of the motor shafts of the sub units are transmitted to the drive control devices 30a to 30d of the sub units in Step P151, the instructed speed is outputted to the drive motor driver 189A of the main unit in Step P152. Next, when speeds of the units in the printing press for activating the brakes of the drive motors of the printing presses are read out of the memory 171A for speeds of the units in the printing press for activating brakes of the drive motors of the units of the printing presses in Step P153, outputs of the F/V converters 191 and 193a to 193d connected to the rotary encoders 29a to 29e of the drive motors of the respective units in the printing press are read out in Step P154. Next, current speeds of the respective units in the printing press are calculated and stored in Step P155 by use of the outputs of the F/V converters 191 and 193a to 193d connected to the rotary encoders 29a to 29e of the drive motors of the respective units in the printing press, which are read out as described above. Then, a judgment is made in Step P156 as to whether or not all the current speeds of the units in the printing press obtained by the calculation are equal to or smaller than the speeds of the units in the printing press for activating the brakes of the drive motors of the units in the printing press.

If the result is NO in the above-described Step P156, the operation returns to the above-described Step P133. On the other hand, if the result is YES, a synchronous drive stop instruction is transmitted to the drive control devices 30a to 30d of the sub units in Step P157. Next, when synchronous drive stop signals are transmitted from the drive control devices 30a to 30d of the sub units in Step P158, the numbers of the sub units which has transmitted the synchronous drive stop signal are received from the drive control devices 30a to 30d of the sub units and stored in Step P159. Next, when an activation signal is outputted to the drive motor brake circuits 197a to 197d of the sub units which has received the synchronous drive stop signals in Step P160, a judgment is made in Step P161 as to whether or not all the sub units have stopped synchronous drive.

If the result is NO in the above-described Step P161, the operation returns to Step P158. On the other hand, if the result is YES, the starting signal for the drive motor driver 189A of the main unit is turned off in Step P162. Next, when an activation signal is outputted to the drive motor brake circuit 196A of the main unit in Step P163, the synchronous drive switch is turned off in Step P164. Here, if the synchronous drive switch is not turned off and if the printing press drive switch is turned on in Step P165, the operation returns to Step P3.

Next, each of the drive control devices 30a to 30d of the sub units is operated in accordance with operational flows shown in FIG. 46A, FIG. 46B, FIG. 47, FIG. 48A, and FIG. 48B.

Specifically, a judgment is made in Step P1 as to whether or not the home position alignment preparation start instruction has been transmitted from the drive control device 31 of the main unit. If the result is NO, the operation goes to Step P49 to be described later. On the other hand, if the result is YES, the home position alignment preparation start instruction is received from the drive control device 31 of the main unit in Step P2. Next, when a starting signal for the drive motor driver 235A of the sub unit is turned on in Step P3 and the instructed (slower) speed is transmitted from the drive control device 31 of the main unit in Step P4, the instructed (slower) speed is received from the drive control device 31 of the main unit and stored in Step P5. Next, the instructed (slower) speed of the main unit is read out of the memory 203A for an instructed speed of the main unit in Step P6, and the instructed (slower) speed of the main unit is written in the memory 204A for an instructed speed of the sub unit in Step P7.

Next the instructed speed is outputted to the drive motor driver 235A of the sub unit in Step P8. When the home position alignment preparation completion instruction is transmitted from the drive control device 31 of the main unit in Step P9, the home position alignment preparation completion instruction is received from the drive control device 31 of the main unit in Step P10. Next, when the home position alignment start instruction is transmitted from the drive control device 31 of the main unit in Step P11, the home position alignment start instruction is received from the drive control device 31 of the main unit in Step P12.

Next, a judgment is made in Step P13 as to whether or not the instructed (slower) speed of the main unit and the virtual current position of the machine shaft of the sub unit have been transmitted from the drive control device 31 of the main unit. Here, if the result is NO, the instructed (slower) speed of the main unit and the virtual current position of the motor shaft of the sub unit are transmitted from the drive control device 31 of the main unit in Step P25, and then the instructed (slower) speed of the main unit and the virtual current position of the motor shaft of the sub unit are received from the drive control device 31 of the main unit and are stored in Step P26. Thereafter, the operation goes to Step P33 to be described later.

If the result is YES in the above-described Step P13, the instructed (slower) speed of the main unit and the virtual current position of the machine shaft of the sub unit are received from the drive control device 31 of the main unit and are stored in Step P14. Next, when a counted value is read out of the sub unit machine shaft position detection counter 238A and is stored in Step P15, the current position of the machine shaft of the sub unit is calculated by use of the counted value of the sub unit machine shaft position detection counter 238A, and is stored in Step P16.

Next, when a difference in the current position of the machine shaft is calculated by use of the received virtual current position of the machine shaft of the sub unit and the current position of the machine shaft of the sub unit obtained by the calculation and is stored in Step P17, an absolute value of the difference in the current position of the machine shaft is calculated by use of the difference in the current position of the machine shaft obtained by the calculation, and is stored in Step P18. Next, when an allowance of the difference in the position of the machine shaft is read out of the memory 210A for an allowance of the difference in the position of the machine shaft in Step P19, a judgment is made in Step P20 as to whether or not the absolute value of the difference in the current position of the machine shaft obtained by the calculation is equal to or smaller than the allowance of the position of the machine shaft thus read out.

If the result is YES in the above-described Step P20, the instructed (slower) speed of the main unit is read out of the memory 203A for an instructed speed of the main unit in Step P21, and then the instructed (slower) speed of the main unit is written in the memory 204A for an instructed speed of the sub unit in Step P22. Next, when the instructed speed is outputted to the drive motor driver 235A of the sub unit in Step P23, the home position alignment completion signal of the machine shaft is transmitted to the drive control device 31 of the main unit in Step P24. Thereafter, the operation returns to the above-described Step P13.

If the result is NO in the above-described Step P20, a conversion table from the difference in the current position of the machine shaft into a correction value of the instructed speed is read out of the memory 211A for a conversion table from the difference in the current position of the machine shaft into a correction value of the instructed speed in Step P27. Then, a difference in the current position of the machine shaft is read out of the memory 208A for a difference in the position of the machine shaft in Step P28. Next, the correction value of the instruction speed of the sub unit is derived from the difference in the current position of the machine shaft by use of the conversion table from the difference in the current position of the machine shaft into a correction value of the instructed speed, and is stored in Step P29. Thereafter, the instructed (slower) speed is read out of the memory 203A for an instructed speed of the main unit in Step P30. Next, the derived correction value of the instructed speed of the sub unit is added to the instructed (slower) speed of the main unit thus read out, and the instructed speed of the sub unit is thereby calculated and stored in Step P31. Thereafter, the instructed speed is outputted to the drive motor driver 235A of the sub unit in Step P32. Thereafter, the operation returns to the above-described Step P13.

When a counted value is read out of the sub unit motor shaft position detection counter 239A and is stored in Step P33, the current position of the motor shaft of the sub unit is calculated by use of the counted value of the sub unit motor shaft position detection counter 239A thus read out, and is stored in Step P34. Next, a difference in the current position of the motor shaft is calculated by use of the received virtual current position of the motor shaft of the sub unit and the current position of the motor shaft of the sub units obtained by the calculation, and is stored in Step P35. Then, an absolute value of the difference in the current position of the motor shaft is calculated by use of the difference in the current position of the motor shaft obtained by the calculation, and is stored in Step P36. Next, when an allowance of the difference in the position of the motor shaft is read out of the memory 218 for an allowance of the difference in the position of the motor shaft in Step P37, a judgment is made in Step P38 as to whether or not the absolute value of the difference in the current position of the motor shaft obtained by the calculation is equal to or smaller than the allowance of the position of the motor shaft thus read out.

If the result is YES in the above-described Step P38, the instructed (slower) speed of the main unit is read out of the memory 203A for an instructed speed of the main unit in Step P39. When the instructed (slower) speed of the main unit is written in the memory 204A for an instructed speed of the sub unit in Step P40, the instructed speed is outputted to the drive motor driver 235A of the sub unit in Step P41. Next, the home position alignment completion signal of the motor shaft is transmitted to the drive control device 31 of the main unit in Step P42, and the operation returns to Step P1.

On the other hand, if the result is NO in the above-described Step P38, a conversion table from the difference in the current position of the motor shaft into a correction value of the instructed speed is read out of the memory 219 for a conversion table from the difference in the current position of the motor shaft into a correction value of the instructed speed in Step P43. Next, when a difference in the current position of the motor shaft is read out of the memory 216A for a difference in the position of the motor shaft in Step P44, the correction value of the instructed speed of the sub unit is derived from the difference in the current position of the motor shaft by use of the conversion table from the difference in the current position of the motor shaft into a correction value of the instructed speed in Step P45. Next, when the instructed (slower) speed is read out of the memory 203A for an instructed speed of the main unit in Step P46, the derived correction value of the instructed speed of the sub unit is added to the instructed (slower) speed of the main unit thus read out, and the instructed speed of the sub unit is thereby calculated and stored in Step P47. Next, when the instructed speed is outputted to the drive motor driver 235A of the sub unit in Step P48, the operation returns to the above-described Step P13.

A judgment is made in the above-mentioned Step P49 as to whether or not the instructed speed of the main unit and the virtual current position of the motor shaft of the sub unit have been transmitted from the drive control device 31 of the main unit. Here, if the result is NO, a judgment is made in Step P66 as to whether or not the synchronous drive stop instruction is transmitted from the drive control device 31 of the main unit. Here, if the result is YES, the synchronous drive stop instruction is received from the drive control device 31 of the main unit in Step P67. Next, when the starting signal for the drive motor driver 235A of the sub unit is turned off in Step P68, the synchronous drive stop signal is transmitted to the drive control device 31 of the main unit in Step P69, and the operation returns to Step P1. On the other hand, if the result is NO in the above-described Step P66, the operation directly returns to Step P1.

If the result is YES in the above-described Step P49, the instructed speed of the main unit and the virtual current position of the motor shaft of the sub unit are received from the drive control device 31 of the main unit and stored in Step P50. Next, when the counted value is read out of the sub unit motor shaft position detection counter 239A and is stored in Step P51, the current position of the motor shaft of the sub unit is calculated by use of the counted value of the sub unit motor shaft position detection counter 239A thus read out, and is stored in Step P52.

Next, the difference in the current position of the machine shaft is calculated by use of the received virtual current position of the motor shaft of the sub unit and the current position of the motor shaft obtained by the calculation, and is stored in Step P53. Then, the absolute value of the difference in the current position of the motor shaft is calculated by use of the difference in the current position of the motor shaft obtained by the calculation, and is stored in Step P54. Next, when the allowance of the difference in the position of the motor shaft is read out of the memory 218 for an allowance of the difference in the position of the motor shaft in Step P55, a judgment is made in Step P56 as to whether or not the absolute value of the difference in the current position of the motor shaft obtained by the calculation is equal to or smaller than the allowance of the position of the motor shaft thus read out.

Here, if the result is YES in the above-described Step P56, the instructed speed of the main unit is read out of the memory 203A for an instructed speed of the main unit in Step P57. Then, the instructed speed of the main unit is written in the memory 204A for an instructed speed of the sub unit in Step P58. Next, the instructed speed is outputted to the drive motor driver 235A of the sub unit in Step P59, and the operation returns to Step P1.

If the result is NO in the above-described Step P56, the conversion table from the difference in the current position of the motor shaft into a correction value of the instructed speed is read out of the memory 219 for a conversion table from the difference in the current position of the motor shaft into a correction value of the instructed speed in Step P60. Then, the difference in the current position of the motor shaft is read out of the memory 216A for a difference in the position of the motor shaft in Step P61. Next, the correction value of the instructed speed of the sub unit is derived from the difference in the current position of the motor shaft by use of the conversion table from the difference in the current position of the motor shaft into a correction value of the instructed speed, and is stored in Step P62. Thereafter, the instructed speed is read out of the memory 203A for an instructed speed of the main unit in Step P63. Next, the derived correction value of the instructed speed of the sub unit is added to the instructed speed of the main unit thus read out, and the instructed speed of the sub unit is thereby calculated and stored in Step P64. Then, the instructed speed is outputted to the drive motor driver 235A of the sub unit in Step P65. Thereafter, the operation returns to Step P1.

In this way, according to this embodiment, when the printing press is in shutdown, phase deviation among the folding machine 10 as the main unit and the first to fourth units 3 to 6 as the sub units is prevented and the synchronous condition is retained by stopping the synchronous control by the drive motors 26a to 26e and by starting the drive motor brakes 27a to 27e attached to the drive motors 26a to 26e instead.

In this case, according to this embodiment, when the speeds of the first to fourth units 3 to 6 and of the folding machine 10 are detected by the rotary encoders 29a to 29e and the speeds are reduced to a predetermined speed (such as 8 rpm) by the stop instruction, the phase of the folding machine 10 is stopped in the relevant position and the synchronous control (drive) of the first to fourth units 3 to 6 with respect to the folding machine 10 is released. Simultaneously, the drive motor brakes 27a to 27e of the drive motors 26a to 26e of the first to fourth units 3 to 6 and of the folding machine 10 are started. Accordingly, rotation of the first to fourth units 3 to 6 and of the folding machine 10 is stopped by the drive motor brakes 27a to 27e when the printing press is in shutdown.

In this way, it is not necessary to supply currents to the drive motors 26a to 26e and to the drive motor drivers 189A and 235A when the printing press is in shutdown. Therefore, it is possible to reduce power consumption and to improve durability of motors and motor bearings.

Fifth Embodiment

Figure 49:
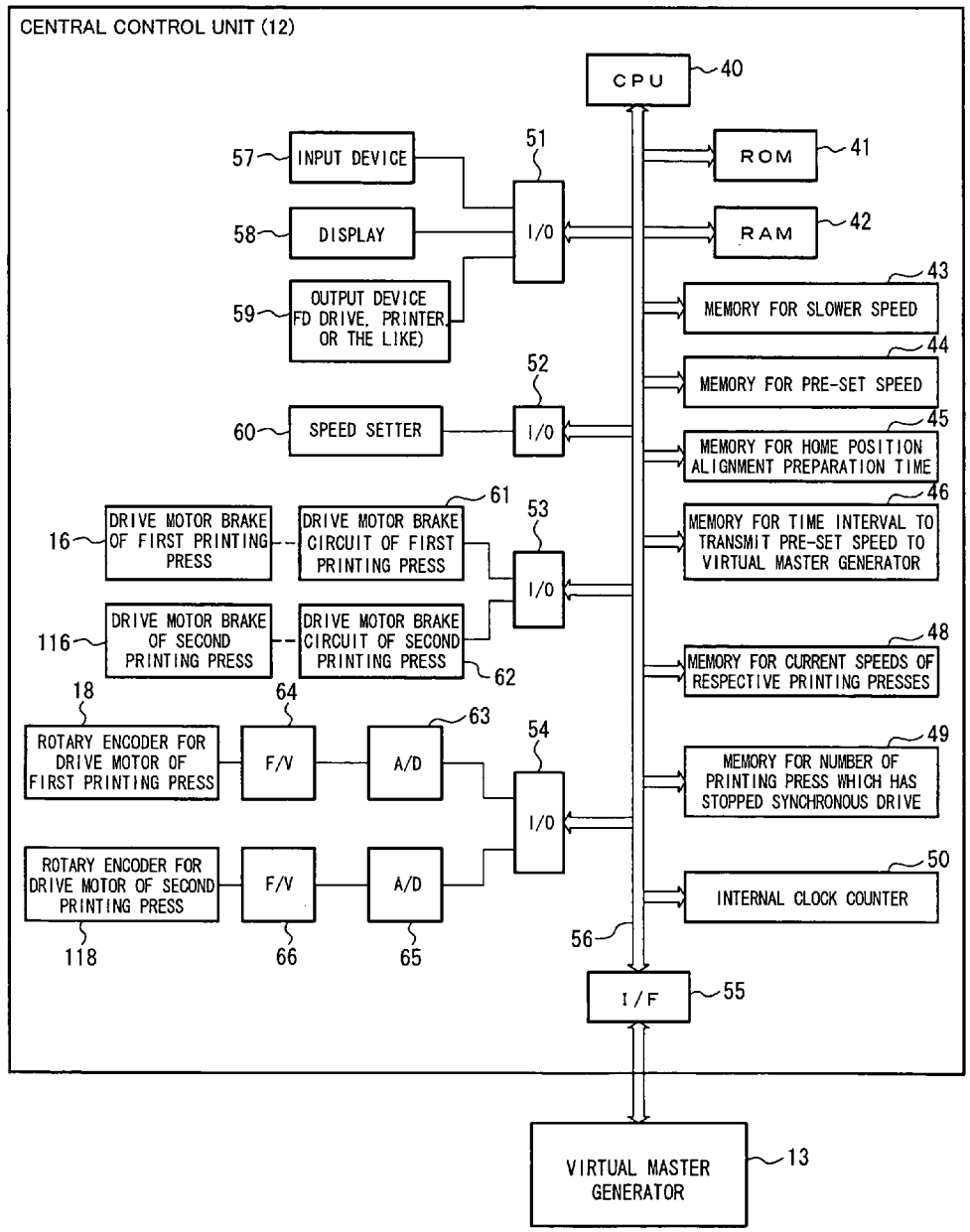
FIG. 49 is a block diagram of a central control unit, showing a fifth embodiment of the present invention.
Figure 50A:
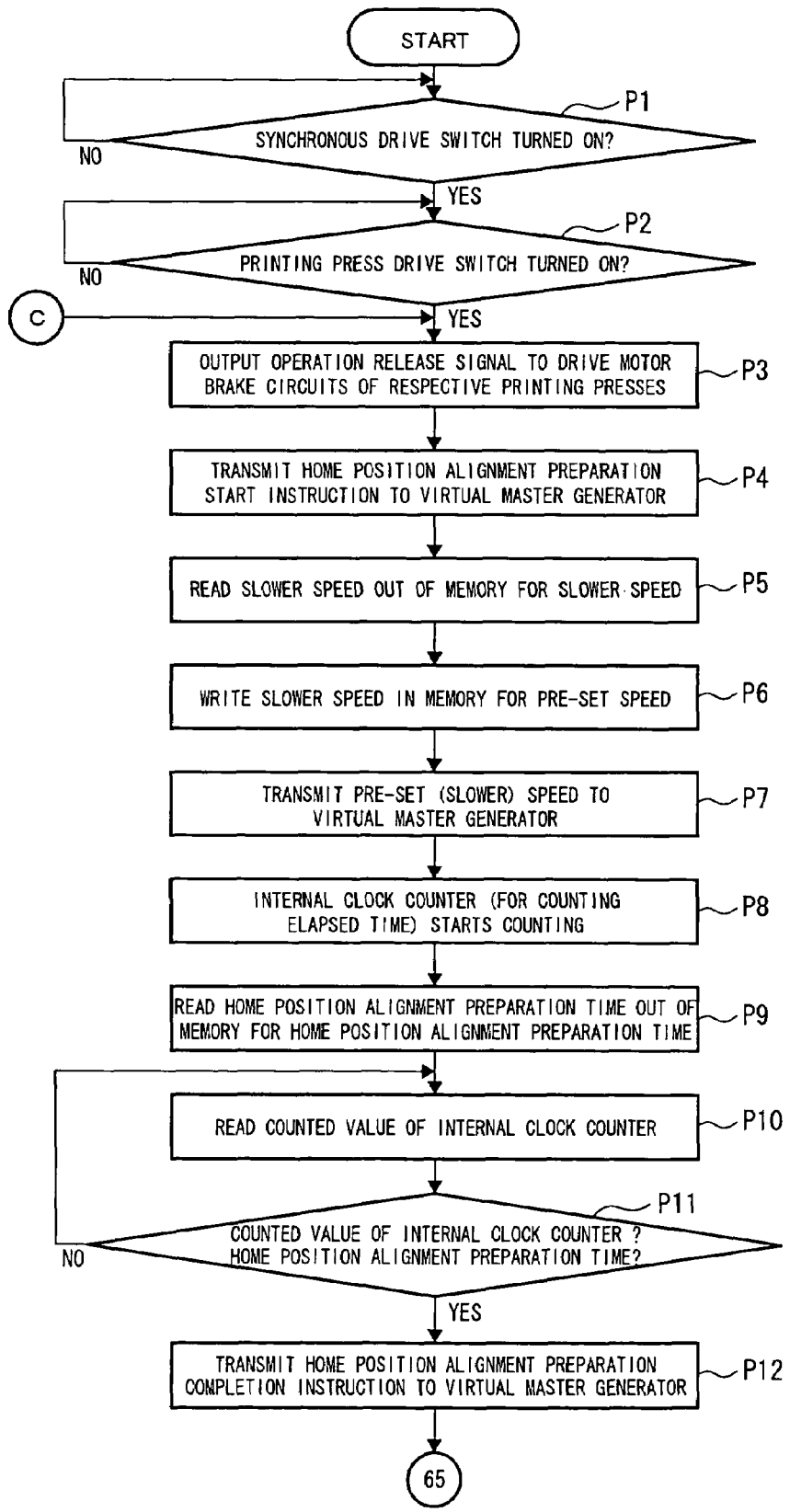
FIG. 50A is an operational flowchart of the central control unit.
Figure 50B:
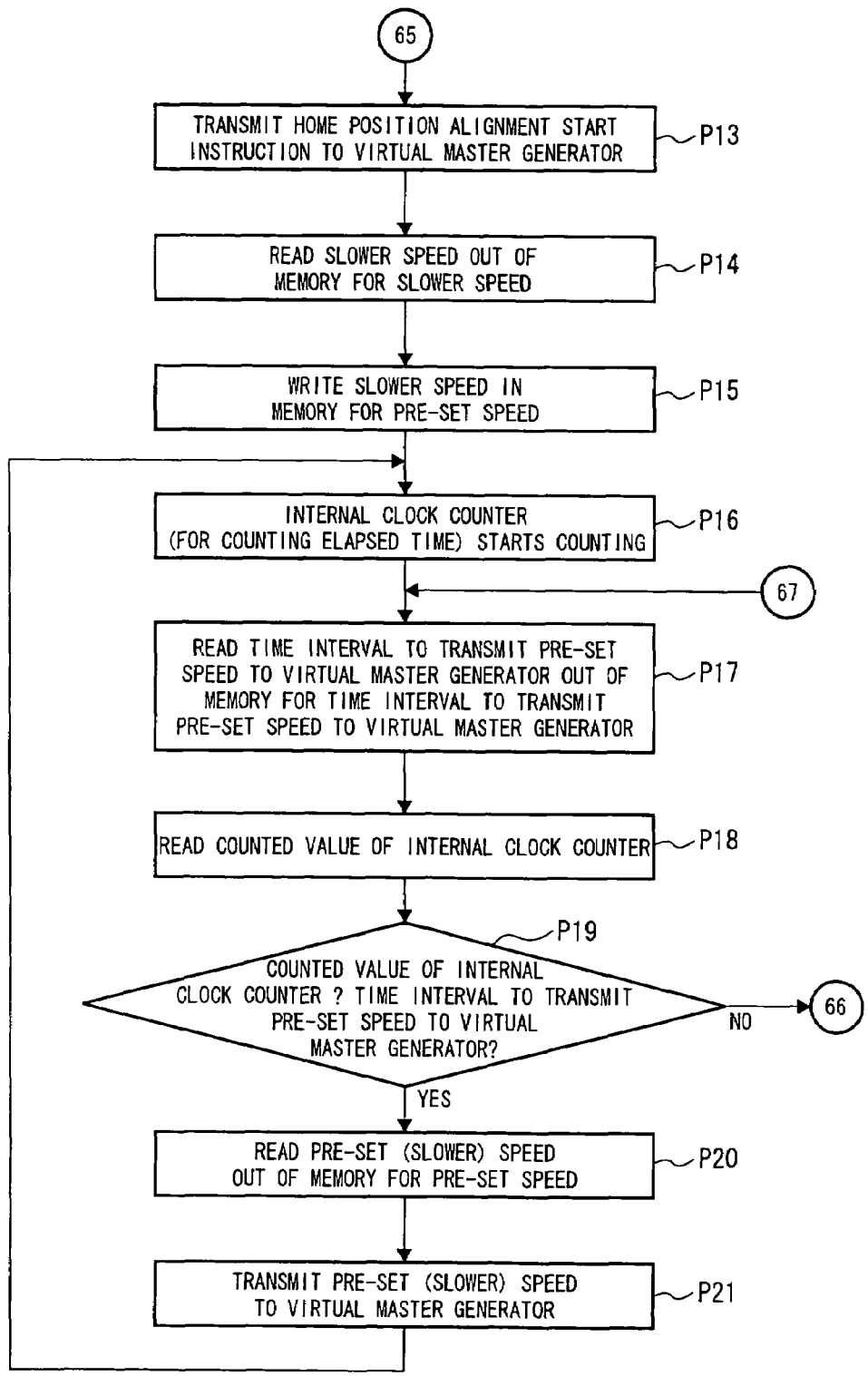
FIG. 50B is another operational flowchart of the central control unit.
Figure 50C:
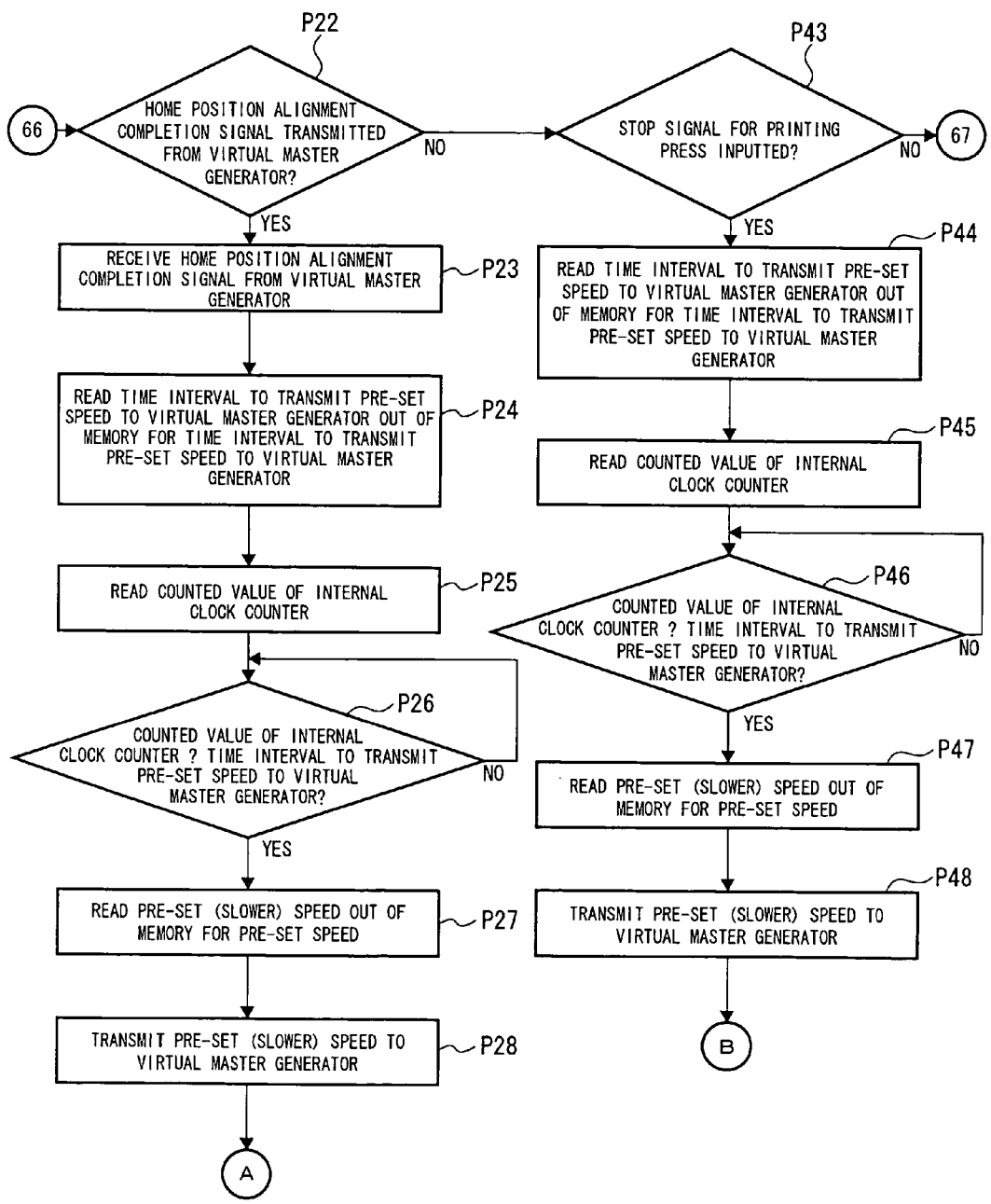
FIG. 50C is another operational flowchart of the central control unit.
Figure 51:
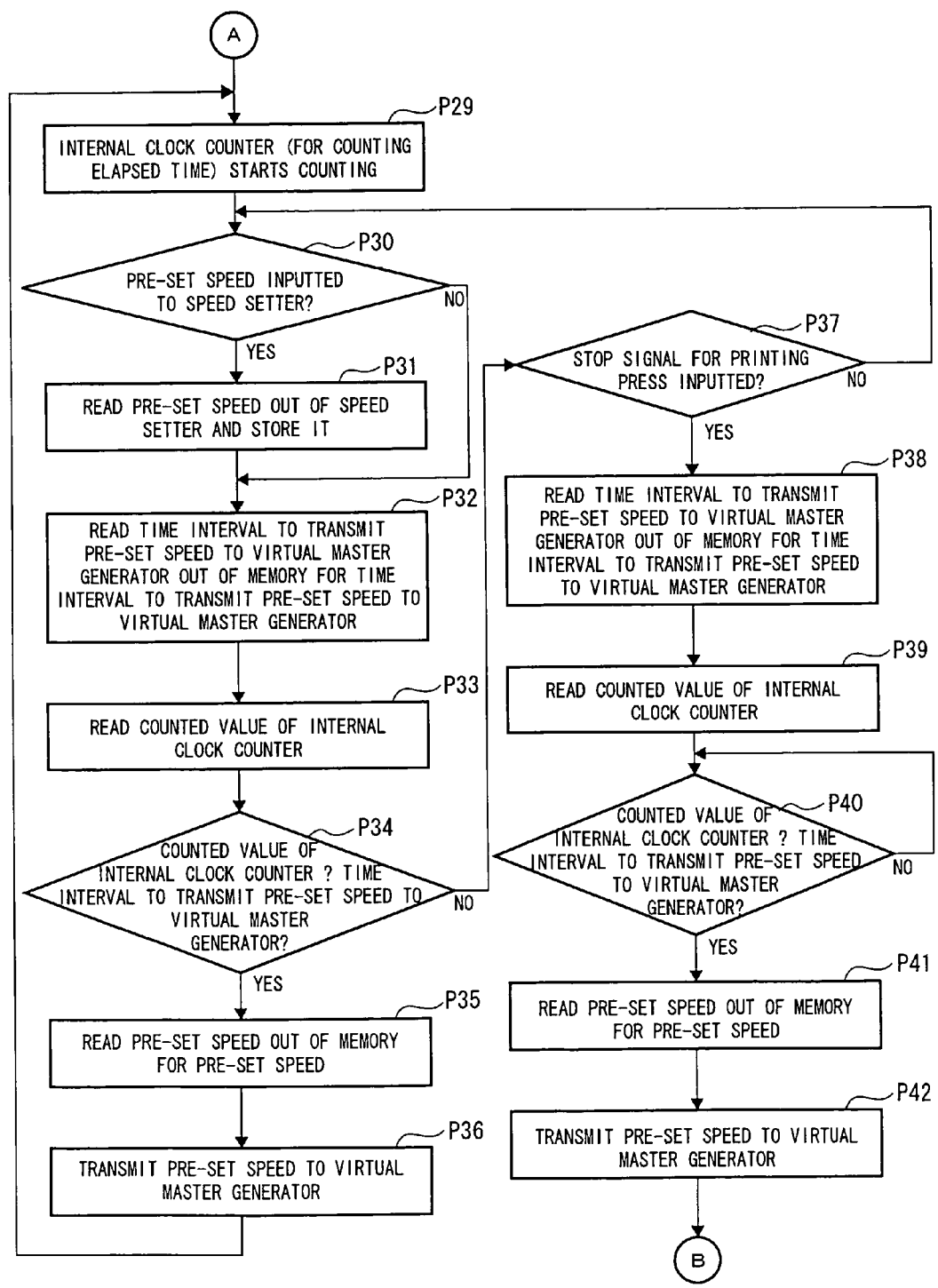
FIG. 51 is another operational flowchart of the central control unit.
Figure 52:
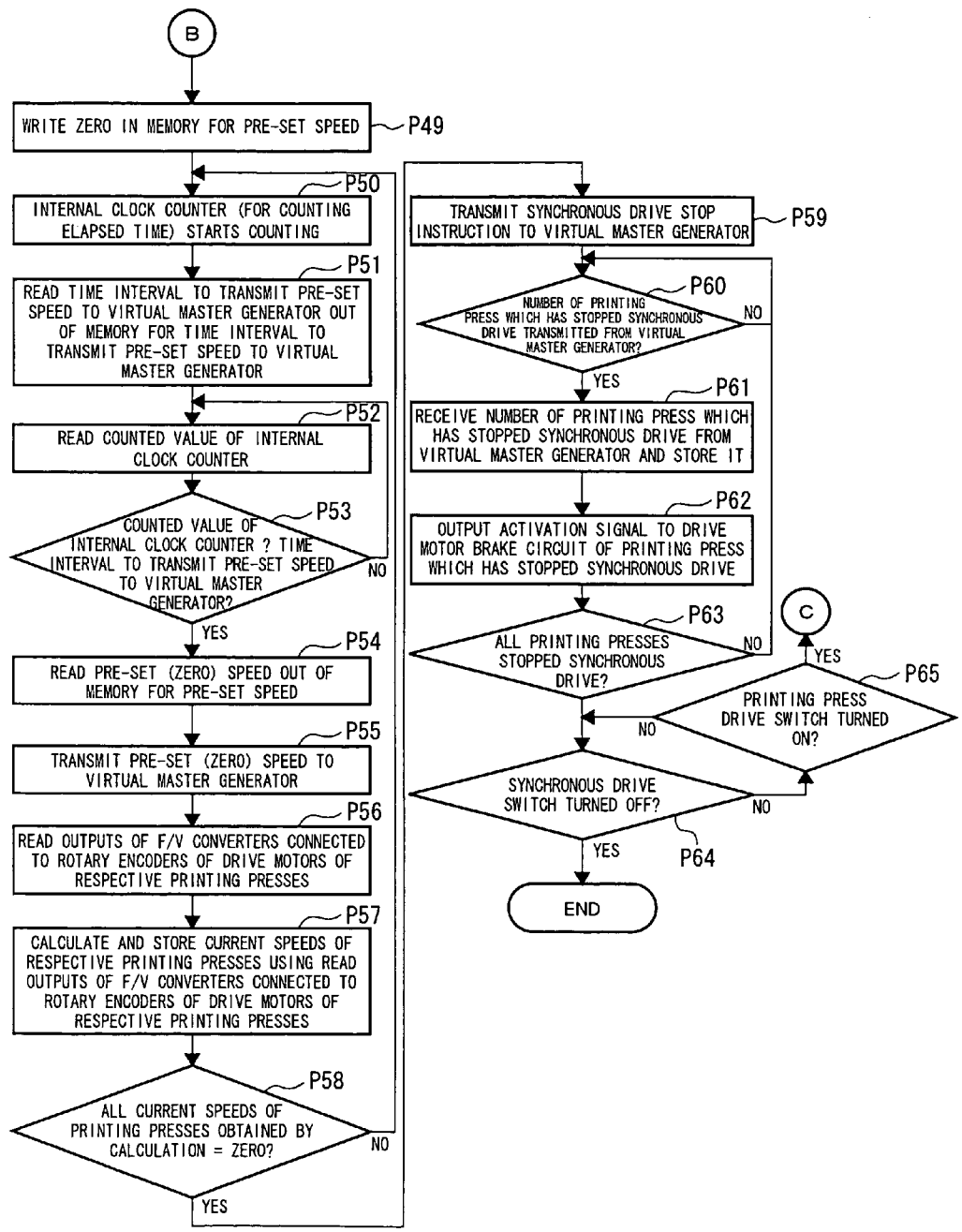
FIG. 52 is another operational flowchart of the central control unit.

FIG. 49 is a block diagram of a central control unit showing a fifth embodiment of the present invention. FIG. 50A is an operational flowchart of the central control unit. FIG. 50B is another operational flowchart of the central control unit. FIG. 50C is another operational flowchart of the central control unit. FIG. 51 is another operational flowchart of the central control unit. FIG. 52 is another operational flowchart of the central control unit.

This embodiment is a modified example of the above-described first embodiment, which is configured to release synchronous control between the respective printing presses A and B by outputting the synchronous drive stop instruction to the virtual master generator 13 and simultaneously to start the drive motor brakes 16 and 116 when the speeds of the first and second printing presses A and B become zero in the course of shutting down the printing presses. Therefore, in this embodiment, the schematic configuration diagram of the synchronous control device for the plurality of printing presses, the block diagram of the virtual master generator, the block diagram of the drive control device of each of the printing presses, the operational flowcharts of the virtual master generator, and the operational flowcharts of the drive control device of each of the printing presses are similar to those in the first embodiment. Accordingly, reference will be made to the first embodiment in this context, and detailed explanation will be omitted herein.

As shown in FIG. 49, a central control unit 12 includes a CPU 40, a ROM 41, a RAM 42, a memory 43 for a slower speed of the printing press, a memory 44 for a pre-set speed, a memory 45 for home position alignment preparation time, a memory 46 for a time interval to transmit the pre-set speed to the virtual master generator, a memory 48 for current speeds of the respective printing presses, a memory 49 for a number of the printing press which has stopped synchronous drive, and an internal clock counter 50, which are connected to one another by a bus 56 together with respective input and output devices 51 to 54 and an interface 55.

An input device 57 such as a keyboard or various switches and buttons, a display 58 such as a CRT or a lamp, and an output device 59 such as a printer or a FD drive are connected to the input and output device 51. A speed setter 60 is connected to the input and output device 52. A drive motor brake 16 of the first printing press is connected to the input and output device 53 through a drive motor brake circuit 61 of the first printing press, and a drive motor brake 116 of the second printing press is also connected thereto through a drive motor brake circuit 62 of the second printing press. A rotary encoder 18 for the drive motor of the first printing press is connected to the input and output device 54 through an A/D converter 63 and a F/V converter 64, and a rotary encoder 118 for the drive motor of the second printing press is also connected thereto through an A/D converter 65 and a F/V converter 65. Moreover, a virtual master generator 13 to be described later is connected to the interface 55.

Now, the central control unit 12 is operated in accordance with operational flows shown in FIG. 50A, FIG. 50B, FIG. 50C, FIG. 51, and FIG. 52 in order to perform synchronous control of a first printing press A and a second printing press B.

Specifically, when a synchronous drive switch is turned on in Step P1 and a printing press drive switch is turned on in Step P2, an operation release signal is outputted to the drive motor brake circuits 61 and 62 of the respective printing presses in Step P3. Next, when a home position alignment preparation start instruction is transmitted to the virtual master generator 13 in Step P4, a slower speed is read out of the memory 43 for a slower speed in Step P5. Next, when the slower speed is written in the memory 44 for a pre-set speed in Step P6, the pre-set (slower) speed is transmitted to the virtual master generator 13 in Step P7. Next, when the internal clock counter (for counting elapsed time) 50 starts counting in Step P8, home position alignment preparation time is read out of the memory 45 for home position alignment preparation time in Step P9. Next, the counted value of the internal clock counter 50 is read out in Step P10, and when the counted value of the internal clock counter 50 becomes equal to or greater than the home position alignment preparation time in Step P11, a home position alignment preparation completion instruction is transmitted to the virtual master generator 13 in Step P12.

Next, after the home position alignment preparation start instruction is transmitted to the virtual master generator 13 in Step P13, when the slower speed is read out of the memory 43 for a slower speed in Step P14, the slower speed is written in the memory 44 for a pre-set speed in Step P15. Next, when the internal clock counter 50 starts counting in Step P16, a time interval to transmit the pre-set speed to the virtual master generator 13 is read out of the memory 46 for a time interval to transmit the pre-set speed to the virtual master generator in Step P17. Next, when the counted value of the internal clock counter 50 is read out in Step P18, a judgment is made in Step P19 as to whether or not the counted value of the internal clock counter 50 is equal to or greater than the time interval to transmit the pre-set speed to the virtual master generator 13. If the result is YES, the pre-set (slower) speed is read out of the memory 44 for a pre-set speed in Step P20, and then the pre-set (slower) speed is transmitted to the virtual master generator 13 in Step P21. Thereafter, the operation returns to Step P16.

If the result is NO in the above-described Step P19, a judgment is made in Step P22 as to whether or not a home position alignment completion signal has been transmitted from the virtual master generator 13. If the result is YES, the home position alignment completion signal is received from the virtual master generator 13 in Step P23. Next, the time interval to transmit the pre-set speed to the virtual master generator 13 is read out of the memory 46 for a time interval to transmit the pre-set speed to the virtual master generator in Step P24. Next, the counted value of the internal clock counter 50 is read out in Step P25. When the counted value of the internal clock counter 50 becomes equal to or greater than the time interval to transmit the pre-set speed to the virtual master generator 13 in Step P26, the pre-set (slower) speed is read out of the memory 44 for a pre-set speed in Step P27, and then the pre-set (slower) speed is transmitted to the virtual master generator 13 in Step P28.

Next, when the internal clock counter 50 starts counting in Step P29, a judgment is made in Step P30 as to whether or not the pre-set speed has been inputted to the speed setter 60. If the result is YES, the pre-set speed is read out of the speed setter 60 and stored in Step P31, and then the time interval to transmit the pre-set speed to the virtual master generator 13 is read out of the memory 46 for a time interval to transmit the pre-set speed to the virtual master generator 13 in Step P32. If the result is NO in the above-described Step P30, then the operation directly goes to the above-described Step P32. Next, when the counted value of the internal clock counter 50 is read out in Step P33, a judgment is made in Step P34 as to whether or not the counted value of the internal clock counter 50 is equal to or greater than the time interval to transmit the pre-set speed to the virtual master generator 13. If the result is YES, the pre-set speed is read out of the memory 44 for a pre-set speed in Step P35, and then the pre-set speed is transmitted to the virtual master generator 13 in Step P36. Thereafter, the operation returns to Step P29.

If the result is NO in the above-described Step P34, a judgment is made in Step P37 as to whether or not a stop signal for the printing press has been inputted. If the result is NO, then the operation returns to Step P30. On the other hand, if the result is YES, the time interval to transmit the pre-set speed to the virtual master generator 13 is read out of the memory 46 for a time interval to transmit the pre-set speed to the virtual master generator in Step P38. Next, the counted value of the internal clock counter 50 is read out in Step P39. When the counted value of the internal clock counter 50 becomes equal to or greater than the time interval to transmit the pre-set speed to the virtual master generator 13 in Step P40, the pre-set speed is read out of the memory 44 for a pre-set speed in Step P41. Thereafter, the pre-set speed is transmitted to the virtual master generator 13 in Step P42, and the operation goes to Step P49.

If the result is NO in the above-described Step P22, a judgment is made in Step P43 as to whether or not the stop signal for the printing press has been inputted. If the result is NO, then the operation returns to Step P17. On the other hand, if the result is YES, the time interval to transmit the pre-set speed to the virtual master generator 13 is read out of the memory 46 for a time interval to transmit the pre-set speed to the virtual master generator in Step P44. Next, the counted value of the internal clock counter 50 is read out in Step P45. When the counted value of the internal clock counter 50 becomes equal to or greater than the time interval to transmit the pre-set speed to the virtual master generator 13 in Step P46, the pre-set (slower) speed is read out of the memory 44 for a pre-set speed in Step P47. Thereafter, the pre-set (slower) speed is transmitted to the virtual master generator 13 in Step P48, and the operation goes to Step P49.

Next, zero is written in the memory 44 for a pre-set speed in Step P49. When the internal clock counter 50 starts counting in Step P50, the time interval to transmit the pre-set speed to the virtual master generator 13 is read out of the memory 46 for a time interval to transmit the pre-set speed to the virtual master generator in Step P51. Next, the counted value of the internal clock counter 50 is read out in Step P52. When the counted value of the internal clock counter 50 becomes equal to or greater than the time interval to transmit the pre-set speed to the virtual master generator 13 in Step P53, the pre-set speed (zero) is read out of the memory 44 for a pre-set speed in Step P54.

Next, after the pre-set speed (zero) is transmitted to the virtual master generator 13 in Step P55, outputs of the F/V converters 64 and 66 connected to the rotary encoders 18 and 118 of drive motors 15 and 115 of the respective printing presses are read out in Step P56. Thereafter, current speeds of the respective printing presses are calculated and stored in Step P57 by use of the outputs of the F/V converters 64 and 66 connected to the rotary encoders 18 and 118 of the drive motors 15 and 115 of the respective printing presses, which are read out as described above.

Next, a judgment is made in Step P58 as to whether or not all the current speeds of the printing presses obtained by the calculation are equal to zero. If the result is NO, the operation returns to Step P50. On the other hand, if the result is YES, a synchronous drive stop instruction is transmitted to the virtual master generator 13 in Step P59. Next, when the number of the printing press which has stopped synchronous drive is transmitted from the virtual master generator 13 in Step P60, the number of the printing press which has stopped synchronous drive is received from the virtual master generator 13 and stored in Step P61. Next, when an activation signal is outputted to the drive motor brake circuit of the printing press which has stopped synchronous drive in Step P62, a judgment is made in Step P63 as to whether or not all the printing presses have stopped synchronous drive. If the result is NO, the operation returns to Step P60. On the other hand, if the result is YES, the synchronous drive switch is turned off in Step P64 and the operation is terminated. Here, if the synchronous drive switch is not turned off in Step P64 and if the printing press drive switch is turned on in Step P65, the operation returns to Step P3.

In this way, according to this embodiment, when the first printing press A and the second printing press B are in shutdown, phase deviation between the first printing press A and the second printing press B is prevented and the synchronous condition is retained by stopping the synchronous control by the drive motors 15 and 115 and by starting the drive motor brakes 16 and 116 attached to the drive motors 15 and 115 instead.

In this case, according to this embodiment, when the speeds of the respective printing presses A and B are detected by the rotary encoders 18 and 118 and the speeds are reduced to zero by the stop instruction, the synchronous control of the respective printing presses A and B is released by outputting the synchronous drive stop instruction to the virtual master generator 13. Simultaneously, the drive motor brakes 16 and 116 of the drive motors 15 and 115 of the respective printing presses A and B are started. Accordingly, rotation of the respective printing presses A and B is stopped by the drive motor brakes 16 and 116 when the respective printing presses A and B are in shutdown.

In this way, it is not necessary to supply currents to the drive motors 15 and 115 and to the drive motor driver 146 when the respective printing presses A and B are in shutdown. Therefore, it is possible to reduce power consumption and to improve durability of motors and motor bearings. In addition to the original effects described above, there is also an advantage that the phase deviation between the respective printing presses A and B are completely eliminated. Although this embodiment has been described on the synchronous control between the two printing presses A and B, it is needless to say that the present invention is also applicable to synchronous control of three or more printing presses.

Sixth Embodiment

Figure 53:
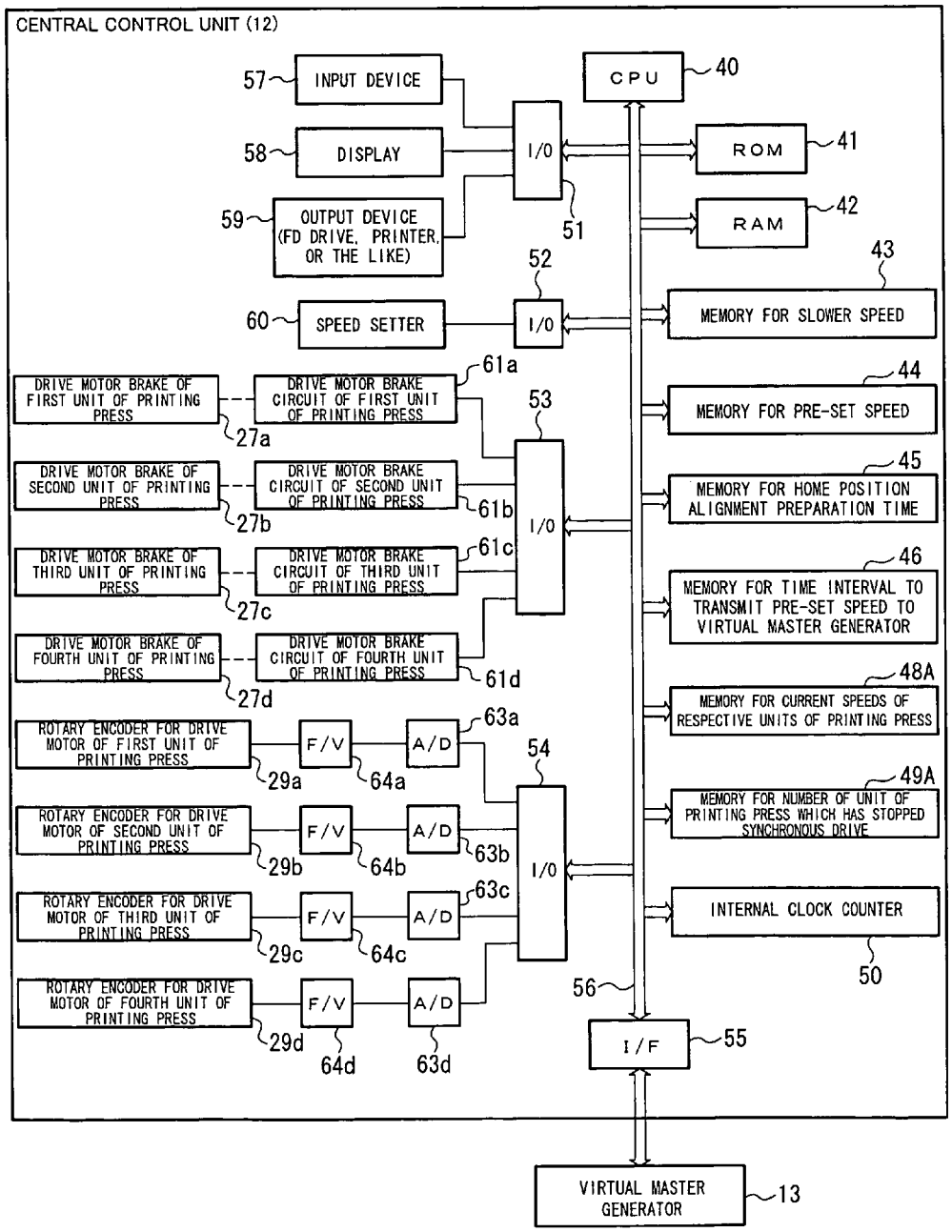
FIG. 53 is a block diagram of a central control unit, showing a sixth embodiment of the present invention.
Figure 54A:
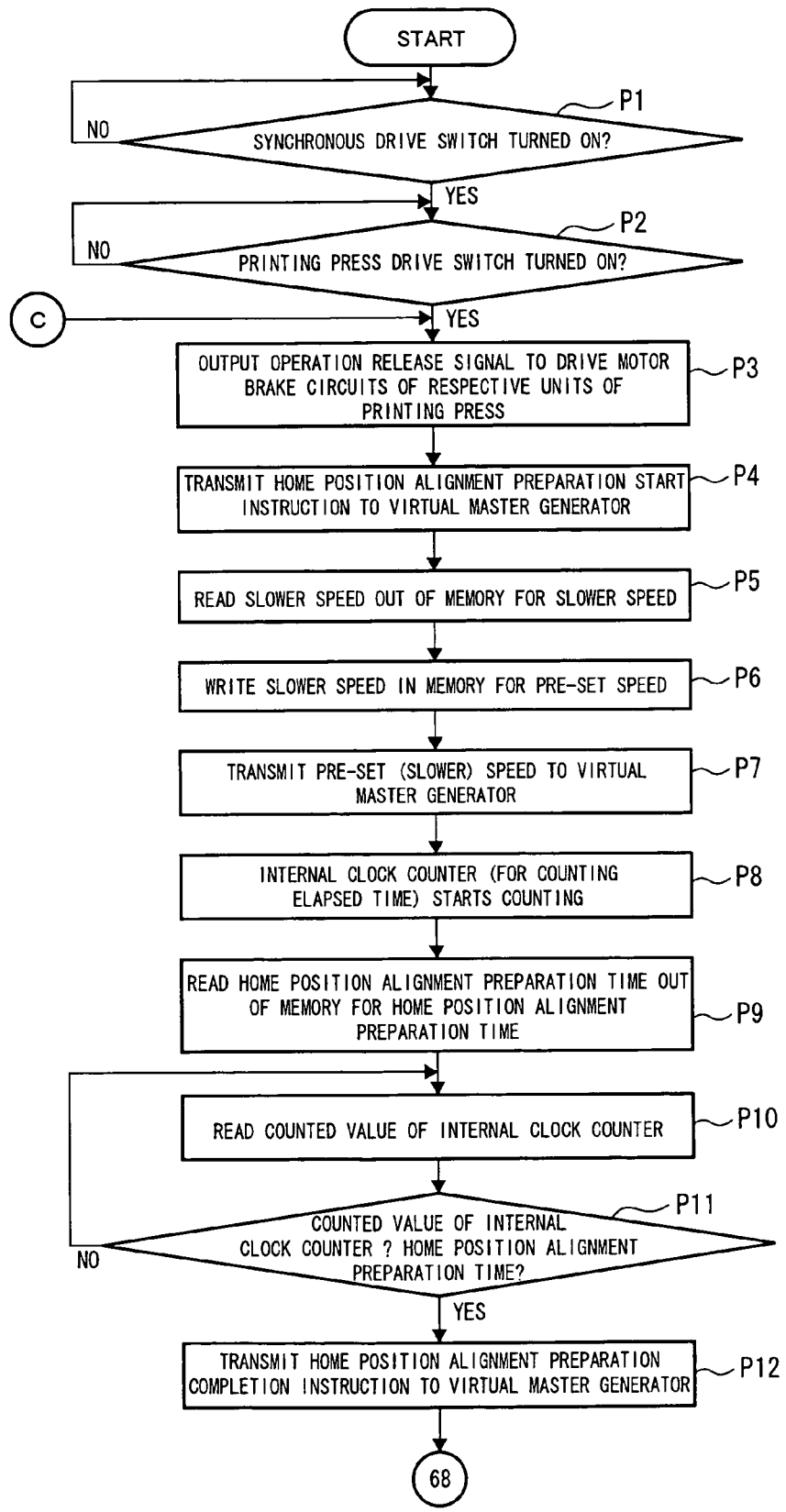
FIG. 54A is an operational flowchart of the central control unit.
Figure 54B:
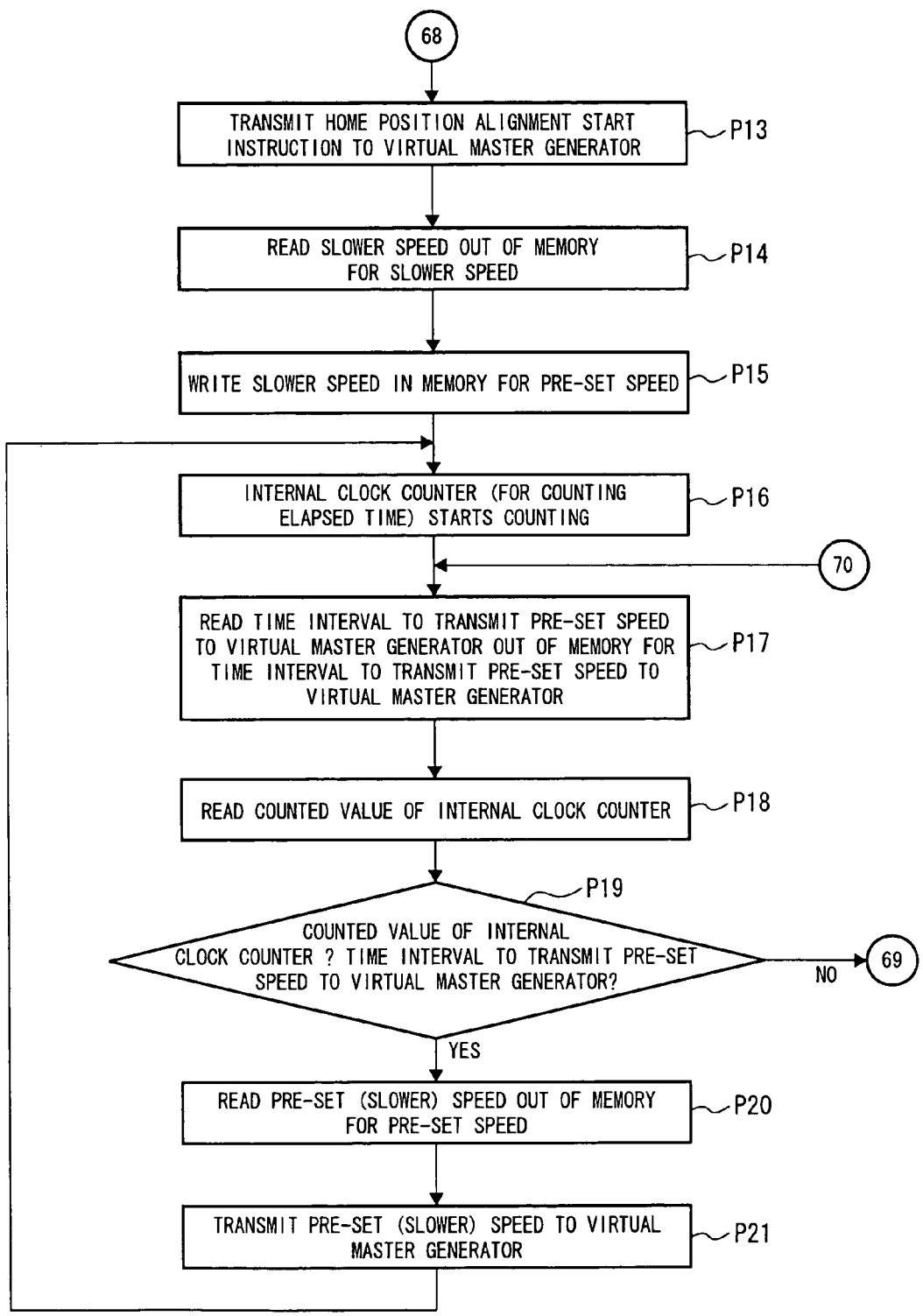
FIG. 54B is another operational flowchart of the central control unit.
Figure 54C:
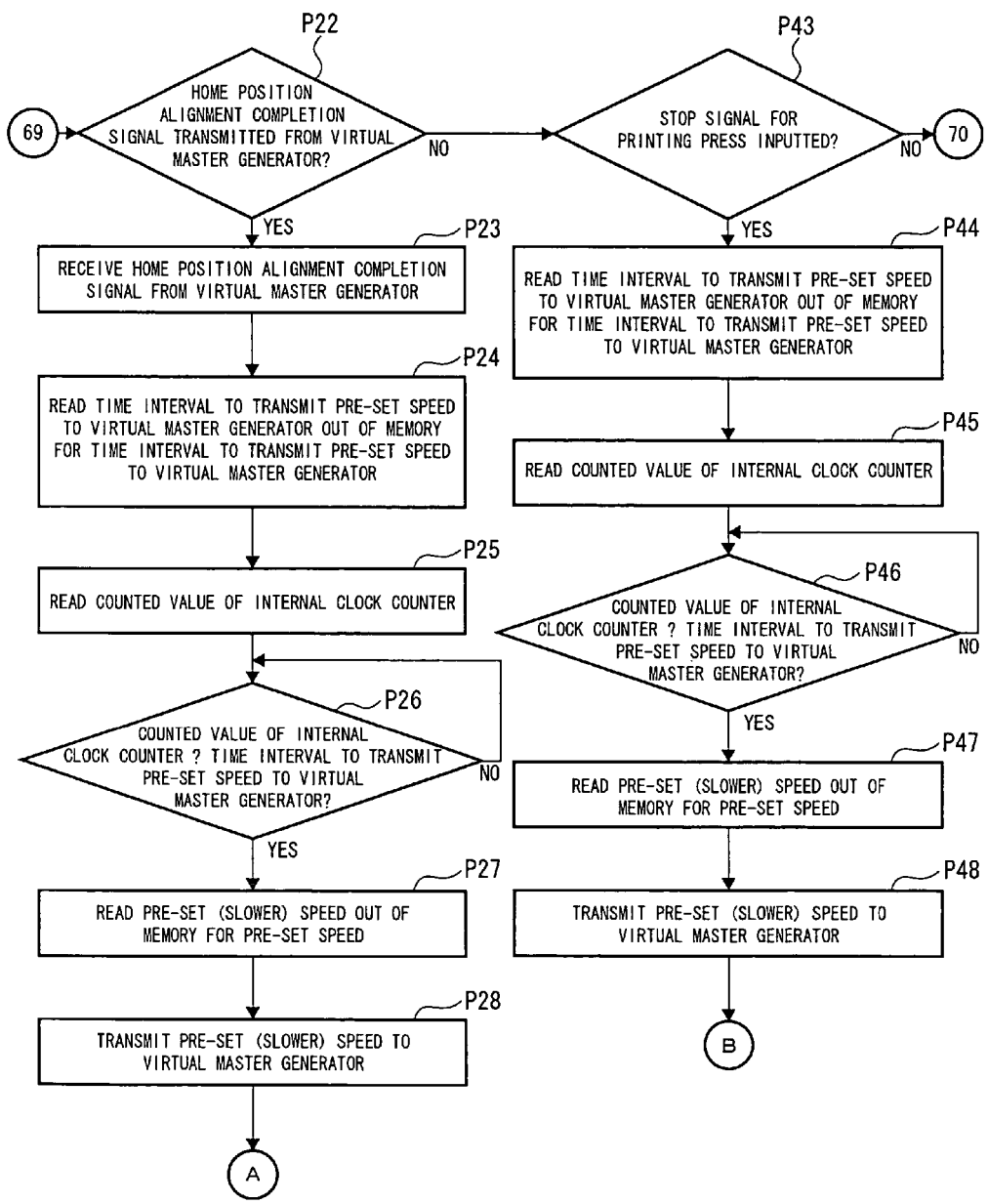
FIG. 54C is another operational flowchart of the central control unit.
Figure 55:
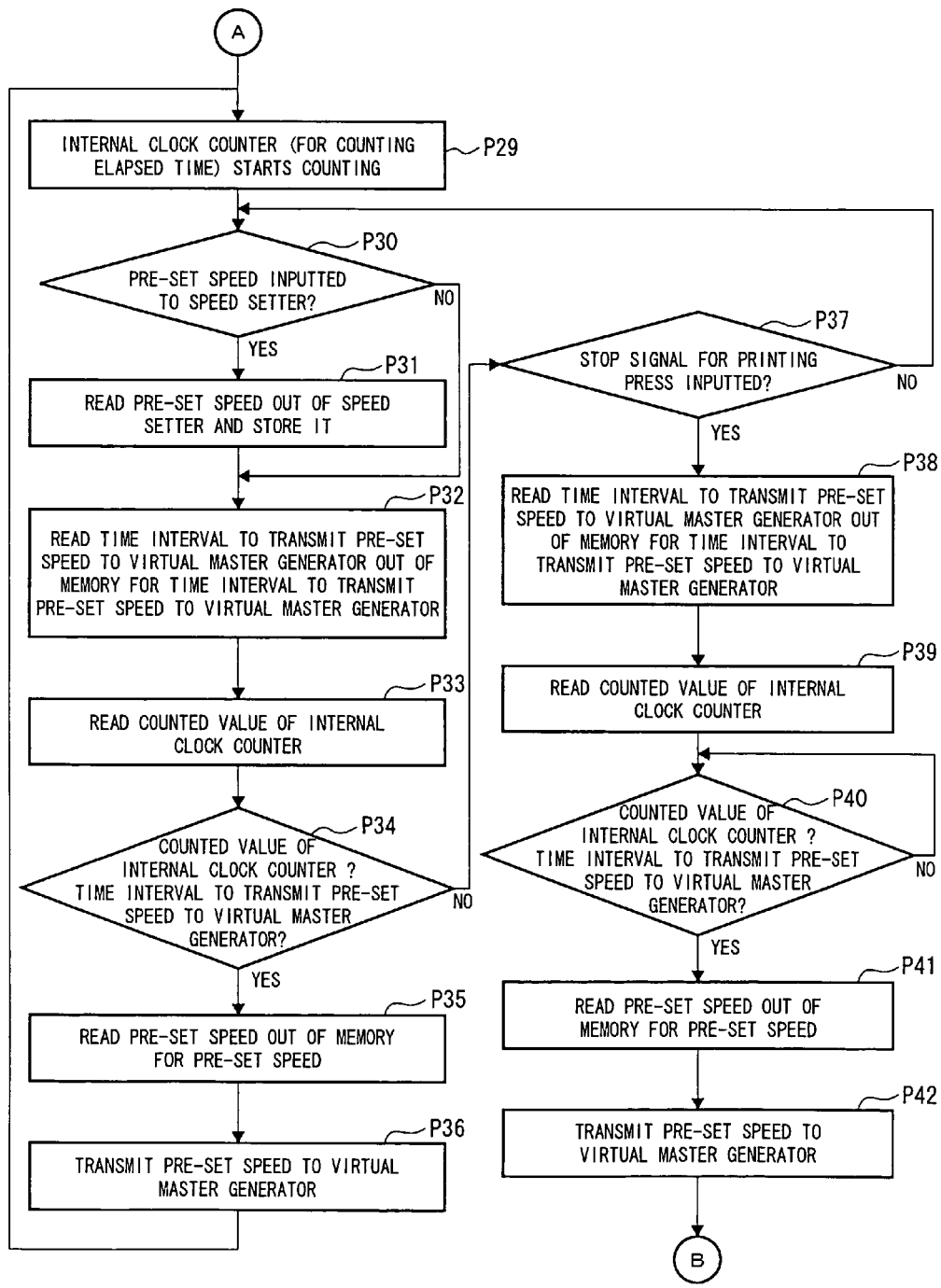
FIG. 55 is another operational flowchart of the central control unit.
Figure 56:
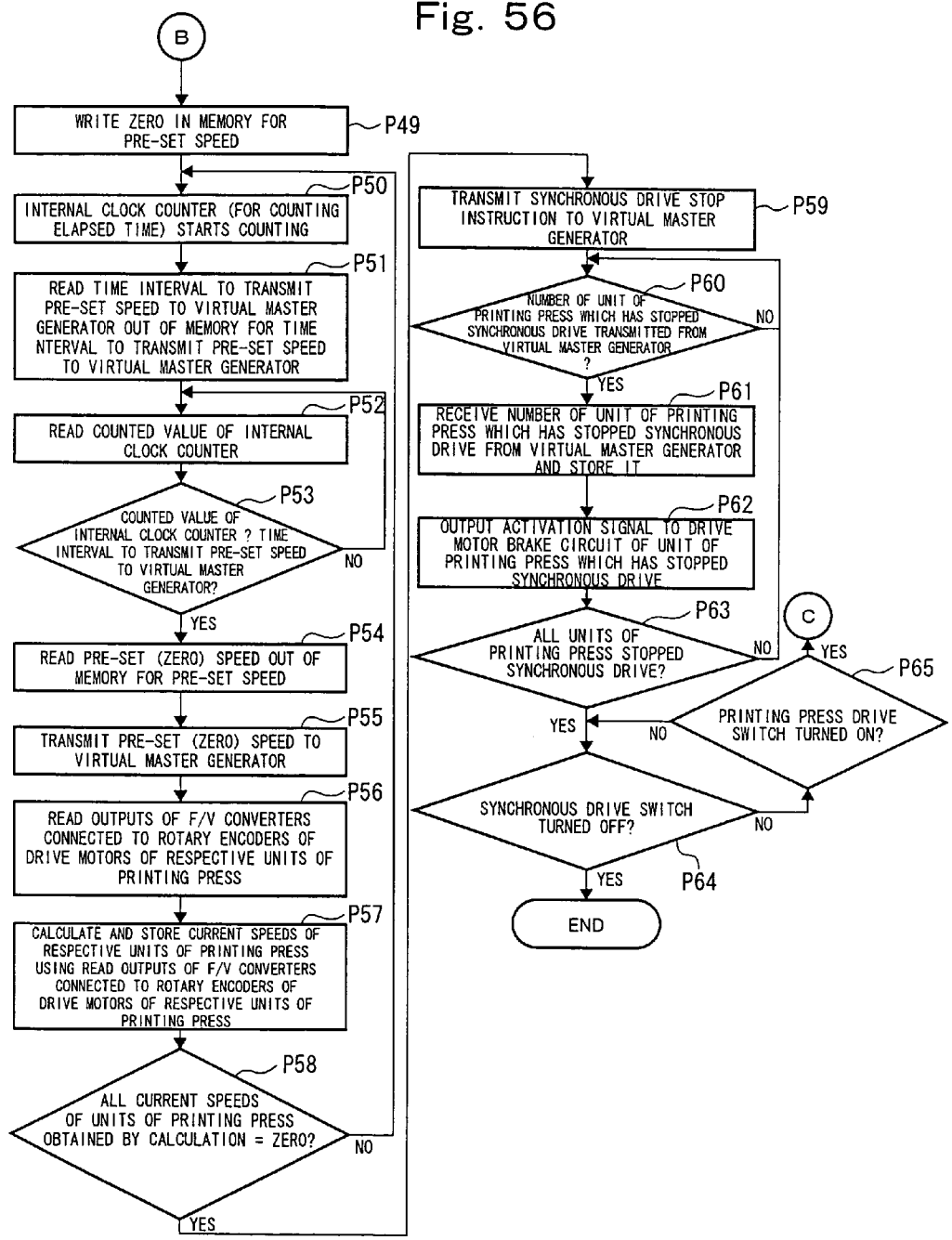
FIG. 56 is another operational flowchart of the central control unit.

FIG. 53 is a block diagram of a central control unit showing a sixth embodiment of the present invention. FIG. 54A is an operational flowchart of the central control unit. FIG. 54B is another operational flowchart of the central control unit. FIG. 54C is another operational flowchart of the central control unit. FIG. 55 is another operational flowchart of the central control unit. FIG. 56 is another operational flowchart of the central control unit.

This embodiment is a modified example of the above-described second embodiment, which is configured to release synchronous control among the respective units by outputting the synchronous drive stop instruction to the virtual master generator 13 and simultaneously to start the drive motor brakes 27a to 27e when the speeds of the respective units become zero in the course of shutting down the printing press. Therefore, in this embodiment, the schematic configuration diagram of the synchronous control device for each unit of the printing press, the block diagram of the virtual master generator, the block diagram of the drive control device of each unit of the printing press, the operational flowcharts of the virtual master generator, and the operational flowcharts of the drive control device of each unit of the printing press are similar to those in the second embodiment. Accordingly, reference will be made to the second embodiment in this context, and detailed explanation will be omitted herein.

As shown in FIG. 53, the central control unit 12 includes a CPU 40, a ROM 41, a RAM 42, a memory 43 for a slower speed of the printing press, a memory 44 for a pre-set speed, a memory 45 for home position alignment preparation time, a memory 46 for a time interval to transmit the pre-set speed to the virtual master generator, a memory 48A for current speeds of the respective units in the printing press, a memory 49A for a number of the unit in the printing press which has stopped synchronous drive, and an internal clock counter 50, which are connected to one another by a bus 56 together with respective input and output devices 51 to 54 and an interface 55.

An input device 57 such as a keyboard or various switches and buttons, a display 58 such as a CRT or a lamp, and an output device 59 such as a printer or a FD drive are connected to the input and output device 51. A speed setter 60 is connected to the input and output device 52. Drive motor brakes 27a to 27d of first to fourth units in the printing press are connected respectively to the input and output device 53 through drive motor brake circuits 61a to 61d of the first to fourth units in the printing press. Rotary encoders 29a to 29d for the drive motors of the first to fourth units in the printing press are connected to the input and output device 54 through A/D converters 63a to 63d and F/V converters 64a to 64d. Moreover, a virtual master generator 13 is connected to the interface 55.

Now, the central control unit 12 is firstly operated in accordance with operational flows shown in FIG. 54A, FIG. 54B, FIG. 54C, FIG. 55, and FIG. 56 in order to perform synchronous control of the first to fourth units 3 to 6 of the printing press.

Specifically, when a synchronous drive switch is turned on in Step P1 and a printing press drive switch is turned on in Step P2, an operation release signal is outputted to the drive motor brake circuits 61a to 61d of the respective units in the printing press in Step P3. Next, when a home position alignment preparation start instruction is transmitted to the virtual master generator 13 in Step P4, a slower speed is read out of the memory 43 for a slower speed in Step P5. Next, when the slower speed is written in the memory 44 for a pre-set speed in Step P6, the pre-set (slower) speed is transmitted to the virtual master generator 13 in Step P7. Next, when the internal clock counter (for counting elapsed time) 50 starts counting in Step P8, home position alignment preparation time is read out of the memory 45 for home position alignment preparation time in Step P9. Next, the counted value of the internal clock counter 50 is read out in Step P10, and when the counted value of the internal clock counter 50 becomes equal to or greater than the home position alignment preparation time in Step P11, a home position alignment preparation completion instruction is transmitted to the virtual master generator 13 in Step P12.

Next, after the home position alignment preparation start instruction is transmitted to the virtual master generator 13 in Step P13, when the slower speed is read out of the memory 43 for a slower speed in Step P14, the slower speed is written in the memory 44 for a pre-set speed in Step P15. Next, when the internal clock counter 50 starts counting in Step P16, a time interval to transmit the pre-set speed to the virtual master generator 13 is read out of the memory 46 for a time interval to transmit the pre-set speed to the virtual master generator in Step P17. Next, when the counted value of the internal clock counter 50 is read out in Step P18, a judgment is made in Step P19 as to whether or not the counted value of the internal clock counter 50 is equal to or greater than the time interval to transmit the pre-set speed to the virtual master generator 13. If the result is YES, the pre-set (slower) speed is read out of the memory 44 for a pre-set speed in Step P20, and then the pre-set (slower) speed is transmitted to the virtual master generator 13 in Step P21. Thereafter, the operation returns to Step P16.

If the result is NO in the above-described Step P19, a judgment is made in Step P22 as to whether or not a home position alignment completion signal has been transmitted from the virtual master generator 13. If the result is YES, the home position alignment completion signal is received from the virtual master generator 13 in Step P23. Next, the time interval to transmit the pre-set speed to the virtual master generator 13 is read out of the memory 46 for a time interval to transmit the pre-set speed to the virtual master generator in Step P24. Next, the counted value of the internal clock counter 50 is read out in Step P25. When the counted value of the internal clock counter 50 becomes equal to or greater than the time interval to transmit the pre-set speed to the virtual master generator 13 in Step P26, the pre-set (slower) speed is read out of the memory 44 for a pre-set speed in Step P27, and then the pre-set (slower) speed is transmitted to the virtual master generator 13 in Step P28.

Next, when the internal clock counter 50 starts counting in Step P29, a judgment is made in Step P30 as to whether or not the pre-set speed has been inputted to the speed setter 60. If the result is YES, the pre-set speed is read out of the speed setter 60 and stored in Step P31, and then the time interval to transmit the pre-set speed to the virtual master generator 13 is read out of the memory 46 for a time interval to transmit the pre-set speed to the virtual master generator in Step P32. If the result is NO in the above-described Step P30, then the operation directly goes to the above-described Step P32. Next, when the counted value of the internal clock counter 50 is read out in Step P33, a judgment is made in Step P34 as to whether or not the counted value of the internal clock counter 50 is equal to or greater than the time interval to transmit the pre-set speed to the virtual master generator 13. If the result is YES, the pre-set speed is read out of the memory 44 for a pre-set speed in Step P35, and then the pre-set speed is transmitted to the virtual master generator 13 in Step P36. Thereafter, the operation returns to Step P29.

If the result is NO in the above-described Step P34, a judgment is made in Step P37 as to whether or not a stop signal for the printing press has been inputted. If the result is NO, then the operation returns to Step P30. On the other hand, if the result is YES, the time interval to transmit the pre-set speed to the virtual master generator 13 is read out of the memory 46 for a time interval to transmit the pre-set speed to the virtual master generator in Step P38. Next, the counted value of the internal clock counter 50 is read out in Step P39. When the counted value of the internal clock counter 50 becomes equal to or greater than the time interval to transmit the pre-set speed to the virtual master generator 13 in Step P40, the pre-set speed is read out of the memory 44 for a pre-set speed in Step P41. Thereafter, the pre-set speed is transmitted to the virtual master generator 13 in Step P42, and the operation goes to Step P49.

If the result is NO in the above-described Step P22, a judgment is made in Step P43 as to whether or not the stop signal for the printing press has been inputted. If the result is NO, then the operation returns to Step P17. On the other hand, if the result is YES, the time interval to transmit the pre-set speed to the virtual master generator 13 is read out of the memory 46 for a time interval to transmit the pre-set speed to the virtual master generator in Step P44. Next, the counted value of the internal clock counter 50 is read out in Step P45. When the counted value of the internal clock counter 50 becomes equal to or greater than the time interval to transmit the pre-set speed to the virtual master generator 13 in Step P46, the pre-set (slower) speed is read out of the memory 44 for a pre-set speed in Step P47. Thereafter, the pre-set (slower) speed is transmitted to the virtual master generator 13 in Step P48, and the operation goes to Step P49.

Next, zero is written in the memory 44 for a pre-set speed in Step P49. When the internal clock counter 50 starts counting in Step P50, the time interval to transmit the pre-set speed to the virtual master generator 13 is read out of the memory 46 for a time interval to transmit the pre-set speed to the virtual master generator in Step P51. Next, the counted value of the internal clock counter 50 is read out in Step P52. When the counted value of the internal clock counter 50 becomes equal to or greater than the time interval to transmit the pre-set speed to the virtual master generator 13 in Step P53, the pre-set speed (zero) is read out of the memory 44 for a pre-set speed in Step P54.

Next, after the pre-set speed (zero) is transmitted to the virtual master generator 13 in Step P55, outputs of the F/V converters 64a to 64d connected to the rotary encoders 29a to 29d of the drive motors 26a to 26d of the respective units in the printing press are read out in Step P56. Thereafter, current speeds of the respective units in the printing press are calculated and stored in Step P57 by use of the outputs of the F/V converters 64a to 64d connected to the rotary encoders 29a to 29d of the drive motors 26a to 26d of the respective units, which are read out as described above.

Next, a judgment is made in Step P58 as to whether or not all the current speeds of the units obtained by the calculation are equal to zero. If the result is NO, the operation returns to Step P50. On the other hand, if the result is YES, a synchronous drive stop instruction is transmitted to the virtual master generator 13 in Step P59. Next, when the number of the unit in the printing press which has stopped synchronous drive is transmitted from the virtual master generator 13 in Step P60, the number of the unit in the printing press which has stopped synchronous drive is received from the virtual master generator 13 and stored in Step P61. Next, when an activation signal is outputted to the drive motor brake circuit of the unit in the printing press which has stopped synchronous drive in Step P62, a judgment is made in Step P63 as to whether or not all the units have stopped synchronous drive. If the result is NO, the operation returns to Step P60. On the other hand, if the result is YES, the synchronous drive switch is turned off in Step P64 and the operation is terminated. Here, if the synchronous drive switch is not turned off in Step P64 and if the printing press drive switch is turned on in Step P65, the operation returns to Step P3.

In this way, according to this embodiment, when the printing press is in shutdown, phase deviation among the respective units 3 to 6 is prevented and the synchronous condition is retained by stopping the synchronous control by the drive motors 26a to 26d of the first to fourth units 3 to 6 and by starting the drive motor brakes 27a to 27d attached to the drive motors 26a to 26d instead.

In this case, according to this embodiment, when the speeds of the respective units 3 to 6 are detected by the rotary encoders 29a to 29d and the speeds are reduced to zero by the stop instruction, the synchronous control of the respective units 3 to 6 is released by outputting the synchronous drive stop instruction to the virtual master generator 13. Simultaneously, the drive motor brakes 27a to 27d of the drive motors 26a to 26d of the respective units 3 to 6 are started. Accordingly, rotation of the respective units 3 to 6 in the printing press is stopped by the drive motor brakes 27a to 27d when the printing press is in shutdown.

In this way, it is not necessary to supply currents to the drive motors 26a to 26d and to the drive motor driver 146A when the printing press is in shutdown. Therefore, it is possible to reduce power consumption and to improve durability of motors and motor bearings. Although this embodiment has been described on the synchronous control among the respective units 3 to 6 of the printing press, it is needless to say that the present invention is also applicable to synchronous control among the respective units 3 to 6 of the printing press and the folding machine 10.

Seventh Embodiment

Figure 57:
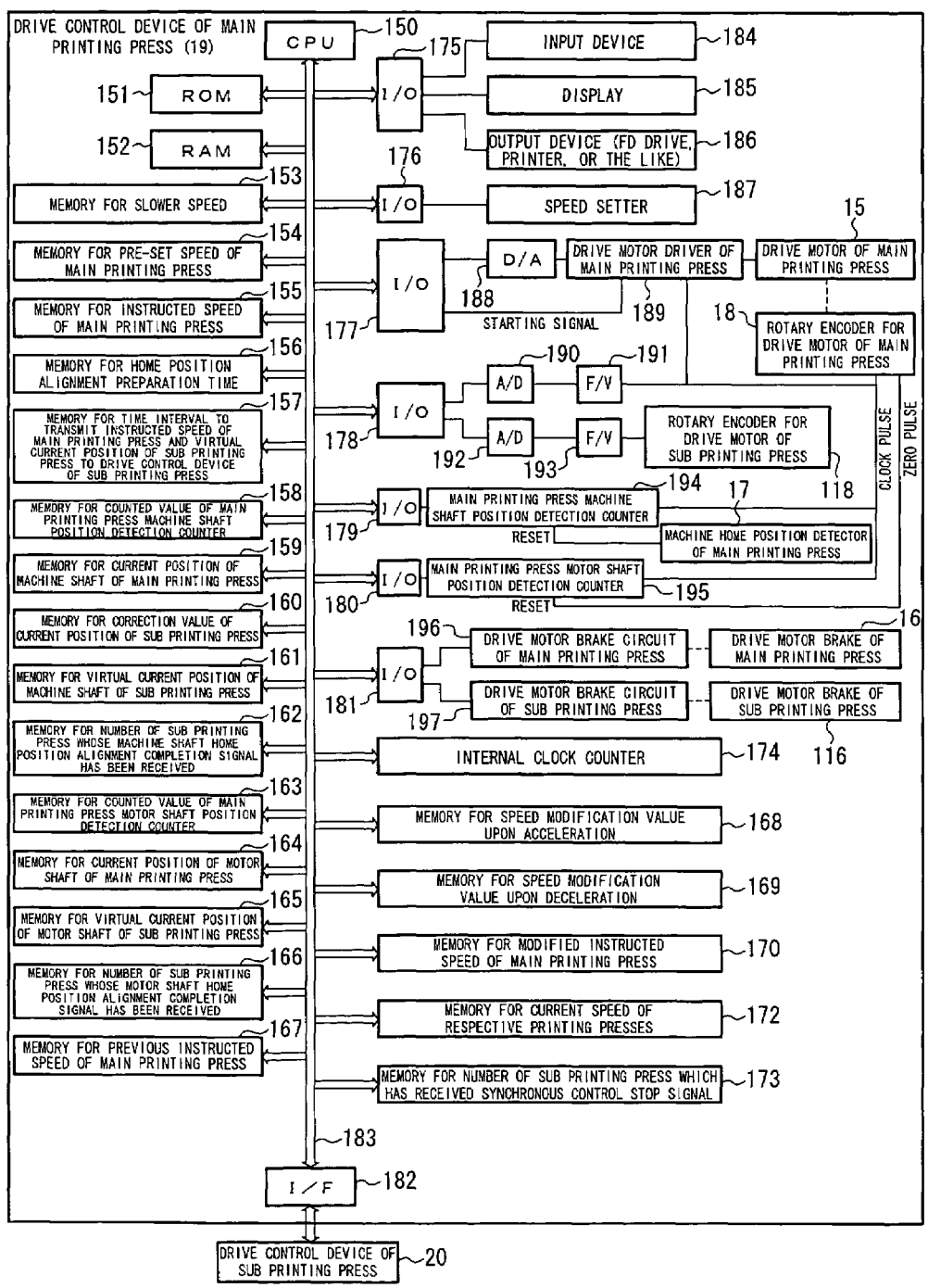
FIG. 57 is a block diagram of a drive control device for a main printing press, showing a seventh embodiment of the present invention.
Figure 58A:
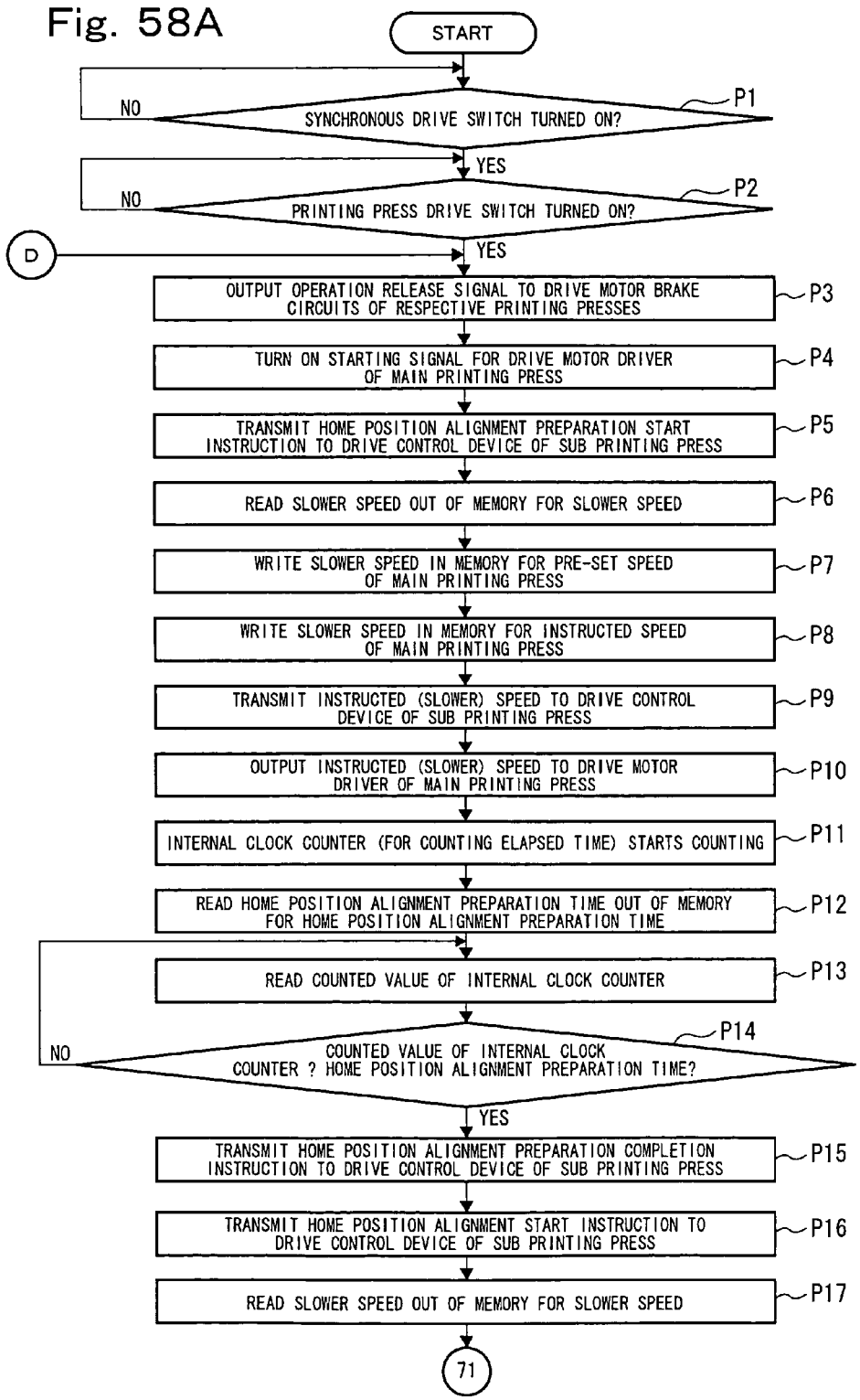
FIG. 58A is an operational flowchart of the drive control device for the main printing press.
Figure 58B:
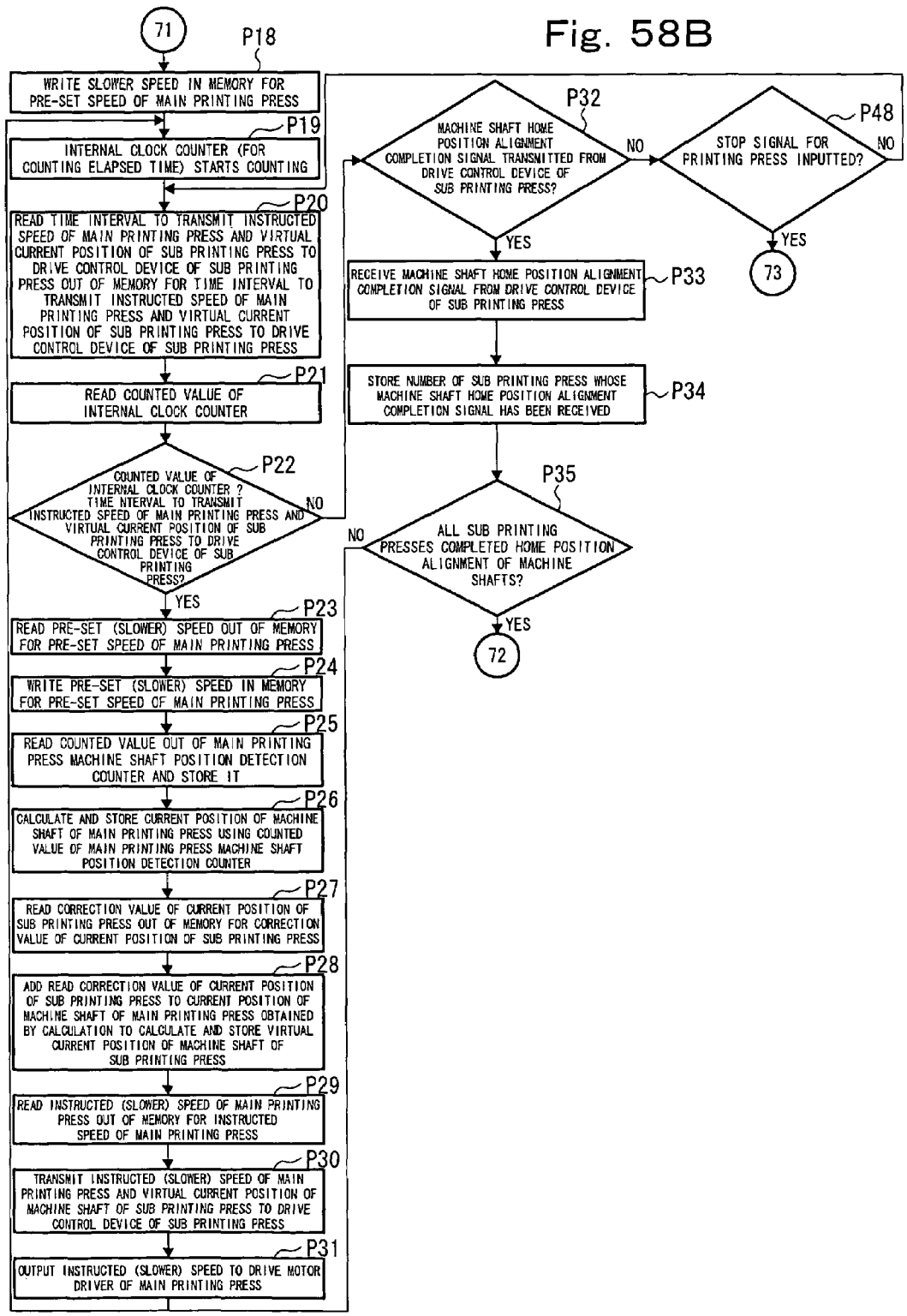
FIG. 58B is another operational flowchart of the drive control device for the main printing press.
Figure 58C:
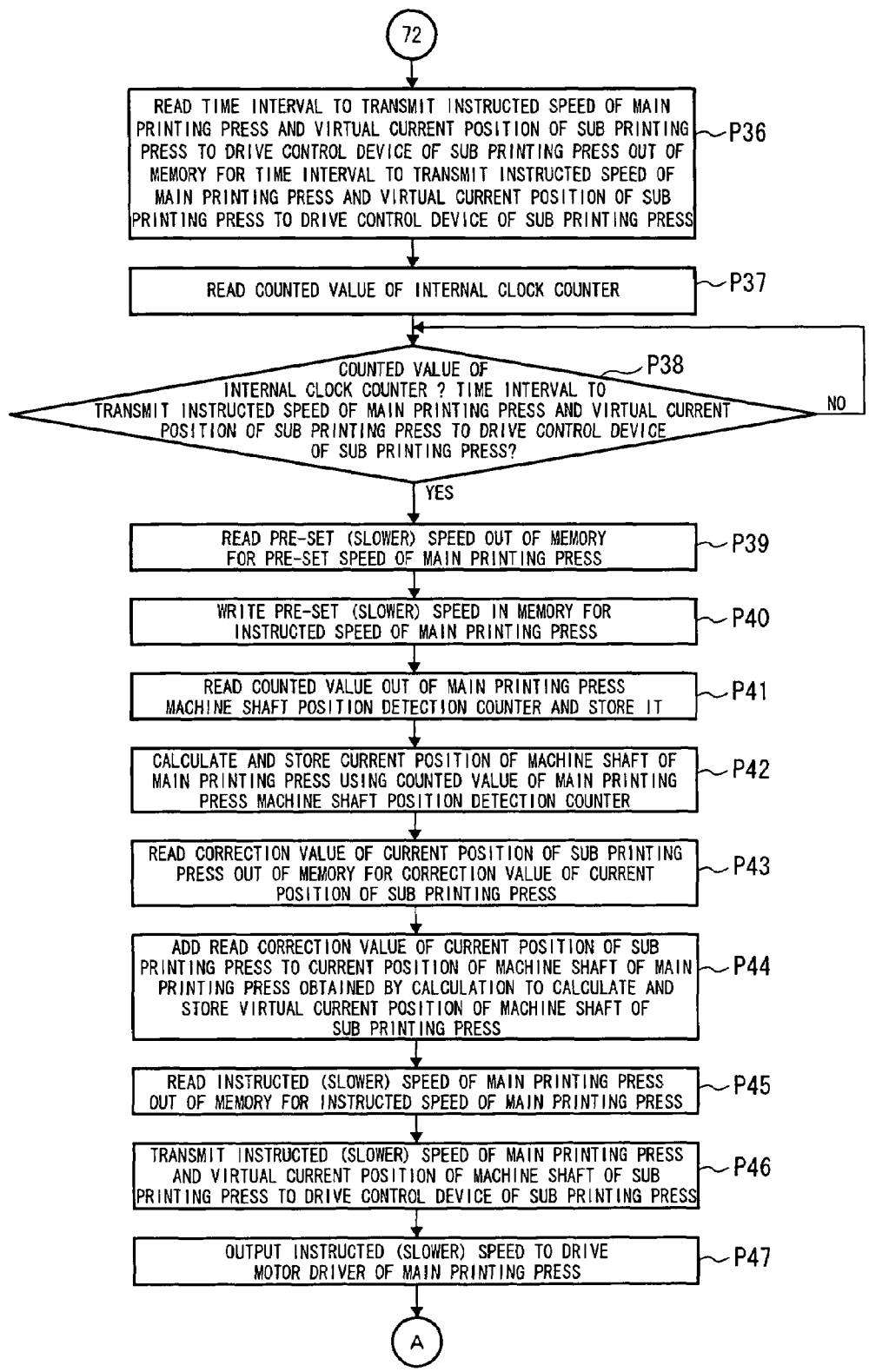
FIG. 58C is another operational flowchart of the drive control device for the main printing press.
Figure 58D:
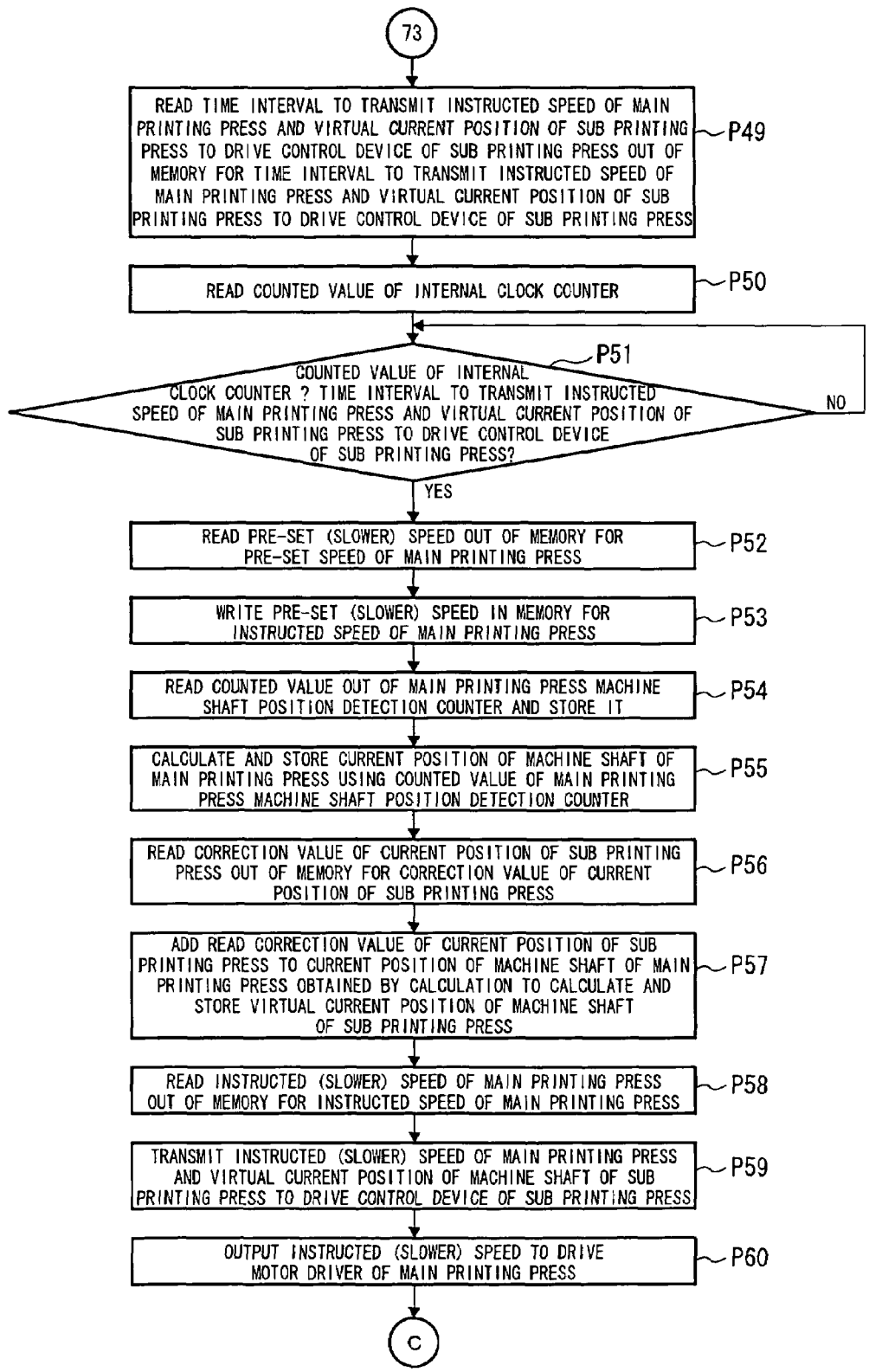
FIG. 58D is another operational flowchart of the drive control device for the main printing press.
Figure 59A:
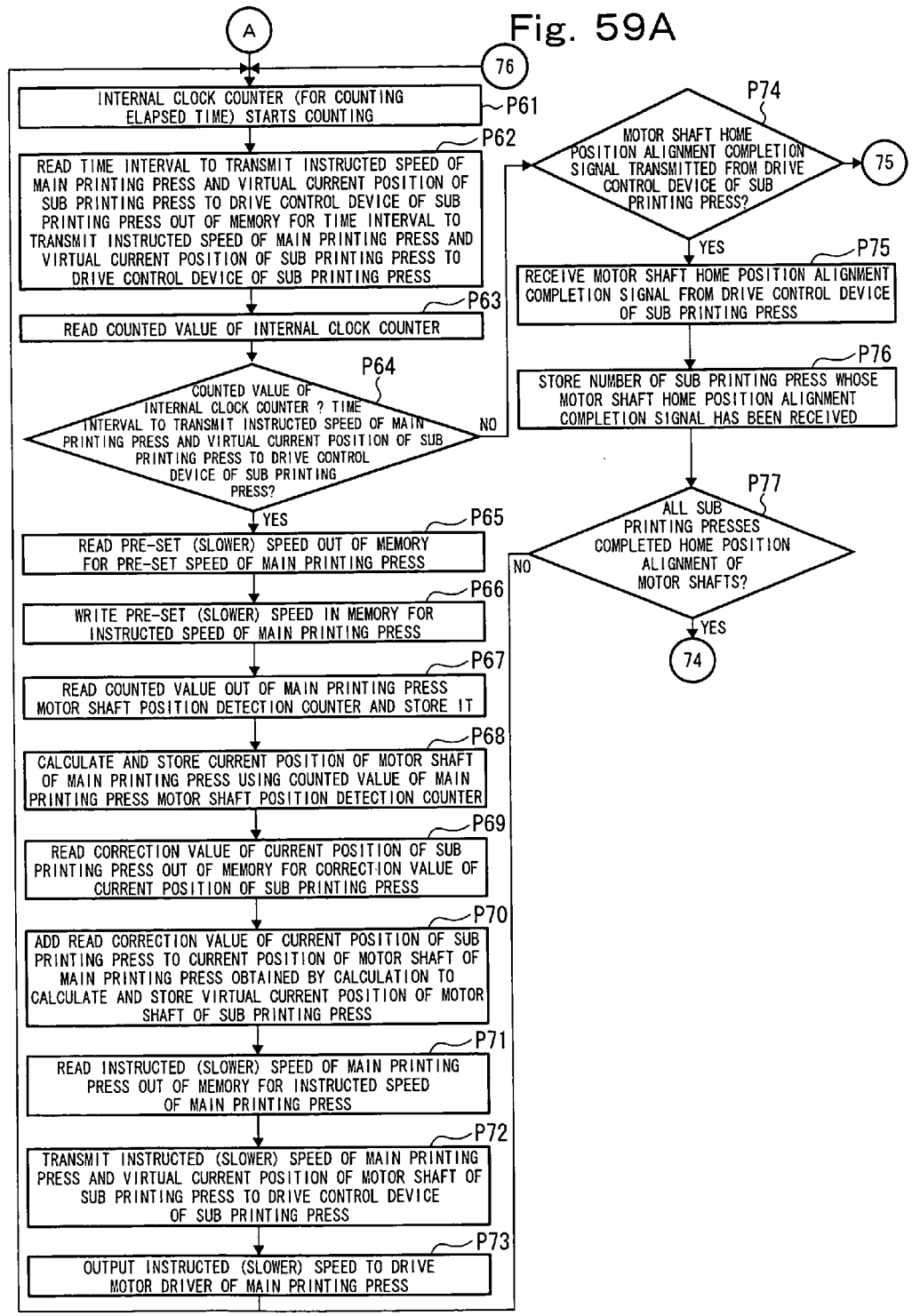
FIG. 59A is another operational flowchart of the drive control device for the main printing press.
Figure 59B:
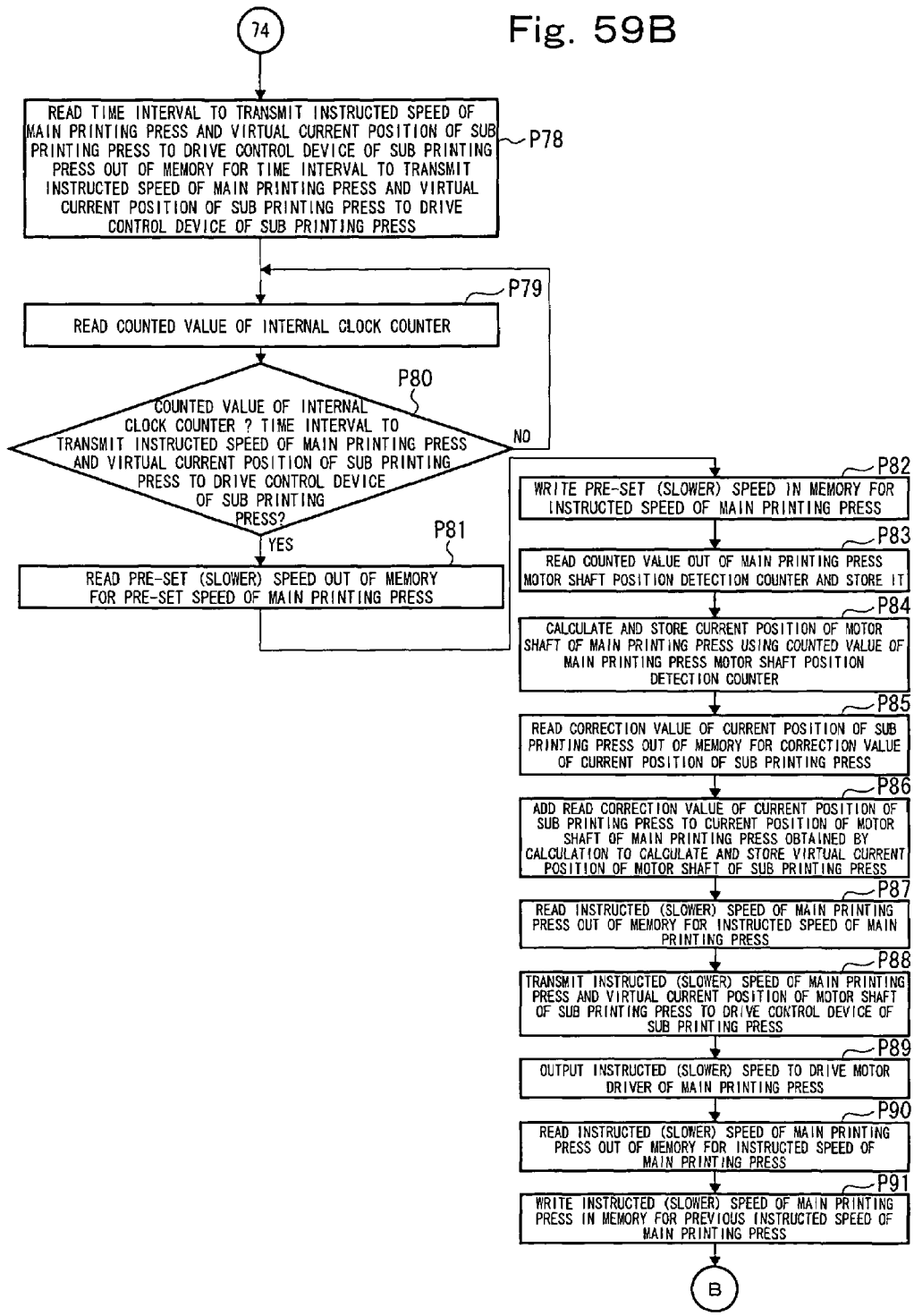
FIG. 59B is another operational flowchart of the drive control device for the main printing press.
Figure 60A:
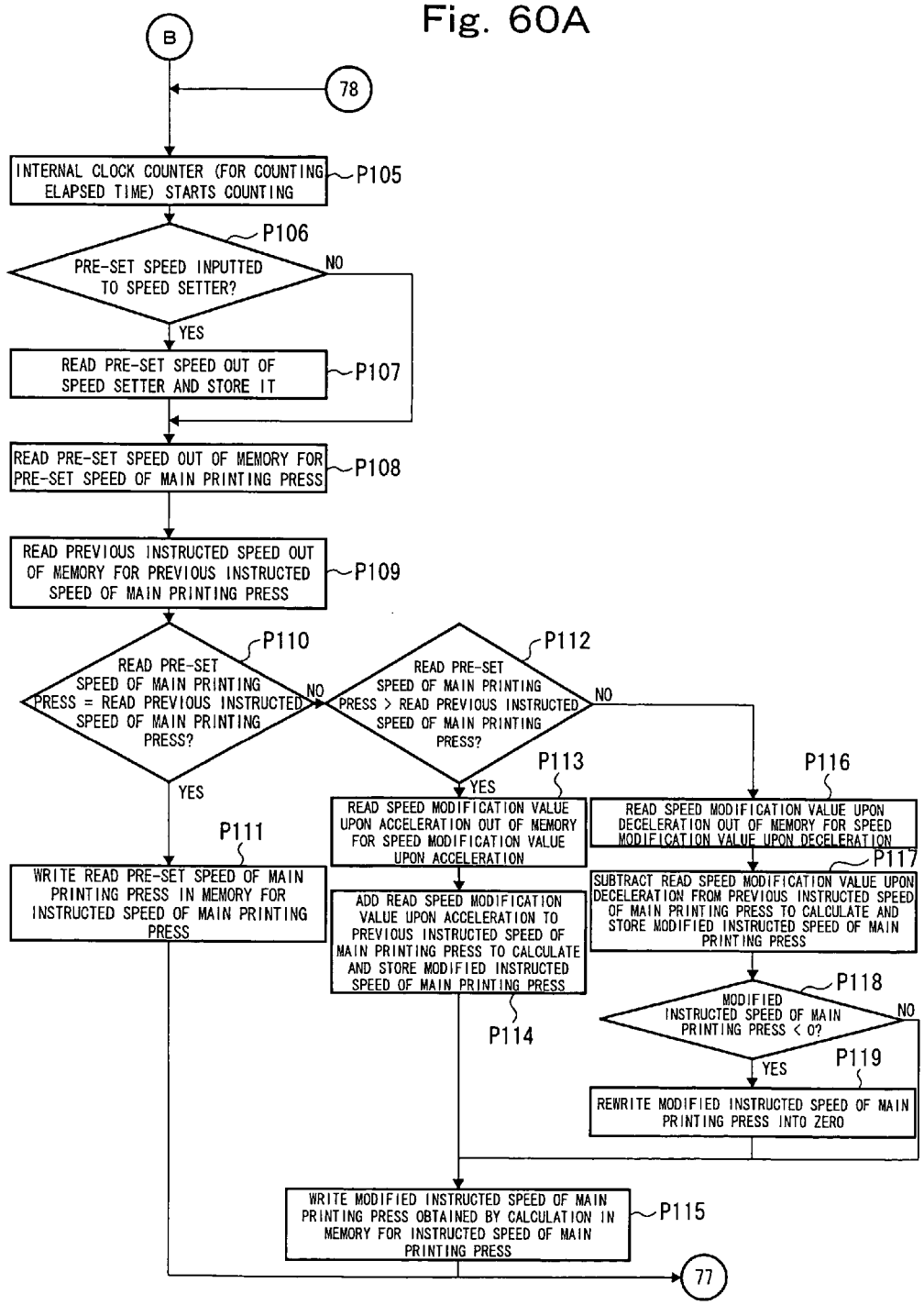
FIG. 60A is another operational flowchart of the drive control device for the main printing press.
Figure 60B:
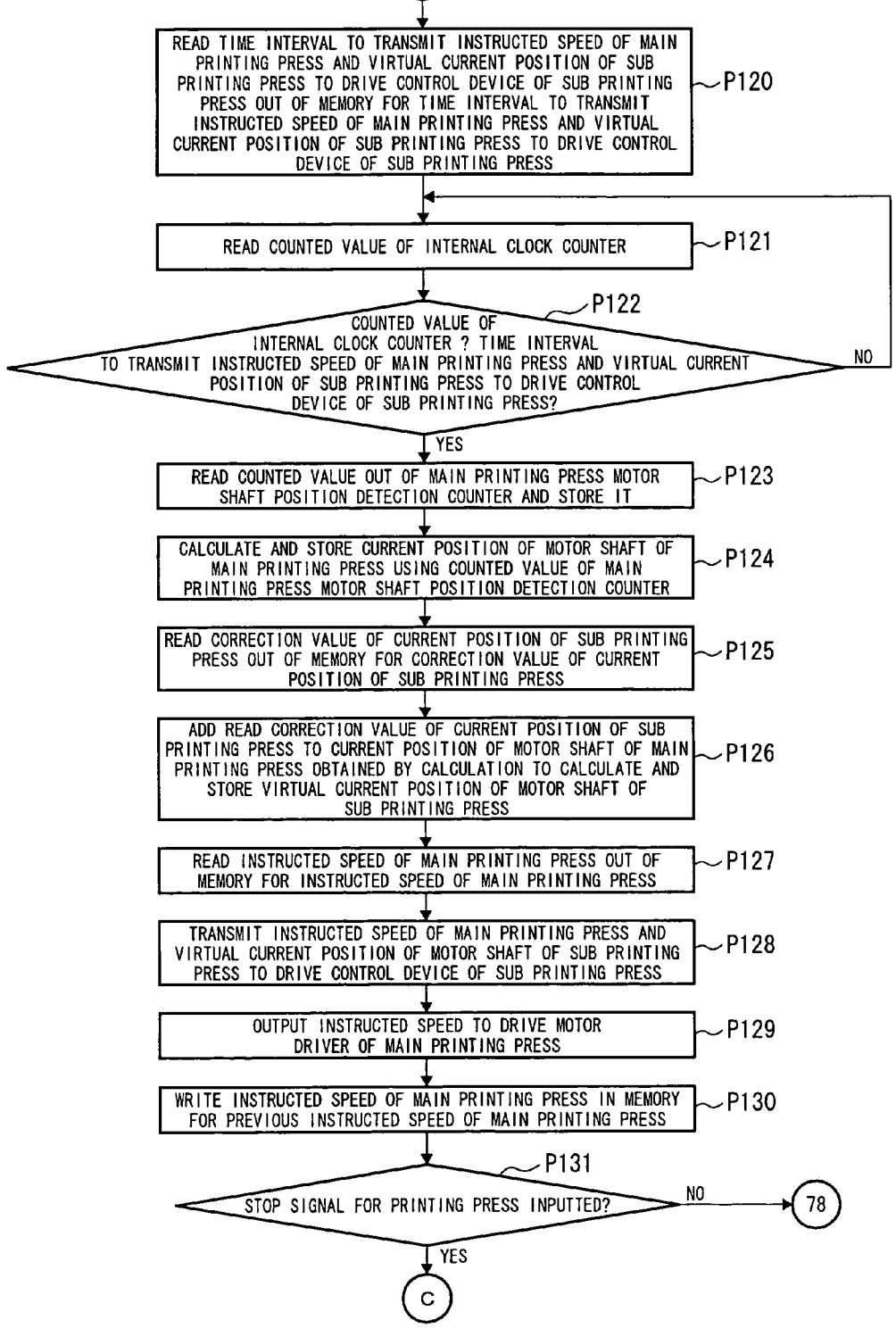
FIG. 60B is another operational flowchart of the drive control device for the main printing press.
Figure 61A:
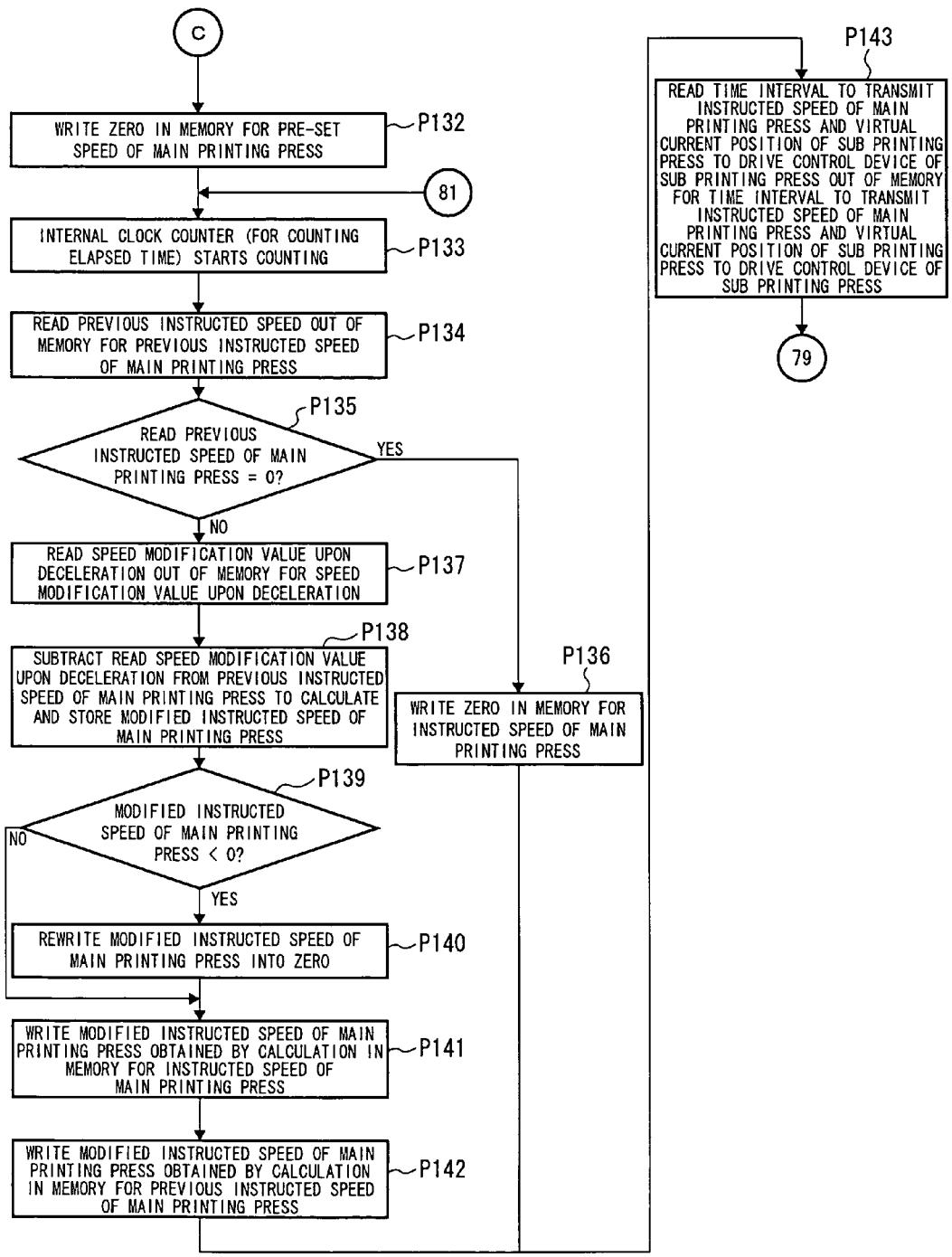
FIG. 61A is another operational flowchart of the drive control device for the main printing press.
Figure 61B:
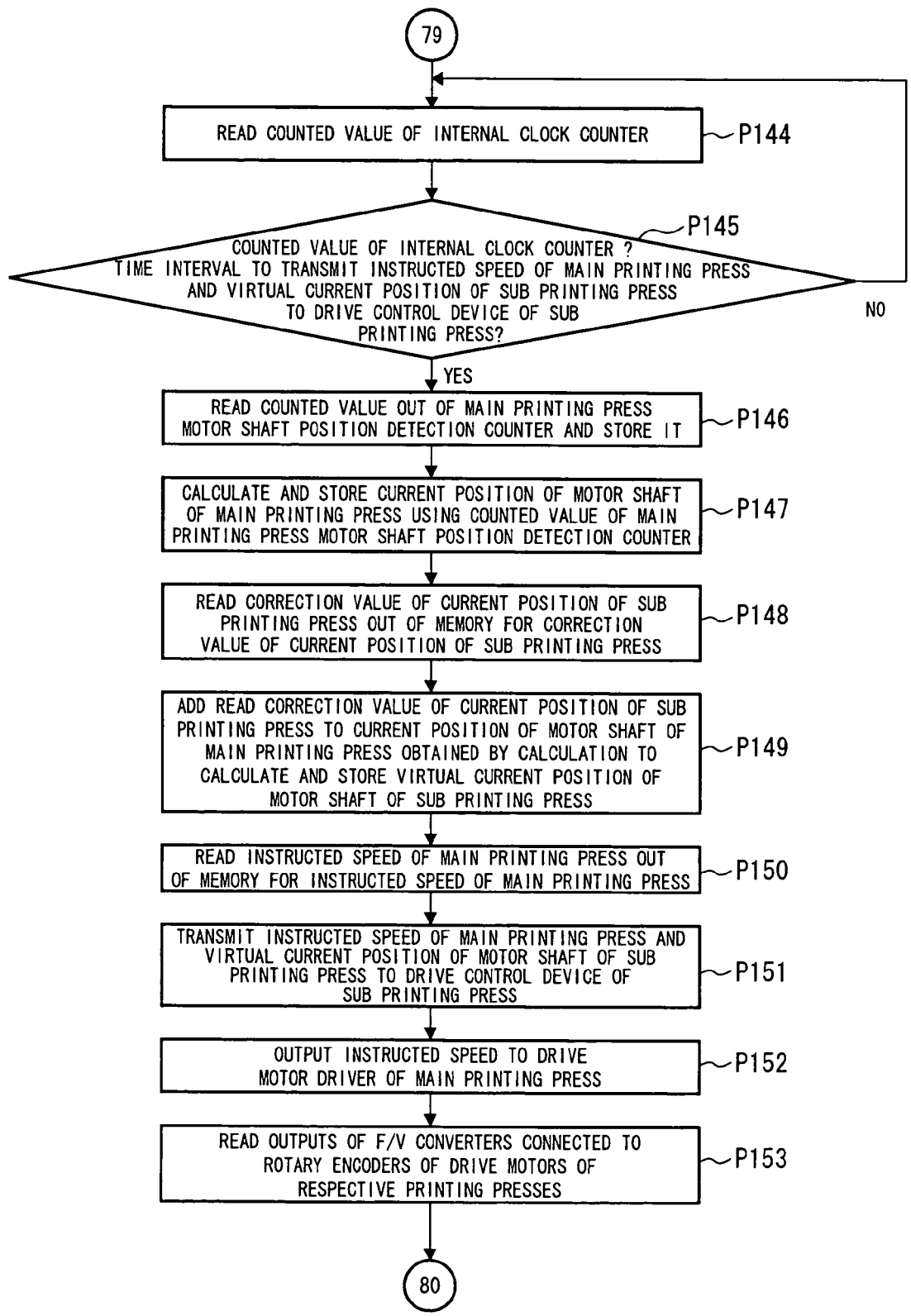
FIG. 61B is another operational flowchart of the drive control device for the main printing press.

FIG. 57 is a block diagram of a drive control device for a main printing press showing a seventh embodiment of the present invention. FIG. 58A is an operational flowchart of the drive control device for the main printing press. FIG. 58B is another operational flowchart of the drive control device for the main printing press. FIG. 58C is another operational flowchart of the drive control device for the main printing press. FIG. 58D is another operational flowchart of the drive control device for the main printing press. FIG. 59A is another operational flowchart of the drive control device for the main printing press. FIG. 59B is another operational flowchart of the drive control device for the main printing press. FIG. 59C is another operational flowchart of the drive control device for the main printing press. FIG. 60A is another operational flowchart of the drive control device for the main printing press. FIG. 60B is another operational flowchart of the drive control device for the main printing press. FIG. 61A is another operational flowchart of the drive control device for the main printing press. FIG. 61B is another operational flowchart of the drive control device for the main printing press. FIG. 61C is another operational flowchart of the drive control device for the main printing press.

This embodiment is a modified example of the above-described third embodiment, which is configured to release synchronous control of the sub printing press with respect to the main printing press A and simultaneously to start the drive motor brakes 16 and 116 when the speeds of the main and sub printing presses A and B become zero in the course of shutting down the printing presses A and B. Therefore, in this embodiment, the schematic configuration diagram of the synchronous control device for the plurality of printing presses, the block diagram of the drive control device of the sub printing press, and the operational flowcharts of the drive control device of the sub printing press are similar to those in the third embodiment. Accordingly, reference will be made to the third embodiment in this context, and detailed explanation will be omitted herein.

As shown in FIG. 57, a device control device 19 of the main printing press includes a CPU 150, a ROM 151, a RAM 152, a memory 153 for a slower speed, a memory 154 for a pre-set speed of the main printing press, a memory 155 for an instructed speed of the main printing press, a memory 156 for home position alignment preparation time, a memory 157 for a time interval to transmit the instructed speed of the main printing press and a virtual current position of the sub printing press to the drive control device of the sub printing press, a memory 158 for a counted value of a main printing press machine shaft position detection counter, a memory 159 for a current position of the machine shaft of the main printing press, a memory 160 for a correction value of a current position of the sub printing press, a memory 161 for a virtual current position of a machine shaft of the sub printing press, a memory 162 for a number of the sub printing press whose machine shaft home position alignment completion signal has been received, a memory 163 for a counted value of a main printing press motor shaft position detection counter, a memory 164 for a current position of a motor shaft of the main printing press, a memory 165 for a virtual current position of a motor shaft of the sub printing press, a memory 166 for a number of the sub printing press whose motor shaft home position alignment completion signal has been received, a memory 167 for a previous instructed speed of the main printing press, a memory 168 for a speed modification value upon acceleration, a memory 169 for a speed modification value upon deceleration, a memory 170 for a modified instructed speed of the main printing press, a memory 172 for current speeds of the respective printing presses, a memory 173 for a number of the sub printing press which has received a synchronous control stop signal, and an internal clock counter 174, which are connected to one another by a bus 183 together with respective input and output devices 175 to 181 and an interface 182.

An input device 184 such as a keyboard or various switches and buttons, a display 185 such as a CRT or a lamp, and an output device 186 such as a printer or a FD drive are connected to the input and output device 175. A speed setter 187 is connected to the input and output device 176. A drive motor driver 189 of the main printing press is connected to the input and output device 177 through a D/A converter 188, and a drive motor 15 of the main printing press and a rotary encoder 18 for the drive motor of the main printing press are connected to this drive motor driver 189. The rotary encoder 18 for the drive motor of the main printing press is connected to the input and output device 178 through an A/D converter 190 and a F/V converter 191, and a rotary encoder 118 for the drive motor of the sub printing press is similarly connected thereto through an A/D converter 192 and a F/V converter 193. A main printing press machine shaft position detection counter 194 is connected to the input and output device 179, and the rotary encoder 18 for the drive motor of the main printing press and a machine home position detector 17 of the main printing press are connected to this counter 194. A main printing press motor shaft position detection counter 195 is connected to the input and output device 180, and the rotary encoder 18 for the drive motor of the main printing press is connected to this counter 195. A drive motor brake 16 of the main printing press is connected to the input and output device 181 through a drive motor brake circuit 196 of the main printing press, and a drive motor brake 116 of the sub printing press is also connected thereto through a drive motor brake circuit 197 of the sub printing press. Moreover, a drive control device 20 of the sub printing press is connected to the interface 182.

Now, the device control device 19 of the main printing press is operated in accordance with operational flows shown in FIG. 58A, FIG. 58B, FIG. 58C, FIG. 58d, FIG. 59A, FIG. 59B, FIG. 59C, FIG. 60A, FIG. 60B, FIG. 61A, FIG. 61B, and FIG. 61C in order to perform synchronous control of the sub printing press B with respect to the main printing press A.

Specifically, when a synchronous drive switch is turned on in Step P1 and a printing press drive switch is turned on in Step P2, an operation release signal is outputted to the drive motor brake circuits 196 and 197 of the respective printing presses in Step P3. Next, when a starting signal for the drive motor driver 189 of the main printing press is turned on in Step P4, a home position alignment preparation start instruction is transmitted to the drive control device 20 of the sub printing press in Step P5. Next, when a slower speed is read out of the memory 153 for a slower speed in Step P6, the slower speed is written in the memory 154 for a pre-set speed of the main printing press in Step P7. Next, when the slower speed is written in memory 155 for an instructed speed of the main printing press in Step P8, the instructed (slower) speed is transmitted to the drive control device 20 of the sub printing press in Step P9. Next, when the instructed (slower) speed is outputted to the drive motor driver 189 of the main printing press in Step P10, the internal clock counter (for counting elapsed time) 174 starts counting in Step P11. Next, when home position alignment preparation time is read out of the memory 156 for home position alignment preparation time in Step P12, the counted value of the internal clock counter 174 is read out in Step P13.

When the counted value of the internal clock counter 174 becomes equal to or greater than the home position alignment preparation time in Step P14, a home position alignment preparation completion instruction is transmitted to the drive control device 20 of the sub printing press in Step P15. Next, when the home position alignment preparation start instruction is transmitted to the drive control device 20 of the sub printing press in Step P16, the slower speed is read out of the memory 153 for a slower speed in Step P17. Next, when the slower speed is written in the memory 154 for a pre-set speed of the main printing press in Step P18, the internal clock counter (for counting elapsed time) 174 starts counting in Step P19. Next, when a time interval to transmit the instructed speed of the main printing press and a virtual current position of the sub printing press to the drive control device 20 of the sub printing press is read out of the memory 157 for a time interval to transmit the instructed speed of the main printing press and a virtual current position of the sub printing press to the drive control device 20 of the sub printing press in Step P20, the counted value of the internal clock counter 174 is read out in Step P21.

Next, a judgment is made in Step P22 as to whether or not the counted value of the internal clock counter 174 is equal to or greater than the time interval to transmit the instructed speed of the main printing press and the virtual current position of the sub printing press to the drive control device 20 of the sub printing press. If the result is YES, the pre-set (slower) speed is read out of the memory 154 for a pre-set speed of the main printing press in Step P23. Next, when the pre-set (slower) speed is written in the memory 155 for an instructed speed of the main printing press in Step P24, a counted value is read out of the main printing press machine shaft position detection counter 194, and is stored in Step P25. Next, when a current position of the machine shaft of the main printing press is calculated by use of the counted value of the main printing press machine shaft position detection counter 194 and is stored in Step P26, a correction value of a current position of the sub printing press is read out of the memory 160 for a correction value of a current position of the sub printing press in Step P27.

Next, when the correction value of the current position of the sub printing press thus read out is added to the current position of the machine shaft of the main printing press obtained by the calculation, and a virtual current position of the machine shaft of the sub printing press is calculated and stored in Step P28, the instructed (slower) speed of the main printing press is read out of the memory 155 for an instructed speed of the main printing press in Step P29. Next, when the instructed (slower) speed of the main printing press and the virtual current position of the machine shaft of the sub printing press are transmitted to the drive control device 20 of the sub printing press in Step P30, the instructed (slower) speed is outputted to the drive motor driver 189 of the main printing press in Step P31. Thereafter, the operation returns to Step P19.

If the result is NO in the above-described Step P22, a judgment is made in Step P32 as to whether or not a machine shaft home position alignment completion signal has been transmitted from the drive control device 20 of the sub printing press. If the result is YES, the machine shaft home position alignment completion signal is received from the drive control device 20 of the sub printing press in Step P33. Next, when a number of the sub printing press whose machine shaft home position alignment completion signal has been received is stored in Step P34, a judgment is made in Step P35 as to whether or not machine shaft home position alignment is completed in terms of all the sub printing presses. If the result is NO, the operation returns to the above-described Step P19.

On the other hand, if the result is YES, the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in Step P36. Then, the counted value of the internal clock counter 174 is read out in Step P37. Next, when the counted value of the internal clock counter 174 becomes equal to or greater than the time interval to transmit the instructed speed of the main printing press and the virtual current position of the sub printing press to the drive control device 20 of the sub printing press in Step P38, the pre-set (slower) speed is read out of the memory 154 for a pre-set speed of the main printing press in Step P39. Next, when the pre-set (slower) speed is written in the memory 155 for an instructed speed of the main printing press in Step P40, the counted value is read out of the main printing press machine shaft position detection counter 194, and is stored in Step P41. Next, when the current position of the machine shaft of the main printing press is calculated by use of the counted value of the main printing press machine shaft position detection counter 194 and is stored in Step P42, the correction value of the current position of the sub printing press is read out of the memory 160 for a correction value of a current position of the sub printing press in Step P43.

Next, when the correction value of the current position of the sub printing press thus read out is added to the current position of the machine shaft of the main printing press obtained by the calculation, and the virtual current position of the machine shaft of the sub printing press is calculated and stored in Step P44, the instructed (slower) speed of the main printing press is read out of the memory 155 for an instructed speed of the main printing press in Step P45. Next, when the instructed (slower) speed of the main printing press and the virtual current position of the machine shaft of the sub printing press are transmitted to the drive control device 20 of the sub printing press in Step P46, the instructed (slower) speed is outputted to the drive motor driver 189 of the main printing press in Step P47. Thereafter, the operation goes to Step P61 to be described later.

If the result is NO in the above-described Step P32, a judgment is made in Step P48 as to whether or not a stop signal for the printing press has been inputted. Here, if the result is NO, the operation returns to Step P20. If the result is YES, the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in Step P49, and then the counted value of the internal clock counter 174 is read out in Step P50. Next, when the counted value of the internal clock counter 174 becomes equal to or greater than the time interval to transmit the instructed speed of the main printing press and the virtual current position of the sub printing press to the drive control device 20 of the sub printing press in Step P51, the pre-set (slower) speed is read out of the memory 154 for a pre-set speed of the main printing press in Step P52. Next, when the pre-set (slower) speed is written in memory 155 for an instructed speed of the main printing press in Step P53, the counted value is read out of the main printing press machine shaft position detection counter 194 and is stored in Step P54. Next, when the current position of the machine shaft of the main printing press is calculated by use of the counted value of the main printing press machine shaft position detection counter 194 and is stored in Step P55, the correction value of the current position of the sub printing press is read out of the memory 160 for a correction value of a current position of the sub printing press in Step P56.

Next, when the correction value of the current position of the sub printing press thus read out is added to the current position of the machine shaft of the main printing press obtained by the calculation, and the virtual current position of the machine shaft of the sub printing press is calculated and stored in Step P57, the instructed (slower) speed of the main printing press is read out of the memory 155 for an instructed speed of the main printing press in Step P58. Next, when the instructed (slower) speed of the main printing press and the virtual current position of the machine shaft of the sub printing press are transmitted to the drive control device 20 of the sub printing press in Step P59, the instructed (slower) speed is outputted to the drive motor driver 189 of the main printing press in Step P60. Thereafter, the operation goes to Step P131 to be described later.

The internal clock counter (for counting elapsed time) 174 starts counting in the above-mentioned Step P61. Next, when the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in Step P62, the counted value of the internal clock counter 174 is read out in Step P63. Next, when the counted value of the internal clock counter 174 becomes equal to or greater than the time interval to transmit the instructed speed of the main printing press and the virtual current position of the sub printing press to the drive control device 20 of the sub printing press in Step P64, the pre-set (slower) speed is read out of the memory 154 for a pre-set speed of the main printing press in Step P65. Next, when the pre-set (slower) speed is written in memory 155 for an instructed speed of the main printing press in Step P66, a counted value is read out of the main printing press motor shaft position detection counter 195 and is stored in Step P67. Next, a current position of a motor shaft of the main printing press is calculated by use of the counted value of the main printing press motor shaft position detection counter 195 and is stored in Step P68, the correction value of the current position of the sub printing press is read out of the memory 160 for a correction value of a current position of the sub printing press in Step P69.

Next, when the correction value of the current position of the sub printing press thus read out is added to the current position of the motor shaft of the main printing press obtained by the calculation, and a virtual current position of a motor shaft of the sub printing press is calculated and stored in Step P70, the instructed (slower) speed of the main printing press is read out of the memory 155 for an instructed speed of the main printing press in Step P71. Next, when the instructed (slower) speed of the main printing press and the virtual current position of the motor shaft of the sub printing press are transmitted to the drive control device 20 of the sub printing press in Step P72, the instructed (slower) speed is outputted to the drive motor driver 189 of the main printing press in Step P73. Thereafter, the operation goes to the above-described Step P61.

If the result is NO in the above-described Step P64, a judgment is made in Step P74 as to whether or not a motor shaft home position alignment completion signal has been transmitted from the drive control device 20 of the sub printing press. If the result is YES, the motor shaft home position alignment completion signal is received from the drive control device 20 of the sub printing press in Step P75. Next, when a number of the sub printing press whose motor shaft home position alignment completion signal has been received is stored in Step P76, a judgment is made in Step P77 as to whether or not motor shaft home position alignment is completed in terms of all the sub printing presses. If the result is NO, the operation returns to the above-described Step P61.

On the other hand, if the result is YES, the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in Step P78. Then, the counted value of the internal clock counter 174 is read out in Step P79. Next, when the counted value of the internal clock counter 174 becomes equal to or greater than the time interval to transmit the instructed speed of the main printing press and the virtual current position of the sub printing press to the drive control device 20 of the sub printing press in Step P80, the pre-set (slower) speed is read out of the memory 154 for a pre-set speed of the main printing press in Step P81. Next, when the pre-set (slower) speed is written in the memory 155 for an instructed speed of the main printing press in Step P82, the counted value is read out of the main printing press motor shaft position detection counter 195, and is stored in Step P83. Next, when the current position of the motor shaft of the main printing press is calculated by use of the counted value of the main printing press motor shaft position detection counter 195 and is stored in Step P84, the correction value of the current position of the sub printing press is read out of the memory 160 for a correction value of a current position of the sub printing press in Step P85.

Next, when the correction value of the current position of the sub printing press thus read out is added to the current position of the motor shaft of the main printing press obtained by the calculation, and the virtual current position of the motor shaft of the sub printing press is calculated and stored in Step P86, the instructed (slower) speed of the main printing press is read out of the memory 155 for an instructed speed of the main printing press in Step P87. Next, when the instructed (slower) speed of the main printing press and the virtual current position of the motor shaft of the sub printing press are transmitted to the drive control device 20 of the sub printing press in Step P88, the instructed (slower) speed is outputted to the drive motor driver 189 of the main printing press in Step P89. Next, when the instructed (slower) speed of the main printing press is read out of the memory 155 for an instructed speed of the main printing press in Step P90, the instructed (slower) speed is written in the memory 167 for a previous instructed speed of the main printing press in Step P91. Thereafter, the operation goes to Step P105 to be described later.

If the result is NO in the above-described Step P74, a judgment is made in Step P92 as to whether or not the stop signal for the printing press has been inputted. Here, if the result is NO, the operation returns to Step P61. If the result is YES, the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in Step P93, and then the counted value of the internal clock counter 174 is read out in Step P94. Next, when the counted value of the internal clock counter 174 becomes equal to or greater than the time interval to transmit the instructed speed of the main printing press and the virtual current position of the sub printing press to the drive control device 20 of the sub printing press in Step P95, the pre-set (slower) speed is read out of the memory 154 for a pre-set speed of the main printing press in Step P96. Next, when the pre-set (slower) speed is written in memory 155 for an instructed speed of the main printing press in Step P97, the counted value is read out of the main printing press motor shaft position detection counter 195 and is stored in Step P98. Next, when the current position of the motor shaft of the main printing press is calculated by use of the counted value of the main printing press motor shaft position detection counter 195 and is stored in Step P99, the correction value of the current position of the sub printing press is read out of the memory 160 for a correction value of a current position of the sub printing press in Step P100.

Next, when the correction value of the current position of the sub printing press thus read out is added to the current position of the motor shaft of the main printing press obtained by the calculation, and the virtual current position of the motor shaft of the sub printing press is calculated and stored in Step P101, the instructed (slower) speed of the main printing press is read out of the memory 155 for an instructed speed of the main printing press in Step P102. Next, when the instructed (slower) speed of the main printing press and the virtual current position of the motor shaft of the sub printing press are transmitted to the drive control device 20 of the sub printing press in Step P103, the instructed (slower) speed is outputted to the drive motor driver 189 of the main printing press in Step P104. Thereafter, the operation goes to Step P131 to be described later.

When the internal clock counter (for counting elapsed time) 174 starts counting in the above-described Step P105, a judgment is made in Step P106 as to whether or not the pre-set speed has been inputted to the speed setter 187. If the result is YES, the pre-set speed is read out of the speed setter 187 and stored in Step P107, and then the pre-set speed is read out of the memory 154 for a pre-set speed of the main printing press in Step P108. On the other hand, if the result is NO, the operation directly goes to Step P108.

Next, when a previous pre-set speed is read out of the memory 167 for a previous instructed speed of the main printing press in Step P109, a judgment is made in Step P110 as to whether or not the pre-set speed of the main printing press thus read out is equal to the previous instructed speed of the main printing press. Here, if the result is YES, the pre-set speed of the main printing press thus read out is written in the memory 155 for an instructed speed of the main printing press in Step P111, and then the operation goes to Step P120 to be described later. On the other hand, if the result is NO, a judgment is made in Step P112 as to whether or not the pre-set speed of the main printing press thus read out is grater than the previous instructed speed of the main printing press thus read out. If the result is YES, a speed modification value upon acceleration is read out of the memory 168 for a speed modification value upon acceleration in Step P113. Next, the speed modification value upon acceleration thus read out is added to the previous instructed speed of the main printing press and a modified instructed speed of the main printing press is thereby calculated and stored in Step P114. Then, the modified instructed speed of the main printing press obtained by the calculation is written in the memory 155 for an instructed speed of the main printing press in Step P115. Thereafter, the operation goes to Step P120 to be described later.

If the result is NO in the above-described Step P112, a speed modification value upon deceleration is read out of the memory 169 for a speed modification value upon deceleration in Step P116. Then, the speed modification value upon deceleration thus read out is subtracted from the previous instructed speed of the main printing press and the modified instructed speed of the main printing press is thereby calculated and stored in Step P117. Next, a judgment is made in Step P118 as to whether or not the modified instructed speed of the main printing press is smaller than 0. If the result is YES, the modified instructed speed of the main printing press is rewritten into zero in Step P119, and then the operation goes to the above-described Step P115. On the other hand, if the result is NO, the operation directly goes to Step P115.

Next, the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in the above-mentioned Step P120, and then the counted value of the internal clock counter 174 is read out in Step P121. Next, when the counted value of the internal clock counter 174 becomes equal to or greater than the time interval to transmit the instructed speed of the main printing press and the virtual current position of the sub printing press to the drive control device of the sub printing press in Step P122, the counted value is read out of the main printing press motor shaft position detection counter 195 and is stored in Step P123.

Next, when the current position of the motor shaft of the main printing press is calculated by use of the counted value of the main printing press motor shaft position detection counter 195 and is stored in Step P124, the correction value of the current position of the sub printing press is read out of the memory 160 for a correction value of a current position of the sub printing press in Step P125. Next, the correction value of the current position of the sub printing press thus read out is added to the current position of the motor shaft of the main printing press obtained by the calculation, and the virtual current position of the motor shaft of the sub printing press is calculated and stored in Step P126, and then the instructed speed of the main printing press is read out of the memory 155 for an instructed speed of the main printing press in Step P127.

Next, when the instructed speed of the main printing press and the virtual current position of the motor shaft of the sub printing press are transmitted to the drive control device 20 of the sub printing press in Step P128, the instructed speed is outputted to the drive motor driver 189 of the main printing press in Step P129. Next, when the instructed speed of the main printing press is written in the memory 167 for a previous instructed speed of the main printing press in Step P130, a judgment is made in Step P131 as to whether or not the stop signal for the printing press has been inputted. Here, if the result is NO, the operation returns to the above-described Step P105. If the answer is YES, zero is written in the memory 154 for a pre-set speed of the main printing press in Step P132.

Next, when the internal clock counter (for counting elapsed time) 174 starts counting in Step P133, the previous instructed speed is read out of the memory 167 for a previous instructed speed of the main printing press in Step P134. Next, a judgment is made in Step P135 as to whether or not the previous instructed speed of the main printing press thus read out is equal to 0. Here, if the result is YES, zero is written in the memory 155 for an instruction speed of the main printing press in Step P136, and then the operation goes to Step P143 to be described later. If the result is NO, the speed modification value upon deceleration is read out of the memory 169 for a speed modification value upon deceleration in Step P137.

Next, the speed modification value upon deceleration thus read out is subtracted from the previous instructed speed of the main printing press and the modified instructed speed of the main printing press is thereby calculated and stored in Step P138. Thereafter, a judgment is made in Step P139 as to whether or not the modified instructed speed of the main printing press is smaller than 0. Here, if the result is YES, the modified instructed speed of the main printing press is rewritten into zero in Step P140, and then the modified instructed speed of the main printing press obtained by the calculation is written in the memory 155 for an instructed speed of the main printing press in Step P141. If the result is NO, the operation directly goes to Step P141. Thereafter, the modified instructed speed obtained by the calculation is written in the memory 167 for a previous instructed speed of the main printing press in Step P142.

Next, when the time interval to transmit the instructed speed of the main printing press and the virtual current position of the sub printing press to the drive control device 20 of the sub printing press is read out of the memory 157 for a time interval to transmit the instructed speed of the main printing press and a virtual current position of the sub printing press to the drive control device of the sub printing press in the above-mentioned Step P143, the counted value of the internal clock counter 174 is read out in Step P144. Next, when the counted value of the internal clock counter 174 becomes equal to or greater than the time interval to transmit the instructed speed of the main printing press and the virtual current position of the sub printing press to the drive control device of the sub printing press in Step P145, the counted value is read out of the main printing press motor shaft position detection counter 195 and is stored in Step P146.

Next, when the current position of the motor shaft of the main printing press is calculated by use of the counted value of the main printing press motor shaft position detection counter 195 and is stored in Step P147, the correction value of the current position of the sub printing press is read out of the memory 160 for a correction value of a current position of the sub printing press in Step P148. Next, the correction value of the current position of the sub printing press thus read out is added to the current position of the motor shaft of the main printing press obtained by the calculation, and the virtual current position of the motor shaft of the sub printing press is calculated and stored in Step P149, and then the instructed speed of the main printing press is read out of the memory 155 for an instructed speed of the main printing press in Step P150.

Next, when the instructed speed of the main printing press and the virtual current position of the motor shaft of the sub printing press are transmitted to the drive control device 20 of the sub printing press in Step P151, the instructed speed is outputted to the drive motor driver 189 of the main printing press in Step P152. Thereafter, outputs of the F/V converters 191 and 193 connected to the rotary encoders 18 and 118 of the drive motors of the respective printing presses are read out in Step P153. Next, current speeds of the respective printing presses are calculated and stored in Step P154 by use of the outputs of the F/V converters 191 and 193 connected to the rotary encoders 18 and 118 of the drive motors of the respective printing presses, which are read out as described above. Then, a judgment is made in Step P155 as to whether or not all the current speeds of the printing presses obtained by the calculation are equal to zero.

If the result is NO in the above-described Step P155, the operation returns to the above-described Step P133. On the other hand, if the result is YES, a synchronous drive stop instruction is transmitted to the drive control device 20 of the sub printing press in Step P156. Next, when a synchronous drive stop signal is transmitted from the drive control device 20 of the sub printing press in Step P157, the number of the sub printing press which has transmitted the synchronous drive stop signal is received from the drive control device 20 of the sub printing press and stored in Step P158.

Next, when an activation signal is outputted to the drive motor brake circuit 197 of the sub printing press which has received the synchronous drive stop signal in Step P159, a judgment is made in Step P160 as to whether or not all the sub printing presses have stopped synchronous drive.

If the result is NO in the above-described Step P160, the operation returns to the above-described Step P157. On the other hand, if the result is YES, the starting signal for the drive motor driver 189 of the main printing press is turned off in Step P161. Next, when an activation signal is outputted to the drive motor brake circuit 196 of the main printing press in Step P162, the synchronous drive switch is turned off in Step P163. Here, if the synchronous drive switch is not turned off and if the printing press drive switch is turned on in Step P164, the operation returns to Step P3.

In this way, according to this embodiment, when the main printing press A and the sub printing press B are in shutdown, phase deviation between the main printing press A and the sub printing press B is prevented and the synchronous condition is retained by stopping the synchronous control by the drive motors 15 and 115 and by starting the drive motor brakes 16 and 116 attached to the drive motors 15 and 115 instead.

In this case, according to this embodiment, when the speeds of the respective printing presses A and B are detected by the rotary encoders 18 and 118 and the speeds are reduced to zero by the stop instruction, the synchronous control (drive) of the sub printing press with respect to the main printing press A is released. Simultaneously, the drive motor brakes 16 and 116 of the drive motors 15 and 115 of the respective printing presses A and B are started. Accordingly, rotation of the respective printing presses A and B is stopped by the drive motor brakes 16 and 116 when the respective printing presses A and B are in shutdown.

In this way, it is not necessary to supply currents to the drive motors 15 and 115 and to the drive motor drivers 189 and 235 when the respective printing presses A and B are in shutdown. Therefore, it is possible to reduce power consumption and to improve durability of motors and motor bearings.

Eighth Embodiment

Figure 62:
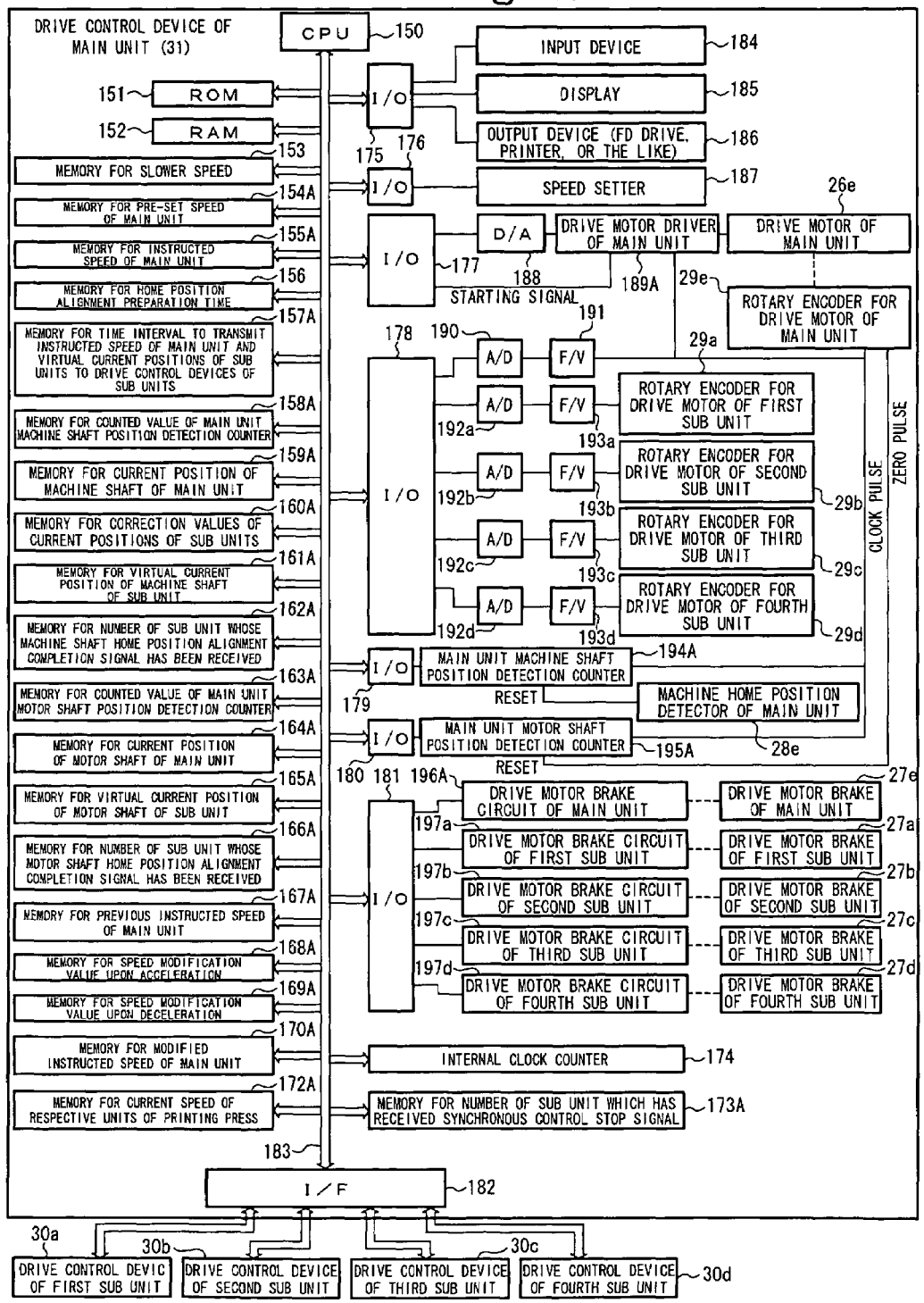
FIG. 62 is a block diagram of a drive control device for a main printing press, showing an eighth embodiment of the present invention.
Figure 63A:
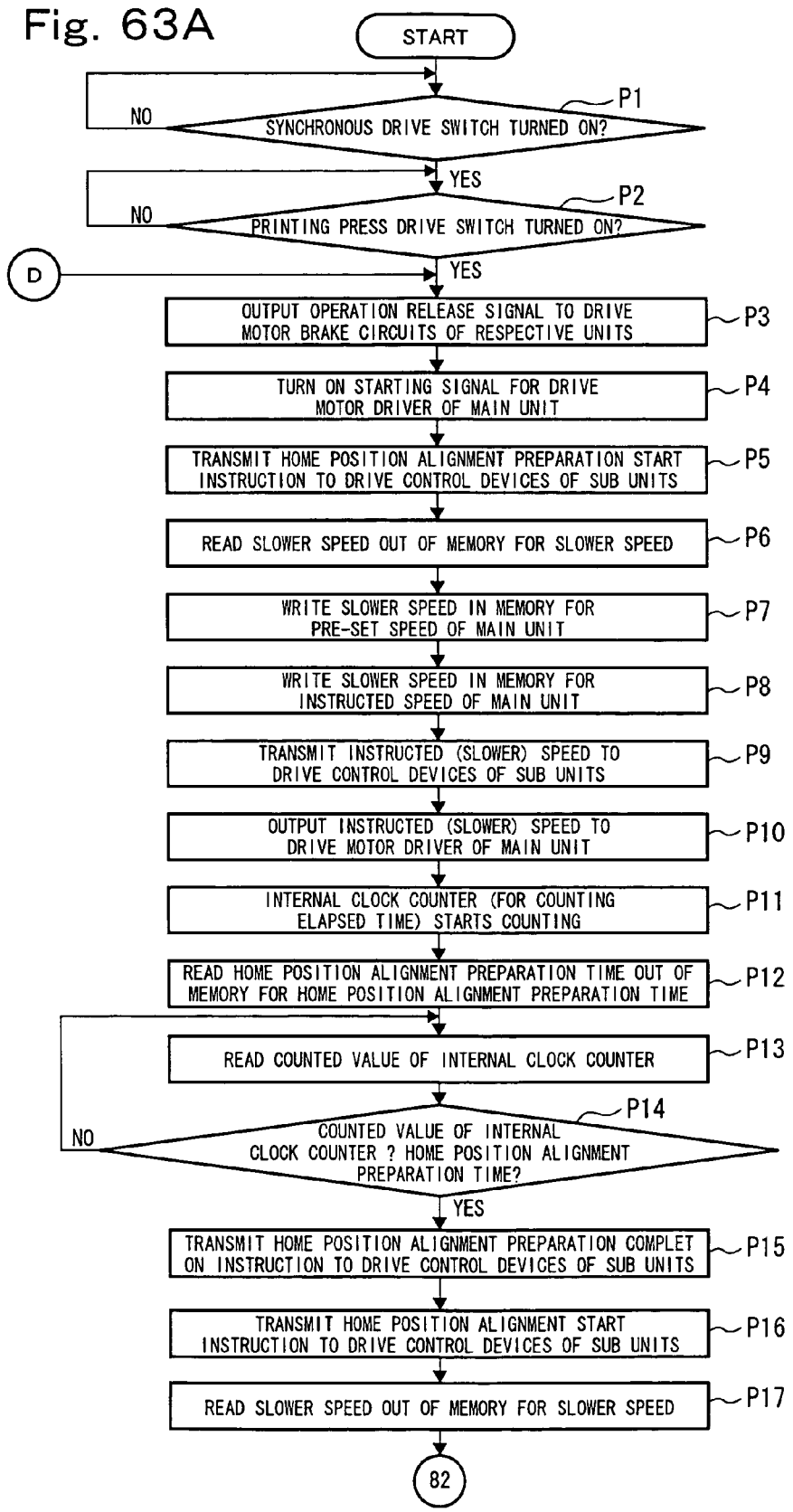
FIG. 63A is an operational flowchart of the drive control device for the main unit.
Figure 63B:
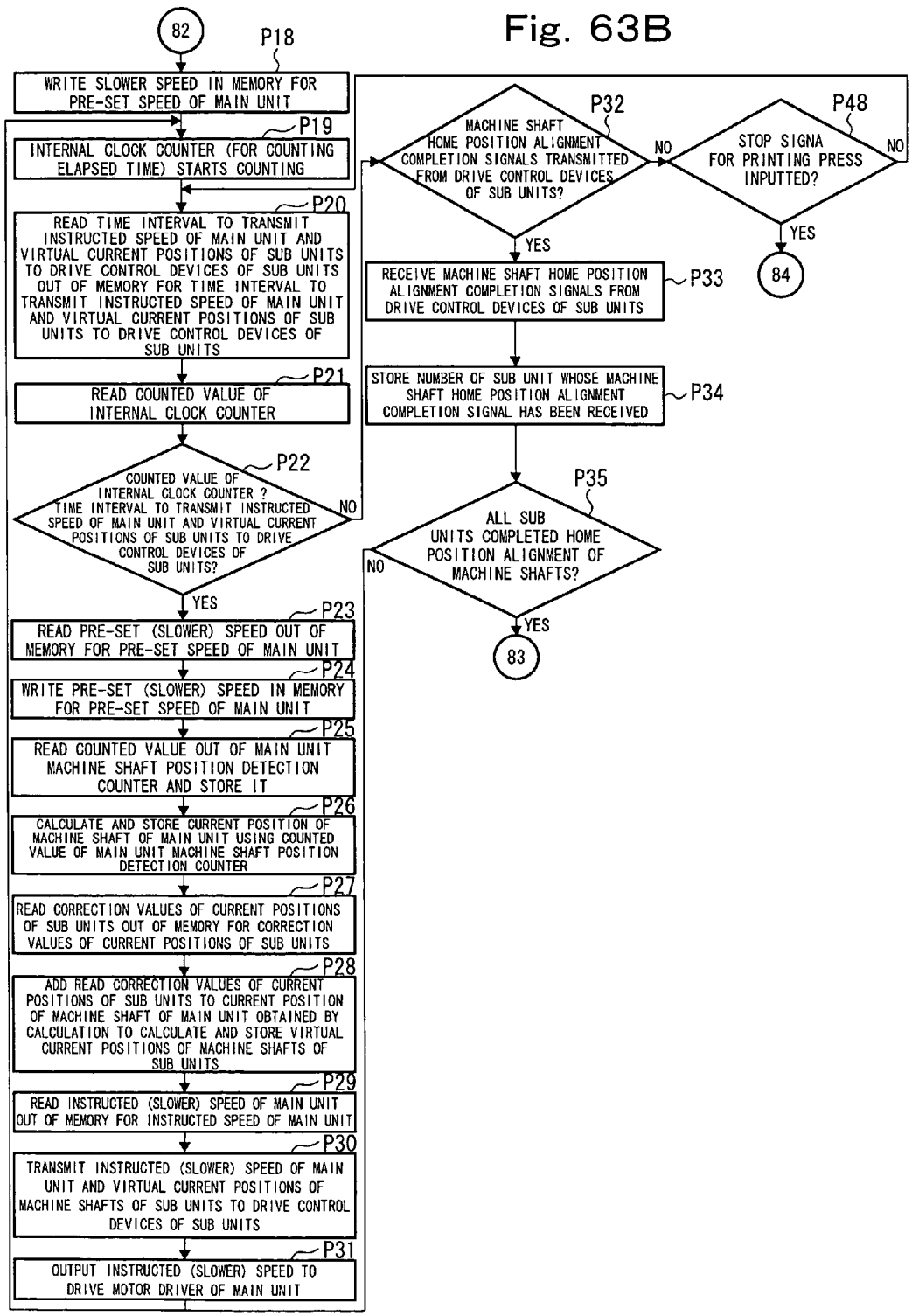
FIG. 63B is another operational flowchart of the drive control device for the main unit.
Figure 63C:
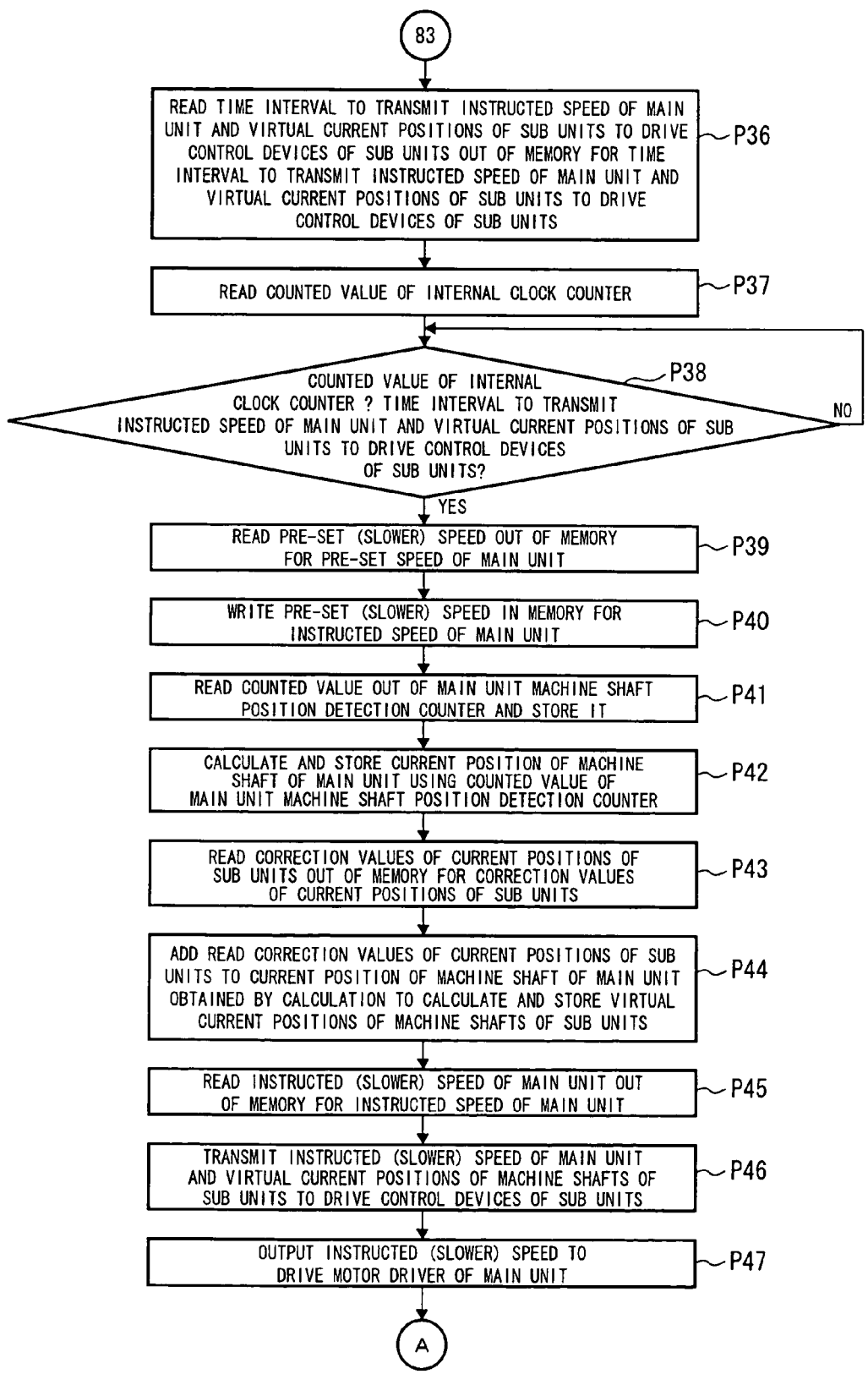
FIG. 63C is another operational flowchart of the drive control device for the main unit.
Figure 63D:
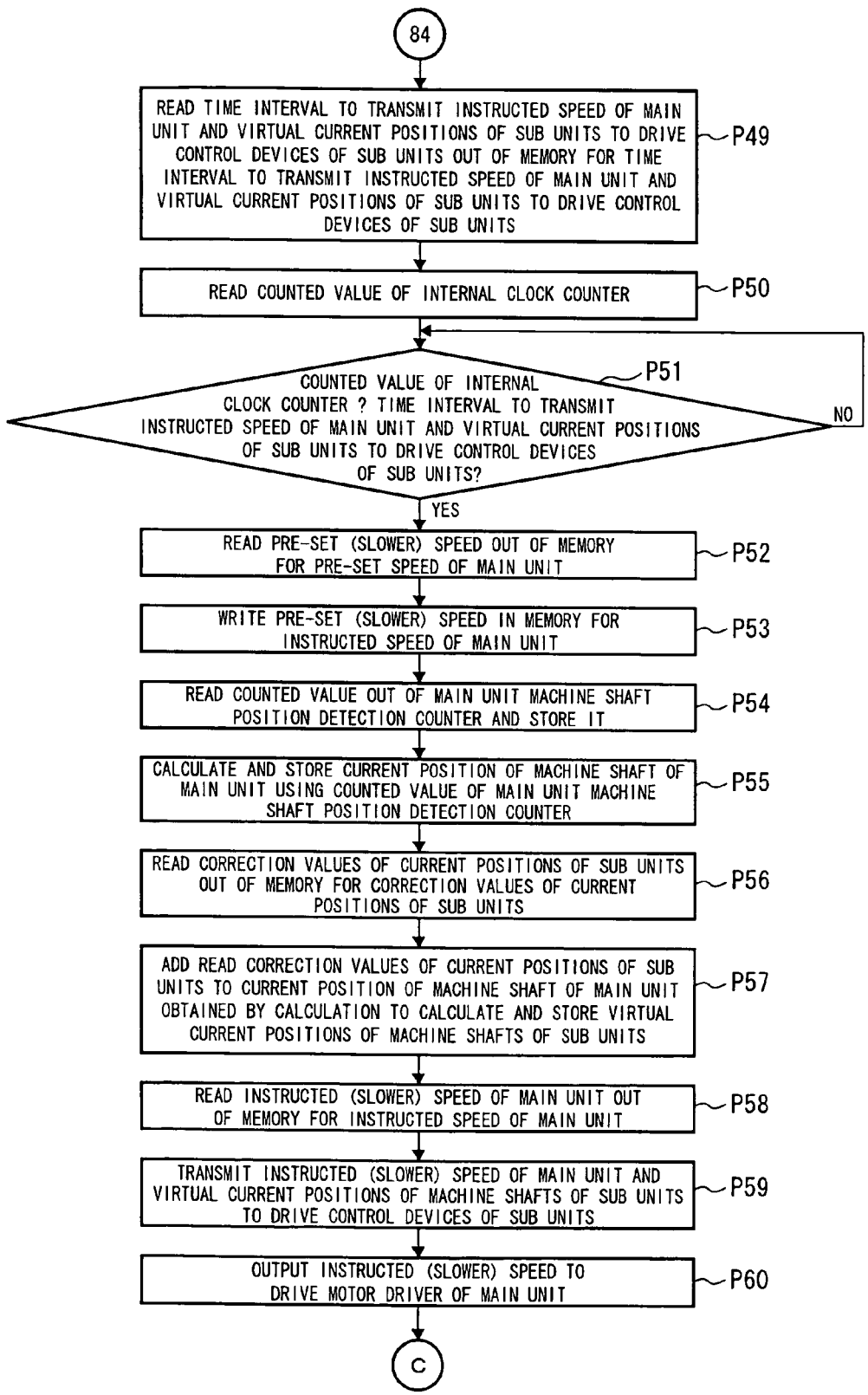
FIG. 63D is another operational flowchart of the drive control device for the main unit.
Figure 64A:
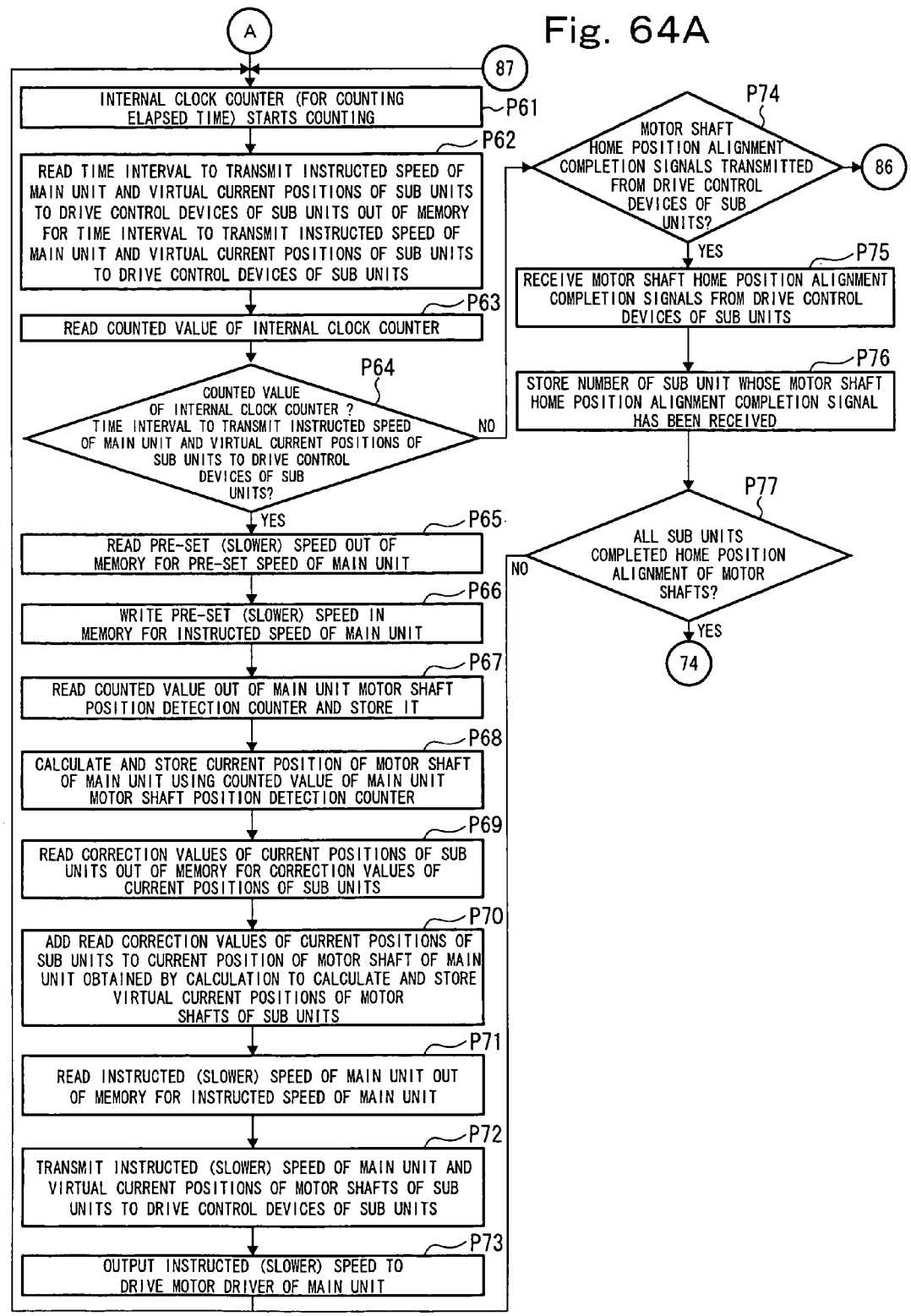
FIG. 64A is another operational flowchart of the drive control device for the main unit.
Figure 64B:
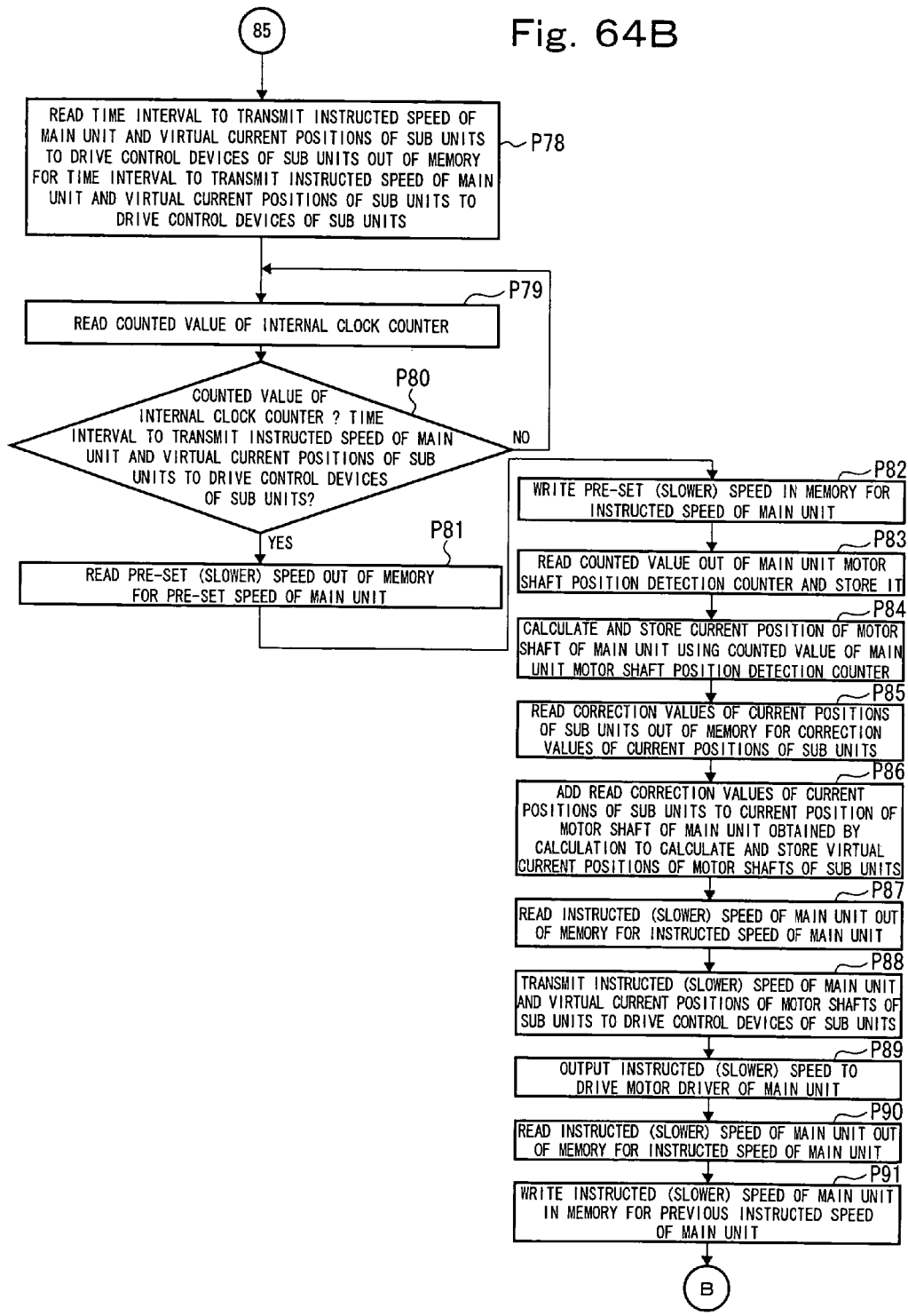
FIG. 64B is another operational flowchart of the drive control device for the main unit.
Figure 64C:
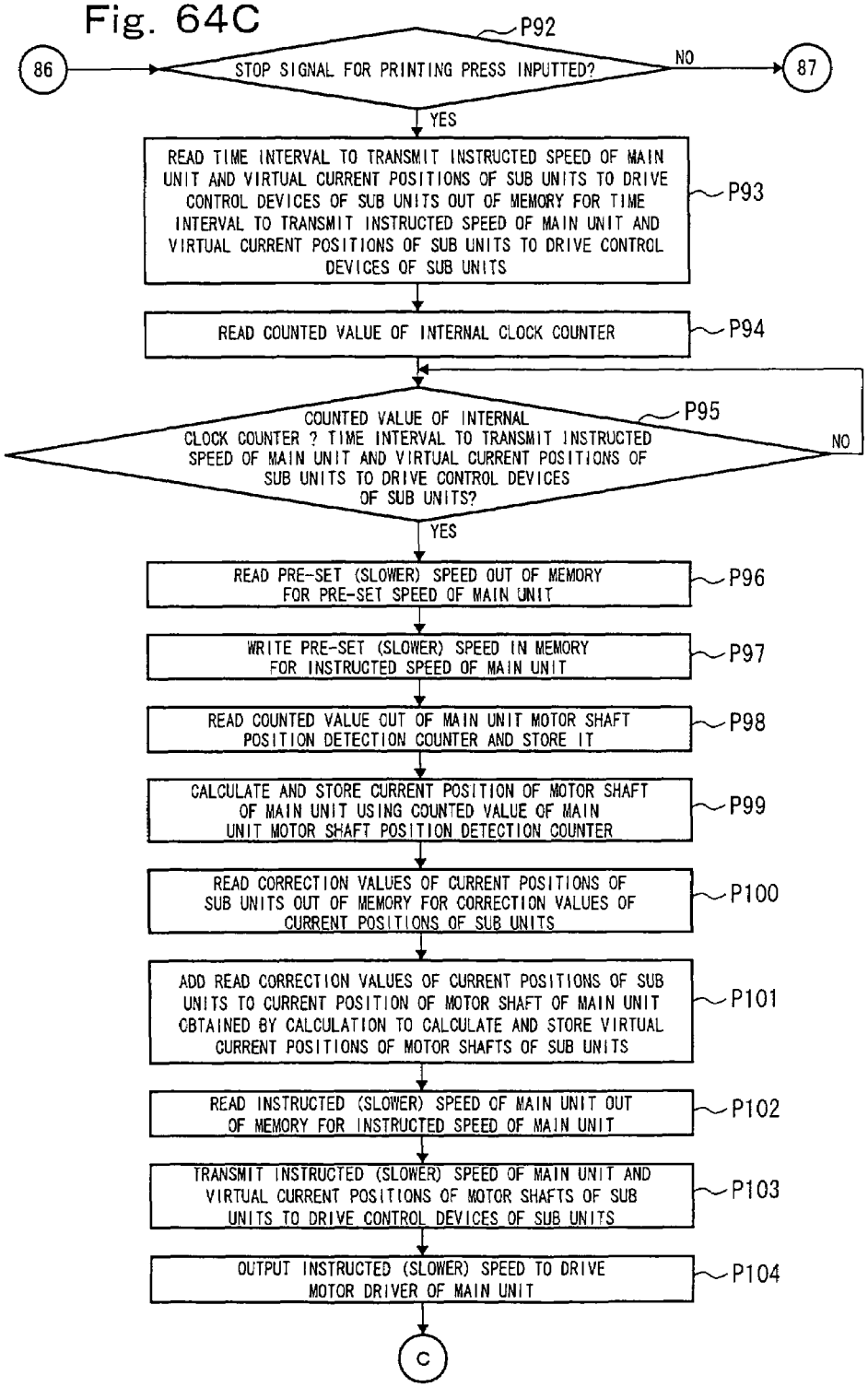
FIG. 64C is another operational flowchart of the drive control device for the main unit.
Figure 65A:
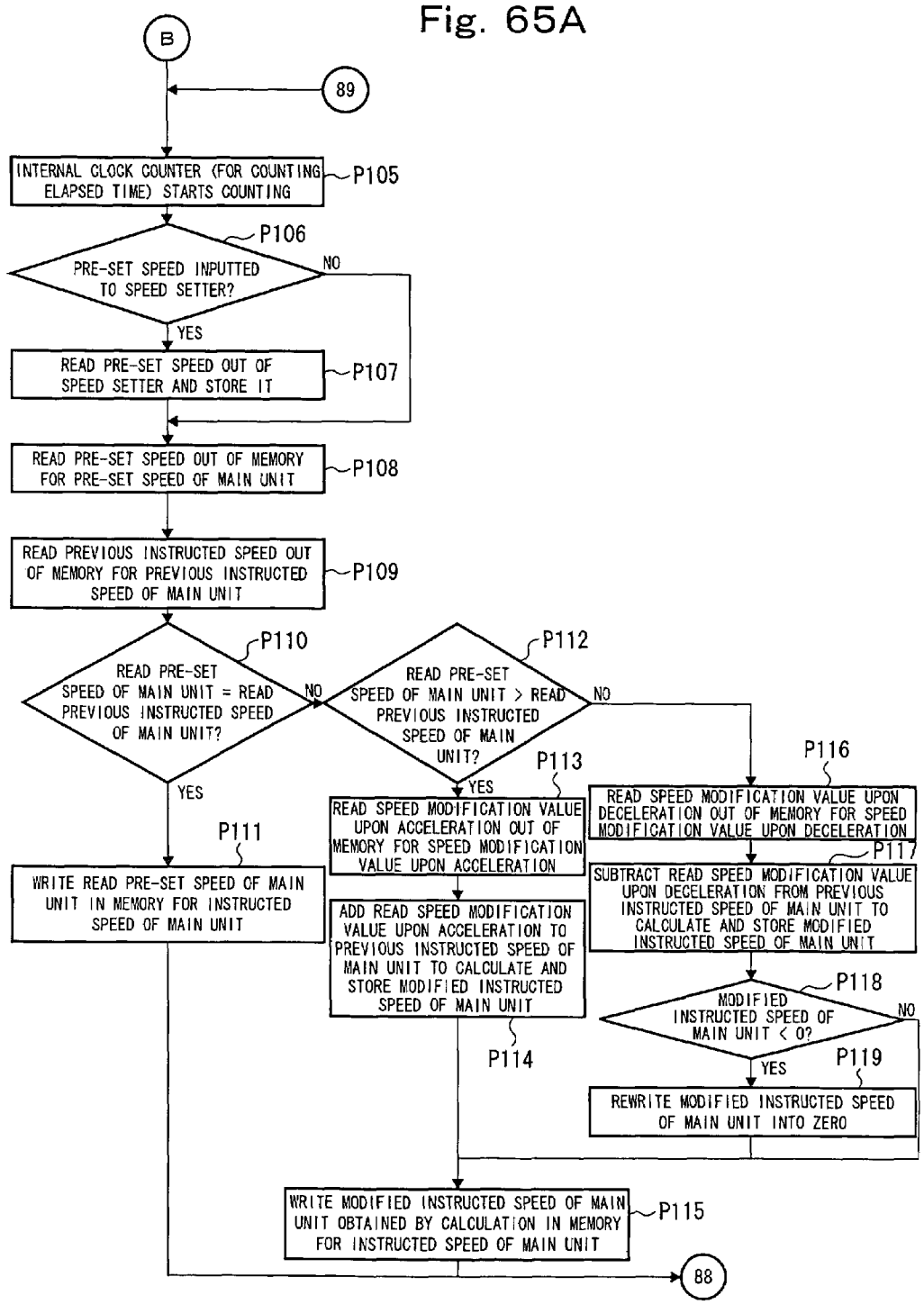
Figure 65B:
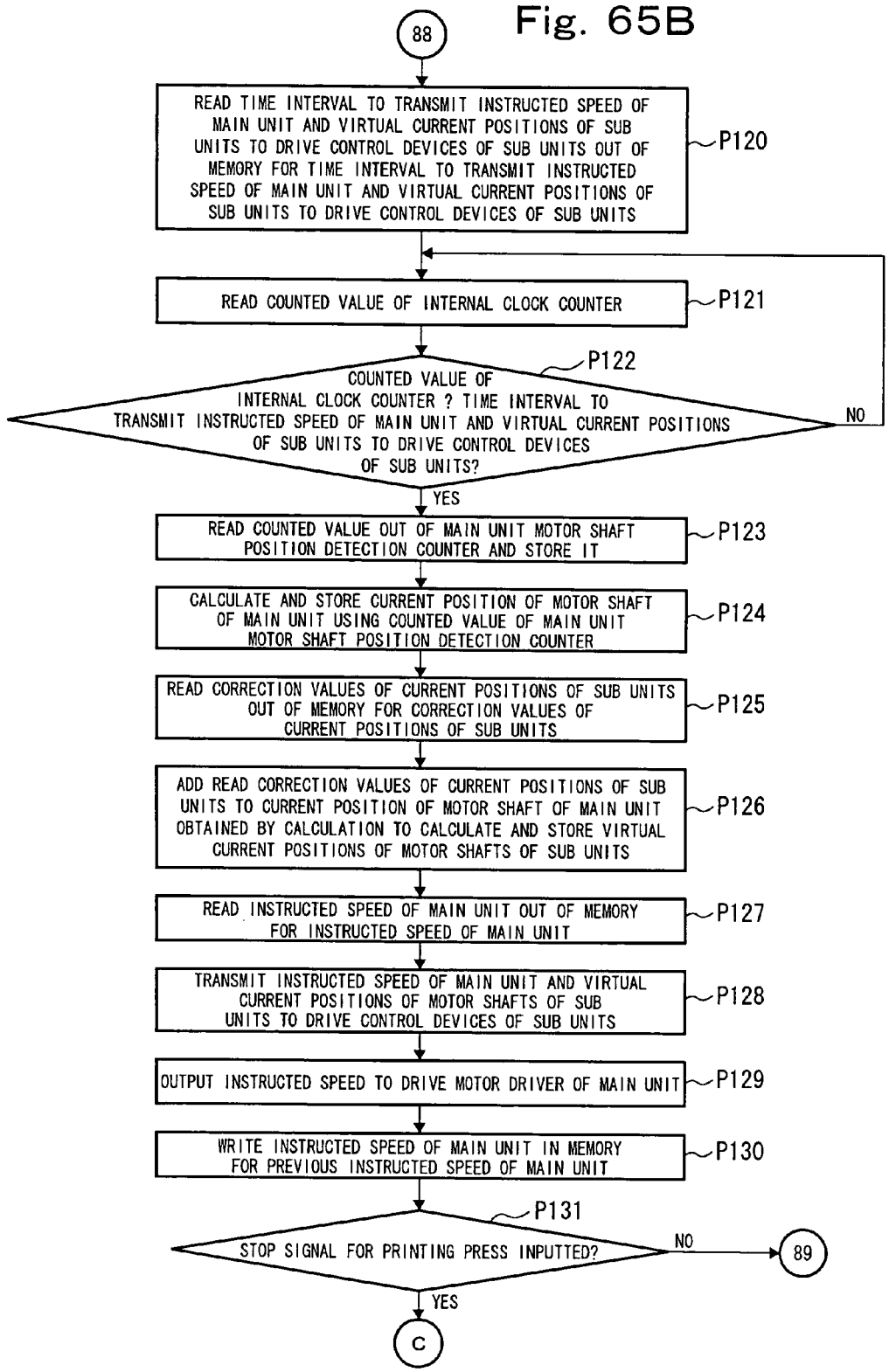
Figure 66A:
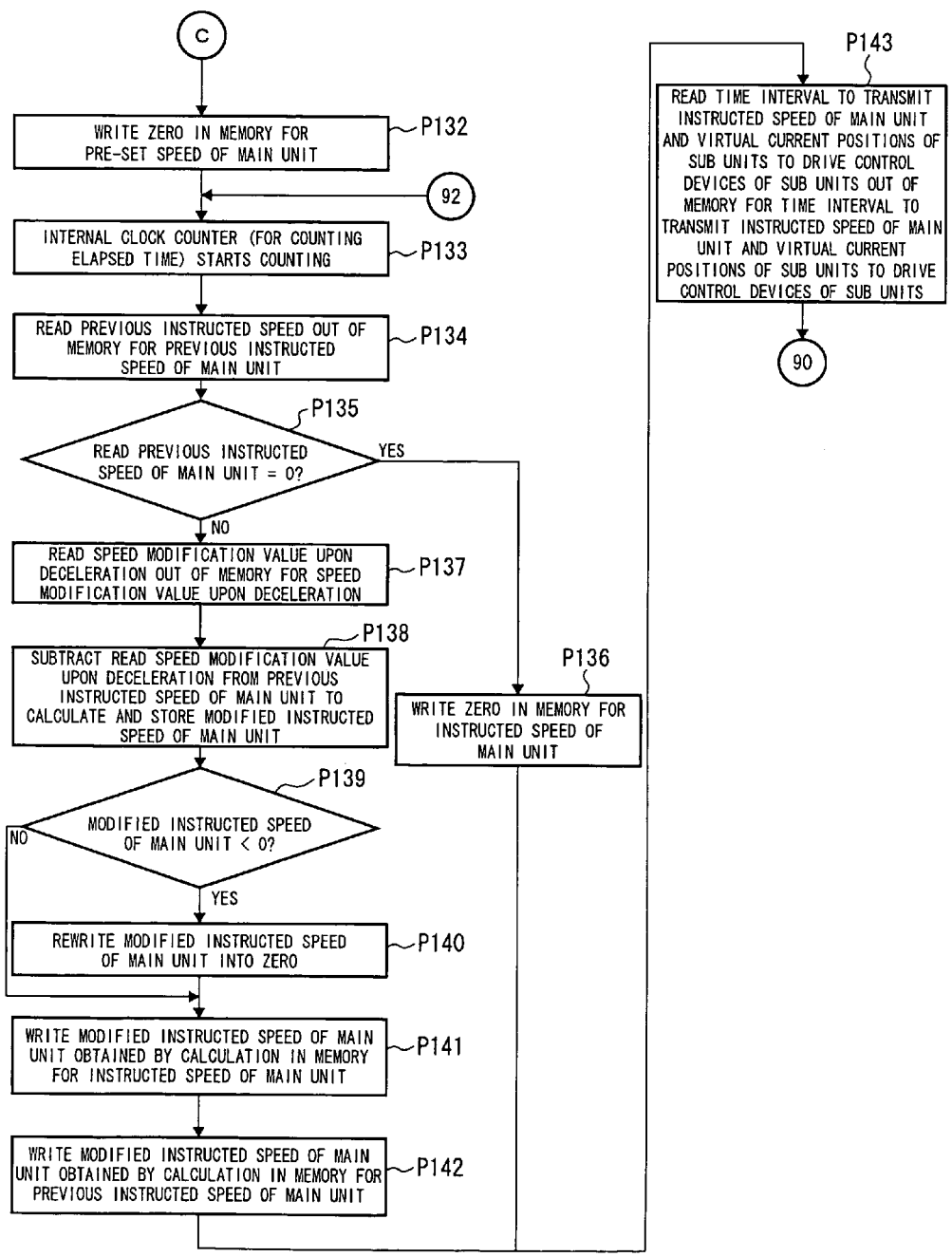
Figure 66B:
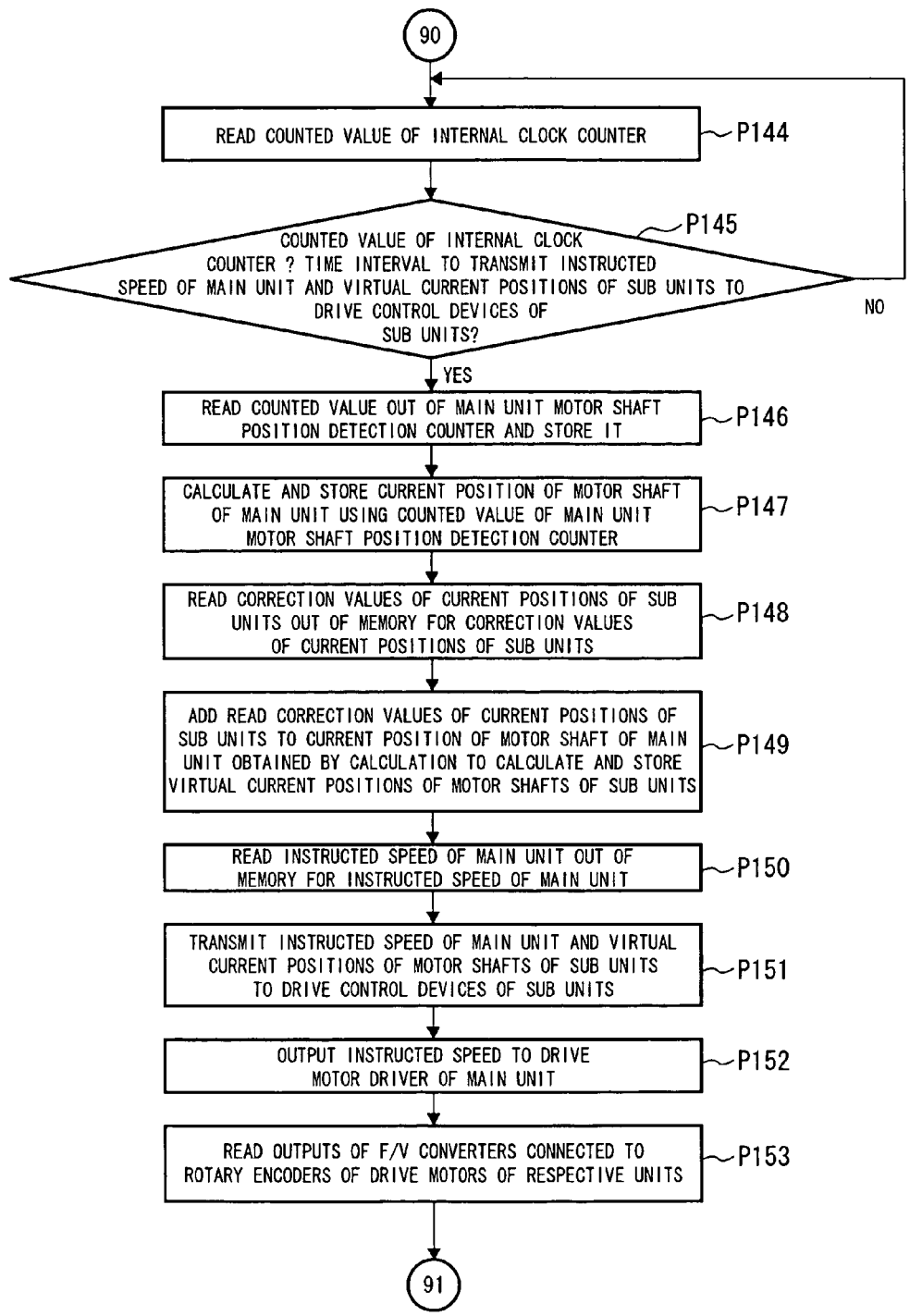
Figure 66C:
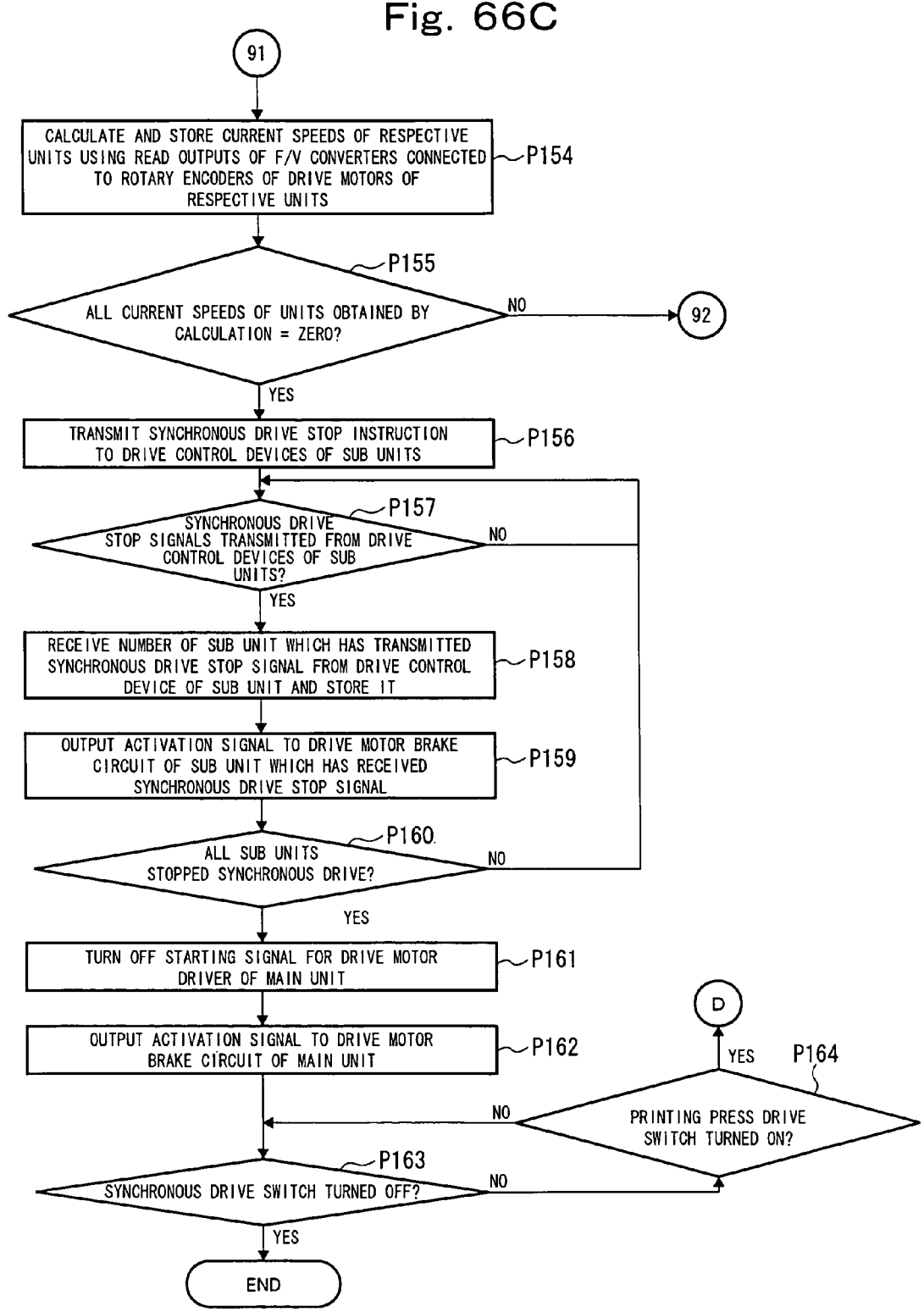

FIG. 62 is a block diagram of a drive control device for a main unit of a printing press showing an eighth embodiment of the present invention. FIG. 63A is an operational flowchart of the drive control device for the main unit. FIG. 63B is another operational flowchart of the drive control device for the main unit. FIG. 63C is another operational flowchart of the drive control device for the main unit. FIG. 63D is another operational flowchart of the drive control device for the main unit. FIG. 64A is another operational flowchart of the drive control device for the main unit. FIG. 64B is another operational flowchart of the drive control device for the main unit. FIG. 64C is another operational flowchart of the drive control device for the main unit. FIG. 65A is another operational flowchart of the drive control device for the main unit. FIG. 65B is another operational flowchart of the drive control device for the main unit. FIG. 66A is another operational flowchart of the drive control device for the main unit. FIG. 66B is another operational flowchart of the drive control device for the main unit. FIG. 66C is another operational flowchart of the drive control device for the main unit.

This embodiment is a modified example of the above-described fourth embodiment, which is configured to release synchronous control of the sub units with respect to the main unit and simultaneously to start the drive motor brakes 26a to 26e of the respective units when the speeds of the respective units become zero in the course of shutting down the printing press. Therefore, in this embodiment, the schematic configuration diagram of the synchronous control device for the respective units in the printing press, the block diagram of the drive control device of each sub unit, and the operational flowcharts of the drive control device of the sub unit are similar to those in the fourth embodiment. Accordingly, reference will be made to the fourth embodiment in this context, and detailed explanation will be omitted herein.

As shown in FIG. 62, a drive control device 31 of the main unit includes a CPU 150, a ROM 151, a RAM 152, a memory 153 for a slower speed, a memory 154A for a pre-set speed of the main unit, a memory 155A for an instructed speed of the main unit, a memory 156 for home position alignment preparation time, a memory 157A for a time interval to transmit the instructed speed of the main unit and virtual current positions of the sub units to the drive control devices of the sub units, a memory 158A for a counted value of a main unit machine shaft position detection counter, a memory 159A for a current position of the machine shaft of the main unit, a memory 160A for correction values of current positions of the sub units, a memory 161A for virtual current positions of machine shafts of the sub units, a memory 162A for a number of the sub unit whose machine shaft home position alignment completion signal has been received, a memory 163A for a counted value of a main unit motor shaft position detection counter, a memory 164A for a current position of a motor shaft of the main unit, a memory 165A for virtual current positions of motor shafts of the sub units, a memory 166A for a number of the sub unit whose motor shaft home position alignment completion signal has been received, a memory 167A for a previous instructed speed of the main unit, a memory 168A for a speed modification value upon acceleration, a memory 169A for a speed modification value upon deceleration, a memory 170A for a modified instructed speed of the main unit, a memory 172A for current speeds of the respective units in the printing presses, a memory 173A for a number of the sub unit which has received a synchronous control stop signal, and an internal clock counter 174, which are connected to one another by a bus 183 together with respective input and output devices 175 to 181 and an interface 182.

An input device 184 such as a keyboard or various switches and buttons, a display 185 such as a CRT or a lamp, and an output device 186 such as a printer or a FD drive are connected to the input and output device 175. A speed setter 187 is connected to the input and output device 176. A drive motor driver 189A of the main unit is connected to the input and output device 177 through a D/A converter 188, and a drive motor 26e of the main unit and a rotary encoder 29e for the drive motor of the main unit are connected to this drive motor driver 189A. A rotary encoder 29e for the drive motor of the main unit is connected to the input and output device 178 through an A/D converter 190 and a F/V converter 191, and rotary encoders 29a to 29d for the drive motors of the first to fourth sub units are similarly connected thereto through A/D converters 192a to 192d and F/V converters 193a to 193d. A main unit machine shaft position detection counter 194A is connected to the input and output device 179, and the rotary encoder 29e for the drive motor of the main unit and a machine home position detector 28e of the main unit are connected to this counter 194A. A main unit motor shaft position detection counter 195A is connected to the input and output device 180, and the rotary encoder 29e for the drive motor of the main unit is connected to this counter 195A. A drive motor brake 27e of the main unit is connected to the input and output device 181 through a drive motor brake circuit 196A of the main unit, and drive motor brakes 27a to 27d of the first to fourth sub units are also connected thereto through drive motor brake circuits 197a to 197d of the first to fourth sub units. Moreover, drive control devices 30a to 30d of the sub units to be described later are connected to the interface 182.

Now, the drive control device 31 of the main unit is operated in accordance with operational flows shown in FIG. 63A, FIG. 63B, FIG. 63C, FIG. 63D, FIG. 64A, FIG. 64B, FIG. 64C, FIG. 65A, FIG. 65B, FIG. 66A, FIG. 66B, and FIG. 66C in order to perform synchronous control (drive) of the first to fourth units 3 to 6 as the sub units with respect to a folding machine 10 as the main unit.

Specifically, when a synchronous drive switch is turned on in Step P1 and a printing press drive switch is turned on in Step P2, an operation release signal is outputted to the drive motor brake circuits 196A, and 197a to 197d of the respective units in Step P3. Next, when a starting signal for the drive motor driver 189A of the main unit is turned on in Step P4, a home position alignment preparation start instruction is transmitted to the drive control devices 30a to 30d of the sub units in Step P5. Next, when a slower speed is read out of the memory 153 for a slower speed in Step P6, the slower speed is written in the memory 154A for a pre-set speed of the main unit in Step P7. Next, when the slower speed is written in memory 155A for an instructed speed of the main unit in Step P8, the instructed (slower) speed is transmitted to the drive control devices 30a to 30d of the sub units in Step P9. Next, when the instructed (slower) speed is outputted to the drive motor driver 189A of the main unit in Step P10, the internal clock counter (for counting elapsed time) 174 starts counting in Step P11. Next, when home position alignment preparation time is read out of the memory 156 for home position alignment preparation time in Step P12, the counted value of the internal clock counter 174 is read out in Step P13.

When the counted value of the internal clock counter 174 becomes equal to or greater than the home position alignment preparation time in Step P14, a home position alignment preparation completion instruction is transmitted to the drive control devices 30a to 30d of the sub units in Step P15. Next, when the home position alignment start instruction is transmitted to the drive control devices 30a to 30d of the sub units in Step P16, the slower speed is read out of the memory 153 for a slower speed in Step P17. Next, when the slower speed is written in the memory 154A for a pre-set speed of the main unit in Step P18, the internal clock counter (for counting elapsed time) 174 starts counting in Step P19. Next, when a time interval to transmit the instructed speed of the main unit and virtual current positions of the sub units to the drive control devices 30a to 30d of the sub units is read out of the memory 157A for a time interval to transmit the instructed speed of the main unit and virtual current positions of the sub units to the drive control devices of the sub units in Step P20, the counted value of the internal clock counter 174 is read out in Step P21.

Next, a judgment is made in Step P22 as to whether or not the counted value of the internal clock counter 174 is equal to or greater than the time interval to transmit the instructed speed of the main unit and the virtual current positions of the sub units to the drive control devices 30a to 30d of the sub units. If the result is YES, the pre-set (slower) speed is read out of the memory 154A for a pre-set speed of the main unit in Step P23. Next, when the pre-set (slower) speed is written in the memory 155A for an instructed speed of the main unit in Step P24, a counted value is read out of the main unit machine shaft position detection counter 194A, and is stored in Step P25. Next, when a current position of the machine shaft of the main unit is calculated by use of the counted value of the main unit machine shaft position detection counter 194A and is stored in Step P26, correction values of current positions of the sub units are read out of the memory 160A for correction values of current positions of the sub units in Step P27.

Next, when the correction values of the current positions of the sub units thus read out are added to the current position of the machine shaft of the main unit obtained by the calculation, and virtual current positions of the machine shafts of the sub units are calculated and stored in Step P28, the instructed (slower) speed of the main unit is read out of the memory 155A for an instructed speed of the main unit in Step P29. Next, when the instructed (slower) speed of the main unit and the virtual current positions of the machine shafts of the sub units are transmitted to the drive control devices 30a to 30d of the sub units in Step P30, the instructed (slower) speed is outputted to the drive motor driver 189A of the main unit in Step P31. Thereafter, the operation returns to Step P19.

If the result is NO in the above-described Step P22, a judgment is made in Step P32 as to whether or not machine shaft home position alignment completion signals have been transmitted from the drive control devices 30a to 30d of the sub units. If the result is YES, the machine shaft home position alignment completion signals are received from the drive control devices 30a to 30d of the sub units in Step P33. Next, when a number of the sub unit whose machine shaft home position alignment completion signal has been received is stored in Step P34, a judgment is made in Step P35 as to whether or not machine shaft home position alignment is completed in terms of all the sub units. If the result is NO, the operation returns to the above-described Step P19.

On the other hand, if the result is YES, the time interval to transmit the instructed speed of the main unit and the virtual current positions of the sub units to the drive control devices 30a to 30d of the sub units is read out of the memory 157A for a time interval to transmit the instructed speed of the main unit and virtual current positions of the sub units to the drive control devices of the sub units in Step P36. Then, the counted value of the internal clock counter 174 is read out in Step P37. Next, when the counted value of the internal clock counter 174 becomes equal to or greater than the time interval to transmit the instructed speed of the main unit and the virtual current positions of the sub units to the drive control devices 30a to 30d of the sub units in Step P38, the pre-set (slower) speed is read out of the memory 154A for a pre-set speed of the main unit in Step P39. Next, when the pre-set (slower) speed is written in the memory 155A for an instructed speed of the main unit in Step P40, the counted value is read out of the main unit machine shaft position detection counter 194A, and is stored in Step P41. Next, when the current position of the machine shaft of the main unit is calculated by use of the counted value of the main unit machine shaft position detection counter 194A and is stored in Step P42, the correction values of the current positions of the sub units are read out of the memory 160A for correction values of current positions of the sub units in Step P43.

Next, when the correction values of the current positions of the sub units thus read out are added to the current position of the machine shaft of the main unit obtained by the calculation, and the virtual current positions of the machine shafts of the sub units are calculated and stored in Step P44, the instructed (slower) speed of the main unit is read out of the memory 155A for an instructed speed of the main unit in Step P45. Next, when the instructed (slower) speed of the main unit and the virtual current positions of the machine shafts of the sub units are transmitted to the drive control devices 30a to 30d of the sub units in Step P46, the instructed (slower) speed is outputted to the drive motor driver 189A of the main unit in Step P47. Thereafter, the operation goes to Step P61 to be described later.

If the result is NO in the above-described Step P32, a judgment is made in Step P48 as to whether or not a stop signal for the printing press has been inputted. Here, if the result is NO, the operation returns to Step P20. If the result is YES, the time interval to transmit the instructed speed of the main unit and the virtual current positions of the sub units to the drive control devices 30a to 30d of the sub units is read out of the memory 157A for a time interval to transmit the instructed speed of the main unit and a virtual current positions of the sub units to the drive control devices of the sub units in Step P49, and then the counted value of the internal clock counter 174 is read out in Step P50. Next, when the counted value of the internal clock counter 174 becomes equal to or greater than the time interval to transmit the instructed speed of the main unit and the virtual current positions of the sub units to the drive control devices 30a to 30d of the sub units in Step P51, the pre-set (slower) speed is read out of the memory 154A for a pre-set speed of the main unit in Step P52. Next, when the pre-set (slower) speed is written in memory 155A for an instructed speed of the main unit in Step P53, the counted value is read out of the main unit machine shaft position detection counter 194A and is stored in Step P54. Next, when the current position of the machine shaft of the main unit is calculated by use of the counted value of the main unit machine shaft position detection counter 194A and is stored in Step P55, the correction values of the current positions of the sub units are read out of the memory 160A for correction values of current positions of the sub units in Step P56.

Next, when the correction values of the current positions of the sub units thus read out are added to the current position of the machine shaft of the main unit obtained by the calculation, and the virtual current positions of the machine shafts of the sub units are calculated and stored in Step P57, the instructed (slower) speed of the main unit is read out of the memory 155A for an instructed speed of the main unit in Step P58. Next, when the instructed (slower) speed of the main unit and the virtual current positions of the machine shafts of the sub units are transmitted to the drive control devices 30a to 30d of the sub units in Step P59, the instructed (slower) speed is outputted to the drive motor driver 189A of the main unit in Step P60. Thereafter, the operation goes to Step P131 to be described later.

The internal clock counter (for counting elapsed time) 174 starts counting in the above-mentioned Step P61. Next, when the time interval to transmit the instructed speed of the main unit and the virtual current positions of the sub units to the drive control devices 30a to 30d of the sub units is read out of the memory 157A for a time interval to transmit the instructed speed of the main unit and virtual current positions of the sub units to the drive control devices of the sub units in Step P62, the counted value of the internal clock counter 174 is read out in Step P63. Next, when the counted value of the internal clock counter 174 becomes equal to or greater than the time interval to transmit the instructed speed of the main unit and the virtual current positions of the sub units to the drive control devices 30a to 30d of the sub units in Step P64, the pre-set (slower) speed is read out of the memory 154A for a pre-set speed of the main unit in Step P65. Next, when the pre-set (slower) speed is written in memory 155A for an instructed speed of the main unit in Step P66, a counted value is read out of the main unit motor shaft position detection counter 195A and is stored in Step P67. Next, a current position of a motor shaft of the main unit is calculated by use of the counted value of the main unit motor shaft position detection counter 195A and is stored in Step P68, the correction values of the current positions of the sub units are read out of the memory 160A for correction values of current positions of the sub units in Step P69.

Next, when the correction values of the current positions of the sub units thus read out are added to the current position of the motor shaft of the main unit obtained by the calculation, and virtual current positions of motor shafts of the sub units are calculated and stored in Step P70, the instructed (slower) speed of the main unit is read out of the memory 155A for an instructed speed of the main unit in Step P71. Next, when the instructed (slower) speed of the main unit and the virtual current positions of the motor shafts of the sub units are transmitted to the drive control devices 30a to 30d of the sub units in Step P72, the instructed (slower) speed is outputted to the drive motor driver 189A of the main unit in Step P73. Thereafter, the operation goes to the above-described Step P61.

If the result is NO in the above-described Step P64, a judgment is made in Step P74 as to whether or not motor shaft home position alignment completion signals have been transmitted from the drive control devices 30a to 30d of the sub units. If the result is YES, the motor shaft home position alignment completion signals are received from the drive control devices 30a to 30d of the sub units in Step P75. Next, when a number of the sub unit whose motor shaft home position alignment completion signal has been received is stored in Step P76, a judgment is made in Step P77 as to whether or not motor shaft home position alignment is completed in terms of all the sub units. If the result is NO, the operation returns to the above-described Step P61.

On the other hand, if the result is YES, the time interval to transmit the instructed speed of the main unit and the virtual current positions of the sub units to the drive control devices 30a to 30d of the sub units is read out of the memory 157A for a time interval to transmit the instructed speed of the main unit and virtual current positions of the sub units to the drive control devices of the sub units in Step P78. Then, the counted value of the internal clock counter 174 is read out in Step P79. Next, when the counted value of the internal clock counter 174 becomes equal to or greater than the time interval to transmit the instructed speed of the main unit and the virtual current positions of the sub units to the drive control devices 30a to 30d of the sub units in Step P80, the pre-set (slower) speed is read out of the memory 154A for a pre-set speed of the main unit in Step P81. Next, when the pre-set (slower) speed is written in the memory 155A for an instructed speed of the main unit in Step P82, the counted value is read out of the main unit motor shaft position detection counter 195A, and is stored in Step P83. Next, when the current position of the motor shaft of the main unit is calculated by use of the counted value of the main printing press motor shaft position detection counter195A and is stored in Step P84, the correction values of the current positions of the sub units are read out of the memory 160A for correction values of current positions of the sub units in Step P85.

Next, when the correction values of the current positions of the sub units thus read out are added to the current position of the motor shaft of the main unit obtained by the calculation, and the virtual current positions of the motor shafts of the sub units are calculated and stored in Step P86, the instructed (slower) speed of the main unit is read out of the memory 155A for an instructed speed of the main unit in Step P87. Next, when the instructed (slower) speed of the main unit and the virtual current positions of the motor shafts of the sub units are transmitted to the drive control devices 30a to 30d of the sub units in Step P88, the instructed (slower) speed is outputted to the drive motor driver 189A of the main unit in Step P89. Next, when the instructed (slower) speed of the main unit is read out of the memory 155A for an instructed speed of the main unit in Step P90, the instructed (slower) speed is written in the memory 167A for a previous instructed speed of the main unit in Step P91. Thereafter, the operation goes to Step P105 to be described later.

If the result is NO in the above-described Step P74, a judgment is made in Step P92 as to whether or not the stop signal for the printing press has been inputted. Here, if the result is NO, the operation returns to Step P61. If the result is YES, the time interval to transmit the instructed speed of the main unit and the virtual current positions of the sub units to the drive control devices 30a to 30d of the sub units is read out of the memory 157A for a time interval to transmit the instructed speed of the main unit and virtual current positions of the sub units to the drive control devices of the sub units in Step P93, and then the counted value of the internal clock counter 174 is read out in Step P94. Next, when the counted value of the internal clock counter 174 becomes equal to or greater than the time interval to transmit the instructed speed of the main unit and the virtual current positions of the sub units to the drive control devices 30a to 30d of the sub units in Step P95, the pre-set (slower) speed is read out of the memory 154A for a pre-set speed of the main unit in Step P96. Next, when the pre-set (slower) speed is written in memory 155A for an instructed speed of the main unit in Step P97, the counted value is read out of the main unit motor shaft position detection counter 195A and is stored in Step P98. Next, when the current position of the motor shaft of the main unit is calculated by use of the counted value of the main unit motor shaft position detection counter 195A and is stored in Step P99, the correction values of the current positions of the sub units are read out of the memory 160A for correction values of current positions of the sub units in Step P100.

Next, when the correction values of the current positions of the sub units thus read out are added to the current position of the motor shaft of the main unit obtained by the calculation, and the virtual current positions of the motor shafts of the sub units are calculated and stored in Step P101, the instructed (slower) speed of the main unit is read out of the memory 155A for an instructed speed of the main unit in Step P102. Next, when the instructed (slower) speed of the main unit and the virtual current positions of the motor shafts of the sub units are transmitted to the drive control devices 30a to 30d of the sub units in Step P103, the instructed (slower) speed is outputted to the drive motor driver 189A of the main unit in Step P104. Thereafter, the operation goes to Step P132 to be described later.

When the internal clock counter (for counting elapsed time) 174 starts counting in the above-described Step P105, a judgment is made in Step P106 as to whether or not the pre-set speed has been inputted to the speed setter 187. If the result is YES, the pre-set speed is read out of the speed setter 187 and stored in Step P107, and then the pre-set speed is read out of the memory 154A for a pre-set speed of the main unit in Step P108. On the other hand, if the result is NO, the operation directly goes to Step P108.

Next, when a previous instructed speed is read out of the memory 167A for a previous instructed speed of the main unit in Step P109, a judgment is made in Step P110 as to whether or not the pre-set speed of the main unit thus read out is equal to the previous instructed speed of the main unit. Here, if the result is YES, the pre-set speed of the main unit thus read out is written in the memory 155A for an instructed speed of the main unit in Step P111, and then the operation goes to Step P120 to be described later. On the other hand, if the result is NO, a judgment is made in Step P112 as to whether or not the pre-set speed of the main unit thus read out is grater than the previous instructed speed of the main unit thus read out. If the result is YES, a speed modification value upon acceleration is read out of the memory 168A for a speed modification value upon acceleration in Step P113. Next, the speed modification value upon acceleration thus read out is added to the previous instructed speed of the main unit and a modified instructed speed of the main unit is thereby calculated and stored in Step P114. Then, the modified instructed speed of the main unit obtained by the calculation is written in the memory 155A for an instructed speed of the main unit in Step P115. Thereafter, the operation goes to Step P120 to be described later.

If the result is NO in the above-described Step P112, a speed modification value upon deceleration is read out of the memory 169A for a speed modification value upon deceleration in Step P116. Then, the speed modification value upon deceleration thus read out is subtracted from the previous instructed speed of the main unit and the modified instructed speed of the main unit is thereby calculated and stored in Step P117. Next, a judgment is made in Step P118 as to whether or not the modified instructed speed of the main unit is smaller than 0. If the result is YES, the modified instructed speed of the main unit is rewritten into zero in Step P119, and then the operation goes to the above-described Step P115. On the other hand, if the result is NO, the operation directly goes to Step P115.

Next, the time interval to transmit the instructed speed of the main unit and the virtual current positions of the sub units to the drive control devices 30a to 30d of the sub units is read out of the memory 157A for a time interval to transmit the instructed speed of the main unit and virtual current positions of the sub units to the drive control devices of the sub units in the above-mentioned Step P120, and then the counted value of the internal clock counter 174 is read out in Step P121. Next, when the counted value of the internal clock counter 174 becomes equal to or greater than the time interval to transmit the instructed speed of the main unit and the virtual current positions of the sub units to the drive control devices of the sub units in Step P122, the counted value is read out of the main unit motor shaft position detection counter 195A and is stored in Step P123.

Next, when the current position of the motor shaft of the main unit is calculated by use of the counted value of the main unit motor shaft position detection counter 195A and is stored in Step P124, the correction values of the current positions of the sub units are read out of the memory 160A for a correction value of current positions of the sub units in Step P125. Next, the correction values of the current positions of the sub units thus read out are added to the current position of the motor shaft of the main unit obtained by the calculation, and the virtual current positions of the motor shafts of the sub units are calculated and stored in Step P126, and then the instructed speed of the main unit is read out of the memory 155A for an instructed speed of the main unit in Step P127.

Next, when the instructed speed of the main unit and the virtual current positions of the motor shafts of the sub units are transmitted to the drive control devices 30a to 30d of the sub units in Step P128, the instructed speed is outputted to the drive motor driver 189A of the main unit in Step P129. Next, when the instructed speed of the main unit is written in the memory 167A for a previous instructed speed of the main unit in Step P130, a judgment is made in Step P131 as to whether or not the stop signal for the printing press has been inputted. Here, if the result is NO, the operation returns to the above-described Step P105. If the answer is YES, zero is written in the memory 154A for a pre-set speed of the main unit in Step P132.

Next, when the internal clock counter (for counting elapsed time) 174 starts counting in Step P133, the previous instructed speed is read out of the memory 167A for a previous instructed speed of the main unit in Step P134. Next, a judgment is made in Step P135 as to whether or not the previous instructed speed of the main unit thus read out is equal to 0. Here, if the result is YES, zero is written in the memory 155A for an instruction speed of the main unit in Step P136, and then the operation goes to Step P143 to be described later. If the result is NO, the speed modification value upon deceleration is read out of the memory 169A for a speed modification value upon deceleration in Step P137.

Next, the speed modification value upon deceleration thus read out is subtracted from the previous instructed speed of the main unit and the modified instructed speed of the main unit is thereby calculated and stored in Step P138. Thereafter, a judgment is made in Step P139 as to whether or not the modified instructed speed of the main unit is smaller than 0. Here, if the result is YES, the modified instructed speed of the main unit is rewritten into zero in Step P140, and then the modified instructed speed of the main unit obtained by the calculation is written in the memory 155A for an instructed speed of the main unit in Step P141. If the result is NO, the operation directly goes to Step P141. Thereafter, the modified instructed speed obtained by the calculation is written in the memory 167A for a previous instructed speed of the main unit in Step P142.

Next, when the time interval to transmit the instructed speed of the main unit and the virtual current positions of the sub units to the drive control devices 30a to 30d of the sub units is read out of the memory 157A for a time interval to transmit the instructed speed of the main unit and virtual current positions of the sub units to the drive control devices of the sub units in the above-mentioned Step P143, the counted value of the internal clock counter 174 is read out in Step P144. Next, when the counted value of the internal clock counter 174 becomes equal to or greater than the time interval to transmit the instructed speed of the main unit and the virtual current positions of the sub units to the drive control devices of the sub units in Step P145, the counted value is read out of the main unit motor shaft position detection counter 195A and is stored in Step P146.

Next, when the current position of the motor shaft of the main unit is calculated by use of the counted value of the main unit motor shaft position detection counter 195A and is stored in Step P147, the correction values of the current positions of the sub units are read out of the memory 160A for correction values of current positions of the sub units in Step P148. Next, the correction values of the current positions of the sub units thus read out are added to the current position of the motor shaft of the main unit obtained by the calculation, and the virtual current positions of the motor shafts of the sub units are calculated and stored in Step P149, and then the instructed speed of the main unit is read out of the memory 155A for an instructed speed of the main unit in Step P150.

Next, when the instructed speed of the main unit and the virtual current positions of the motor shafts of the sub units are transmitted to the drive control devices 30a to 30d of the sub units in Step P151, the instructed speed is outputted to the drive motor driver 189A of the main unit in Step P152. Thereafter, outputs of the F/V converters 191 and 193a to 193d connected to the rotary encoders 29a to 29e of the drive motors of the respective units are read out in Step P153. Next, current speeds of the respective units are calculated and stored in Step P154 by use of the outputs of the F/V converters 191 and 193a to 193d connected to the rotary encoders 29a to 29e of the drive motors of the printing press, which are read out as described above. Then, a judgment is made in Step P155 as to whether or not all the current speeds of the units obtained by the calculation are equal to zero.

If the result is NO in the above-described Step P155, the operation returns to the above-described Step P133. On the other hand, if the result is YES, a synchronous drive stop instruction is transmitted to the drive control devices 30a to 30d of the sub units in Step P156. Next, when synchronous drive stop signals are transmitted from the drive control devices 30a to 30d of the sub units in Step P157, the numbers of the sub units which has transmitted the synchronous drive stop signal are received from the drive control devices 30a to 30d of the sub units and stored in Step P158. Next, when an activation signal is outputted to the drive motor brake circuits 197a to 197d of the sub units which have received the synchronous drive stop signals in Step P159, a judgment is made in Step P160 as to whether or not all the sub units have stopped synchronous drive.

If the result is NO in the above-described Step P160, the operation returns to Step P157. If the result is YES, the starting signal for the drive motor driver 189A of the main unit is turned off in Step P161. Next, when an activation signal is outputted to the drive motor brake circuit 196A of the main unit in Step P162, the synchronous drive switch is turned off in Step P163. Here, if the synchronous drive switch is not turned off and if the printing press drive switch is turned on in Step P164, the operation returns to Step P3.

In this way, according to this embodiment, when the printing press is in shutdown, phase deviation among the folding machine 10 as the main unit and the first to fourth units 3 to 6 as the sub units is prevented and the synchronous condition is retained by stopping the synchronous control by the drive motors 26a to 26e and by starting the drive motor brakes 27a to 27e attached to the drive motors 26a to 26e instead.

In this case, according to this embodiment, when the speeds of the first to fourth units 3 to 6 and of the folding machine 10 are detected by the rotary encoders 29a to 29e and the speeds are reduced to zero by the stop instruction, the synchronous control (drive) of the first to fourth units 3 to 6 with respect to the folding machine 10 is released. Simultaneously, the drive motor brakes 27a to 27e of the drive motors 26a to 26e of the first to fourth units 3 to 6 and of the folding machine 10 are started. Accordingly, rotation of the first to fourth units 3 to 6 and of the folding machine 10 is stopped by the drive motor brakes 27a to 27e when the printing press is in shutdown.

In this way, it is not necessary to supply currents to the drive motors 26a to 26e and to the drive motor drivers 189A and 235A when the printing press is in shutdown. Therefore, it is possible to reduce power consumption and to improve durability of motors and motor bearings.

What is claimed is:

1. A method of synchronously controlling any of multiple printing presses or any of multiple units in a printing press, in which any of the multiple printing presses or the multiple units in the printing press are respectively provided with drive motors and rotation of at least one drive motor among the plurality of drive motors is synchronously controlled, wherein braking means for braking the rotation of at least one of the drive motors among the plurality of drive motors is provided, and wherein speed detecting means for detecting a rotation speed of the drive motor provided with the braking means is provided, the method comprising:

starting deceleration of drive speeds of the plurality of drive motors by the stop instruction while performing the synchronous control; and releasing the synchronous control of the drive motor provided with the braking means and starting the braking means when the rotation speed detected by the speed detecting means becomes equal to or slower than a predetermined rotation speed.

2. The method of synchronously controlling any of multiple printing presses or any of multiple units in a printing press according to claim 1, wherein the drive motors are provided with motor drivers; and wherein the synchronous control of the drive motor is released by cutting off a starting signal for a motor driver of the drive motor.

3. The method of synchronously controlling any of multiple printing presses or any of multiple units in a printing press according to claim 1, wherein the predetermined rotation speed is equal to zero.

4. The method of synchronously controlling any of multiple printing presses or any of multiple units in a printing press according to claim 1, wherein a virtual master generator for generating a synchronization reference signal based on an inputted rotation speed instruction is provided, the synchronization reference signal includes a speed instruction and a phase instruction, and the plurality of drive motors are controlled to be synchronized with the synchronization reference signal from the virtual master generator.

5. The method of synchronously controlling any of multiple printing presses or any of multiple units in a printing press according to claim 4, wherein the drive motors are provided with motor drivers; and wherein the synchronous control of the drive motors is released by cutting off a starting signal for motor drivers of the drive motors.

6. The method of synchronously controlling any of multiple printing presses or any of multiple units in a printing press according to claim 4, wherein the predetermined rotation speed is equal to zero.

7. The method of synchronously controlling any of multiple printing presses or any of multiple units in a printing press according to claim 1, wherein the drive motors include a first drive motor and a second drive motor, braking means is for braking rotation of the second drive motor, and wherein said speed detecting means detects rotation speed of the first drive motor or the second drive motor, and wherein the starting step includes starting deceleration of drive speeds of the first drive motor and the second drive motor by the stop instruction; and the releasing step includes releasing the synchronous control of the second drive motor and starting the braking means when the rotation speed detected by the speed detecting means becomes equal to or slower than a predetermined rotation speed.

8. The method of synchronously controlling any of multiple printing presses or any of multiple units in a printing press according to claim 7, wherein the predetermined rotation speed is equal to zero.

9. The method of synchronously controlling any of multiple printing presses or any of multiple units in a printing press according to claim 7, wherein the drive motors are provided with motor drivers; and wherein the synchronous control of the drive motor is released by cutting off a starting signal for a motor driver of the drive motor.

10. A device for synchronously controlling any of multiple printing presses or any of multiple units in a printing press, in which any of the multiple printing presses or the multiple units in the printing press are respectively provided with drive motors and rotation of at least one of the drive motors among the plurality of drive motors is synchronously controlled, the device comprising:

braking means for braking the rotation of at least one of the drive motors among the plurality of drive motors;

speed detecting means for detecting a rotation speed of a said drive motor provided with the braking means; and controlling means for releasing synchronous control of the drive motor provided with the braking means by a stop instruction and starting the braking means;

wherein the controlling means starts deceleration of drive speeds of the plurality of drive motors by the stop instruction while performing the synchronous control, and when the rotation speed detected by the speed detecting means becomes equal to or slower than a predetermined rotation speed, the controlling means releases the synchronous control of the drive motor provided with the braking means, and starts the braking means.

11. The device for synchronously controlling any of multiple printing presses or any of multiple units in a printing press according to claim 10, wherein the drive motors are provided with motor drivers; and wherein the synchronous control of the drive motor is released by cutting off a starting signal for the motor driver of the drive motor.

12. The device for synchronously controlling any of multiple printing presses or any of multiple units in a printing press according to claim 10, wherein the predetermined rotation speed is equal to zero.

13. The device for synchronously controlling any of multiple printing presses or any of multiple units in a printing press according to claim 10, further comprising:

a virtual master generator for generating a synchronization reference signal based on an inputted rotation speed instruction, wherein the synchronization reference signal includes a speed instruction and a phase instruction, and the controlling means controls the plurality of drive motors in a way that the plurality of drive motors are synchronized with the synchronization reference signal from the virtual master generator.

14. The device for synchronously controlling any of multiple printing presses or any of multiple units in a printing press according to claim 13, wherein the drive motors are provided with motor drivers; and wherein the synchronous control of the drive motors is released by cutting off a starting signal for motor drivers of the drive motors.

15. The device for synchronously controlling any of multiple printing presses or any of multiple units in a printing press according to claim 13, wherein the predetermined rotation speed is equal to zero.

16. The device for synchronously controlling any of multiple printing presses or any of multiple units in a printing press according to claim 10, wherein the drive motors include a first drive motor and a second drive motor;

braking means for braking rotation of the second drive motor; and speed detecting means is for detecting rotation speed of the first drive motor or the second drive motor, wherein the controlling means starts deceleration of drive speeds of the first drive motor and the second drive motor by the stop instruction, and when the rotation speed detected by the speed detecting means becomes equal to or slower than a predetermined rotation speed, the controlling means releases the synchronous control of the second drive motor, and starts the braking means.

17. The device for synchronously controlling any of multiple printing presses or any of multiple units in a printing press according to claim 16, wherein the predetermined rotation speed is equal to zero.

18. The device for synchronously controlling any of multiple printing presses or any of multiple units in a printing press according to claim 16, wherein the drive motors are provided with motors drivers; and wherein the synchronous control of the drive motor is released by cutting off a starting signal for a motor driver of the drive motor.

* * * * *